US011625153B2

(12) United States Patent
Clarke et al.

(10) Patent No.: US 11,625,153 B2
(45) Date of Patent: Apr. 11, 2023

(54) MEDIA BROWSING USER INTERFACE WITH INTELLIGENTLY SELECTED REPRESENTATIVE MEDIA ITEMS

(71) Applicant: Apple Inc., Cupertino, CA (US)

(72) Inventors: Graham R. Clarke, Scotts Valley, CA (US); Kevin Aujoulet, San Francisco, CA (US); Kevin Bessiere, Cupertino, CA (US); Simon Bovet, Zurich (CH); Eric M. G. Circlaeys, Los Gatos, CA (US); Lynne Devine, San Francisco, CA (US); Alan C. Dye, San Francisco, CA (US); Benedikt M. Hirmer, Tbilisi (GE); Andreas Karlsson, San Jose, CA (US); Chelsea L. Burnette, Mountain View, CA (US); Matthieu Lucas, San Francisco, CA (US); Behkish J. Manzari, San Francisco, CA (US); Nicole R. Ryan, San Francisco, CA (US); William A. Sorrentino, III, Mill Valley, CA (US); Andre Souza Dos Santos, San Jose, CA (US); Gregg Suzuki, Daly City, CA (US); Sergey Tatarchuk, Cupertino, CA (US); Justin S. Titi, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/697,539

(22) Filed: Mar. 17, 2022

(65) Prior Publication Data
US 2022/0206647 A1 Jun. 30, 2022

Related U.S. Application Data

(63) Continuation of application No. 16/584,783, filed on Sep. 26, 2019, now Pat. No. 11,307,737.
(Continued)

(51) Int. Cl.
*G06F 3/0482* (2013.01)
*G06F 3/0485* (2022.01)
(Continued)

(52) U.S. Cl.
CPC ............ *G06F 3/0482* (2013.01); *G06F 3/016* (2013.01); *G06F 3/0485* (2013.01);
(Continued)

(58) Field of Classification Search
None
See application file for complete search history.

(56) References Cited

U.S. PATENT DOCUMENTS 5,416,895 A 5/1995 Anderson et al.
5,463,725 A 10/1995 Henckel et al.
(Continued)

FOREIGN PATENT DOCUMENTS

CN 1404233 A 3/2003
CN 1619541 A 5/2005
(Continued)

OTHER PUBLICATIONS

US 2002/0018582 A1, 02/2002, Hagiwara et al. (withdrawn)
Notice of acceptance received for Australian Patent Application No. 2021202225, dated Jun. 20, 2022, 3 pages.
(Continued)

*Primary Examiner* — Tuan S Nguyen
(74) *Attorney, Agent, or Firm* — DLA Piper LLP (US)

(57) ABSTRACT

The present disclosure generally relates to navigating a collection of media items. In accordance with one embodiment, in response to receiving an input, a device displays a first view of a collection of media items, including concurrently displaying a representation of a first time period and a representation of a second time period. In accordance with a determination that a current time is associated with a first recurring temporal event: the representation of the first time period includes a first representative media item and the
(Continued)

representation of the second time period includes a second representative media item. In accordance with a determination that the current time is associated with a second recurring temporal event, the representation of the first time period includes a third representative media item and the representation of the second time period includes a fourth representative media item.

51 Claims, 86 Drawing Sheets

Related U.S. Application Data

(60) Provisional application No. 62/856,052, filed on Jun. 1, 2019, provisional application No. 62/843,930, filed on May 6, 2019.

(51) Int. Cl.

| | |
|---|---|
| *G06F 9/451* | (2018.01) |
| *G06F 3/04883* | (2022.01) |
| *G06F 3/01* | (2006.01) |
| *G06F 16/435* | (2019.01) |
| *G06F 16/432* | (2019.01) |
| *G06F 16/438* | (2019.01) |
| *G06F 16/44* | (2019.01) |
| *G06F 3/04845* | (2022.01) |

(52) U.S. Cl.
CPC ...... *G06F 3/04845* (2013.01); *G06F 3/04883* (2013.01); *G06F 9/451* (2018.02); *G06F 16/434* (2019.01); *G06F 16/435* (2019.01); *G06F 16/438* (2019.01); *G06F 16/447* (2019.01)

(56) References Cited

U.S. PATENT DOCUMENTS

| | | |
|---|---|---|
| 5,565,888 A | 10/1996 | Selker |
| 5,583,542 A | 12/1996 | Capps |
| 5,602,981 A | 2/1997 | Hargrove |
| 5,604,861 A | 2/1997 | Douglas et al. |
| 5,677,708 A | 10/1997 | Matthews et al. |
| 5,685,723 A | 11/1997 | Ladin et al. |
| 5,712,995 A | 1/1998 | Cohn |
| 5,757,368 A | 5/1998 | Gerpheide et al. |
| 5,767,835 A | 6/1998 | Obbink et al. |
| 5,784,061 A | 7/1998 | Moran et al. |
| 5,825,349 A | 10/1998 | Meier et al. |
| 5,845,122 A | 12/1998 | Nielsen et al. |
| 5,864,868 A | 1/1999 | Contois |
| 5,886,697 A | 3/1999 | Naughton et al. |
| 5,956,035 A | 9/1999 | Sciammarella et al. |
| 5,969,283 A | 10/1999 | Looney et al. |
| 5,973,694 A | 10/1999 | Steele et al. |
| 6,055,543 A | 4/2000 | Christensen et al. |
| 6,073,036 A | 6/2000 | Heikkinen et al. |
| 6,088,649 A | 7/2000 | Kadaba et al. |
| 6,118,450 A | 9/2000 | Proehl et al. |
| 6,141,007 A | 10/2000 | Elterman et al. |
| 6,154,210 A | 11/2000 | Anderson |
| 6,160,551 A | 12/2000 | Naughton et al. |
| 6,167,469 A | 12/2000 | Satai et al. |
| 6,237,010 B1 | 5/2001 | Hui et al. |
| 6,244,988 B1 | 6/2001 | Delman |
| 6,245,982 B1 | 6/2001 | Suzuki et al. |
| 6,248,946 B1 | 6/2001 | Dwek |
| 6,252,596 B1 | 6/2001 | Garland et al. |
| 6,272,246 B1 | 8/2001 | Takai |
| 6,292,273 B1 | 9/2001 | Dow et al. |
| 6,301,586 B1 | 10/2001 | Yang et al. |
| 6,317,784 B1 | 11/2001 | Mackintosh et al. |
| 6,334,025 B1 | 12/2001 | Yamagami et al. |
| 6,346,951 B1 | 2/2002 | Mastronardi |
| 6,356,971 B1 | 3/2002 | Katz et al. |
| 6,374,177 B1 | 4/2002 | Lee et al. |
| 6,380,947 B1 | 4/2002 | Stead |
| 6,462,760 B1 | 10/2002 | Cox et al. |
| 6,564,213 B1 | 5/2003 | Ortega et al. |
| 6,686,938 B1 | 2/2004 | Jobs et al. |
| 6,713,312 B2 | 3/2004 | Blalock et al. |
| 6,731,312 B2 | 5/2004 | Robbin |
| 6,741,268 B1 | 5/2004 | Hayakawa et al. |
| 6,784,925 B1 | 8/2004 | Tomat et al. |
| 6,920,619 B1 | 7/2005 | Milekic |
| 6,950,989 B2 | 9/2005 | Rosenzweig et al. |
| 7,015,910 B2 | 3/2006 | Card et al. |
| 7,139,982 B2 | 11/2006 | Card et al. |
| 7,164,410 B2 | 1/2007 | Kupka |
| 7,178,111 B2 | 2/2007 | Glein et al. |
| 7,380,212 B2 | 5/2008 | Cody et al. |
| 7,434,177 B1 | 10/2008 | Ording et al. |
| 7,444,390 B2 | 10/2008 | Tadayon et al. |
| 7,453,444 B2 | 11/2008 | Geaghan |
| 7,559,034 B1 | 7/2009 | Paperny et al. |
| 7,587,671 B2 | 9/2009 | Saft et al. |
| 7,627,828 B1 | 12/2009 | Collison et al. |
| 7,695,406 B2 | 4/2010 | Waters |
| 7,779,358 B1 | 8/2010 | Gupta et al. |
| 7,791,755 B2 | 9/2010 | Mori |
| 7,823,080 B2 | 10/2010 | Miyajima et al. |
| 7,865,215 B2 | 1/2011 | Bells et al. |
| 7,970,240 B1 | 6/2011 | Chao et al. |
| 7,996,788 B2 | 8/2011 | Carmichael |
| 8,024,658 B1 | 9/2011 | Fagans et al. |
| 8,060,229 B2 | 11/2011 | Gupta et al. |
| 8,106,856 B2 | 1/2012 | Matas et al. |
| 8,132,116 B1 | 3/2012 | Schendel |
| 8,152,640 B2 | 4/2012 | Shirakawa et al. |
| 8,200,669 B1 | 6/2012 | Iampietro et al. |
| 8,259,132 B2 | 9/2012 | Buchheit |
| 8,305,355 B2 | 11/2012 | Forstall et al. |
| 8,339,420 B2 | 12/2012 | Hiraoka et al. |
| 8,456,431 B2 | 6/2013 | Victor |
| 8,458,617 B2 | 6/2013 | Victor et al. |
| 8,464,173 B2 | 6/2013 | Victor et al. |
| 8,566,403 B2 | 10/2013 | Pascal et al. |
| 8,698,762 B2 | 4/2014 | Wagner et al. |
| 8,780,069 B2 | 7/2014 | Victor et al. |
| 8,863,016 B2 | 10/2014 | Victor et al. |
| 8,934,717 B2 | 1/2015 | Newell et al. |
| 8,957,865 B2 | 2/2015 | Cieplinski et al. |
| 8,966,399 B2 | 2/2015 | Chiang et al. |
| 9,021,034 B2 | 4/2015 | Narayanan et al. |
| 9,183,560 B2 | 11/2015 | Abelow |
| 9,286,546 B2 | 3/2016 | O'malley et al. |
| 9,310,907 B2 | 4/2016 | Victor et al. |
| 9,338,242 B1 | 5/2016 | Suchland et al. |
| 9,449,365 B2 | 9/2016 | Roberts |
| 9,459,792 B2 | 10/2016 | Matas et al. |
| 9,532,734 B2 | 1/2017 | Hoffman et al. |
| 9,870,554 B1 | 1/2018 | Leung et al. |
| 9,880,805 B1 | 1/2018 | Guralnick |
| 9,904,906 B2 | 2/2018 | Kim et al. |
| 9,916,538 B2 | 3/2018 | Zadeh et al. |
| 10,019,136 B1 | 7/2018 | Ozog |
| 10,051,103 B1 | 8/2018 | Gordon et al. |
| 10,204,338 B2 | 2/2019 | Lee |
| 10,220,258 B2 | 3/2019 | Gu et al. |
| 10,282,070 B2 | 5/2019 | Victor |
| 10,303,448 B2 | 5/2019 | Steven et al. |
| 10,304,347 B2 | 5/2019 | Wilson et al. |
| 10,417,588 B1 | 9/2019 | Kreisel et al. |
| 10,489,982 B2 | 11/2019 | Johnson et al. |
| 10,509,907 B2 | 12/2019 | Shear et al. |
| 10,540,400 B2 | 1/2020 | Dumant et al. |
| 10,776,965 B2 | 9/2020 | Stetson et al. |
| 10,777,314 B1 | 9/2020 | Williams et al. |
| 11,103,161 B2 | 8/2021 | Williams et al. |
| 11,152,100 B2 | 10/2021 | Crowley et al. |
| 11,202,598 B2 | 12/2021 | Soli et al. |

(56) References Cited

U.S. PATENT DOCUMENTS

| | | |
|---|---|---|
| 11,209,957 B2 | 12/2021 | Dryer et al. |
| 11,317,833 B2 | 5/2022 | Williams et al. |
| 2001/0014184 A1 | 8/2001 | Bubie et al. |
| 2002/0008763 A1 | 1/2002 | Kawamura et al. |
| 2002/0021758 A1 | 2/2002 | Chui et al. |
| 2002/0045960 A1 | 4/2002 | Phillips et al. |
| 2002/0054233 A1 | 5/2002 | Juen |
| 2002/0057292 A1 | 5/2002 | Holtz |
| 2002/0057461 A1 | 5/2002 | Dow et al. |
| 2002/0070982 A1 | 6/2002 | Hill et al. |
| 2002/0086774 A1 | 7/2002 | Warner |
| 2002/0093531 A1 | 7/2002 | Barile |
| 2002/0106199 A1 | 8/2002 | Ikeda |
| 2002/0135621 A1 | 9/2002 | Angiulo et al. |
| 2003/0033296 A1 | 2/2003 | Rothmuller et al. |
| 2003/0048291 A1 | 3/2003 | Dieberger |
| 2003/0064860 A1 | 4/2003 | Yamashita et al. |
| 2003/0081135 A1 | 5/2003 | Boll |
| 2003/0090504 A1 | 5/2003 | Brook et al. |
| 2003/0108241 A1 | 6/2003 | Colmenarez et al. |
| 2003/0122787 A1 | 7/2003 | Zimmerman et al. |
| 2003/0128192 A1 | 7/2003 | Van Os |
| 2003/0128241 A1 | 7/2003 | Watanabe et al. |
| 2003/0134714 A1 | 7/2003 | Oishi et al. |
| 2003/0149990 A1 | 8/2003 | Anttila et al. |
| 2003/0169288 A1 | 9/2003 | Misawa |
| 2003/0197687 A1 | 10/2003 | Shetter |
| 2004/0019640 A1 | 1/2004 | Bartram et al. |
| 2004/0046886 A1 | 3/2004 | Ambiru et al. |
| 2004/0119758 A1 | 6/2004 | Grossman et al. |
| 2004/0135904 A1 | 7/2004 | Shiota et al. |
| 2004/0143590 A1 | 7/2004 | Wong et al. |
| 2004/0158555 A1 | 8/2004 | Seedman et al. |
| 2004/0183830 A1 | 9/2004 | Cody et al. |
| 2004/0205504 A1 | 10/2004 | Phillips |
| 2004/0207722 A1 | 10/2004 | Koyama et al. |
| 2004/0212617 A1 | 10/2004 | Fitzmaurice et al. |
| 2005/0020317 A1 | 1/2005 | Koyama |
| 2005/0041035 A1 | 2/2005 | Nagatomo et al. |
| 2005/0052427 A1 | 3/2005 | Wu et al. |
| 2005/0062130 A1 | 3/2005 | Ciancio et al. |
| 2005/0071736 A1 | 3/2005 | Schneider et al. |
| 2005/0071767 A1 | 3/2005 | Kirkland et al. |
| 2005/0073601 A1 | 4/2005 | Battles et al. |
| 2005/0076307 A1 | 4/2005 | Robbin |
| 2005/0083406 A1 | 4/2005 | Cozier |
| 2005/0088418 A1 | 4/2005 | Nguyen |
| 2005/0102635 A1 | 5/2005 | Jiang et al. |
| 2005/0104848 A1 | 5/2005 | Yamaguchi et al. |
| 2005/0108253 A1 | 5/2005 | Metsatahti et al. |
| 2005/0134719 A1 | 6/2005 | Beck |
| 2005/0160377 A1 | 7/2005 | Sciammarella et al. |
| 2005/0183026 A1 | 8/2005 | Amano et al. |
| 2005/0195221 A1 | 9/2005 | Berger et al. |
| 2005/0198024 A1* | 9/2005 | Sakata .................. H04N 21/485 |
| 2005/0272564 A1 | 12/2005 | Pyles et al. |
| 2005/0275636 A1 | 12/2005 | Dehlin et al. |
| 2006/0001652 A1 | 1/2006 | Chiu et al. |
| 2006/0004685 A1 | 1/2006 | Pyhalammi et al. |
| 2006/0017692 A1 | 1/2006 | Wehrenberg et al. |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0061663 A1 | 3/2006 | Park |
| 2006/0072028 A1 | 4/2006 | Hong |
| 2006/0077266 A1 | 4/2006 | Nurmi et al. |
| 2006/0080386 A1 | 4/2006 | Roykkee et al. |
| 2006/0088228 A1 | 4/2006 | Marriott et al. |
| 2006/0112335 A1 | 5/2006 | Hofmeister et al. |
| 2006/0136246 A1 | 6/2006 | Tu |
| 2006/0136839 A1 | 6/2006 | Makela et al. |
| 2006/0164535 A1 | 7/2006 | Oyama |
| 2006/0170669 A1 | 8/2006 | Walker et al. |
| 2006/0184966 A1 | 8/2006 | Hunleth et al. |
| 2006/0240959 A1 | 10/2006 | Huang |
| 2006/0265643 A1 | 11/2006 | Saft et al. |
| 2006/0279532 A1 | 12/2006 | Olszewski et al. |
| 2007/0016868 A1 | 1/2007 | Nurmi |
| 2007/0031115 A1 | 2/2007 | Oshikiri et al. |
| 2007/0033069 A1 | 2/2007 | Rao et al. |
| 2007/0050726 A1 | 3/2007 | Wakai et al. |
| 2007/0055940 A1 | 3/2007 | Moore et al. |
| 2007/0061748 A1 | 3/2007 | Hirose |
| 2007/0071256 A1 | 3/2007 | Ito |
| 2007/0081740 A1 | 4/2007 | Ciudad et al. |
| 2007/0097421 A1 | 5/2007 | Sorensen et al. |
| 2007/0112754 A1 | 5/2007 | Haigh et al. |
| 2007/0113726 A1 | 5/2007 | Oliver et al. |
| 2007/0136778 A1 | 6/2007 | Birger et al. |
| 2007/0150839 A1 | 6/2007 | Danninger |
| 2007/0152984 A1 | 7/2007 | Ording et al. |
| 2007/0160345 A1 | 7/2007 | Sakai et al. |
| 2007/0169614 A1 | 7/2007 | Sasaki et al. |
| 2007/0179938 A1 | 8/2007 | Ikeda et al. |
| 2007/0186154 A1 | 8/2007 | Anthony et al. |
| 2007/0188518 A1 | 8/2007 | Vale et al. |
| 2007/0192741 A1 | 8/2007 | Yoritate et al. |
| 2007/0204225 A1 | 8/2007 | Berkowitz et al. |
| 2007/0209004 A1 | 9/2007 | Layard |
| 2007/0229678 A1 | 10/2007 | Barrus et al. |
| 2007/0236475 A1 | 10/2007 | Wherry |
| 2007/0245236 A1 | 10/2007 | Lee et al. |
| 2007/0245257 A1 | 10/2007 | Chan et al. |
| 2007/0253025 A1 | 11/2007 | Terayoko |
| 2007/0271340 A1 | 11/2007 | Goodman et al. |
| 2008/0019591 A1 | 1/2008 | Iwayama et al. |
| 2008/0030456 A1 | 2/2008 | Asadi et al. |
| 2008/0040668 A1 | 2/2008 | Ala-rantala |
| 2008/0051919 A1 | 2/2008 | Sakai et al. |
| 2008/0052945 A1 | 3/2008 | Matas et al. |
| 2008/0057941 A1 | 3/2008 | Scott et al. |
| 2008/0059888 A1 | 3/2008 | Dunko |
| 2008/0062141 A1 | 3/2008 | Chaudhri |
| 2008/0066010 A1 | 3/2008 | Brodersen et al. |
| 2008/0096726 A1 | 4/2008 | Riley et al. |
| 2008/0133697 A1 | 6/2008 | Stewart et al. |
| 2008/0134070 A1 | 6/2008 | Kobayashi et al. |
| 2008/0141135 A1 | 6/2008 | Mason et al. |
| 2008/0147664 A1 | 6/2008 | Fujiwara et al. |
| 2008/0152201 A1 | 6/2008 | Zhang et al. |
| 2008/0155474 A1* | 6/2008 | Duhig .................. G06F 3/0485 715/830 |
| 2008/0155478 A1 | 6/2008 | Stress |
| 2008/0161161 A1 | 7/2008 | Pipinich et al. |
| 2008/0165141 A1 | 7/2008 | Christie |
| 2008/0168349 A1 | 7/2008 | Lamiraux et al. |
| 2008/0168402 A1 | 7/2008 | Blumenberg |
| 2008/0180404 A1 | 7/2008 | Han et al. |
| 2008/0216022 A1 | 9/2008 | Lorch et al. |
| 2008/0262946 A1 | 10/2008 | Wren |
| 2008/0282202 A1 | 11/2008 | Sunday |
| 2008/0297482 A1 | 12/2008 | Weiss |
| 2008/0309632 A1 | 12/2008 | Westerman et al. |
| 2008/0320419 A1 | 12/2008 | Matas et al. |
| 2009/0013350 A1 | 1/2009 | Ohlfs et al. |
| 2009/0021576 A1 | 1/2009 | Linder et al. |
| 2009/0051946 A1 | 2/2009 | Hibi |
| 2009/0055748 A1 | 2/2009 | Dieberger et al. |
| 2009/0063542 A1 | 3/2009 | Bull et al. |
| 2009/0077460 A1 | 3/2009 | Li et al. |
| 2009/0113315 A1 | 4/2009 | Fisher et al. |
| 2009/0128516 A1 | 5/2009 | Rimon et al. |
| 2009/0132921 A1 | 5/2009 | Hwangbo et al. |
| 2009/0140997 A1 | 6/2009 | Jeong et al. |
| 2009/0158326 A1 | 6/2009 | Hunt et al. |
| 2009/0193351 A1 | 7/2009 | Lee et al. |
| 2009/0198359 A1 | 8/2009 | Chaudhri |
| 2009/0210793 A1 | 8/2009 | Yee et al. |
| 2009/0216806 A1 | 8/2009 | Feuerstein et al. |
| 2009/0259967 A1 | 10/2009 | Davidson et al. |
| 2009/0268949 A1 | 10/2009 | Ueshima et al. |
| 2009/0278806 A1 | 11/2009 | Duarte et al. |
| 2009/0282371 A1 | 11/2009 | Curl et al. |

(56) References Cited

U.S. PATENT DOCUMENTS

| | | |
|---|---|---|
| 2009/0284551 A1 | 11/2009 | Stanton |
| 2009/0307623 A1 | 12/2009 | Agarawala et al. |
| 2009/0319472 A1 | 12/2009 | Jain et al. |
| 2010/0058238 A1 | 3/2010 | Ben Moshe |
| 2010/0060586 A1 | 3/2010 | Pisula et al. |
| 2010/0062818 A1 | 3/2010 | Haughay et al. |
| 2010/0083173 A1 | 4/2010 | Germann et al. |
| 2010/0103321 A1 | 4/2010 | Ishikawa et al. |
| 2010/0110228 A1 | 5/2010 | Ozawa et al. |
| 2010/0124967 A1 | 5/2010 | Lutnick et al. |
| 2010/0125786 A1 | 5/2010 | Ozawa et al. |
| 2010/0149211 A1 | 6/2010 | Tossing et al. |
| 2010/0153833 A1 | 6/2010 | Siegel et al. |
| 2010/0169819 A1 | 7/2010 | Bestle et al. |
| 2010/0179874 A1 | 7/2010 | Higgins et al. |
| 2010/0184564 A1 | 7/2010 | Molyneux et al. |
| 2010/0191701 A1 | 7/2010 | Beyda et al. |
| 2010/0207892 A1 | 8/2010 | Lin et al. |
| 2010/0211575 A1 | 8/2010 | Collins et al. |
| 2010/0214442 A1 | 8/2010 | Uemura et al. |
| 2010/0241955 A1 | 9/2010 | Price et al. |
| 2010/0251167 A1 | 9/2010 | Deluca et al. |
| 2010/0253807 A1 | 10/2010 | Matsumoto et al. |
| 2010/0262634 A1 | 10/2010 | Wang |
| 2010/0283754 A1 | 11/2010 | Nakao et al. |
| 2010/0287053 A1 | 11/2010 | Ganong et al. |
| 2010/0299601 A1 | 11/2010 | Kaplan et al. |
| 2010/0302179 A1 | 12/2010 | Ahn et al. |
| 2010/0331145 A1 | 12/2010 | Lakovic et al. |
| 2011/0016120 A1 | 1/2011 | Haughay et al. |
| 2011/0035700 A1 | 2/2011 | Meaney et al. |
| 2011/0050564 A1 | 3/2011 | Alberth et al. |
| 2011/0050640 A1 | 3/2011 | Lundback et al. |
| 2011/0069017 A1 | 3/2011 | Victor |
| 2011/0072394 A1 | 3/2011 | Victor et al. |
| 2011/0078717 A1 | 3/2011 | Drummond et al. |
| 2011/0099199 A1 | 4/2011 | Stalenhoef et al. |
| 2011/0099299 A1 | 4/2011 | Vasudevan et al. |
| 2011/0126148 A1 | 5/2011 | Krishnaraj et al. |
| 2011/0145275 A1 | 6/2011 | Stewart |
| 2011/0179097 A1 | 7/2011 | Ala-rantala |
| 2011/0246918 A1 | 10/2011 | Henderson |
| 2011/0267368 A1 | 11/2011 | Casillas et al. |
| 2011/0282867 A1 | 11/2011 | Palermiti et al. |
| 2011/0314422 A1 | 12/2011 | Cameron et al. |
| 2012/0015779 A1 | 1/2012 | Powch et al. |
| 2012/0036460 A1 | 2/2012 | Cieplinski et al. |
| 2012/0042272 A1 | 2/2012 | Hong et al. |
| 2012/0057081 A1 | 3/2012 | Petersson et al. |
| 2012/0058801 A1 | 3/2012 | Nurmi |
| 2012/0116550 A1 | 5/2012 | Hoffman et al. |
| 2012/0117506 A1 | 5/2012 | Koch et al. |
| 2012/0190386 A1 | 7/2012 | Anderson |
| 2012/0251079 A1 | 10/2012 | Meschter et al. |
| 2012/0253485 A1 | 10/2012 | Weast et al. |
| 2012/0311444 A1 | 12/2012 | Chaudhri |
| 2013/0013650 A1 | 1/2013 | Shum |
| 2013/0021368 A1 | 1/2013 | Lee et al. |
| 2013/0054634 A1 | 2/2013 | Chakraborty et al. |
| 2013/0061175 A1 | 3/2013 | Matas et al. |
| 2013/0117365 A1 | 5/2013 | Padmanabhan et al. |
| 2013/0145292 A1 | 6/2013 | Cohen et al. |
| 2013/0156275 A1 | 6/2013 | Amacker et al. |
| 2013/0179837 A1 | 7/2013 | Eriksson et al. |
| 2013/0198176 A1 | 8/2013 | Kim |
| 2013/0198661 A1 | 8/2013 | Matas |
| 2013/0205210 A1 | 8/2013 | Jeon et al. |
| 2013/0239049 A1 | 9/2013 | Perrodin et al. |
| 2013/0263055 A1 | 10/2013 | Victor |
| 2013/0263719 A1 | 10/2013 | Watterson et al. |
| 2013/0285948 A1 | 10/2013 | Zhang |
| 2013/0324210 A1 | 12/2013 | Doig et al. |
| 2014/0025737 A1 | 1/2014 | Kruglick |
| 2014/0038781 A1 | 2/2014 | Foley et al. |
| 2014/0064572 A1 | 3/2014 | Panzer et al. |
| 2014/0067096 A1 | 3/2014 | Aibara |
| 2014/0074825 A1 | 3/2014 | Wood et al. |
| 2014/0074893 A1 | 3/2014 | Griffin |
| 2014/0082533 A1 | 3/2014 | Kelley et al. |
| 2014/0092291 A1 | 4/2014 | Aoshima et al. |
| 2014/0165000 A1 | 6/2014 | Fleizach et al. |
| 2014/0181089 A1 | 6/2014 | Desmond et al. |
| 2014/0181205 A1 | 6/2014 | Sherrets et al. |
| 2014/0198234 A1 | 7/2014 | Kobayashi et al. |
| 2014/0225925 A1 | 8/2014 | Hayashi et al. |
| 2014/0282011 A1 | 9/2014 | Dellinger et al. |
| 2014/0282262 A1 | 9/2014 | Gregotski et al. |
| 2014/0289222 A1 | 9/2014 | Sharpe et al. |
| 2014/0337324 A1 | 11/2014 | Chao et al. |
| 2014/0344693 A1 | 11/2014 | Reese et al. |
| 2014/0358473 A1 | 12/2014 | Goel et al. |
| 2014/0362274 A1 | 12/2014 | Christie et al. |
| 2014/0371887 A1 | 12/2014 | Hoffman et al. |
| 2014/0372436 A1 | 12/2014 | Makki et al. |
| 2014/0372889 A1 | 12/2014 | Lemay et al. |
| 2014/0372898 A1 | 12/2014 | Ayres et al. |
| 2015/0004578 A1 | 1/2015 | Gilley et al. |
| 2015/0039616 A1 | 2/2015 | Rolston et al. |
| 2015/0046814 A1 | 2/2015 | Haughay et al. |
| 2015/0078680 A1 | 3/2015 | Shakib et al. |
| 2015/0082250 A1 | 3/2015 | Wagner et al. |
| 2015/0112700 A1 | 4/2015 | Sublett et al. |
| 2015/0113553 A1 | 4/2015 | Pan |
| 2015/0118657 A1 | 4/2015 | Shrake et al. |
| 2015/0130719 A1 | 5/2015 | Wehrenberg et al. |
| 2015/0133748 A1 | 5/2015 | Edmonds et al. |
| 2015/0177979 A1 | 6/2015 | Johansson et al. |
| 2015/0180980 A1 | 6/2015 | Welinder et al. |
| 2015/0181314 A1 | 6/2015 | Swanson |
| 2015/0185967 A1 | 7/2015 | Ly et al. |
| 2015/0185995 A1 | 7/2015 | Shoemaker et al. |
| 2015/0196804 A1 | 7/2015 | Koduri et al. |
| 2015/0199494 A1 | 7/2015 | Koduri et al. |
| 2015/0213001 A1 | 7/2015 | Levy et al. |
| 2015/0227782 A1 | 8/2015 | Salvador et al. |
| 2015/0242689 A1 | 8/2015 | Mau |
| 2015/0251053 A1 | 9/2015 | Hoffman et al. |
| 2015/0256491 A1 | 9/2015 | Eatough et al. |
| 2015/0262062 A1 | 9/2015 | Burger et al. |
| 2015/0287162 A1 | 10/2015 | Canan et al. |
| 2015/0309698 A1 | 10/2015 | Senderek et al. |
| 2016/0004820 A1 | 1/2016 | Moore |
| 2016/0044269 A1 | 2/2016 | Kang |
| 2016/0048263 A1 | 2/2016 | Hiraga et al. |
| 2016/0054845 A1 | 2/2016 | Takahashi et al. |
| 2016/0058336 A1 | 3/2016 | Blahnik et al. |
| 2016/0073034 A1 | 3/2016 | Mukherjee et al. |
| 2016/0107031 A1 | 4/2016 | Palatsi et al. |
| 2016/0110355 A1 | 4/2016 | Charania et al. |
| 2016/0140146 A1 | 5/2016 | Wexler et al. |
| 2016/0202889 A1 | 7/2016 | Shin et al. |
| 2016/0216868 A1 | 7/2016 | Victor et al. |
| 2016/0226804 A1 | 8/2016 | Hampson et al. |
| 2016/0234184 A1 | 8/2016 | Liu et al. |
| 2016/0239724 A1 | 8/2016 | Arfvidsson et al. |
| 2016/0255162 A1 | 9/2016 | Frieder et al. |
| 2016/0279475 A1 | 9/2016 | Aragones et al. |
| 2016/0283483 A1 | 9/2016 | Jiang et al. |
| 2016/0321831 A1 | 11/2016 | Nakamura et al. |
| 2017/0001073 A1 | 1/2017 | Krueger et al. |
| 2017/0019587 A1 | 1/2017 | Matas |
| 2017/0026430 A1 | 1/2017 | Beckhardt et al. |
| 2017/0041549 A1 | 2/2017 | Kim et al. |
| 2017/0053542 A1 | 2/2017 | Wilson et al. |
| 2017/0063753 A1 | 3/2017 | Probasco et al. |
| 2017/0078621 A1 | 3/2017 | Sahay et al. |
| 2017/0093780 A1 | 3/2017 | Lieb et al. |
| 2017/0139554 A1 | 5/2017 | Nakabayashi et al. |
| 2017/0143262 A1 | 5/2017 | Kurunmäki et al. |
| 2017/0169295 A1 | 6/2017 | Park et al. |
| 2017/0192625 A1 | 7/2017 | Kim et al. |
| 2017/0209766 A1 | 7/2017 | Riley et al. |
| 2017/0244959 A1 | 8/2017 | Angela et al. |
| 2017/0266494 A1 | 9/2017 | Crankson et al. |

(56) References Cited

U.S. PATENT DOCUMENTS

| | | |
|---|---|---|
| 2017/0329933 A1 | 11/2017 | Brust et al. |
| 2017/0337033 A1 | 11/2017 | Duyan et al. |
| 2017/0344257 A1 | 11/2017 | Gnedin et al. |
| 2017/0357382 A1 | 12/2017 | Miura et al. |
| 2017/0357409 A1 | 12/2017 | Wagner et al. |
| 2018/0034765 A1 | 2/2018 | Keszler et al. |
| 2018/0039406 A1 | 2/2018 | Kong et al. |
| 2018/0056132 A1 | 3/2018 | Foley et al. |
| 2018/0068019 A1 | 3/2018 | Novikoff et al. |
| 2018/0083901 A1 | 3/2018 | Mcgregor et al. |
| 2018/0126248 A1 | 5/2018 | Dion et al. |
| 2018/0140903 A1 | 5/2018 | Poure et al. |
| 2018/0143761 A1 | 5/2018 | Choi et al. |
| 2018/0181668 A1 | 6/2018 | Zhang et al. |
| 2018/0204111 A1 | 7/2018 | Zadeh et al. |
| 2018/0294053 A1 | 10/2018 | Runyon et al. |
| 2018/0318647 A1 | 11/2018 | Foley et al. |
| 2018/0321048 A1 | 11/2018 | Li et al. |
| 2018/0329584 A1 | 11/2018 | Williams et al. |
| 2018/0339195 A1 | 11/2018 | Bernotas |
| 2018/0345078 A1 | 12/2018 | Blahnik et al. |
| 2018/0364872 A1 | 12/2018 | Miura et al. |
| 2018/0367862 A1 | 12/2018 | Horii et al. |
| 2019/0073081 A1 | 3/2019 | Takahashi et al. |
| 2019/0143194 A1 | 5/2019 | Evancha et al. |
| 2019/0184234 A1 | 6/2019 | Packles et al. |
| 2019/0209777 A1 | 7/2019 | O'connell et al. |
| 2019/0258383 A1 | 8/2019 | Wagner et al. |
| 2019/0279520 A1 | 9/2019 | Wilson et al. |
| 2019/0313012 A1 | 10/2019 | Matas |
| 2019/0336827 A1 | 11/2019 | Intonate et al. |
| 2019/0339822 A1 | 11/2019 | Devine et al. |
| 2019/0339849 A1 | 11/2019 | Williams et al. |
| 2019/0342616 A1 | 11/2019 | Domm et al. |
| 2020/0004409 A1 | 1/2020 | Victor |
| 2020/0014967 A1 | 1/2020 | Putnam |
| 2020/0054931 A1 | 2/2020 | Martin et al. |
| 2020/0110814 A1 | 4/2020 | Abuelsaad et al. |
| 2020/0160961 A1 | 5/2020 | Wadhawan et al. |
| 2020/0257434 A1 | 8/2020 | Victor |
| 2020/0356222 A1 | 11/2020 | Clarke et al. |
| 2020/0356590 A1 | 11/2020 | Clarke et al. |
| 2020/0363932 A1 | 11/2020 | Wagner et al. |
| 2021/0093919 A1 | 4/2021 | Lyke et al. |
| 2021/0117072 A1 | 4/2021 | Victor |
| 2021/0191578 A1 | 6/2021 | Miura et al. |
| 2021/0243356 A1 | 8/2021 | Matas et al. |
| 2021/0252337 A1 | 8/2021 | Devine et al. |
| 2021/0252341 A1 | 8/2021 | Devine et al. |
| 2021/0252369 A1 | 8/2021 | Devine et al. |
| 2021/0255747 A1 | 8/2021 | Devine et al. |
| 2021/0255758 A1 | 8/2021 | Devine et al. |
| 2021/0255826 A1 | 8/2021 | Devine et al. |
| 2021/0379447 A1 | 12/2021 | Lee |
| 2022/0027039 A1 | 1/2022 | Wagner et al. |
| 2022/0062707 A1 | 3/2022 | Bedekar et al. |
| 2022/0276750 A1 | 9/2022 | Miura et al. |
| 2022/0317846 A1 | 10/2022 | Victor |

FOREIGN PATENT DOCUMENTS

| | | |
|---|---|---|
| CN | 1717918 A | 1/2006 |
| CN | 1756273 A | 4/2006 |
| CN | 101854278 A | 10/2010 |
| CN | 102483758 A | 5/2012 |
| CN | 102681847 A | 9/2012 |
| CN | 102693311 A | 9/2012 |
| CN | 103081496 A | 5/2013 |
| CN | 104035666 A | 9/2014 |
| CN | 104815428 A | 8/2015 |
| CN | 105103154 A | 11/2015 |
| CN | 105264480 A | 1/2016 |
| CN | 105874447 A | 8/2016 |
| CN | 107430483 A | 12/2017 |
| CN | 107710197 A | 2/2018 |
| EP | 0871177 A2 | 10/1998 |
| EP | 1124175 A2 | 8/2001 |
| EP | 1148412 A2 | 10/2001 |
| EP | 1577746 A2 | 9/2005 |
| EP | 1615114 A2 | 1/2006 |
| EP | 1840717 A1 | 10/2007 |
| EP | 2045703 A2 | 4/2009 |
| EP | 2060970 A1 | 5/2009 |
| EP | 2068237 A2 | 6/2009 |
| EP | 2509074 A2 | 10/2012 |
| EP | 3122038 A1 | 1/2017 |
| FR | 2830093 A3 | 3/2003 |
| GB | 2420260 A | 5/2006 |
| GB | 2550639 A | 11/2017 |
| JP | 3-217976 A | 9/1991 |
| JP | 6-309138 A | 11/1994 |
| JP | 8-106469 A | 4/1996 |
| JP | H1093848 A | 4/1998 |
| JP | 11164175 A | 6/1999 |
| JP | 11168694 A | 6/1999 |
| JP | H11341425 A | 12/1999 |
| JP | 2000-138883 A | 5/2000 |
| JP | 2000-138888 A | 5/2000 |
| JP | 2000-148591 A | 5/2000 |
| JP | 2000-163031 A | 6/2000 |
| JP | 2000-221879 A | 8/2000 |
| JP | 2000-244637 A | 9/2000 |
| JP | 2000-244673 A | 9/2000 |
| JP | 2000-350134 A | 12/2000 |
| JP | 2001-136303 A | 5/2001 |
| JP | 2001-265481 A | 9/2001 |
| JP | 2001-309019 A | 11/2001 |
| JP | 2002-152559 A | 5/2002 |
| JP | 2003-102868 A | 4/2003 |
| JP | 2003-163820 A | 6/2003 |
| JP | 2003-338975 A | 11/2003 |
| JP | 2003-345491 A | 12/2003 |
| JP | 2003-348432 A | 12/2003 |
| JP | 2004-015586 A | 1/2004 |
| JP | 2004-032346 A | 1/2004 |
| JP | 2004-145291 A | 5/2004 |
| JP | 2004-153832 A | 5/2004 |
| JP | 2004-288208 A | 10/2004 |
| JP | 2004-336536 A | 11/2004 |
| JP | 2004-336711 A | 11/2004 |
| JP | 2005-038101 A | 2/2005 |
| JP | 2005-092386 A | 4/2005 |
| JP | 2005-100084 A | 4/2005 |
| JP | 2005-515530 A | 5/2005 |
| JP | 2005-150836 A | 6/2005 |
| JP | 2005-175991 A | 6/2005 |
| JP | 2005-182320 A | 7/2005 |
| JP | 2005-202483 A | 7/2005 |
| JP | 2005-202651 A | 7/2005 |
| JP | 2005-303728 A | 10/2005 |
| JP | 2005-321516 A | 11/2005 |
| JP | 2005-339420 A | 12/2005 |
| JP | 2006-067344 A | 3/2006 |
| JP | 2006-139340 A | 6/2006 |
| JP | 2006-140865 A | 6/2006 |
| JP | 2006-195592 A | 7/2006 |
| JP | 2006-203809 A | 8/2006 |
| JP | 2006-236249 A | 9/2006 |
| JP | 2007-515775 A | 6/2007 |
| JP | 2007-525775 A | 9/2007 |
| JP | 2007-287014 A | 11/2007 |
| JP | 2008-106469 A | 5/2008 |
| JP | 2008-518330 A | 5/2008 |
| JP | 2009-059042 A | 3/2009 |
| JP | 2009-112731 A | 5/2009 |
| JP | 2010-503130 A | 1/2010 |
| JP | 2012-020134 A | 2/2012 |
| JP | 2013-083689 A | 5/2013 |
| JP | 2013-084282 A | 5/2013 |
| JP | 2013-140171 A | 7/2013 |
| JP | 2014-500740 A | 1/2014 |
| JP | 2014-093003 A | 5/2014 |
| JP | 2014-095979 A | 5/2014 |
| JP | 5-771242 B2 | 8/2015 |

(56) References Cited

FOREIGN PATENT DOCUMENTS

| | | |
|---|---|---|
| JP | 2016-17331 A | 2/2016 |
| JP | 2016-035776 A | 3/2016 |
| JP | 2016-052512 A | 4/2016 |
| JP | 2016-517329 A | 6/2016 |
| JP | 2016-167299 A | 9/2016 |
| JP | 2016-201135 A | 12/2016 |
| JP | 2017-532069 A | 11/2017 |
| JP | 2018-202174 A | 12/2018 |
| JP | 2019-3670 A | 1/2019 |
| KR | 10-2005-0101162 A | 10/2005 |
| KR | 10-2006-0032793 A | 4/2006 |
| KR | 10-2012-0058539 A | 6/2012 |
| KR | 10-2012-0092644 A | 8/2012 |
| KR | 10-2013-0026541 A | 3/2013 |
| KR | 10-2014-0067965 A | 6/2014 |
| KR | 10-2015-0131257 A | 11/2015 |
| KR | 10-2015-0131262 A | 11/2015 |
| KR | 10-2016-0027943 A | 3/2016 |
| KR | 10-1611895 B1 | 4/2016 |
| KR | 10-2019-0141702 A | 12/2019 |
| WO | 9/954807 A1 | 10/1999 |
| WO | 01/29702 A2 | 4/2001 |
| WO | 02/080176 A2 | 10/2002 |
| WO | 03/023593 A1 | 3/2003 |
| WO | 03/081458 A1 | 10/2003 |
| WO | 2005/093550 A2 | 10/2005 |
| WO | 2005/103863 A2 | 11/2005 |
| WO | 2006/020305 A2 | 2/2006 |
| WO | 2006/047697 A2 | 5/2006 |
| WO | 2008/030779 A2 | 3/2008 |
| WO | 2008/085737 A1 | 7/2008 |
| WO | 2009/082814 A1 | 7/2009 |
| WO | 2009/084141 A1 | 7/2009 |
| WO | 2009/129402 A1 | 10/2009 |
| WO | 2009/155991 A1 | 12/2009 |
| WO | 2011/017653 A1 | 2/2011 |
| WO | 2011/028424 A1 | 3/2011 |
| WO | 2011/051091 A1 | 5/2011 |
| WO | 2011/084856 A1 | 7/2011 |
| WO | 2012/061438 A2 | 5/2012 |
| WO | 2012/097385 A2 | 7/2012 |
| WO | 2014/149473 A1 | 9/2014 |
| WO | 2014/149488 A1 | 9/2014 |
| WO | 2014/162659 A1 | 10/2014 |
| WO | 2014/200734 A1 | 12/2014 |
| WO | 2015/179592 A1 | 11/2015 |
| WO | 2016/036582 A2 | 3/2016 |
| WO | 2016/077834 A1 | 5/2016 |
| WO | 2016/160632 A1 | 10/2016 |
| WO | 2018/213066 A1 | 11/2018 |
| WO | 2019/183422 A1 | 9/2019 |
| WO | 2019/217249 A2 | 11/2019 |
| WO | 2019/231982 A1 | 12/2019 |

OTHER PUBLICATIONS

Corrected Notice of Allowance received for U.S. Appl. No. 17/030,321, dated Aug. 15, 2022, 3 pages.
Decision to Grant received for Danish Patent Application No. PA202070615, dated Jul. 29, 2022, 2 pages.
Examiner's Answer to Appeal Brief received for U.S. Appl. No. 16/145,033, dated Aug. 4, 2022, 10 pages.
Office Action received for Japanese Patent Application No. 2020-160053, dated Aug. 1, 2022, 8 pages (4 pages of English Translation and 4 pages of Official Copy).
Applicant-Initiated Interview Summary received for U.S. Appl. No. 17/408,220, dated Oct. 18, 2022, 4 pages.
Corrected Notice of Allowance received for U.S. Appl. No. 17/030,337, dated Oct. 18, 2022, 2 pages.
Notice of Allowance received for Japanese Patent Application No. 2020-079486, dated Oct. 21, 2022, 4 pages (1 page of English Translation and 3 pages of Official Copy).
Office Action received for Danish Patent Application No. PA202070613, dated Oct. 13, 2022, 7 pages.
Updated Notice of Allowance received for U.S. Appl. No. 17/030,340, dated Nov. 2, 2022, 2 pages.
Corrected Notice of Allowance received for U.S. Appl. No. 17/030,337, dated Aug. 31, 2022, 2 pages.
Corrected Notice of Allowance received for U.S. Appl. No. 17/031,543, dated Aug. 22, 2022, 2 pages.
International Preliminary Report on Patentability received for PCT Patent Application No. PCT/US2021/017736, dated Aug. 25, 2022, 19 pages.
Notice of Allowance received for Japanese Patent Application No. 2022-107902, dated Aug. 26, 2022, 4 pages (1 page of English Translation and 3 pages of Official Copy).
Notice of Allowance received for Korean Patent Application No. 10-2020-0123815, dated Aug. 26, 2022, 7 pages (2 pages of English Translation and 5 pages of Official Copy).
Notice of Allowance received for U.S. Appl. No. 17/030,337, dated Aug. 22, 2022, 10 pages.
Notice of Allowance received for U.S. Appl. No. 17/153,703, dated Aug. 30, 2022, 8 pages.
Office Action received for European Patent Application No. 21159939.4, dated Sep. 2, 2022, 6 pages.
Office Action received for Korean Patent Application No. 10-2022-0061486, dated Aug. 29, 2022, 5 pages (2 pages of English Translation and 3 pages of Official Copy).
Notice of Allowance received for U.S. Appl. No. 17/030,340, dated Sep. 28, 2022, 7 pages.
Office Action received for Indian Patent Application No. 202048019639, dated Sep. 27, 2022, 5 pages.
Office Action received for Korean Patent Application No. 10-2020-0123821, dated Sep. 20, 2022, 11 pages (5 pages of English Translation and 6 pages of Official Copy).
Supplemental Notice of Allowance received for U.S. Appl. No. 17/030,343, dated Oct. 5, 2022, 2 pages.
Applicant-Initiated Interview Summary received for U.S. Appl. No. 17/031,543, dated Apr. 21, 2022, 2 pages.
Notice of Allowance received for Japanese Patent Application No. 2020-160054, dated Apr. 4, 2022, 4 pages (1 page of English Translation and 3 pages of Official Copy).
Office Action received for Australian Patent Application No. 2021202225, dated Apr. 7, 2022, 3 pages.
Supplemental Notice of Allowance received for U.S. Appl. No. 17/030,321, dated Apr. 15, 2022, 2 pages.
Corrected Notice of Allowance received for U.S. Appl. No. 17/030,337, dated Sep. 21, 2022, 2 pages.
Corrected Notice of Allowance received for U.S. Appl. No. 17/153,703, dated Sep. 14, 2022, 2 pages.
Extended European Search Report received for European Patent Application No. 22164099.8, dated Aug. 25, 2022, 9 pages.
Hourunranta et al., "Video and Audio Editing for Mobile Applications", Proceedings/2006 IEEE international Conference on Multimedia and Expo, ICME 2006, Jul. 9, 2006, pp. 1305-1308.
Hurwitz, Jon, "Interface For Small-Screen Media Playback Control", Technical Disclosure Commons, Online available at: https://www.tdcommons.org/cgi/viewcontent.cgi?article=4231&context=dpubs_series, Apr. 17, 2020, pp. 1-9.
Jin-Chang et al., "Multi-modal Interface Techniques and Its Application for Multimedia Retrieval", China Academic Journal Electronic Publishing House, 2002, pp. 115-117 (Official Copy Only) (See Communication under 37 CFR § 1.98(a) (3)).
Notice of Allowance received for U.S. Appl. No. 17/030,343, dated Sep. 16, 2022, 11 pages.
Office Action received for Chinese Patent Application No. 202011127969.7, dated Jul. 28, 2022, 25 pages (14 pages of English Translation and 11 pages of Official Copy).
Office Action received for Chinese Patent Application No. 202111487316.4, dated Aug. 8, 2022, 25 pages (13 pages of English Translation and 12 pages of Official Copy).
Office Action received for Danish Patent Application No. PA202070612, dated Sep. 12, 2022, 3 pages.
10-2013-0026541, KR, A, In an Office Action for related Patent Application No. 10-2021-7036310 dated Apr. 26, 2022.
Corrected Notice of Allowance received for U.S. Appl. No. 17/030,318, dated Jan. 24, 2022, 2 pages.

(56) References Cited

OTHER PUBLICATIONS

Corrected Notice of Allowance received for U.S. Appl. No. 17/125,744, dated Dec. 8, 2021, 2 pages.
Corrected Notice of Allowance received for U.S. Appl. No. 17/125,744, dated Dec. 24, 2021, 2 pages.
Corrected Notice of Allowance received for U.S. Appl. No. 17/125,744, dated Mar. 10, 2022, 2 pages.
Corrected Notice of Allowance received for U.S. Appl. No. 17/125,744, dated Mar. 30, 2022, 2 pages.
Decision to Grant received for European Patent Application No. 19724963.4, dated Feb. 3, 2022, 2 pages.
Decision to Refuse received for European Patent Application No. 17813778.2, dated Jan. 24, 2022, 17 pages.
Intention to Grant received for Danish Patent Application No. PA202070615, dated Jan. 27, 2022, 2 pages.
Minutes of the Oral Proceedings received for European Patent Application No. 17813778.2, mailed on Jan. 21, 2022, 7 pages.
Non-Final Office Action received for U.S. Appl. No. 17/031,543, dated Apr. 1, 2022, 9 pages.
Non-Final Office Action received for U.S. Appl. No. 17/153,703, dated Mar. 30, 2022, 10 pages.
Notice of Acceptance received for Australian Patent Application No. 2019266054, dated Nov. 25, 2021, 3 pages.
Notice of Acceptance received for Australian Patent Application No. 2020239743, dated Jan. 13, 2022, 3 pages.
Notice of Acceptance received for Australian Patent Application No. 2020239752, dated Jan. 31, 2022, 3 pages.
Notice of Acceptance received for Australian Patent Application No. 2020267310, dated Feb. 23, 2022, 3 pages.
Notice of Allowance received for Australian Patent Application No. 2020239748, dated Mar. 7, 2022, 3 pages.
Notice of Allowance received for Japanese Patent Application No. 2018-138559, dated Dec. 3, 2021, 3 pages (1 page of English Translation and 2 pages of Official Copy).
Notice of Allowance received for U.S. Appl. No. 17/030,318, dated Jan. 5, 2022, 8 pages.
Notice of Allowance received for U.S. Appl. No. 17/030,321, dated Apr. 1, 2022, 8 pages.
Notice of Allowance received for U.S. Appl. No. 17/125,744, dated Feb. 7, 2022, 10 pages.
Office Action received for Australian Patent Application No. 2020239748, dated Feb. 11, 2022, 2 pages.
Office Action received for Danish Patent Application No. PA 2020 70612, dated Mar. 1, 2022, 2 pages.
Office Action received for Danish Patent Application No. PA202070616, dated Jan. 27, 2022, 2 pages.
Office Action received for German Patent Application No. 112007000067.8, dated Apr. 23, 2009, 15 pages (7 pages of English Translation and 8 pages of Official Copy).
Office Action received for German Patent Application No. 112007000067.8, dated Sep. 14, 2010, 4 pages (2 pages of English Translation and 2 pages of Official Copy).
Office Action received for Indian Patent Application No. 202014041563, dated Dec. 30, 2021, 6 pages.
Office Action received for Indian Patent Application No. 202014041571, dated Dec. 17, 2021, 5 pages.
Office Action received for Japanese Patent Application No. 2020-079486, dated Mar. 11, 2022, 8 pages (4 pages of English Translation and 4 pages of Official Copy).
Office Action received for Japanese Patent Application No. 2020-160052, dated Dec. 17, 2021, 10 pages (5 pages of English Translation and 5 pages of Official Copy).
Office Action received for Japanese Patent Application No. 2020-160053, dated Jan. 31, 2022, 8 pages (4 pages of English Translation and 4 pages of Official Copy).
Office Action received for Japanese Patent Application No. 2020-160054, dated Jan. 21, 2022, 8 pages (4 pages of English Translation and 4 pages of Official Copy).

Office Action received for Korean Patent Application No. 10-2021-7036310, dated Feb. 23, 2022, 6 pages (2 pages of English Translation and 4 pages of Official Copy).
Result of Consultation received for European Patent Application No. 17813778.2, dated Dec. 6, 2021, 17 pages.
Summons to Attend Oral Proceedings received for European Patent Application No. 18197554.1, mailed on Mar. 23, 2022, 7 pages.
Summons to Oral Proceedings received for German Patent Application No. 112007000067.8, mailed on Dec. 8, 2021, 11 pages (5 pages of English Translation and 6 pages of Official Copy).
Supplemental Notice of Allowance received for U.S. Appl. No. 17/030,318, dated Apr. 4, 2022, 2 pages.
Supplemental Notice of Allowance received for U.S. Appl. No. 17/030,318, dated Feb. 22, 2022, 2 pages.
Supplemental Notice of Allowance received for U.S. Appl. No. 17/030,318, dated Mar. 16, 2022, 2 pages.
T&GG Channel,"Canon IXUS 700 / Screenshots of deleting an image", Online available at: https://www.youtube.com/watch?v=8BL_L5hKZUM, May 2015, 2 pages.
Advisory Action received for U.S. Appl. No. 10/497,076, dated Aug. 2, 2011, 3 pages.
Adeniyi Samuel, "How to connect a second PS4 controller to a PlayStation 4 console", Online available on:—https://www.youtube.com/watch?v=mOZX_SrNISE, May 28, 2017, 2 pages.
Advisory Action received for U.S. Appl. No. 10/497,076, dated Oct. 28, 2008, 3 pages.
Advisory Action received for U.S. Appl. No. 14/253,783, dated Feb. 15, 2017., 6 Pages.
Advisory Action received for U.S. Appl. No. 16/145,033, dated Nov. 2, 2021, 5 pages.
Allison Conor, "Working out with Fiit's wearable-powered boutique fitness classes", Online available at:—<https://www.wareable.com/wearable-tech/fiit-fitness-classes-review-3849>, May 14, 2018, 8 pages.
Applicant Initiated Interview Summary received for U.S. Appl. No. 16/109,487, dated Apr. 21, 2020, 5 pages.
Applicant Initiated Interview Summary received for U.S. Appl. No. 16/584,783, dated May 4, 2020, 3 pages.
Applicant Initiated Interview Summary received for U.S. Appl. No. 17/030,318, dated Jul. 30, 2021, 4 pages.
Applicant Initiated Interview Summary received for U.S. Appl. No. 17/030,321, dated Jul. 30, 2021, 2 pages.
Applicant-Initiated Interview Summary for U.S. Appl. No. 16/402,057, dated Mar. 16, 2020, 3 pages.
Applicant-Initiated Interview Summary received for U.S. Appl. No. 16/145,033, dated Apr. 30, 2021, 4 pages.
Applicant-Initiated Interview Summary received for U.S. Appl. No. 16/145,033, dated Nov. 24, 2020, 4 pages.
Applicant-Initiated Interview Summary received for U.S. Appl. No. 16/145,033, dated Oct. 7, 2021, 4 pages.
Applicant-Initiated Interview Summary received for U.S. Appl. No. 16/450,531, dated Aug. 11, 2020, 5 pages.
Applicant-Initiated Interview Summary received for U.S. Appl. No. 16/584,776, dated May 13, 2020, 9 pages.
Applicant-Initiated Interview Summary received for U.S. Appl. No. 16/584,776, dated Nov. 25, 2020, 5 pages.
Applicant-Initiated Interview Summary received for U.S. Appl. No. 16/145,033, dated Jun. 29, 2020, 5 pages.
Board Opinion received for Chinese Reexamination Patent Application No. 200780001142.8, dated Oct. 21, 2014, 13 pages.
Brief Communication Regarding Oral Proceedings received for European Patent Application No. 19724963.4, mailed on Jun. 22, 2021, 2 pages.
CBS This Morning,"This smart mirror puts a personal trainer in your reflection", Available on: https://www.youtube.com/watch?v=nSmTTZcpVGg, Oct. 13, 2018, 4 pages.
Certificate of Examination received for Australian Patent Application No. 2019100490, dated Oct. 16, 2019, 2 pages.
Corrected Notice of Allowance received for U.S. Appl. No. 12/566,994, dated Jan. 22, 2015, 2 pages.
Corrected Notice of Allowance received for U.S. Appl. No. 13/666,943, dated Aug. 11, 2016, 2 pages.

(56) References Cited

OTHER PUBLICATIONS

Corrected Notice of Allowance received for U.S. Appl. No. 15/281,524, dated Jun. 3, 2019, 2 pages.
Corrected Notice of Allowance received for U.S. Appl. No. 16/402,057, dated Jul. 6, 2020, 2 pages.
Corrected Notice of Allowance received for U.S. Appl. No. 16/450,531, dated Nov. 12, 2020, 2 pages.
Corrected Notice of Allowance received for U.S. Appl. No. 16/450,531, dated Oct. 30, 2020, 2 pages.
Corrected Notice of Allowance received for U.S. Appl. No. 16/983,815, dated Mar. 31, 2021, 6 pages.
Decision on Appeal received for U.S. Appl. No. 16/584,783, dated Oct. 14, 2021, 12 pages.
Decision to Grant received for Danish Patent Application No. PA201870385, dated Mar. 26, 2020, 2 pages.
Decision to Grant received for European Patent Application No. 09756118.7, dated Jul. 13, 2017., 2 pages.
Decision to Grant received for European Patent Application No. 11178259.5, dated Apr. 4, 2019, 3 pages.
Decision to Grant received for European Patent Application No. 17180535.1, dated Feb. 4, 2021, 2 pages.
Decision to Grant received for Japanese Patent Application No. 2009-526943, dated Dec. 2, 2011, dated Dec. 2, 2011, 3 pages.
Decision to Grant received for the European Patent Application No. 07814633.9, dated Sep. 2, 2010, 3 pages.
Decision to Grant received for the European Patent Application No. 10172417.7, dated Nov. 14, 2013, 3 pages.
Decision to Grant received for the European Patent Application No. 11178257.9, dated Jun. 20, 2013, 3 pages.
Ed Bott,"Chapter 14. Playing and Recording Digital Music", Special Edition Using Microsoft Windows Millennium Edition, Nov. 2000, pp. 329-353.
European Search Report received for the European Application No. 11178259.5, dated Oct. 31, 2011, 8 pages.
European Search Report received for the European Patent Application No. 10172417.7, dated Jan. 7, 2011, dated Jan. 7, 2011, 4 pages.
Examiner's Answer to Appeal Brief received for U.S. Appl. No. 16/584,783, dated Feb. 17, 2021, 9 pages.
Examiner's Pre-Review Report received for Japanese Patent Application No. 2018138559, dated Jul. 29, 2020, 6 pages.
Ex-Parte Quayle Action received for U.S. Appl. No. 12/567,570, mailed on Oct. 3, 2012, 6 pages.
Extended European Search Report received for European Patent Application No. 11178257.9, dated Oct. 31, 2011, dated Oct. 31, 2011, 5 pages.
Extended European Search Report received for European Patent Application No. 17813778.2, dated Jan. 10, 2020, 12 pages.
Extended European Search Report received for European Patent Application No. 18197554.1, dated Jun. 3, 2019, 11 pages.
Extended European Search Report received for European Patent Application No. 21159939.4, dated Sep. 28, 2021, 13 pages.
Extended European Search Report received for European Patent Application No. 17180535.1, dated Oct. 30, 2017, 9 pages.
Final Office Action received for U.S. Appl. No. 10/497,076 dated Feb. 10, 2012, 25 pages.
Final Office Action received for U.S. Appl. No. 10/497,076, dated Apr. 26, 2013, 30 pages.
Final Office Action received for U.S. Appl. No. 10/497,076, dated Feb. 2, 2011, 22 pages.
Final Office Action received for U.S. Appl. No. 10/497,076, dated Jun. 12, 2008, 31 pages.
Final Office Action received for U.S. Appl. No. 10/497,076, dated Oct. 6, 2009, 29 pages.
Final Office Action received for U.S. Appl. No. 12/567,405, dated Dec. 17, 2012, dated Dec. 17, 2012, 19 pages.
Final Office Action received for U.S. Appl. No. 12/567,553, dated Mar. 12, 2012, 15 pages.
Final Office Action received for U.S. Appl. No. 15/281,524, dated Dec. 27, 2018, 6 pages.
Final Office Action received for U.S. Appl. No. 16/145,033, dated Jul. 6, 2021, 113 pages.
Final Office Action received for U.S. Appl. No. 16/145,033, dated Sep. 22, 2020, 49 pages.
Final Office Action received for U.S. Appl. No. 16/402,057, dated Oct. 17, 2019, 23 pages.
Final Office Action received for U.S. Appl. No. 16/584,783, dated May 19, 2020, 19 pages.
Final Office Action received for U.S. Appl. No. 17/030,318, dated Sep. 30, 2021, 28 pages.
Final Office Action received for U.S. Appl. No. 17/030,321, dated Apr. 2, 2021, 28 pages.
Final Office Action received for U.S. Appl. No. 14/253,783, dated Sep. 30, 2016, 18 pages.
Hamilton Jim, "Peloton Tips", Online available on:—<https://www.youtube.com/watch?app=desktop&v=OneXtB0kaD4>, Oct. 22, 2015, 3 pages.
Helm Josh, "Microsoft® Windows Media™ Player Version 7—New features and Walk-through", Jul. 2000, 20 pages.
Hinckley et al., "Sensing Techniques for Mobile Interaction", Symposium on User Interface Software and Technology, CHI Letters, vol. 2, No. 2, Nov. 2000, pp. 91-100.
Hughes Neil, "Apple Explores Merging Cloud Content with Locally Stored Media Library", Available at <http://appleinsider.com/articles/11/02/10/apple_explores_merging_cloud_content_with_locally_stored_media_library.html>, XP55040717, Feb. 10, 2011, 2 pages.
Intention to Grant received for Danish Patent Application No. PA201870385, dated Jan. 24, 2020, 2 pages.
Intention to Grant received for European Patent Application No. 09756118.7, dated Mar. 2, 2017., 8 Pages.
Intention to Grant received for European Patent Application No. 10172417.7, dated Jul. 9, 2013, dated Jul. 9, 2013, 10 pages.
Intention to Grant received for European Patent Application No. 11178257.9, dated Jan. 30, 2013, dated Jan. 30, 2013, 9 pages.
Intention to Grant received for European Patent Application No. 11178259.5, dated Nov. 8, 2018, 16 pages.
Intention to Grant received for European Patent Application No. 17180535.1, dated Sep. 24, 2020, 7 pages.
Intention to Grant received for European Patent Application No. 19724963.4, dated Sep. 20, 2021, 7 pages.
Intention to Grant received for the European Patent Application No. 07814633.9, dated Mar. 19, 2010, 4 pages.
International Preliminary Examination Report on Patentability received for PCT Patent Application No. PCT/US2002/000484, dated Aug. 4, 2003, 7 pages.
International Preliminary Report on Patentability received for PCT Patent Application No. PCT/US2007/077441, dated Mar. 10, 2009, 9 pages.
International Preliminary Report on Patentability received for PCT Patent Application No. PCT/US2009/057899, dated Apr. 5, 2012, 14 pages., 14 pages.
International Preliminary Report on Patentability received for PCT Patent Application No. PCT/US2011/020403, dated Jul. 19, 2012, 10 pages.
International Preliminary Report on Patentability received for PCT Patent Application No. PCT/US2017/035322, dated Dec. 27, 2018, 13 pages.
International Preliminary Report on Patentability received for PCT Patent Application No. PCT/US2019/024790, dated Nov. 19, 2020, 11 pages.
International Preliminary Report on Patentability received for PCT Patent Application No. PCT/US2020/031442, dated Nov. 18, 2021, 21 pages.
International Search Report and Written Opinion received for PCT Patent Application No. PCT/US2002/000484, dated Jul. 11, 2002, 1 page.
International Search Report and Written Opinion received for PCT Patent Application No. PCT/US2009/057899, dated Jun. 14, 2010, dated Jun. 14, 2010, 19 pages.
International Search Report and Written Opinion received for PCT Patent Application No. PCT/US2011/020403, dated May 26, 2011, dated May 26, 2011, 14 pages.

(56) References Cited

OTHER PUBLICATIONS

International Search Report and Written Opinion Received for PCT Patent Application No. PCT/US2017/035322, dated Oct. 5, 2017, 18 pages.
International Search Report and Written Opinion received for PCT Patent Application No. PCT/US2019/024790, dated Sep. 11, 2019, 18 pages.
International Search Report and Written Opinion received for PCT Patent Application No. PCT/US2020/031442, dated Oct. 30, 2020, 28 pages.
International Search Report and Written Opinion received for PCT Patent Application No. PCT/US2021/017736, dated Sep. 2, 2021, 25 pages.
International Search Report and Written Opinion, received for PCT Patent Application No. PCT/US2007/077441, dated May 8, 2008, dated May 8, 2008, 13 pages.
Invitation to Pay Additional Fee received for PCT Patent Application No. PCT/US2019/024790, dated Jul. 18, 2019, 10 pages.
Invitation to Pay Additional Fees received for PCT Patent Application No. PCT/US2007/077441, dated Jan. 28, 2008, dated Jan. 28, 2008, 5 pages.
Invitation to Pay Additional Fees received for PCT Patent Application No. PCT/US2017/035322, dated Aug. 7, 2017, 4 pages.
Invitation to Pay Additional Fees received for PCT Patent Application No. PCT/US2020/031442, dated Aug. 25, 2020, 22 pages.
Invitation to Pay Additional Fees received for PCT Patent Application No. PCT/US2021/017736, dated Jun. 15, 2021, 14 pages.
Jobs Steve, "iPhone Introduction in 2007 (Complete)", available at <https://www.youtube.com/watch?v=9hUIxyE2Ns8>,, Jan. 10, 2013, 3 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Microsoft Support Webcasts, Windows Media Player 7: New features and Walk-through Transcript, Jul. 13, 2000, 7 pages.
Microsoft Windows,"Microsoft Windows (Copyright 2009)", 2 pages.
Minutes of Oral Proceedings received for European Patent Application No. 11178259.5, mailed on Nov. 2, 2018, 9 pages.
Minutes of the Oral Proceedings received for European Patent Application No. 19724963.4, mailed on Sep. 3, 2021, 6 pages.
Mozilla Developer Network,"Mouse Gesture Events", Available online at <https://developer.mozilla.org/en-US/docs/Web/Guide/Events/Mouse_gesture_events>, May 14, 2009, 3 pages.
Non-Final Office Action received for U.S. Appl. No. 09/757,000, dated Jan. 30, 2003, 11 pages.
Non-Final Office Action received for U.S. Appl. No. 09/757,000, dated Jun. 19, 2003, 11 Pages.
Non-Final Office Action received for U.S. Appl. No. 10/497,076, dated Jan. 8, 2009, 29 pages.
Non-Final Office Action received for U.S. Appl. No. 10/497,076, dated May 13, 2010, 24 pages.
Non-Final Office Action received for U.S. Appl. No. 10/497,076, dated Oct. 3, 2012, 24 pages.
Non-Final Office Action received for U.S. Appl. No. 10/497,076, dated Oct. 13, 2011, 24 pages.
Non-Final Office Action received for U.S. Appl. No. 10/497,076, dated Sep. 13, 2007, 19 pages.
Non-Final Office Action received for U.S. Appl. No. 11/848,210, dated Jun. 30, 2011, dated Jun. 30, 2011, 8 pages.
Non-Final Office Action received for U.S. Appl. No. 12/566,994, dated Dec. 13, 2013, dated Dec. 13, 2013, 10 pages.
Non-Final Office Action received for U.S. Appl. No. 12/566,994, dated Jan. 9, 2013, dated Jan. 9, 2013, 15 pages.
Non-Final Office Action received for U.S. Appl. No. 12/566,994, dated Jun. 13, 2014, 12 pages.
Non-Final Office Action received for U.S. Appl. No. 12/567,405, dated Jan. 16, 2014, 19 pages.
Non-Final Office Action received for U.S. Appl. No. 12/567,405, dated May 17, 2012, dated May 17, 2012, 14 pages.
Non-Final Office Action received for U.S. Appl. No. 12/567,460, dated Aug. 4, 2011, dated Aug. 4, 2011, 13 pages.
Non-Final Office Action received for U.S. Appl. No. 12/567,553, dated Sep. 16, 2011, 11 pages.
Non-Final Office Action received for U.S. Appl. No. 12/849,767, dated Jul. 9, 2012, dated Jul. 9, 2012, 16 pages.
Non-Final Office Action received for U.S. Appl. No. 13/361,912, dated Mar. 22, 2012, dated Mar. 22, 2012, 8 pages.
Non-Final Office Action received for U.S. Appl. No. 13/909,001, dated Sep. 26, 2013, 7 pages.
Non-Final Office Action received for U.S. Appl. No. 13/909,002, dated Jun. 23, 2015, 6 pages.
Non-Final Office Action received for U.S. Appl. No. 15/088,450, dated Jul. 23, 2018, 12 pages.
Non-Final Office Action received for U.S. Appl. No. 15/275,294, dated Dec. 23, 2016., 18 pages.
Non-Final Office Action received for U.S. Appl. No. 15/275,294, dated Nov. 3, 2017, 29 pages.
Non-Final Office Action received for U.S. Appl. No. 15/281,524, dated Jun. 19, 2018, 23 pages.
Non-Final Office Action received for U.S. Appl. No. 15/391,269, dated Aug. 22, 2019, 44 pages.
Non-Final Office Action received for U.S. Appl. No. 15/687,384, dated Jul. 6, 2018, 19 pages.
Non-Final Office Action received for U.S. Appl. No. 16/109,487, dated Feb. 5, 2020, 19 pages.
Non-Final Office Action received for U.S. Appl. No. 16/145,033, dated Feb. 9, 2021, 55 pages.
Non-Final Office Action received for U.S. Appl. No. 16/145,033, dated Mar. 4, 2020, 50 pages.
Non-Final Office Action received for U.S. Appl. No. 16/402,057, dated May 23, 2019, 16 pages.
Non-Final Office Action received for U.S. Appl. No. 16/450,531, dated Jun. 10, 2020, 10 pages.
Non-Final Office Action received for U.S. Appl. No. 16/584,776, dated Aug. 18, 2020, 36 pages.
Non-Final Office Action received for U.S. Appl. No. 16/584,776, dated Feb. 13, 2020, 31 pages.
Non-Final Office Action received for U.S. Appl. No. 16/584,783, dated Jan. 30, 2020, 18 pages.
Non-Final Office Action received for U.S. Appl. No. 17/030,318, dated Apr. 2, 2021, 28 pages.
Non-Final Office Action received for U.S. Appl. No. 17/030,318, dated Dec. 3, 2020, 22 pages.
Non-Final Office Action received for U.S. Appl. No. 17/030,321, dated Dec. 15, 2020, 25 pages.
Non-Final Office Action received for U.S. Appl. No. 17/030,321, dated Oct. 18, 2021, 28 pages.
Non-Final Office Action received for U.S. Appl. No. 17/035,367, dated Jun. 11, 2021, 11 pages.
Non-Final Office Action received for U.S. Appl. No. 12/789,441, dated Jan. 17, 2013, dated Jan. 17, 2013, 24 pages.
Non-Final Office Action received for U.S. Appl. No. 13/666,943, dated Oct. 26, 2015, 12 Pages.
Non-Final Office Action received for U.S. Appl. No. 14/253,783, dated Feb. 23, 2016, 18 pages.
Notice of Acceptance received for Australian Patent Application No. 2011265412, dated Nov. 12, 2014, 2 pages.
Notice of Acceptance received for Australian Patent Application No. 2015201028, dated Mar. 21, 2017., 3 Pages.
Notice of Acceptance received for Australian Patent Application No. 2017201548, dated Sep. 3, 2018, 3 pages.
Notice of Acceptance received for Australian Patent Application No. 2018214074, dated Aug. 6, 2019, 3 pages.
Notice of Acceptance received for Australian Patent Application No. 2019264623, dated Jan. 4, 2021, 3 pages.
Notice of Acceptance received for Australian Patent Application No. 2019271873, dated Nov. 30, 2020, 3 pages.
Notice of Acceptance received for Australian Patent Application No. 2020267396, dated Dec. 7, 2021, 3 pages.
Notice of Acceptance received for Australian Patent Application No. 2017284958, dated Sep. 3, 2019, 3 Pages.

(56) References Cited

OTHER PUBLICATIONS

Notice of Allowance received for Canadian Patent Application No. 2,935,875, dated May 3, 2017, 1 page.
Notice of Allowance received for Canadian Patent Application No. 2,984,527, dated Apr. 30, 2020, 1 page.
Notice of Allowance received for Chinese Patent Application No. 201811136445.7, dated Aug. 11, 2021, 2 pages.
Notice of Allowance received for Chinese Patent Application No. 201811616429.8, dated Aug. 5, 2020, 3 pages.
Notice of Allowance received for Japanese Patent Application No. 2013-140171, dated May 29, 2015, 4 pages.
Notice of Allowance received for Japanese Patent Application No. 2014-259225, dated Feb. 27, 2017., 3 pages.
Notice of Allowance received for Japanese Patent Application No. 2015-129152, dated May 8, 2017, 3 pages.
Notice of Allowance received for Japanese Patent Application No. 2017-057997, dated Apr. 23, 2018, 4 pages.
Notice of Allowance received for Japanese Patent Application No. 2017-132229, dated Jun. 25, 2018, 4 pages.
Notice of Allowance received for Japanese Patent Application No. 2019-123115, dated Nov. 30, 2020, 4 pages.
Notice of Allowance received for Japanese Patent Application No. 2021-000224, dated May 7, 2021, 4 pages.
Notice of Allowance received for Japanese Patent Application No. 2021-094529, dated Sep. 6, 2021, 4 pages.
Notice of Allowance received for Korean Patent Application No. 10-2018-7034875, dated Dec. 12, 2018, 4 pages.
Notice of Allowance received for Korean Patent Application No. 10-2019-7007053, dated Dec. 19, 2019, 6 pages.
Notice of Allowance received for Korean Patent Application No. 10-2019-7007053, dated Mar. 12, 2020, 6 pages.
Notice of Allowance received for Korean Patent Application No. 10-2020-7005314, dated Mar. 23, 2020, 6 pages.
Notice of Allowance received for Korean Patent Application No. 10-2020-7018255, dated Feb. 24, 2021, 5 pages.
Notice of Allowance received for the Canadian Patent Application No. 2,853,273, dated Jan. 12, 2016, dated Jan. 12, 2016, 1 page.
Notice of Allowance received for U.S. Appl. No. 09/757,000, dated Dec. 15, 2003, 4 pages.
Notice of Allowance received for U.S. Appl. No. 11/848,210, dated Dec. 20, 2011, dated Dec. 20, 2011, 5 pages.
Notice of Allowance received for U.S. Appl. No. 12/566,994, dated May 22, 2013, 9 pages.
Notice of Allowance received for U.S. Appl. No. 12/566,994, dated Oct. 6, 2014, 8 pages.
Notice of Allowance received for U.S. Appl. No. 12/567,405, dated Jun. 11, 2014, 9 pages.
Notice of Allowance received for U.S. Appl. No. 12/567,460, dated Apr. 10, 2013, dated Apr. 10, 2013, 9 pages.
Notice of Allowance received for U.S. Appl. No. 12/567,460, dated Aug. 10, 2012, dated Aug. 10, 2012, 8 pages.
Notice of Allowance received for U.S. Appl. No. 12/567,460, dated Dec. 24, 2012, dated Dec. 24, 2012, 8 pages.
Notice of Allowance received for U.S. Appl. No. 12/567,460, dated Jan. 18, 2012, dated Jan. 18, 2012, 8 pages.
Notice of Allowance received for U.S. Appl. No. 12/567,553, dated Apr. 2, 2013, 9 pages.
Notice of Allowance received for U.S. Appl. No. 12/567,553, dated Aug. 10, 2012, 8 pages.
Notice of Allowance received for U.S. Appl. No. 12/567,553, dated Dec. 24, 2012, 8 pages.
Notice of Allowance received for U.S. Appl. No. 12/567,553, dated Jun. 12, 2012, 8 pages.
Notice of Allowance received for U.S. Appl. No. 12/567,570, dated Dec. 19, 2012, 7 pages.
Notice of Allowance received for U.S. Appl. No. 12/567,570, dated Mar. 27, 2013, 8 pages.
Notice of Allowance received for U.S. Appl. No. 12/789,441, dated Dec. 6, 2013, dated Dec. 6, 2013, 11 pages.
Notice of Allowance received for U.S. Appl. No. 12/849,767, dated Apr. 25, 2014, 5 pages.
Notice of Allowance received for U.S. Appl. No. 12/849,767, dated Jan. 8, 2013, dated Jan. 8, 2013, 9 pages.
Notice of Allowance received for U.S. Appl. No. 13/361,912, dated Jul. 2, 2012, dated Jul. 2, 2012, 7 pages.
Notice of Allowance received for U.S. Appl. No. 13/666,943, dated Jun. 2, 2016, 9 pages.
Notice of Allowance received for U.S. Appl. No. 13/666,943, dated Jun. 17, 2015, 7 pages.
Notice of Allowance received for U.S. Appl. No. 13/909,001, dated Mar. 3, 2014, 7 pages.
Notice of Allowance received for U.S. Appl. No. 13/909,002, dated Dec. 4, 2015, 7 pages.
Notice of Allowance received for U.S. Appl. No. 14/253,783, dated Apr. 14, 2017., 12 Pages.
Notice of Allowance received for U.S. Appl. No. 14/253,783, dated Jul. 12, 2017, 5 pages.
Notice of Allowance received for U.S. Appl. No. 14/253,783, dated Sep. 5, 2017, 8 pages.
Notice of Allowance received for U.S. Appl. No. 15/088,450, dated Dec. 13, 2018, 7 pages.
Notice of Allowance received for U.S. Appl. No. 15/275,294, dated Jun. 6, 2018, 8 pages.
Notice of Allowance received for U.S. Appl. No. 15/275,294, dated Jun. 30, 2017., 8 Pages.
Notice of Allowance received for U.S. Appl. No. 15/281,524, dated Apr. 11, 2019, 7 pages.
Notice of Allowance received for U.S. Appl. No. 15/687,384, dated Jan. 8, 2019, 8 pages.
Notice of Allowance received for U.S. Appl. No. 16/109,487, dated Aug. 18, 2020, 8 pages.
Notice of Allowance received for U.S. Appl. No. 16/109,487, dated May 12, 2020, 8 pages.
Notice of Allowance received for U.S. Appl. No. 16/109,487, dated Nov. 23, 2020, 3 pages.
Notice of Allowance received for U.S. Appl. No. 16/402,057, dated Mar. 25, 2020, 8 pages.
Notice of Allowance received for U.S. Appl. No. 16/403,184, dated Oct. 11, 2019, 9 pages.
Notice of Allowance received for U.S. Appl. No. 16/450,531 dated Sep. 25, 2020, 7 pages.
Notice of Allowance received for U.S. Appl. No. 16/584,776, dated Feb. 1, 2021, 9 pages.
Notice of Allowance received for U.S. Appl. No. 16/584,783, dated Dec. 20, 2021, 7 pages.
Notice of Allowance received for U.S. Appl. No. 16/791,257, dated Jun. 12, 2020, 11 pages.
Notice of Allowance received for U.S. Appl. No. 16/983,815, dated Jul. 26, 2021, 3 pages.
Notice of Allowance received for U.S. Appl. No. 16/983,815, dated Mar. 18, 2021, 11 pages.
Notice of Allowance received for U.S. Appl. No. 17/035,367, dated Sep. 23, 2021, 7 pages.
Notice of Allowance received for U.S. Appl. No. 17/125,744, dated Oct. 21, 2021, 11 pages.
Notice of Allowance received for U.S. Appl. No. 12/789,441, dated Aug. 20, 2013, dated Aug. 20, 2013, 9 pages.
Office Action received for Australian Patent Application No. 2015201028, dated Mar. 15, 2016, 2 pages.
Office Action received for Australian Patent Application No. 2017201548, dated Feb. 26, 2018, 2 pages.
Office Action received for Australian Patent Application No. 2018214074, dated May 9, 2019, 2 pages.
Office Action received for Australian Patent Application No. 2019100490, dated Jul. 26, 2019, 4 pages.
Office Action received for Australian Patent Application No. 2019264623, dated Sep. 14, 2020, 3 pages.
Office Action received for Australian Patent Application No. 2019266054, dated Aug. 23, 2021, 4 pages.
Office Action received for Australian Patent Application No. 2019266054, dated Jun. 29, 2021, 3 pages.

(56) References Cited

OTHER PUBLICATIONS

Office Action received for Australian Patent Application No. 2019271873, dated Oct. 5, 2020, 3 pages.
Office Action received for Australian Patent Application No. 2020239743, dated Mar. 25, 2021, 8 pages.
Office Action received for Australian Patent Application No. 2020239743, dated Sep. 3, 2021, 4 pages.
Office Action received for Australian Patent Application No. 2020239748, dated Apr. 21, 2021, 6 pages.
Office Action received for Australian Patent Application No. 2020239748, dated Sep. 1, 2021, 4 pages.
Office Action received for Australian Patent Application No. 2020239752, dated Jun. 4, 2021, 8 pages.
Office Action received for Australian Patent Application No. 2020239752, dated Oct. 25, 2021, 5 pages.
Office Action received for Australian Patent Application No. 2020267310, dated Nov. 4, 2021, 2 pages.
Office Action received for Australian Patent Application No. 2017284958, dated Dec. 13, 2018, 3 pages.
Office Action received for Canadian Patent Application No. 2,853,273, dated Feb. 23, 2015, 5 pages.
Office Action received for Canadian Patent Application No. 2,984,527 dated Sep. 11, 2018, 5 pages.
Office Action received for Canadian Patent Application No. 2,984,527, dated Jul. 25, 2019, 4 pages.
Office Action received for Chinese Patent Application No. 201811136445.7, dated Apr. 14, 2021, 7 pages.
Office Action received for Chinese Patent Application No. 201811136445.7, dated Oct. 28, 2020, 17 pages.
Office Action received for Chinese Patent Application No. 201811616429.8, dated May 7, 2020, 8 pages.
Office Action received for Chinese Patent Application No. 201811616429.8, dated Sep. 4, 2019, 26 pages.
Office Action received for Danish Patent Application No. PA201670608, dated Jan. 14, 2019, 7 pages.
Office Action received for Danish Patent Application No. PA201670608, dated Jan. 23, 2018, 10 pages.
Office Action received for Danish Patent Application No. PA201670609, dated Jan. 26, 2018, 8 pages.
Office Action received for Danish Patent Application No. PA201670609, dated Mar. 1, 2019, 9 pages.
Office Action received for Danish Patent Application No. PA201670609, dated May 4, 2020, 7 pages.
Office Action received for Danish Patent Application No. PA201670609, dated May 7, 2018, 4 pages.
Office Action received for Danish Patent Application No. PA201870385, dated Aug. 23, 2019, 3 Pages.
Office Action received for Danish Patent Application No. PA201970535, dated May 20, 2020, 3 pages.
Office Action received for Danish Patent Application No. PA201970535, dated Oct. 27, 2020, 6 pages.
Office Action received for Danish Patent Application No. PA202070613, dated Sep. 30, 2021, 4 pages.
Office Action received for Danish Patent Application No. PA202070615, dated Nov. 16, 2021, 4 pages.
Office Action received for European Patent Application No. 02713375.0, dated Feb. 27, 2009, 5 pages.
Office Action received for European Patent Application No. 07814633.9, dated Aug. 10, 2009, 3 pages.
Office Action received for European Patent Application No. 09756118.7, dated Feb. 13, 2013, dated Feb. 13, 2013, 5 pages.
Office Action received for European Patent Application No. 09756118.7, dated Mar. 7, 2014, 7 pages.
Office Action Received for European Patent Application No. 09756118.7, dated Oct. 8, 2015, dated Aug. 10, 2015, 6 pages.
Office Action received for European Patent Application No. 10172417.7, dated Oct. 31, 2011, 6 pages.
Office Action received for European Patent Application No. 11178259.5, dated Jan. 4, 2013, 8 pages.
Office Action received for European Patent Application No. 11178259.5, dated Nov. 10, 2015, 4 pages.
Office Action received for European Patent Application No. 17180535.1, dated Oct. 8, 2018, 6 pages.
Office Action received for European Patent Application No. 17180535.1, dated Oct. 14, 2019, 8 pages.
Office Action received for European Patent Application No. 17813778.2, dated Nov. 26, 2020, 10 pages.
Office Action received for European Patent Application No. 18197554.1, dated Jun. 15, 2020, 4 pages.
Office Action received for European Patent Application No. 19724963.4, dated Jul. 28, 2020, 6 pages.
Office Action received for European Patent Application No. 02713375.0, dated Feb. 24, 2010, 4 pages.
Office Action received for European Patent Application No. 02713375.0, dated Feb. 24, 2014, 5 pages.
Office Action received for Indian Patent Application No. 9044/CHENP/2014, dated Jan. 24, 2020, 6 pages.
Office action received for Indian Patent Application No. 2797CHENP2008, dated Jan. 29, 2014, 3 pages.
Office Action received for Japanese Patent Application No. 2013-140171, dated Jul. 22, 2014, 4 pages.
Office Action received for Japanese Patent Application No. 2014-259225, dated May 27, 2016, 4 pages.
Office Action Received for Japanese Patent Application No. 2014-259225, dated Nov. 20, 2015, 2 pages.
Office Action received for Japanese Patent Application No. 2015-129152, dated Sep. 23, 2016, 3 pages.
Office Action received for Japanese Patent Application No. 2017-057997, dated Jan. 9, 2018, 6 pages.
Office Action received for Japanese Patent Application No. 2017-132229, dated Mar. 16, 2018, 7 pages.
Office Action received for Japanese Patent Application No. 2018-138559, dated Apr. 9, 2021, 30 pages.
Office Action received for Japanese Patent Application No. 2018-138559, dated Jan. 27, 2020, 7 pages.
Office Action received for Japanese Patent Application No. 2018-138559, dated Jul. 26, 2021, 37 pages.
Office Action received for Japanese Patent Application No. 2018-138559, dated May 13, 2019, 10 pages.
Office Action received for Japanese Patent Application No. 2019-123115, dated Aug. 31, 2020, 9 pages.
Office Action received for Japanese Patent Application No. 2020-079486, dated Jul. 16, 2021, 10 pages.
Office Action received for Korean Patent Application No. 10-2019-7007053, dated Mar. 18, 2019, 12 pages.
Office Action received for Korean Patent Application No. 10-2019-7007053, dated Sep. 26, 2019, 9 pages.
Office Action received for Korean Patent Application No. 10-2020-7018255, dated Sep. 10, 2020, 12 pages.
Partial European Search Report received for European Patent Application No. 18197554.1, dated Jan. 22, 2019, 8 pages.
Person et al., "Special Edition Using Windows 95", Published by Que Corporation, 2nd Edition, 1997, pp. 335-337.
Redmond Wash, "Microsoft Unveils Windows Media Player 7", Microsoft Press Pass, Mar. 27, 2000, 4 pages.
Redmond Wash, "Worldwide Popularity of Microsoft Windows Media Player 7", Microsoft PressPass, Aug. 2, 2000, 1 page.
Result of Consultation received for European Patent Application No. 19724963.4, dated Jul. 8, 2021, 3 pages.
Result of Consultation received for European Patent Application No. 19724963.4, dated May 31, 2021, 3 pages.
Search Report and opinion received for Danish Patent Application No. PA201670608, dated Jan. 3, 2017, 15 pages.
Search Report and Opinion received for Danish Patent Application No. PA201670609, dated Feb. 1, 2017, 11 pages.
Search Report and Opinion received for Danish Patent Application No. PA201870385, dated Nov. 16, 2018, 10 Pages.
Search Report and Opinion received for Danish Patent Application No. PA201970535, dated Nov. 5, 2019, 10 pages.
Search Report and Opinion received for Danish Patent Application No. PA202070612, dated Jun. 7, 2021, 9 pages.

(56) References Cited

OTHER PUBLICATIONS

Search Report and Opinion received for Danish Patent Application No. PA202070613, dated Jan. 22, 2021, 9 pages.
Search Report and Opinion received for Danish Patent Application No. PA202070615, dated Jan. 22, 2021, 9 pages.
Search Report and Opinion received for Danish Patent Application No. PA202070616, dated Feb. 3, 2021, 8 pages.
Skiljan Irfan, "IrfanView Help", Irfan View Screen Dumps, 1996-1999, 3 pages.
Summons to Attend Oral Proceeding received for European Patent Application No. 10172417.7, Jan. 28, 2013, 6 pages, Jan. 28, 2013, 6 pages.
Summons to Attend Oral Proceedings received for European Patent Application No. 09756118.7, mailed on Sep. 23, 2016, 8 pages.
Summons to Attend Oral Proceedings received for European Patent Application No. 11178259.5, mailed on Feb. 11, 2015, 9 pages.
Summons to Attend Oral Proceedings received for European Patent Application No. 11178259.5, mailed on Feb. 19, 2018, 12 pages.
Summons to Attend Oral Proceedings received for European Patent Application No. 17813778.2, mailed on Aug. 13, 2021, 13 pages.
Summons to Attend Oral Proceedings received for European Patent Application No. 19724963.4, mailed on Dec. 23, 2020, 8 pages.
Supplemental Notice of Allowance received for U.S. Appl. No. 16/403,184, dated Nov. 21, 2019, 3 pages.
Supplemental Notice of Allowance received for U.S. Appl. No. 16/584,776, dated Feb. 18, 2021, 3 pages.
Supplemental Notice of Allowance received for U.S. Appl. No. 16/584,776, dated May 13, 2021, 4 pages.
Supplemental Notice of Allowance received for U.S. Appl. No. 16/791,257, dated Aug. 31, 2020, 3 pages.
Supplemental Notice of Allowance received for U.S. Appl. No. 17/035,367, dated Oct. 27, 2021, 3 pages.
Supplementary European Search Report received for European Patent Application No. 02713375.0, dated Oct. 2, 2009, 3 pages.
Supplementary Search Report received for European Patent Application No. 02713375.0, dated Aug. 5, 2005, 3 pages.
Support WebCast: Windows Media Player 7: New features and Walk-through, Microsoft Knowledge Base Article—324594, Jul. 13, 2000, 2 pages.
Vicky's Blog,"How to Log In to PS4 Automatically with Particular User?", Online available on:—https://www.youtube.com/watch?v=kqdlzXAvOkY, May 30, 2018, 3 pages.
Way to Use a Camera, JP, Nov. 18, 2005, pp. 206-212.
Willcom,"Operation Manual for WS003SH", JP, Dec. 2005, pp. 4-1 to 4-7.
Winamp from Nullsoft, screendumps of the media player having visual effect, version 2.62, 1997-2000, 2 pages.
Windows Media Player Visualization, to view a visualization, 2000-2001, 2 pages.
Yoyodavid,"How To Use Multiple Accounts on the Playstation 4", Online available at:—https://www.youtube.com/watch?v=5V21obRMeKE, Jan. 9, 2014, 3 pages.
Corrected Notice of Allowance received for U.S. Appl. No. 17/031,543, dated Jun. 8, 2022, 3 pages.
Non-Final Office Action received for U.S. Appl. No. 17/030,337, dated Jun. 14, 2022, 13 pages.
Non-Final Office Action received for U.S. Appl. No. 17/030,340, dated Jun. 14, 2022, 15 pages.
Non-Final Office Action received for U.S. Appl. No. 17/030,318, dated Jun. 14, 2022, 9 pages.
Notice of Allowance received for Japanese Patent Application No. 2020-160052, dated Jun. 3, 2022, 4 pages (1 page of English Translation and 3 pages of Official Copy).
Office Action received for Japanese Patent Application No. 2021-566100, dated May 27, 2022, 7 pages (3 pages of English Translation and 4 pages of Official Copy).
Office Action received for Korean Patent Application No. 10-2020-0123815, dated May 31, 2022, 10 pages (5 pages of English Translation and 5 pages of Official Copy).
Supplemental Notice of Allowance received for U.S. Appl. No. 17/030,321, dated Jun. 10, 2022, 2 pages.
Supplemental Notice of Allowance received for U.S. Appl. No. 17/030,321, dated May 27, 2022, 2 pages.
Applicant-Initiated Interview Summary received for U.S. Appl. No. 17/030,337, dated Jul. 27, 2022, 2 pages.
Corrected Notice of Allowance received for U.S. Appl. No. 17/031,543, dated Jul. 18, 2022, 2 pages.
Non-Final Office Action received for U.S. Appl. No. 17/408,220, dated Aug. 3, 2022, 15 pages.
Notice of Acceptance received for Australian Patent Application No. 2022201561, dated Jul. 22, 2022, 3 pages.
Supplemental Notice of Allowance received for U.S. Appl. No. 17/030,321, dated Jul. 27, 2022, 2 pages.
Applicant-Initiated Interview Summary received for U.S. Appl. No. 17/153,703, dated May 11, 2022, 4 pages.
Extended European Search Report received for European Patent Application No. 22152524.9, dated May 2, 2022, 10 pages.
Notice of Allowance received for Korean Patent Application No. 10-2021-7036310, dated Apr. 26, 2022, 5 pages (2 pages of English Translation and 3 pages of Official Copy).
Notice of Allowance received for U.S. Appl. No. 17/031,543, dated May 11, 2022, 6 pages.
Office Action received for Australian Patent Application No. 2022201561, dated May 2, 2022, 3 pages.
Office Action received for Danish Patent Application No. PA202070612, dated May 10, 2022, 2 pages.
Office Action received for Danish Patent Application No. PA202070613, dated May 10, 2022, 2 pages.
Office Action received for Danish Patent Application No. PA202070616, dated May 5, 2022, 3 pages.
2016-017331, JP, A, In Notice of Allowance for related Patent Application No. 2022-107902, dated Aug. 26, 2022.
2018-202174, JP, A, In Notice of Allowance for related Patent Application No. 2022-107902, dated Aug. 26, 2022.
2019-003670, JP, A, In Notice of Allowance for related Patent Application No. 2022-107902, dated Aug. 26, 2022.
Office Action received for European Patent Application No. 20729331.7, dated Jan. 4, 2023, 12 pages.
Notice of Allowance received for Japanese Patent Application No. 2021-566100, dated Jan. 27, 2023, 4 pages (1 page of English Translation and 3 pages of Official Copy).
Office Action received for Chinese Patent Application No. 202111487316.4, dated Dec. 28, 2022, 13 pages (8 pages of English Translation and 5 pages of Official Copy).

\* cited by examiner

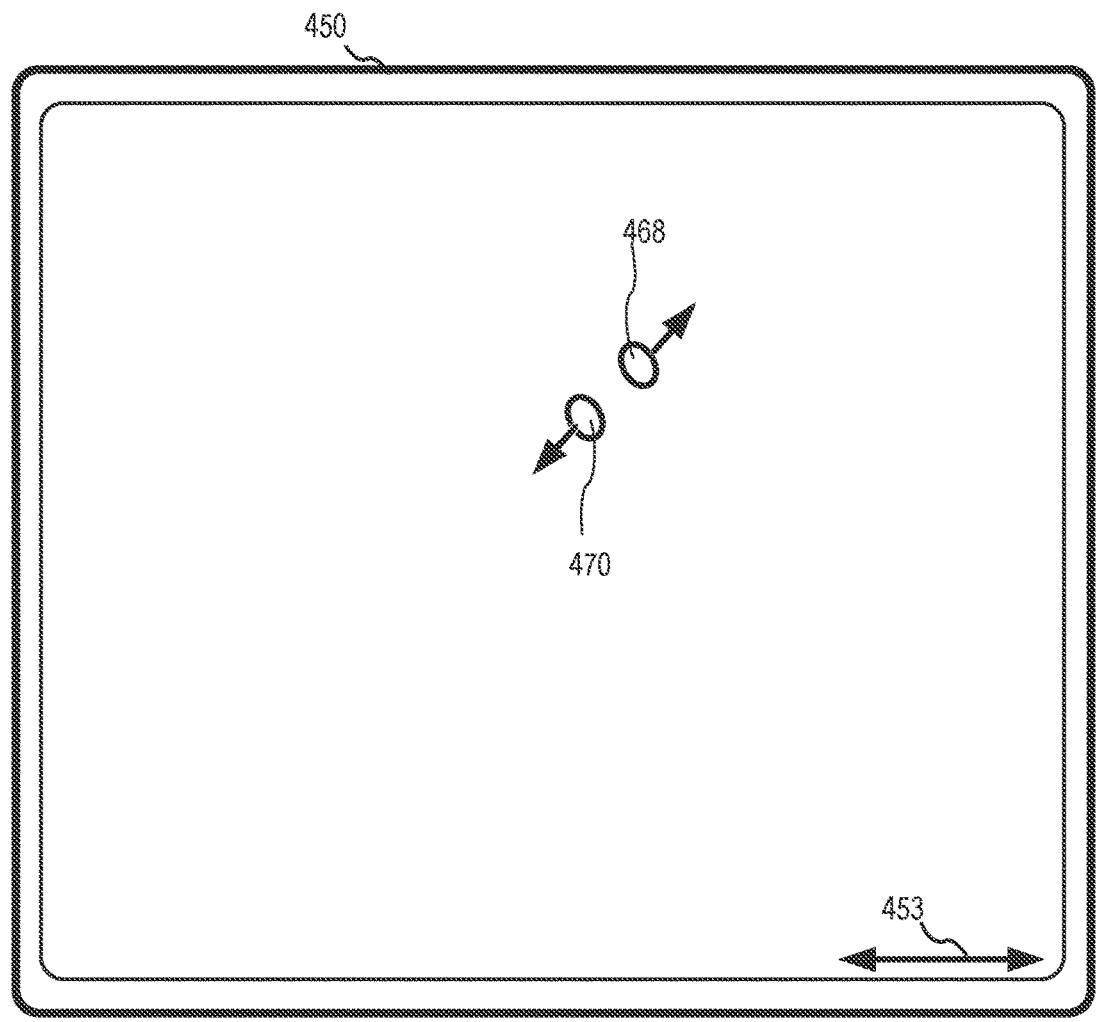
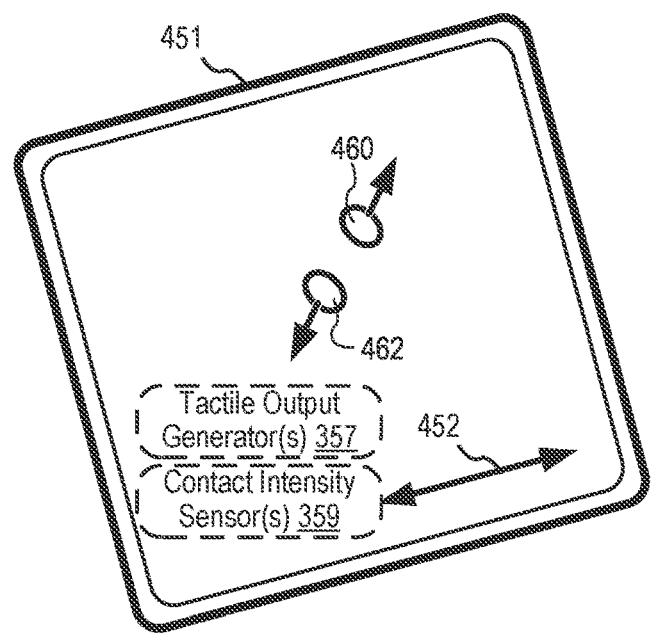
FIG. 4B

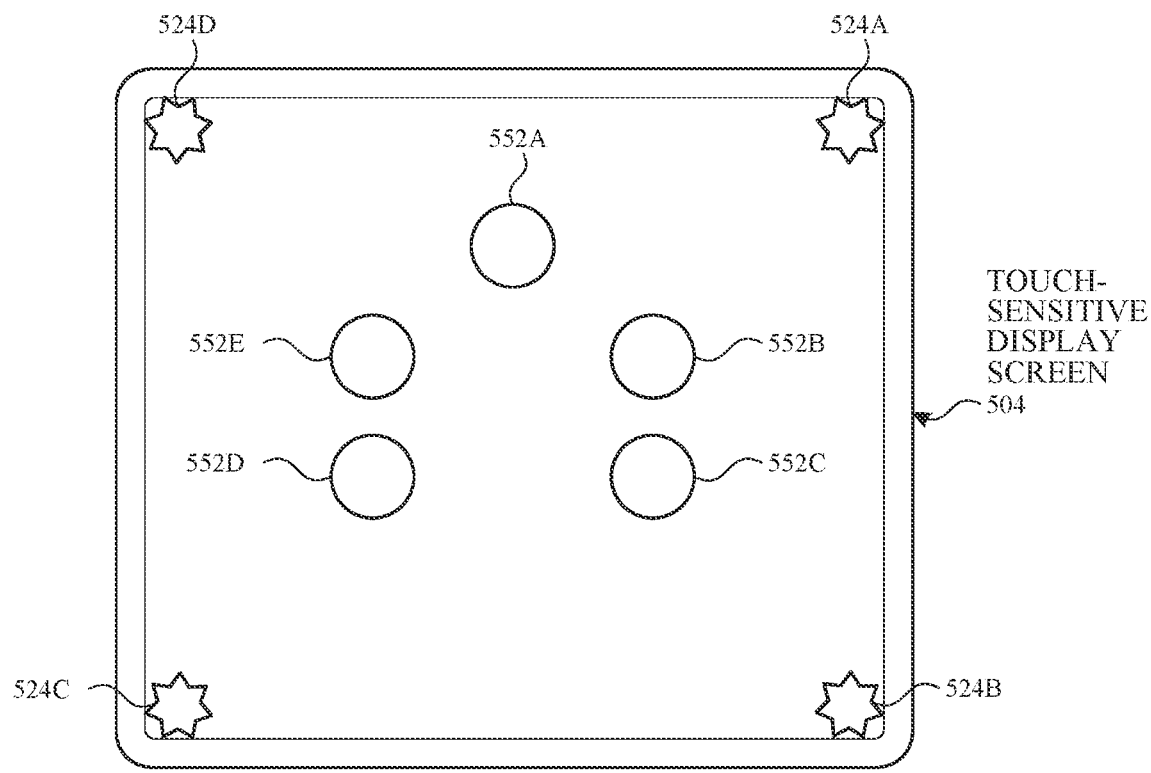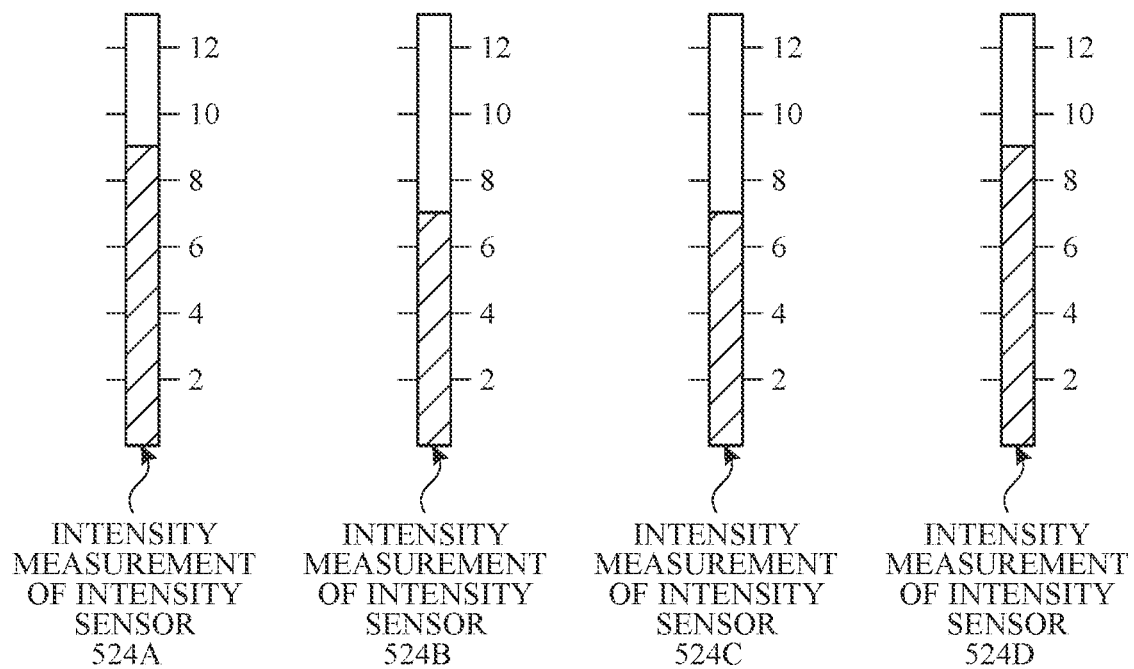
FIG. 5C

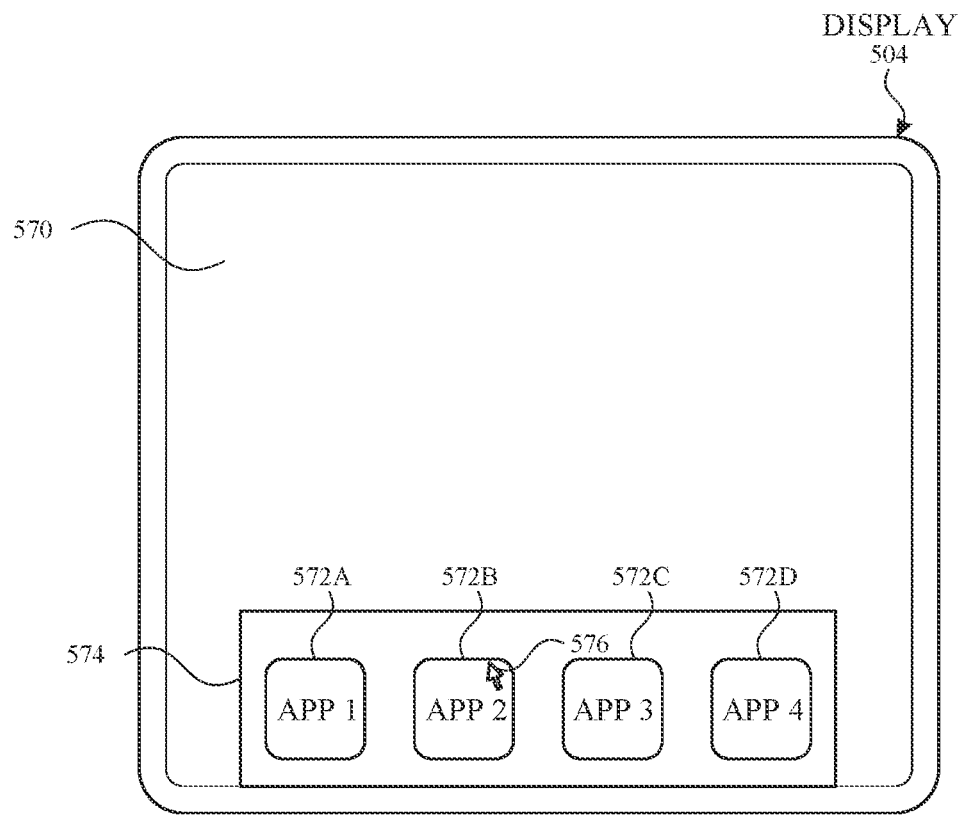
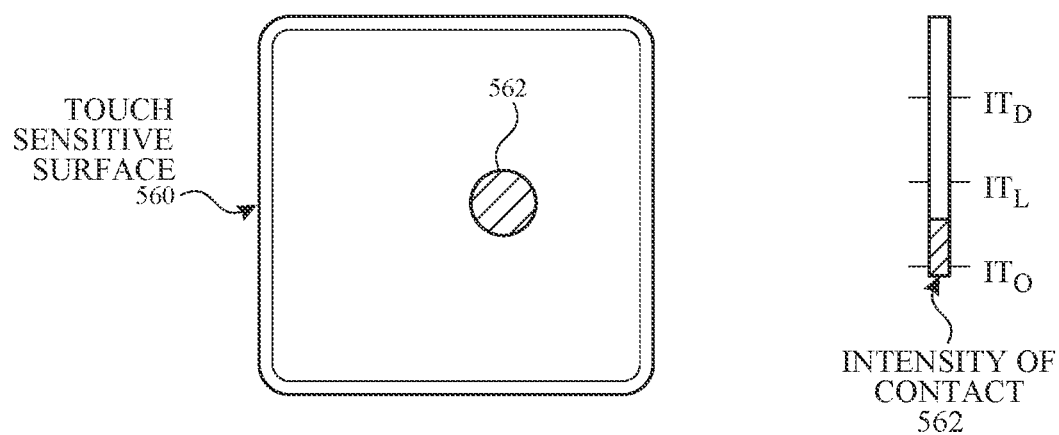
FIG. 5E

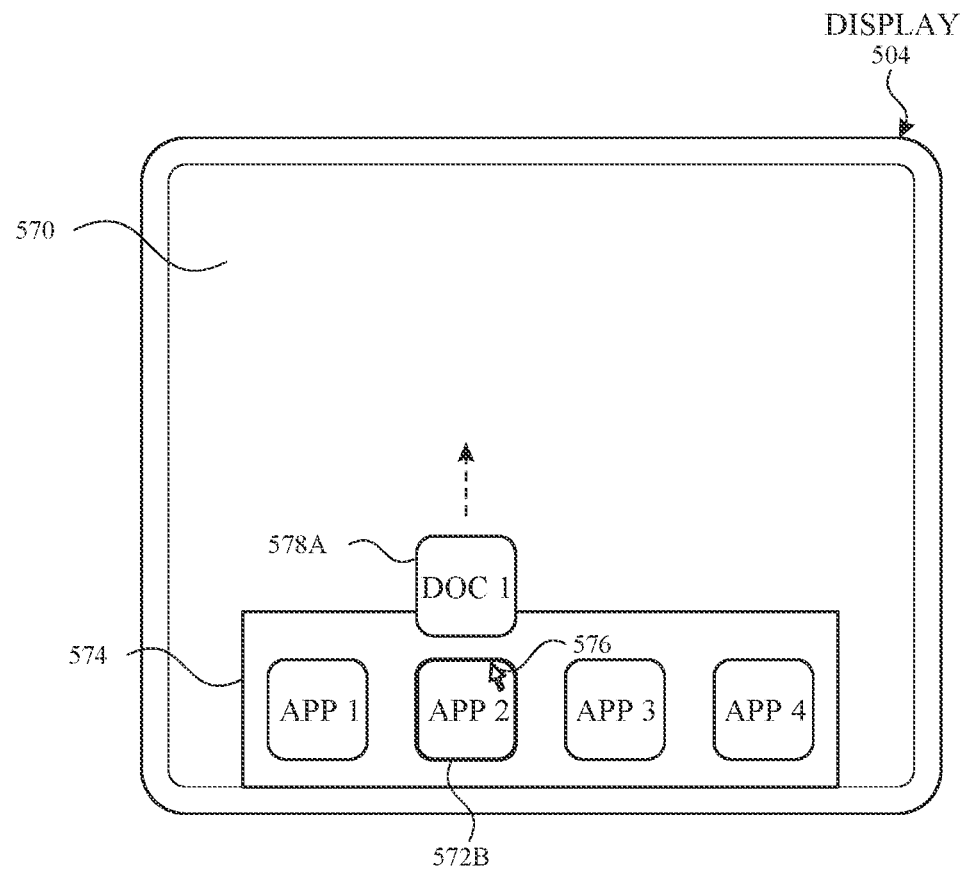
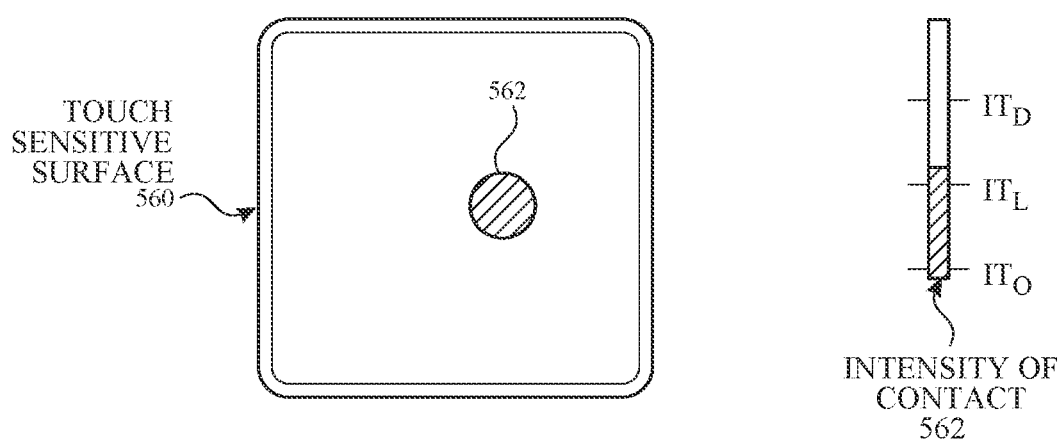
*FIG. 5F*

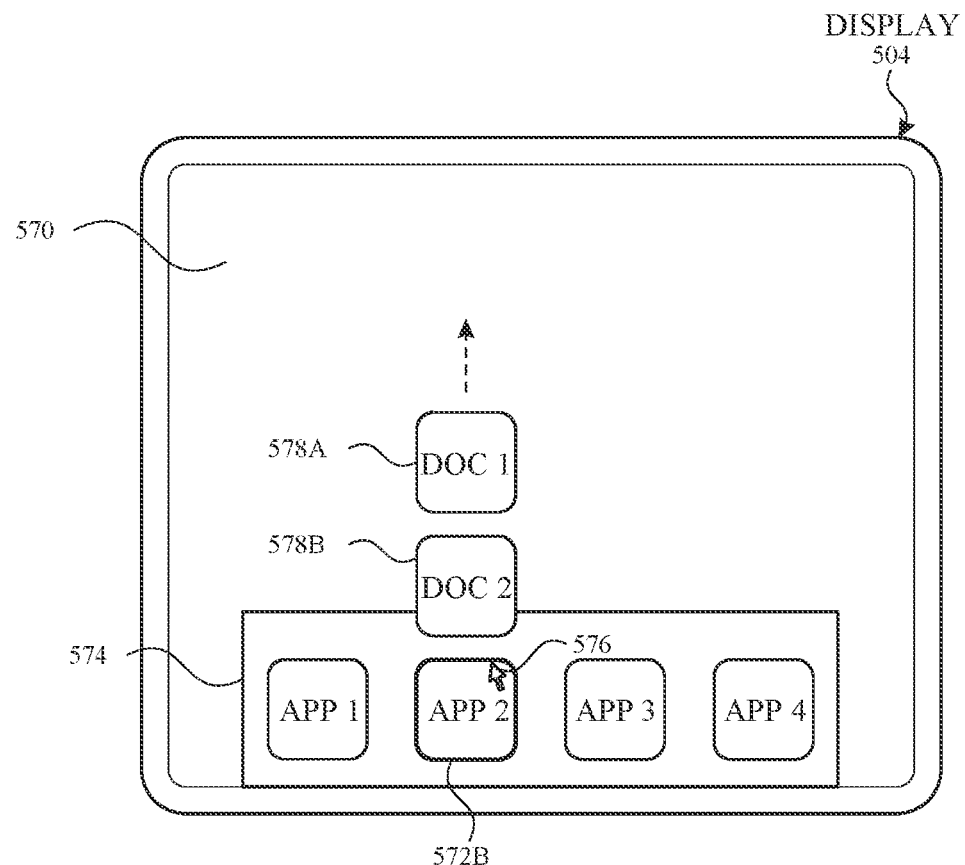
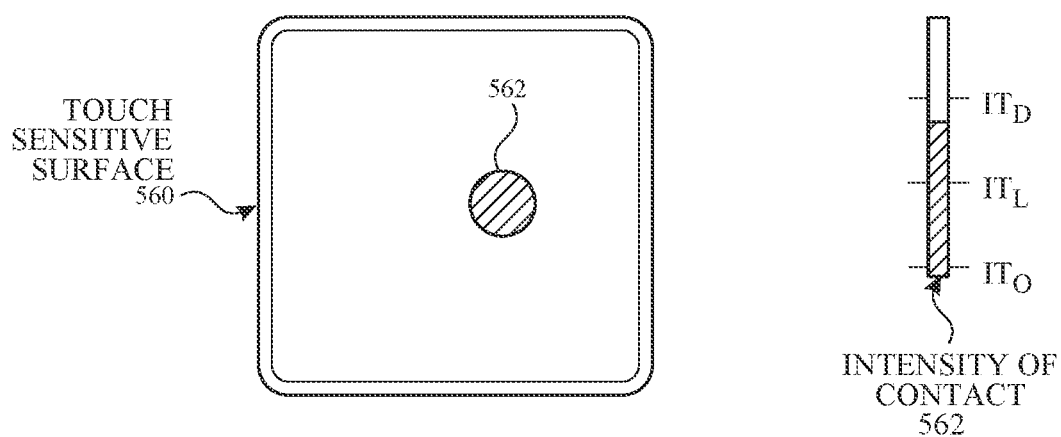
*FIG. 5G*

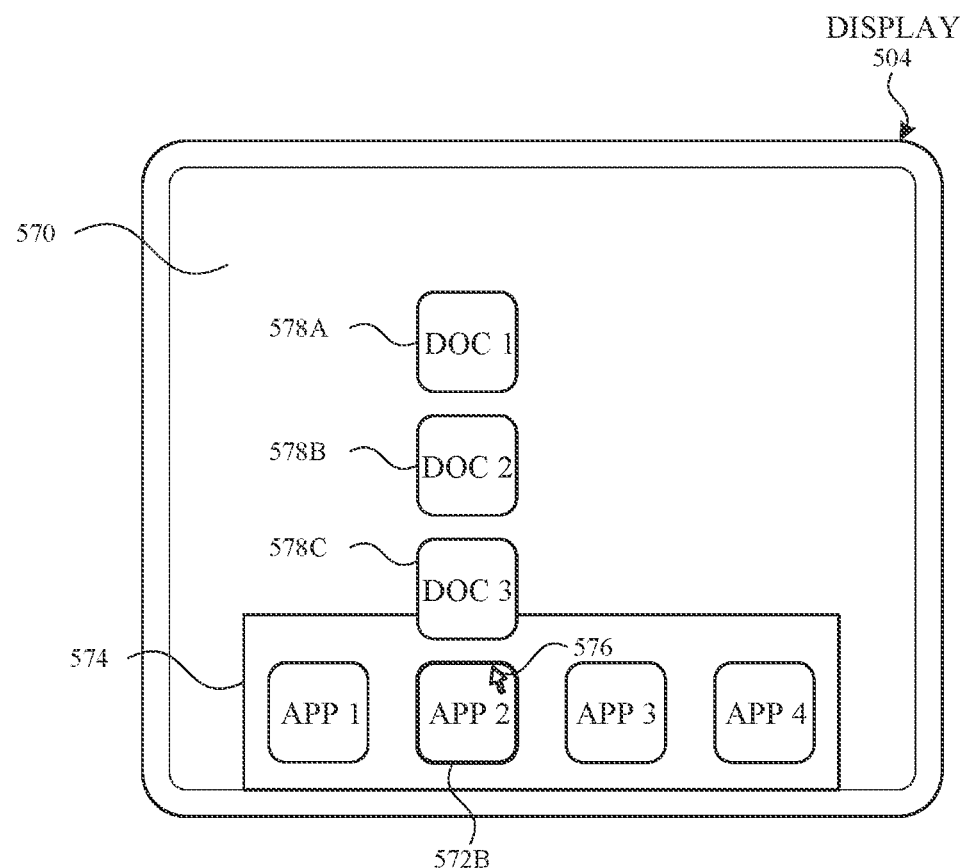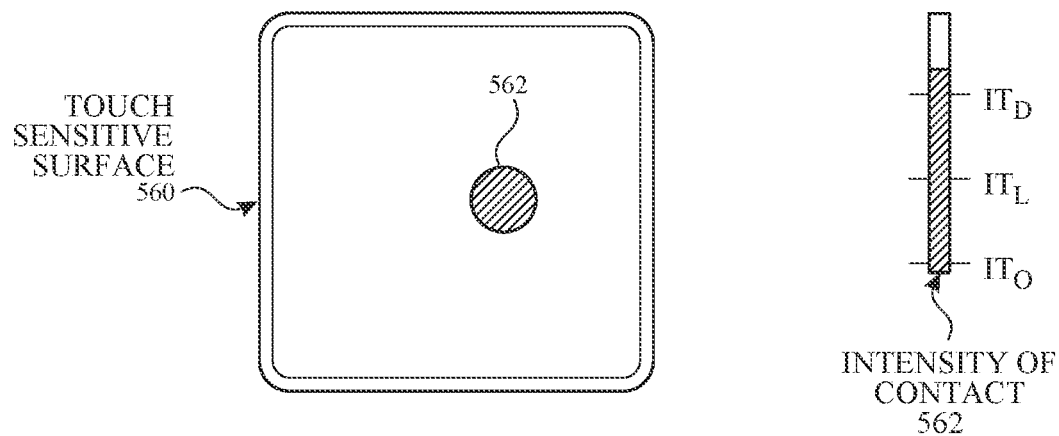
FIG. 5H

700 

702
Receive, via one or more input devices, a first input.

704
In response to receiving the first input, display, via a display device, a first view of a collection of media items that includes multiple different media items that are associated with corresponding dates and times, including concurrently displaying a representation of a first time period and a representation of a second time period that is different from the first time period, including:

706
In accordance with a determination that a current time is associated with a first recurring temporal event: the representation of the first time period includes a first region that is occupied by a first representative media item from the first time period that is selected based on the first recurring temporal event; and the representation of the second time period includes a second region that is occupied by a second representative media item from the second time period that is selected based on the first recurring temporal event.

708
In accordance with a determination that the current time is associated with a second recurring temporal event, wherein the second recurring temporal event is different from the first recurring temporal event: the first region of the representation of the first time period is occupied by a third representative media item from the first time period that is selected based on the second recurring temporal event and is different from the first representative media item from the first time period; and the second region of the representation of the second time period is occupied by a fourth representative media item from the second time period that is selected based on the second recurring temporal event and is different from the second representative media item from the second time period.

*FIG. 7*

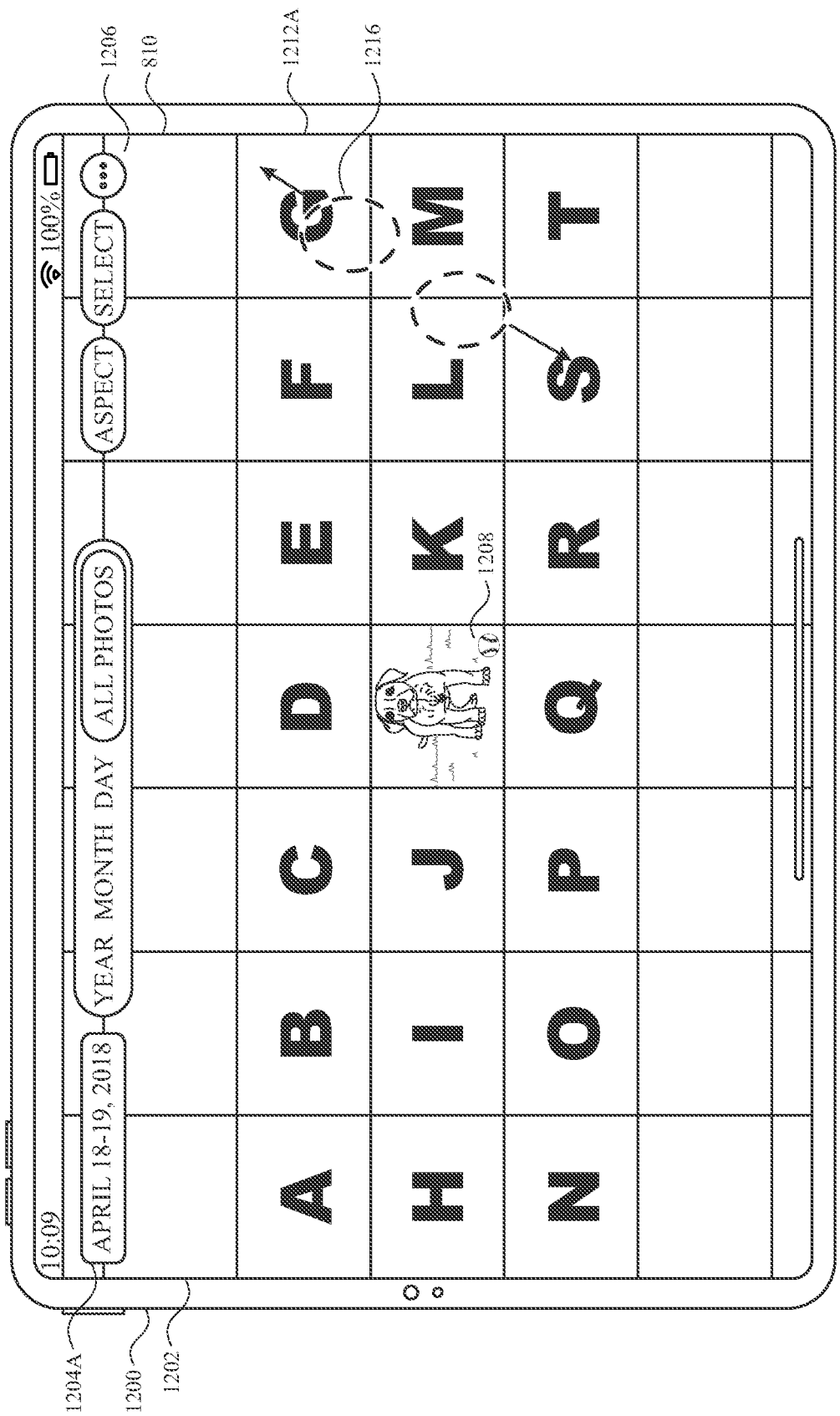

MEDIA BROWSING USER INTERFACE WITH INTELLIGENTLY SELECTED REPRESENTATIVE MEDIA ITEMS

CROSS-REFERENCE TO RELATED APPLICATIONS

This application is a continuation of U.S. patent application Ser. No. 16/584,783, entitled "Media Browsing User Interface with Intelligently Selected Representative Media Items" filed on Sep. 26, 2019 which claims priority to U.S. Patent Application No. 62/856,052, entitled "Media Browsing User Interface with Intelligently Selected Representative Media Items" and filed on Jun. 1, 2019 and U.S. Patent Application No. 62/843,930, entitled "Media Browsing User Interface with Intelligently Selected Representative Media Items" and filed on May 6, 2019, the contents of all of which are hereby incorporated by reference in their entirety.

FIELD

The present disclosure relates generally to computer user interfaces, and more specifically to techniques for navigating a collection of media items.

BACKGROUND

As the storage capacity and processing power of devices continues to increase, coupled with the rise of effortless media sharing between interconnected devices, the size of users' libraries of media items (e.g., photos and videos) continues to increase.

BRIEF SUMMARY

However, as libraries of media items continue to grow, creating an archive of the user's life and experiences, the libraries can become cumbersome to navigate. For example, many libraries arrange media items by default in a substantially inflexible manner. A user browsing for media can desire to see media that is related to a current context across different time periods. However, some interfaces require the user to navigate to an excessive number of different media directories or interfaces to locate the content that they seek. This is inefficient and a waste of the user's time and device resources. Accordingly, it is therefore desirable to facilitate presentation of media items in a contextually-relevant way and thereby provide an improved interface for engaging with media content.

Further, some techniques for navigating a collection of media items using electronic devices cumbersome and inefficient. For example, some existing techniques use a complex and time-consuming user interface, which may include multiple key presses or keystrokes. Existing techniques require more time and user inputs than necessary, thereby wasting user time and device energy. This latter consideration is particularly important in battery-operated devices.

Accordingly, the present technique provides electronic devices with faster, more efficient methods and interfaces for navigating a collection of media items. Such methods and interfaces optionally complement or replace other methods for navigating a collection of media items. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at an electronic device with a display device and one or more input devices: receiving, via the one or more input devices, a first input; in response to receiving the first input, displaying, via the display device, a first view of a collection of media items that includes multiple different media items that are associated with corresponding dates and times, including concurrently displaying a representation of a first time period and a representation of a second time period that is different from the first time period, including: in accordance with a determination that a current time is associated with a first recurring temporal event: the representation of the first time period includes a first region that is occupied by a first representative media item from the first time period that is selected based on the first recurring temporal event; and the representation of the second time period includes a second region that is occupied by a second representative media item from the second time period that is selected based on the first recurring temporal event; and in accordance with a determination that the current time is associated with a second recurring temporal event, wherein the second recurring temporal event is different from the first recurring temporal event: the first region of the representation of the first time period is occupied by a third representative media item from the first time period that is selected based on the second recurring temporal event and is different from the first representative media item from the first time period; and the second region of the representation of the second time period is occupied by a fourth representative media item from the second time period that is selected based on the second recurring temporal event and is different from the second representative media item from the second time period.

In accordance with some embodiments, a non-transitory computer-readable storage medium is described. The non-transitory computer-readable storage medium stores one or more programs configured to be executed by one or more processors of an electronic device with a display device and one or more input devices, the one or more programs including instructions for: receiving, via the one or more input devices, a first input; in response to receiving the first input, displaying, via the display device, a first view of a collection of media items that includes multiple different media items that are associated with corresponding dates and times, including concurrently displaying a representation of a first time period and a representation of a second time period that is different from the first time period, including: in accordance with a determination that a current time is associated with a first recurring temporal event: the representation of the first time period includes a first region that is occupied by a first representative media item from the first time period that is selected based on the first recurring temporal event; and the representation of the second time period includes a second region that is occupied by a second representative media item from the second time period that is selected based on the first recurring temporal event; and in accordance with a determination that the current time is associated with a second recurring temporal event, wherein the second recurring temporal event is different from the first recurring temporal event: the first region of the representation of the first time period is occupied by a third representative media item from the first time period that is selected based on the second recurring temporal event and is different from the first representative media item from the first time period; and the second region of the representation of the second time period is occupied by a fourth representative media item from the second time period that is selected based on the second recurring temporal event and is different from the second representative media item from the second time period.

In accordance with some embodiments, a transitory computer-readable storage medium is described. The transitory computer-readable storage medium stores one or more programs configured to be executed by one or more processors of an electronic device with a display device and one or more input devices, the one or more programs including instructions for: receiving, via the one or more input devices, a first input; in response to receiving the first input, displaying, via the display device, a first view of a collection of media items that includes multiple different media items that are associated with corresponding dates and times, including concurrently displaying a representation of a first time period and a representation of a second time period that is different from the first time period, including: in accordance with a determination that a current time is associated with a first recurring temporal event: the representation of the first time period includes a first region that is occupied by a first representative media item from the first time period that is selected based on the first recurring temporal event; and the representation of the second time period includes a second region that is occupied by a second representative media item from the second time period that is selected based on the first recurring temporal event; and in accordance with a determination that the current time is associated with a second recurring temporal event, wherein the second recurring temporal event is different from the first recurring temporal event: the first region of the representation of the first time period is occupied by a third representative media item from the first time period that is selected based on the second recurring temporal event and is different from the first representative media item from the first time period; and the second region of the representation of the second time period is occupied by a fourth representative media item from the second time period that is selected based on the second recurring temporal event and is different from the second representative media item from the second time period.

In accordance with some embodiments, an electronic device is described. The electronic device comprises: a display device; one or more input devices; one or more processors; and memory storing one or more programs configured to be executed by the one or more processors, the one or more programs including instructions for: receiving, via the one or more input devices, a first input; in response to receiving the first input, displaying, via the display device, a first view of a collection of media items that includes multiple different media items that are associated with corresponding dates and times, including concurrently displaying a representation of a first time period and a representation of a second time period that is different from the first time period, including: in accordance with a determination that a current time is associated with a first recurring temporal event: the representation of the first time period includes a first region that is occupied by a first representative media item from the first time period that is selected based on the first recurring temporal event; and the representation of the second time period includes a second region that is occupied by a second representative media item from the second time period that is selected based on the first recurring temporal event; and in accordance with a determination that the current time is associated with a second recurring temporal event, wherein the second recurring temporal event is different from the first recurring temporal event: the first region of the representation of the first time period is occupied by a third representative media item from the first time period that is selected based on the second recurring temporal event and is different from the first representative media item from the first time period; and the second region of the representation of the second time period is occupied by a fourth representative media item from the second time period that is selected based on the second recurring temporal event and is different from the second representative media item from the second time period.

In accordance with some embodiments, an electronic device is described. The electronic device comprises: a display device; one or more input devices; means for receiving, via the one or more input devices, a first input; means for, responsive to receiving the first input, displaying, via the display device, a first view of a collection of media items that includes multiple different media items that are associated with corresponding dates and times, including concurrently displaying a representation of a first time period and a representation of a second time period that is different from the first time period, including: in accordance with a determination that a current time is associated with a first recurring temporal event: the representation of the first time period includes a first region that is occupied by a first representative media item from the first time period that is selected based on the first recurring temporal event; and the representation of the second time period includes a second region that is occupied by a second representative media item from the second time period that is selected based on the first recurring temporal event; and in accordance with a determination that the current time is associated with a second recurring temporal event, wherein the second recurring temporal event is different from the first recurring temporal event: the first region of the representation of the first time period is occupied by a third representative media item from the first time period that is selected based on the second recurring temporal event and is different from the first representative media item from the first time period; and the second region of the representation of the second time period is occupied by a fourth representative media item from the second time period that is selected based on the second recurring temporal event and is different from the second representative media item from the second time period.

In accordance with some embodiments, a method is described. The method comprises: at an electronic device with a display device and one or more input devices: displaying, via the display device, a first plurality of representations of media items in a first view of a collection of media items, wherein a plurality of media items in the collection of media items include content that can be played back over time; while displaying the first plurality of representations of media items in the first view, receiving, via the one or more input devices, a first input that corresponds to a request to navigate through a portion of the first view of the collection of media items that includes representations of two or more media items that include content that can be played back over time; in response to receiving the first input, navigating through the first view of the collection of media items and while navigating through the first view of the collection of media items automatically playing content from two or more of the media items in the plurality of media items; after navigating through the first view of the collection of media items, receiving, via the one or more input devices, a second input that corresponds to a request to switch to a second view of the collection of media items;

in response to receiving the second input, displaying a second plurality of representations of media items in the second view of the collection of media items; while displaying the second plurality of representations of media items in the second view of the collection of media items, receiving, via the one or more input devices, a third input that that corresponds to a request to navigate through a portion of the second view of the collection of media items that includes representations of two or more media items that include content that can be played back over time; and in response to receiving the third input, navigating through the second view of the collection of media items without automatically playing content from media items in the plurality of media items.

In accordance with some embodiments, a non-transitory computer-readable storage medium is described. The non-transitory computer-readable storage medium stores one or more programs configured to be executed by one or more processors of an electronic device with a display device and one or more input devices, the one or more programs including instructions for: displaying, via the display device, a first plurality of representations of media items in a first view of a collection of media items, wherein a plurality of media items in the collection of media items include content that can be played back over time; while displaying the first plurality of representations of media items in the first view, receiving, via the one or more input devices, a first input that corresponds to a request to navigate through a portion of the first view of the collection of media items that includes representations of two or more media items that include content that can be played back over time; in response to receiving the first input, navigating through the first view of the collection of media items and while navigating through the first view of the collection of media items automatically playing content from two or more of the media items in the plurality of media items; after navigating through the first view of the collection of media items, receiving, via the one or more input devices, a second input that corresponds to a request to switch to a second view of the collection of media items; in response to receiving the second input, displaying a second plurality of representations of media items in the second view of the collection of media items; while displaying the second plurality of representations of media items in the second view of the collection of media items, receiving, via the one or more input devices, a third input that that corresponds to a request to navigate through a portion of the second view of the collection of media items that includes representations of two or more media items that include content that can be played back over time; and in response to receiving the third input, navigating through the second view of the collection of media items without automatically playing content from media items in the plurality of media items.

In accordance with some embodiments, a transitory computer-readable storage medium is described. The transitory computer-readable storage medium stores one or more programs configured to be executed by one or more processors of an electronic device with a display device and one or more input devices, the one or more programs including instructions for: displaying, via the display device, a first plurality of representations of media items in a first view of a collection of media items, wherein a plurality of media items in the collection of media items include content that can be played back over time; while displaying the first plurality of representations of media items in the first view, receiving, via the one or more input devices, a first input that corresponds to a request to navigate through a portion of the first view of the collection of media items that includes representations of two or more media items that include content that can be played back over time; in response to receiving the first input, navigating through the first view of the collection of media items and while navigating through the first view of the collection of media items automatically playing content from two or more of the media items in the plurality of media items; after navigating through the first view of the collection of media items, receiving, via the one or more input devices, a second input that corresponds to a request to switch to a second view of the collection of media items; in response to receiving the second input, displaying a second plurality of representations of media items in the second view of the collection of media items; while displaying the second plurality of representations of media items in the second view of the collection of media items, receiving, via the one or more input devices, a third input that that corresponds to a request to navigate through a portion of the second view of the collection of media items that includes representations of two or more media items that include content that can be played back over time; and in response to receiving the third input, navigating through the second view of the collection of media items without automatically playing content from media items in the plurality of media items.

In accordance with some embodiments, an electronic device is described. The electronic device comprises: a display device; one or more input devices; one or more processors; and memory storing one or more programs configured to be executed by the one or more processors, the one or more programs including instructions for: displaying, via the display device, a first plurality of representations of media items in a first view of a collection of media items, wherein a plurality of media items in the collection of media items include content that can be played back over time; while displaying the first plurality of representations of media items in the first view, receiving, via the one or more input devices, a first input that corresponds to a request to navigate through a portion of the first view of the collection of media items that includes representations of two or more media items that include content that can be played back over time; in response to receiving the first input, navigating through the first view of the collection of media items and while navigating through the first view of the collection of media items automatically playing content from two or more of the media items in the plurality of media items; after navigating through the first view of the collection of media items, receiving, via the one or more input devices, a second input that corresponds to a request to switch to a second view of the collection of media items; in response to receiving the second input, displaying a second plurality of representations of media items in the second view of the collection of media items; while displaying the second plurality of representations of media items in the second view of the collection of media items, receiving, via the one or more input devices, a third input that that corresponds to a request to navigate through a portion of the second view of the collection of media items that includes representations of two or more media items that include content that can be played back over time; and in response to receiving the third input, navigating through the second view of the collection of media items without automatically playing content from media items in the plurality of media items.

In accordance with some embodiments, an electronic device is described. The electronic device comprises: a display device; one or more input devices; means for displaying, via the display device, a first plurality of representations of media items in a first view of a collection of media items, wherein a plurality of media items in the collection of media items include content that can be played back over time; means for, while displaying the first plurality of representations of media items in the first view, receiving, via the one or more input devices, a first input that corresponds to a request to navigate through a portion of the first view of the collection of media items that includes representations of two or more media items that include content that can be played back over time; means for, responsive to receiving the first input, navigating through the first view of the collection of media items and while navigating through the first view of the collection of media items automatically playing content from two or more of the media items in the plurality of media items; means for, after navigating through the first view of the collection of media items, receiving, via the one or more input devices, a second input that corresponds to a request to switch to a second view of the collection of media items; means for, responsive to receiving the second input, displaying a second plurality of representations of media items in the second view of the collection of media items; means for, while displaying the second plurality of representations of media items in the second view of the collection of media items, receiving, via the one or more input devices, a third input that that corresponds to a request to navigate through a portion of the second view of the collection of media items that includes representations of two or more media items that include content that can be played back over time; and means for, responsive to receiving the third input, navigating through the second view of the collection of media items without automatically playing content from media items in the plurality of media items.

Exemplary methods are disclosed herein. An example method includes, at an electronic device with a display device: displaying, via the display device, a plurality of content items in a first layout that includes a plurality of rows and a plurality of columns, including displaying: a first content item of the plurality of content items at a first aspect ratio and a first size, a second content item of the plurality of content items, and a third content item of the plurality of content items; while displaying, via the display device, the plurality of content items in the first layout that includes the plurality of rows and the plurality of columns, detecting a user input that includes a gesture, wherein the user input corresponds to a request to change a size of the first content item; and in response to detecting the user input, gradually changing, as the gesture progresses, the size of the first content item from the first size to a second size that is different from the first size while concurrently gradually changing, as the gesture progresses, an aspect ratio of the first content item from the first aspect ratio to a second aspect ratio that is different from the first aspect ratio.

Exemplary non-transitory computer-readable storage media are described herein. An example non-transitory computer-readable storage medium stores one or more programs configured to be executed by one or more processors of an electronic device with a display device, the one or more programs including instructions for: displaying, via the display device, a plurality of content items in a first layout that includes a plurality of rows and a plurality of columns, including displaying: a first content item of the plurality of content items at a first aspect ratio and a first size, a second content item of the plurality of content items, and a third content item of the plurality of content items; while displaying, via the display device, the plurality of content items in the first layout that includes the plurality of rows and the plurality of columns, detecting a user input that includes a gesture, wherein the user input corresponds to a request to change a size of the first content item; and in response to detecting the user input, gradually changing, as the gesture progresses, the size of the first content item from the first size to a second size that is different from the first size while concurrently gradually changing, as the gesture progresses, an aspect ratio of the first content item from the first aspect ratio to a second aspect ratio that is different from the first aspect ratio.

Exemplary transitory computer-readable storage media are described herein. An example transitory computer-readable storage medium stores one or more programs configured to be executed by one or more processors of an electronic device with a display device, the one or more programs including instructions for: displaying, via the display device, a plurality of content items in a first layout that includes a plurality of rows and a plurality of columns, including displaying: a first content item of the plurality of content items at a first aspect ratio and a first size, a second content item of the plurality of content items, and a third content item of the plurality of content items; while displaying, via the display device, the plurality of content items in the first layout that includes the plurality of rows and the plurality of columns, detecting a user input that includes a gesture, wherein the user input corresponds to a request to change a size of the first content item; and in response to detecting the user input, gradually changing, as the gesture progresses, the size of the first content item from the first size to a second size that is different from the first size while concurrently gradually changing, as the gesture progresses, an aspect ratio of the first content item from the first aspect ratio to a second aspect ratio that is different from the first aspect ratio.

Exemplary electronic devices are described herein. An example electronic device includes a display device; one or more processors; and memory storing one or more programs configured to be executed by the one or more processors, the one or more programs including instructions for: displaying, via the display device, a plurality of content items in a first layout that includes a plurality of rows and a plurality of columns, including displaying: a first content item of the plurality of content items at a first aspect ratio and a first size, a second content item of the plurality of content items, and a third content item of the plurality of content items; while displaying, via the display device, the plurality of content items in the first layout that includes the plurality of rows and the plurality of columns, detecting a user input that includes a gesture, wherein the user input corresponds to a request to change a size of the first content item; and in response to detecting the user input, gradually changing, as the gesture progresses, the size of the first content item from the first size to a second size that is different from the first size while concurrently gradually changing, as the gesture progresses, an aspect ratio of the first content item from the first aspect ratio to a second aspect ratio that is different from the first aspect ratio.

Exemplary electronic devices are described herein. An example electronic device includes a display device; means for displaying, via the display device, a plurality of content items in a first layout that includes a plurality of rows and a plurality of columns, including displaying: a first content item of the plurality of content items at a first aspect ratio and a first size, a second content item of the plurality of content items, and a third content item of the plurality of content items; means for while displaying, via the display device, the plurality of content items in the first layout that includes the plurality of rows and the plurality of columns, detecting a user input that includes a gesture, wherein the user input corresponds to a request to change a size of the first content item; and means for in response to detecting the user input, gradually changing, as the gesture progresses, the size of the first content item from the first size to a second size that is different from the first size while concurrently gradually changing, as the gesture progresses, an aspect ratio of the first content item from the first aspect ratio to a second aspect ratio that is different from the first aspect ratio.

Exemplary methods are disclosed herein. An example method includes, at an electronic device with a display device: displaying, via the display device, a plurality of content items in a first layout, including concurrently displaying: a first content item of the plurality of content items, and a second content item of the plurality of content items; while displaying, via the display device, the plurality of content items in the first layout, detecting a user input that corresponds to a request to change a size of the first content item; and in response to detecting the user input, starting to transition from displaying the first content item in the first layout to displaying the first content item in a second layout, wherein: the second layout is different from the first layout; in the first layout the second content item has a first location relative to the first content item; in the second layout a third content item, different from the first content item, has the first location relative to the first content item; and transitioning from displaying the first content item in the first layout to displaying the first content item in the second layout includes displaying a combination of the second content item and the third content item at the first location relative to the first content item during the transition from displaying the first content item in the first layout to displaying the first content item in the second layout.

Exemplary non-transitory computer-readable storage media are described herein. An example non-transitory computer-readable storage medium stores one or more programs configured to be executed by one or more processors of an electronic device with a display device, the one or more programs including instructions for: displaying, via the display device, a plurality of content items in a first layout, including concurrently displaying: a first content item of the plurality of content items, and a second content item of the plurality of content items; while displaying, via the display device, the plurality of content items in the first layout, detecting a user input that corresponds to a request to change a size of the first content item; and in response to detecting the user input, starting to transition from displaying the first content item in the first layout to displaying the first content item in a second layout, wherein: the second layout is different from the first layout; in the first layout the second content item has a first location relative to the first content item; in the second layout a third content item, different from the first content item, has the first location relative to the first content item; and transitioning from displaying the first content item in the first layout to displaying the first content item in the second layout includes displaying a combination of the second content item and the third content item at the first location relative to the first content item during the transition from displaying the first content item in the first layout to displaying the first content item in the second layout.

Exemplary transitory computer-readable storage media are described herein. An example transitory computer-readable storage medium stores one or more programs configured to be executed by one or more processors of an electronic device with a display device, the one or more programs including instructions for: displaying, via the display device, a plurality of content items in a first layout, including concurrently displaying: a first content item of the plurality of content items, and a second content item of the plurality of content items; while displaying, via the display device, the plurality of content items in the first layout, detecting a user input that corresponds to a request to change a size of the first content item; and in response to detecting the user input, starting to transition from displaying the first content item in the first layout to displaying the first content item in a second layout, wherein: the second layout is different from the first layout; in the first layout the second content item has a first location relative to the first content item; in the second layout a third content item, different from the first content item, has the first location relative to the first content item; and transitioning from displaying the first content item in the first layout to displaying the first content item in the second layout includes displaying a combination of the second content item and the third content item at the first location relative to the first content item during the transition from displaying the first content item in the first layout to displaying the first content item in the second layout.

Exemplary electronic devices are described herein. An example electronic device includes a display device; one or more processors; and memory storing one or more programs configured to be executed by the one or more processors, the one or more programs including instructions for: displaying, via the display device, a plurality of content items in a first layout, including concurrently displaying: a first content item of the plurality of content items, and a second content item of the plurality of content items; while displaying, via the display device, the plurality of content items in the first layout, detecting a user input that corresponds to a request to change a size of the first content item; and in response to detecting the user input, starting to transition from displaying the first content item in the first layout to displaying the first content item in a second layout, wherein: the second layout is different from the first layout; in the first layout the second content item has a first location relative to the first content item; in the second layout a third content item, different from the first content item, has the first location relative to the first content item; and transitioning from displaying the first content item in the first layout to displaying the first content item in the second layout includes displaying a combination of the second content item and the third content item at the first location relative to the first content item during the transition from displaying the first content item in the first layout to displaying the first content item in the second layout.

Exemplary electronic devices are described herein. An example electronic device includes a display device; means for displaying, via the display device, a plurality of content items in a first layout, including concurrently displaying: a first content item of the plurality of content items, and a second content item of the plurality of content items; means for while displaying, via the display device, the plurality of content items in the first layout, detecting a user input that corresponds to a request to change a size of the first content item; and means for in response to detecting the user input, starting to transition from displaying the first content item in the first layout to displaying the first content item in a second layout, wherein: the second layout is different from the first layout; in the first layout the second content item has a first location relative to the first content item; in the second layout a third content item, different from the first content item, has the first location relative to the first content item; and transitioning from displaying the first content item in the first layout to displaying the first content item in the second layout includes displaying a combination of the second content item and the third content item at the first location relative to the first content item during the transition from displaying the first content item in the first layout to displaying the first content item in the second layout.

Exemplary methods are disclosed herein. An example method includes, at an electronic device with a display device: displaying, via the display device, a plurality of content items in a first layout, including concurrently displaying: a first content item of the plurality of content items in a first location, and a second content item of the plurality of content items in a second location different from the first location; while displaying, via the display device, the plurality of content items in the first layout, detecting a request to display a second layout different from the first layout; and in response to detecting the request to display the second layout, starting to transition from the first layout to the second layout, wherein the second layout includes a plurality of rows and a plurality of columns, including: displaying, via the display device, a third content item that was not displayed in the first layout, displaying, via the display device, movement of the first content item from the first location to a third location in the second layout, wherein the third location is different from the first location and already contains a representation of the first content item, and displaying, via the display device, movement of the second content item from the second location to a fourth location in the second layout, wherein the fourth location is different from the second location and already contains a representation of the second content item.

Exemplary non-transitory computer-readable storage media are described herein. An example non-transitory computer-readable storage medium stores one or more programs configured to be executed by one or more processors of an electronic device with a display device, the one or more programs including instructions for: displaying, via the display device, a plurality of content items in a first layout, including concurrently displaying: a first content item of the plurality of content items in a first location, and a second content item of the plurality of content items in a second location different from the first location; while displaying, via the display device, the plurality of content items in the first layout, detecting a request to display a second layout different from the first layout; and in response to detecting the request to display the second layout, starting to transition from the first layout to the second layout, wherein the second layout includes a plurality of rows and a plurality of columns, including: displaying, via the display device, a third content item that was not displayed in the first layout, displaying, via the display device, movement of the first content item from the first location to a third location in the second layout, wherein the third location is different from the first location and already contains a representation of the first content item, and displaying, via the display device, movement of the second content item from the second location to a fourth location in the second layout, wherein the fourth location is different from the second location and already contains a representation of the second content item.

Exemplary transitory computer-readable storage media are described herein. An example transitory computer-readable storage medium stores one or more programs configured to be executed by one or more processors of an electronic device with a display device, the one or more programs including instructions for: displaying, via the display device, a plurality of content items in a first layout, including concurrently displaying: a first content item of the plurality of content items in a first location, and a second content item of the plurality of content items in a second location different from the first location; while displaying, via the display device, the plurality of content items in the first layout, detecting a request to display a second layout different from the first layout; and in response to detecting the request to display the second layout, starting to transition from the first layout to the second layout, wherein the second layout includes a plurality of rows and a plurality of columns, including: displaying, via the display device, a third content item that was not displayed in the first layout, displaying, via the display device, movement of the first content item from the first location to a third location in the second layout, wherein the third location is different from the first location and already contains a representation of the first content item, and displaying, via the display device, movement of the second content item from the second location to a fourth location in the second layout, wherein the fourth location is different from the second location and already contains a representation of the second content item.

Exemplary electronic devices are described herein. An example electronic device includes a display device; one or more processors; and memory storing one or more programs configured to be executed by the one or more processors, the one or more programs including instructions for: displaying, via the display device, a plurality of content items in a first layout, including concurrently displaying: a first content item of the plurality of content items in a first location, and a second content item of the plurality of content items in a second location different from the first location; while displaying, via the display device, the plurality of content items in the first layout, detecting a request to display a second layout different from the first layout; and in response to detecting the request to display the second layout, starting to transition from the first layout to the second layout, wherein the second layout includes a plurality of rows and a plurality of columns, including: displaying, via the display device, a third content item that was not displayed in the first layout, displaying, via the display device, movement of the first content item from the first location to a third location in the second layout, wherein the third location is different from the first location and already contains a representation of the first content item, and displaying, via the display device, movement of the second content item from the second location to a fourth location in the second layout, wherein the fourth location is different from the second location and already contains a representation of the second content item.

Exemplary electronic devices are described herein. An example electronic device includes a display device; means for displaying, via the display device, a plurality of content items in a first layout, including concurrently displaying: a first content item of the plurality of content items in a first location, and a second content item of the plurality of content items in a second location different from the first location; means for while displaying, via the display device, the plurality of content items in the first layout, detecting a request to display a second layout different from the first layout; and means for in response to detecting the request to display the second layout, starting to transition from the first layout to the second layout, wherein the second layout includes a plurality of rows and a plurality of columns, including: displaying, via the display device, a third content item that was not displayed in the first layout, displaying, via the display device, movement of the first content item from the first location to a third location in the second layout, wherein the third location is different from the first location and already contains a representation of the first content item, and displaying, via the display device, movement of the second content item from the second location to a fourth location in the second layout, wherein the fourth location is different from the second location and already contains a representation of the second content item.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for navigating a collection of media items, thereby increasing the effectiveness, efficiency, and user satisfaction with such devices. Such methods and interfaces may complement or replace other methods for navigating a collection of media items.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 7 is a flow diagram illustrating an exemplary process for navigating a collection of media items.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for navigating a collection of media items. For example, techniques that eliminate extensive manual effort by the user navigating interfaces in order to retrieve media content that is related a current context. Such techniques can reduce the cognitive burden on a user who accesses a collection of media items, thereby enhancing productivity. Further, such techniques can reduce processor and battery power otherwise wasted on redundant user inputs.

Figure 8A:
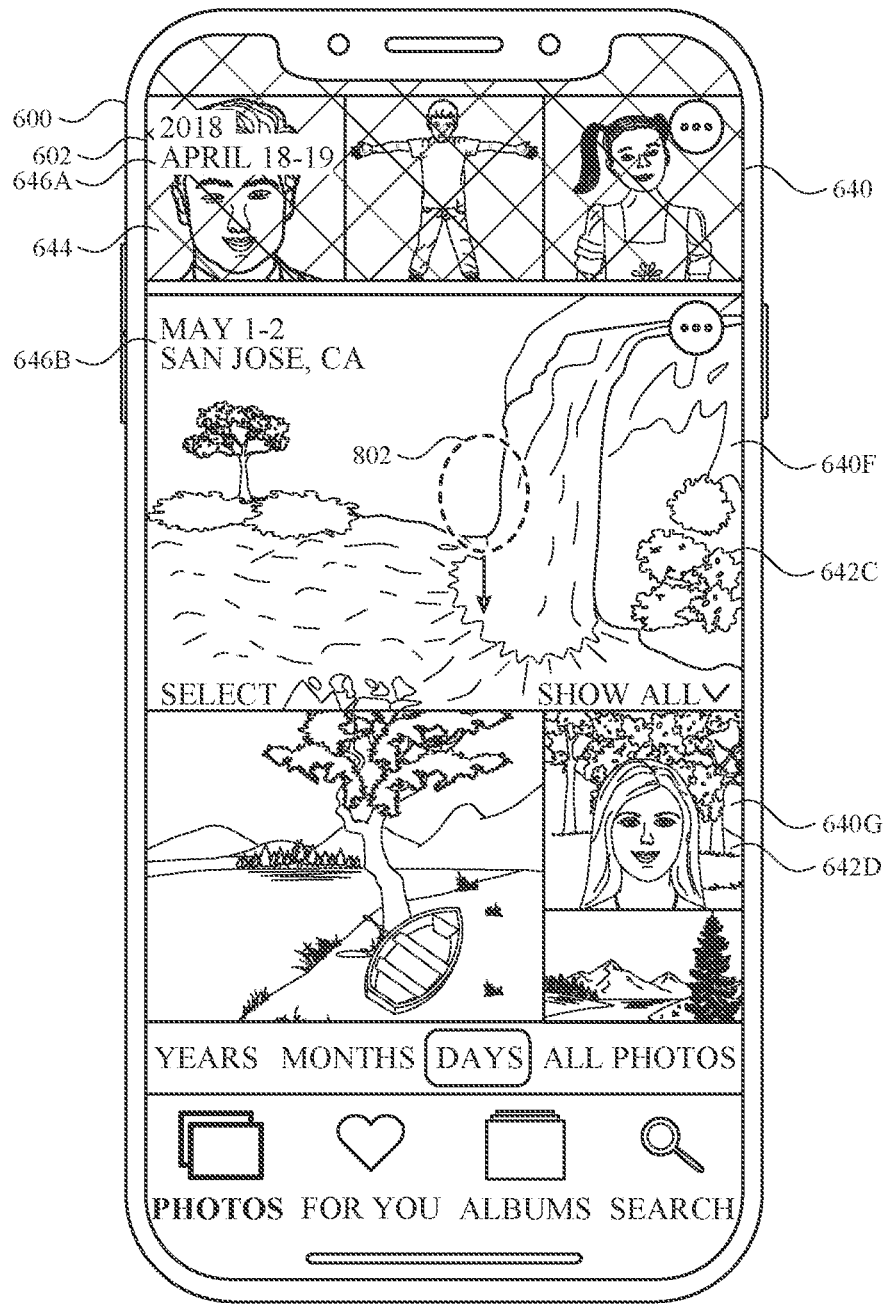
FIGS. 8A-8Q illustrate exemplary user interfaces for navigating a collection of media items.
Figure 9:
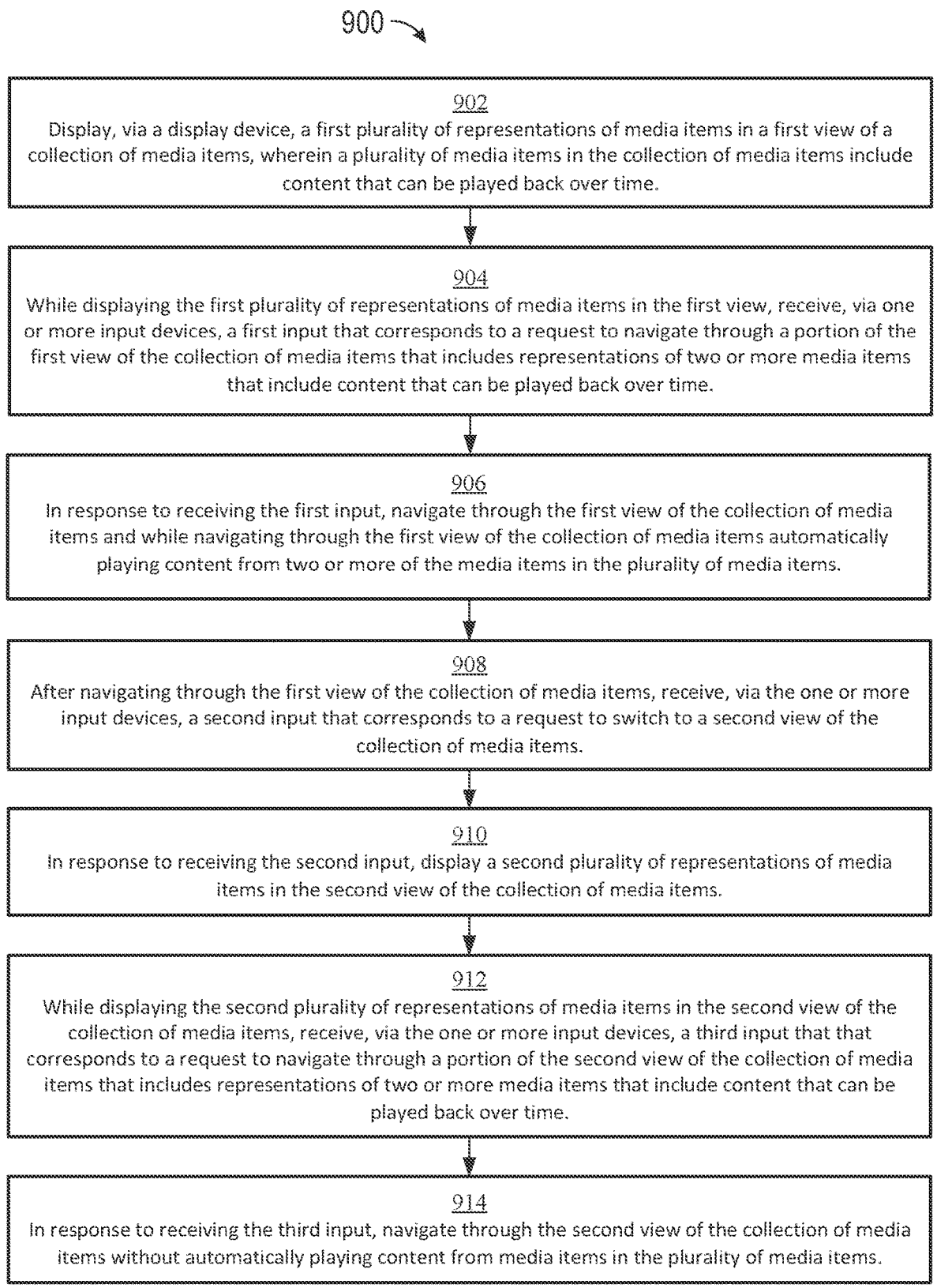
FIG. 9 is a flow diagram illustrating an exemplary process for navigating a collection of media items.
Figure 10A:
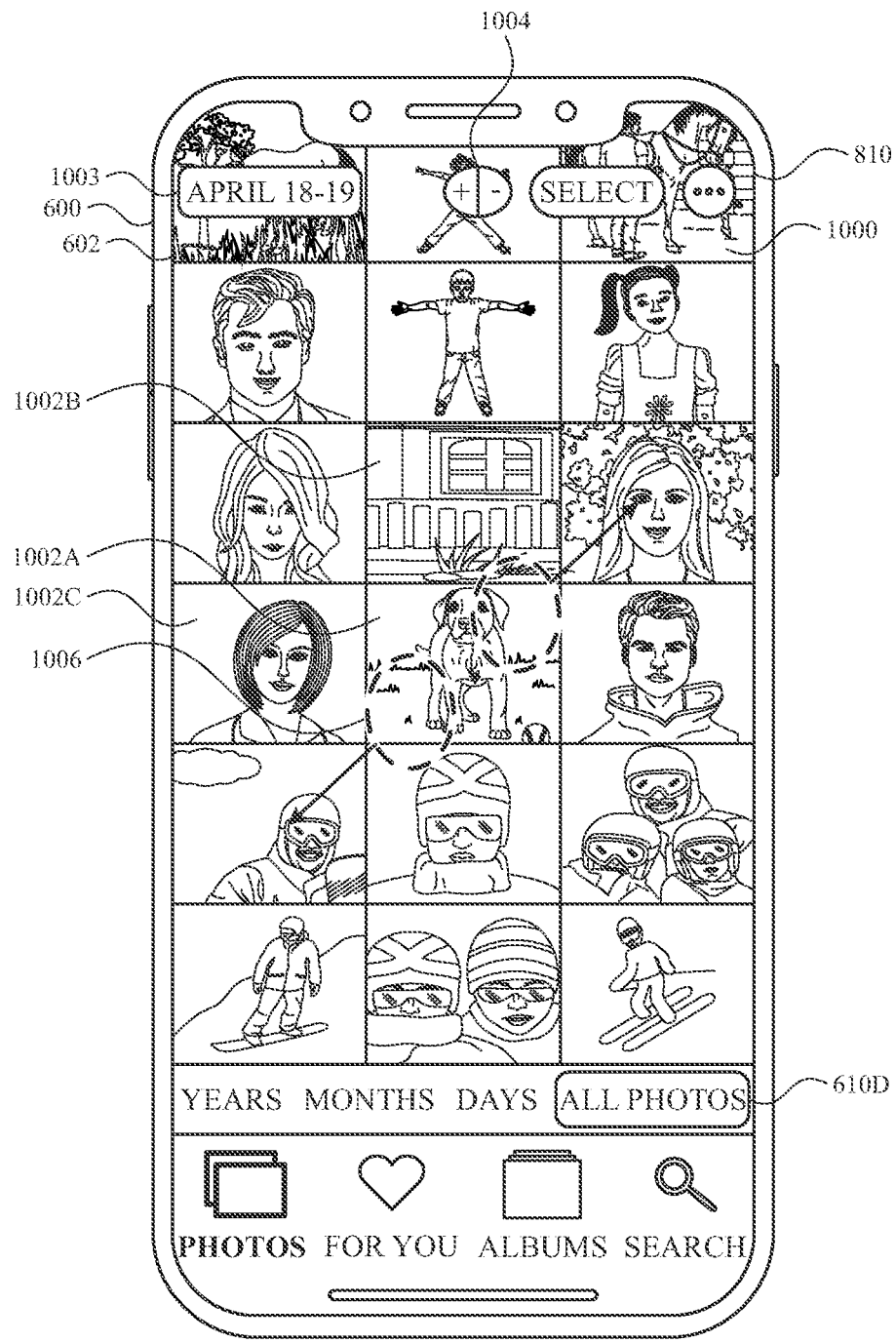
FIGS. 10A-10O illustrate exemplary user interfaces for navigating a collection of media items, in accordance with some embodiments.
Figure 10O:
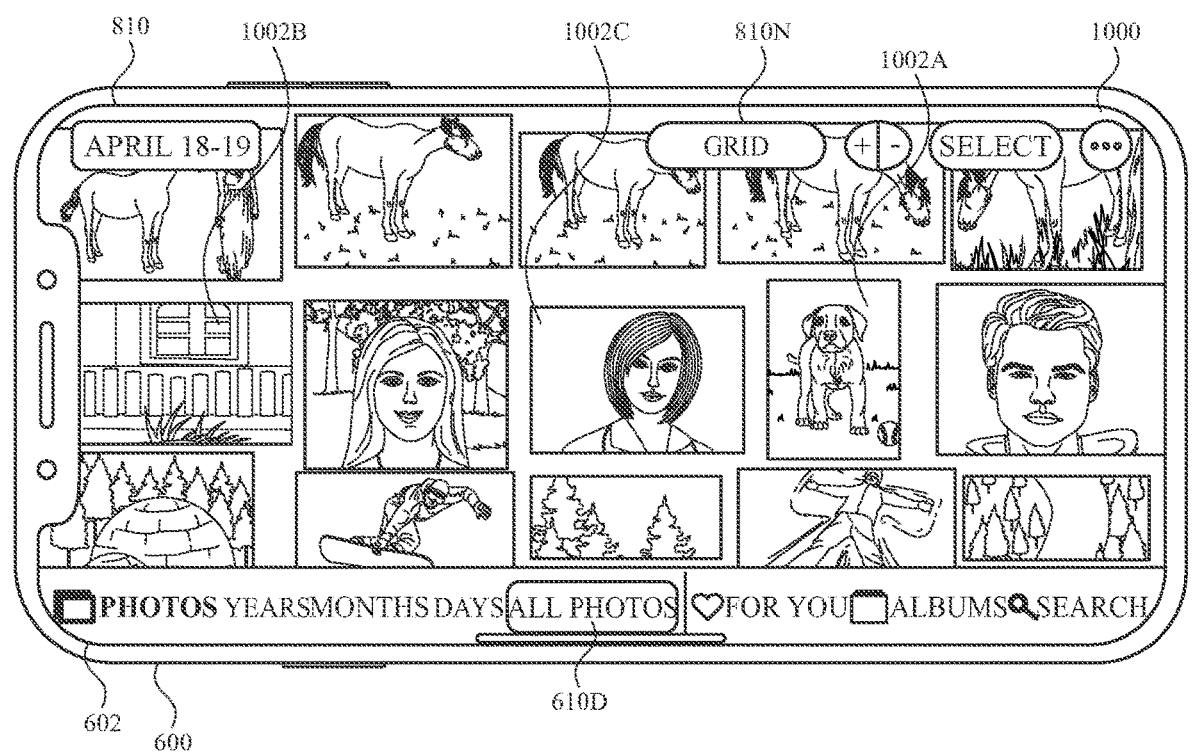
Figure 11:
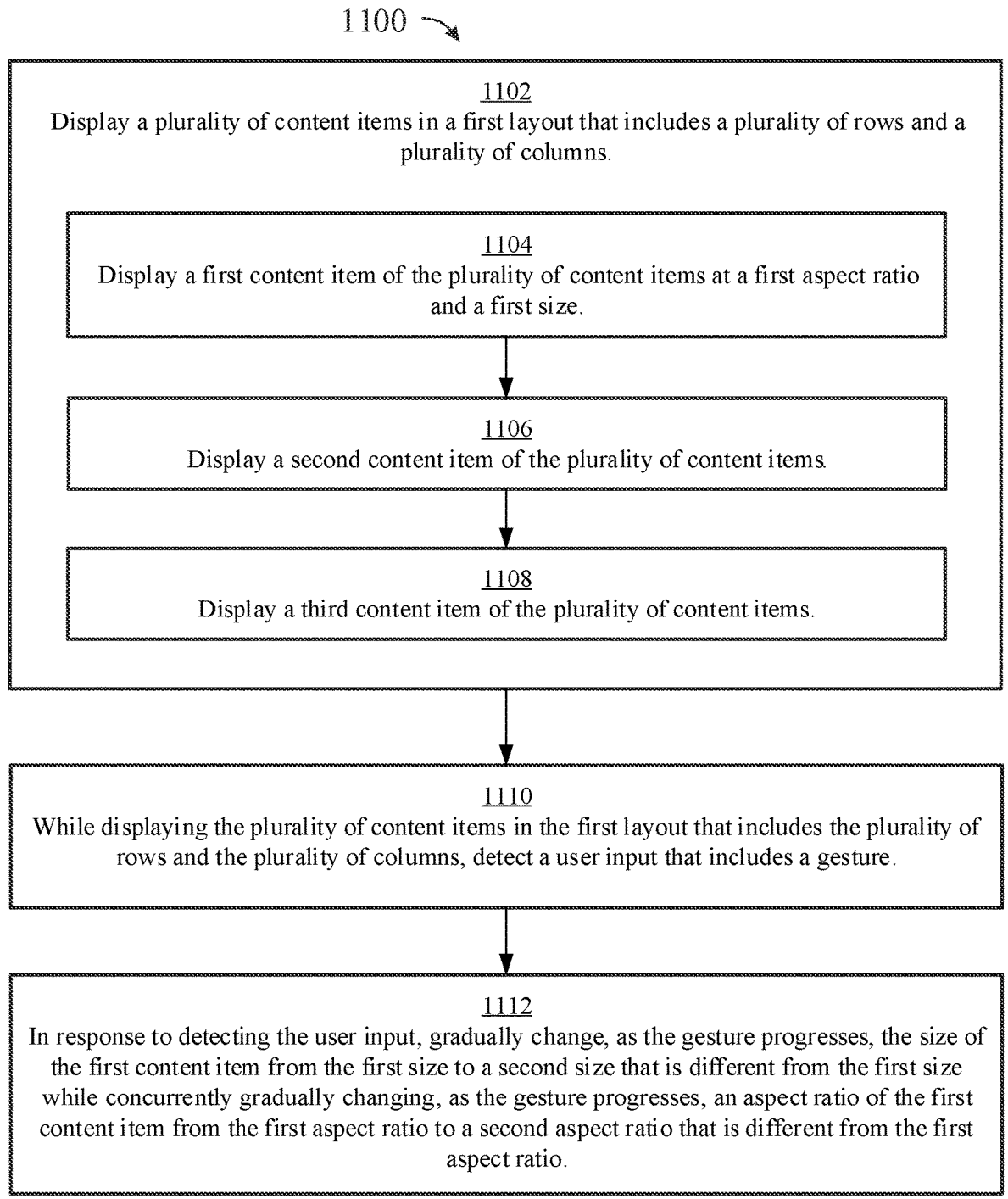
FIG. 11 is a flow diagram illustrating an exemplary process for navigating a collection of media items, in accordance with some embodiments.
Figure 12A:
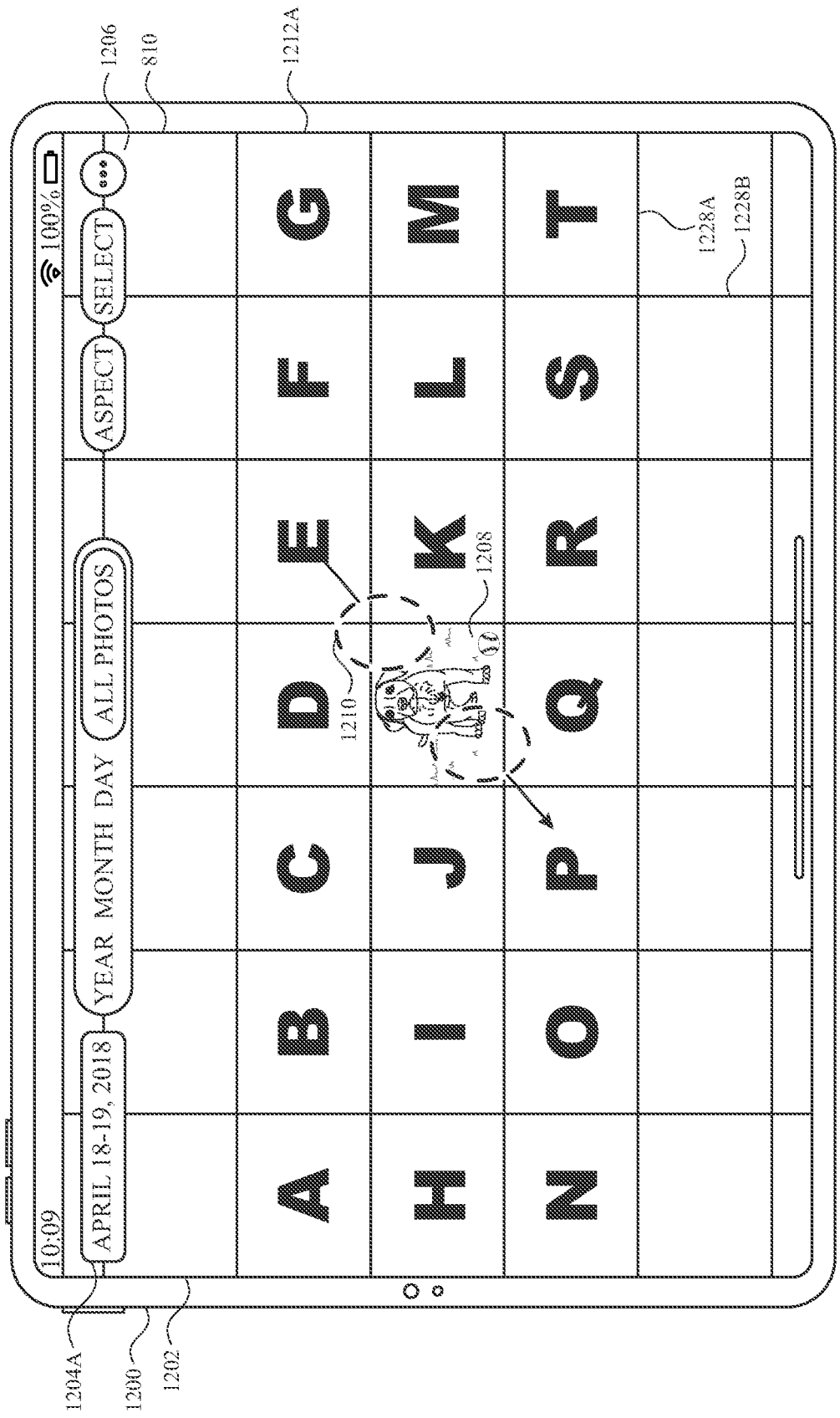
FIGS. 12A-12O illustrate exemplary user interfaces for navigating a collection of media items, in accordance with some embodiments.
Figure 13:
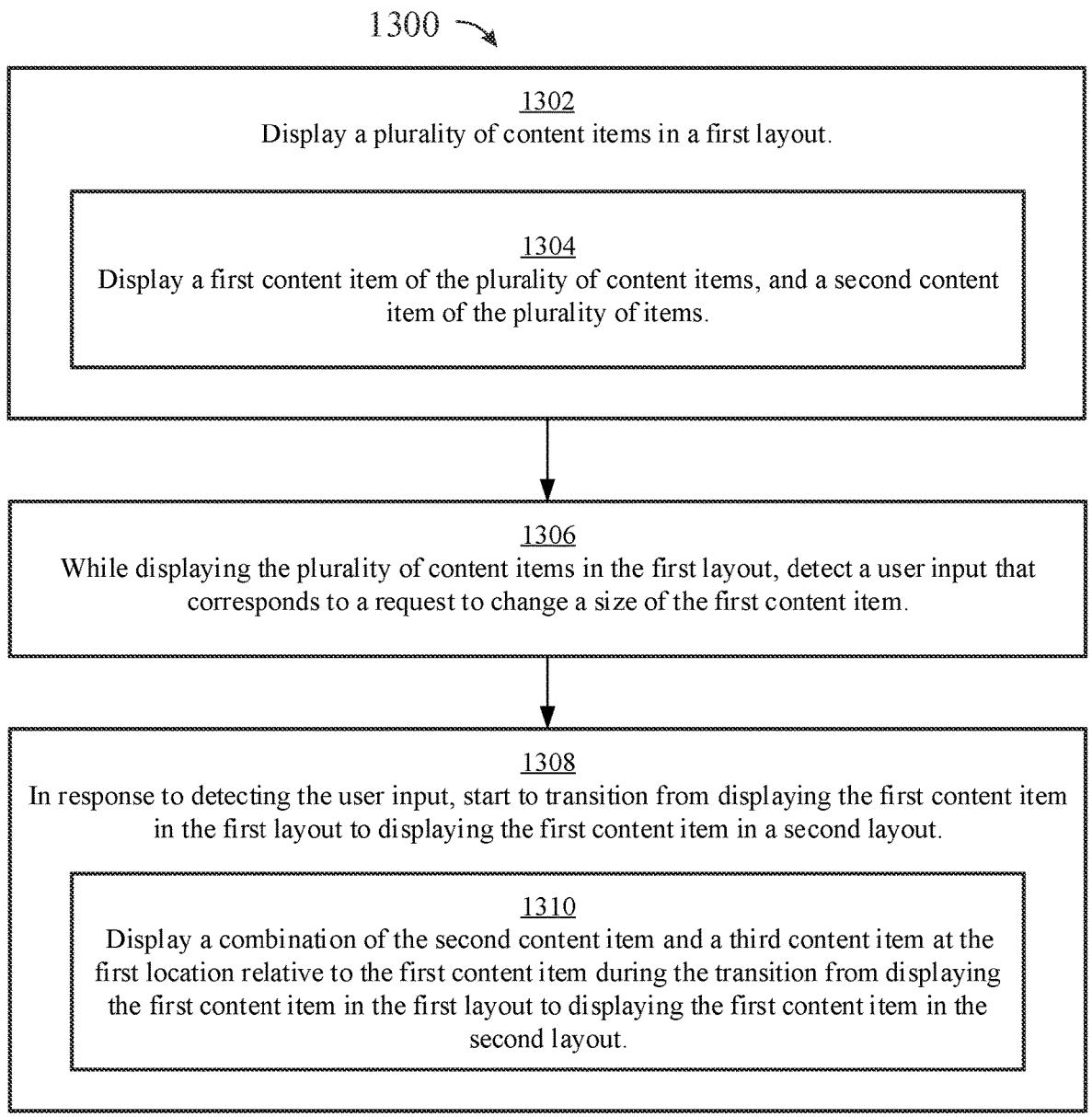
FIG. 13 is a flow diagram illustrating an exemplary process for navigating a collection of media items, in accordance with some embodiments.

Below, FIGS. 1A-1B, 2, 3, 4A-4B, and 5A-5H provide a description of exemplary devices for performing the techniques for navigating a collection of media items. FIGS. 6A-6N illustrate exemplary user interfaces for navigating a collection of media items. FIG. 7 is a flow diagram illustrating methods of navigating a collection of media items in accordance with some embodiments. The user interfaces in FIGS. 6A-6N are used to illustrate the processes described below, including the processes in FIG. 7. FIGS. 8A-8Q illustrate exemplary user interfaces for navigating a collection of media items. FIG. 9 is a flow diagram illustrating methods of navigating a collection of media items in accordance with some embodiments. The user interfaces in FIGS. 8A-8Q are used to illustrate the processes described below, including the processes in FIG. 9. FIGS. 10A-10O illustrate exemplary user interfaces for navigating a collection of media items. FIG. 11 is a flow diagram illustrating methods of navigating a collection of media items in accordance with some embodiments. The user interfaces in FIGS. 10A-10O are used to illustrate the processes described below, including the processes in FIG. 11. FIGS. 12A-12O illustrate exemplary user interfaces for navigating a collection of media items. FIG. 13 is a flow diagram illustrating methods of navigating a collection of media items in accordance with some embodiments. The user interfaces in FIGS. 12A-12O are used to illustrate the processes described below, including the processes in FIG. 13. FIGS. 14A-14F illustrate exemplary user interfaces for navigating a collection of media items. FIG. 15 is a flow diagram illustrating methods of navigating a collection of media items in accordance with some embodiments. The user interfaces in FIGS. 14A-14F are used to illustrate the processes described below, including the processes in FIG. 15.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
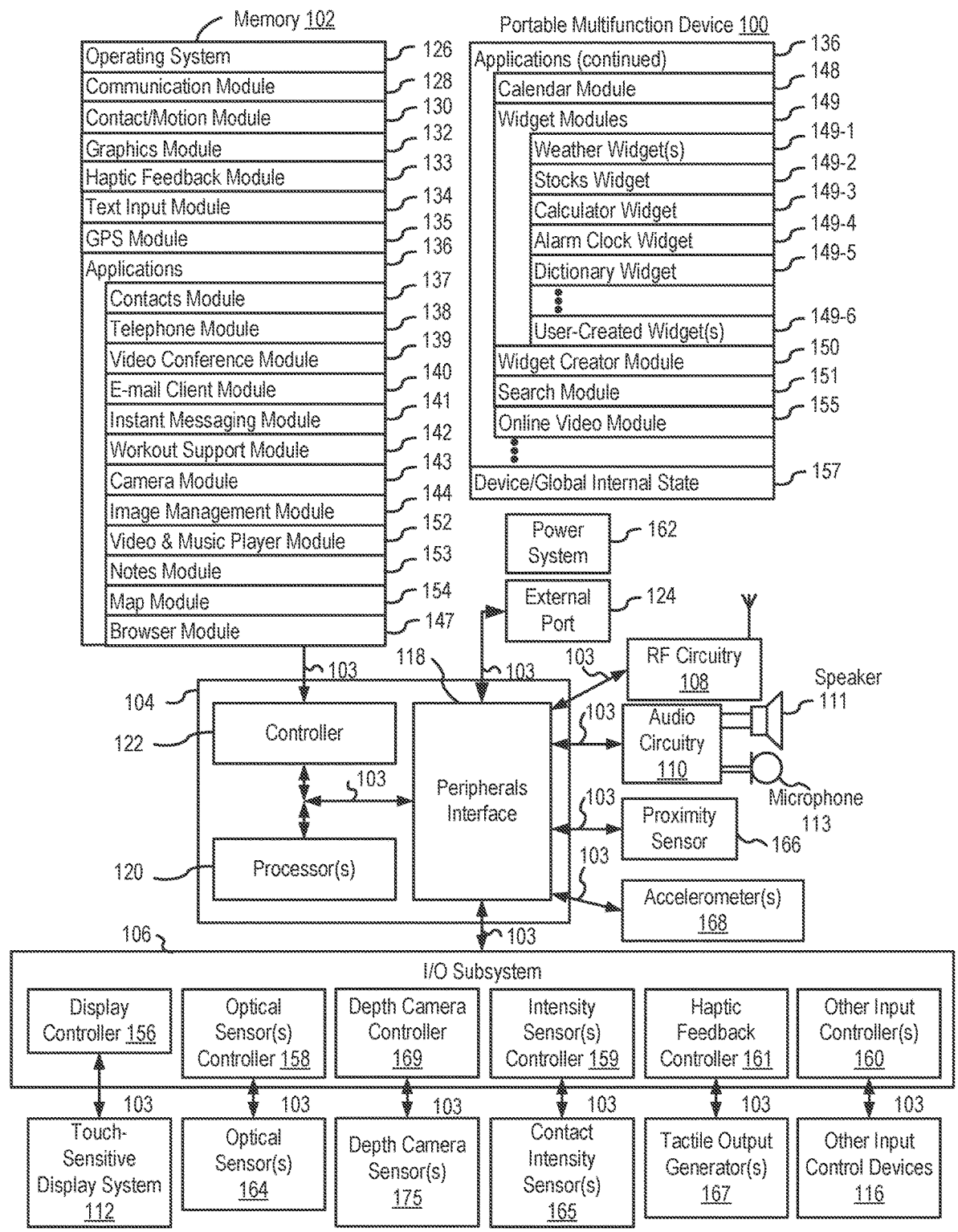
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
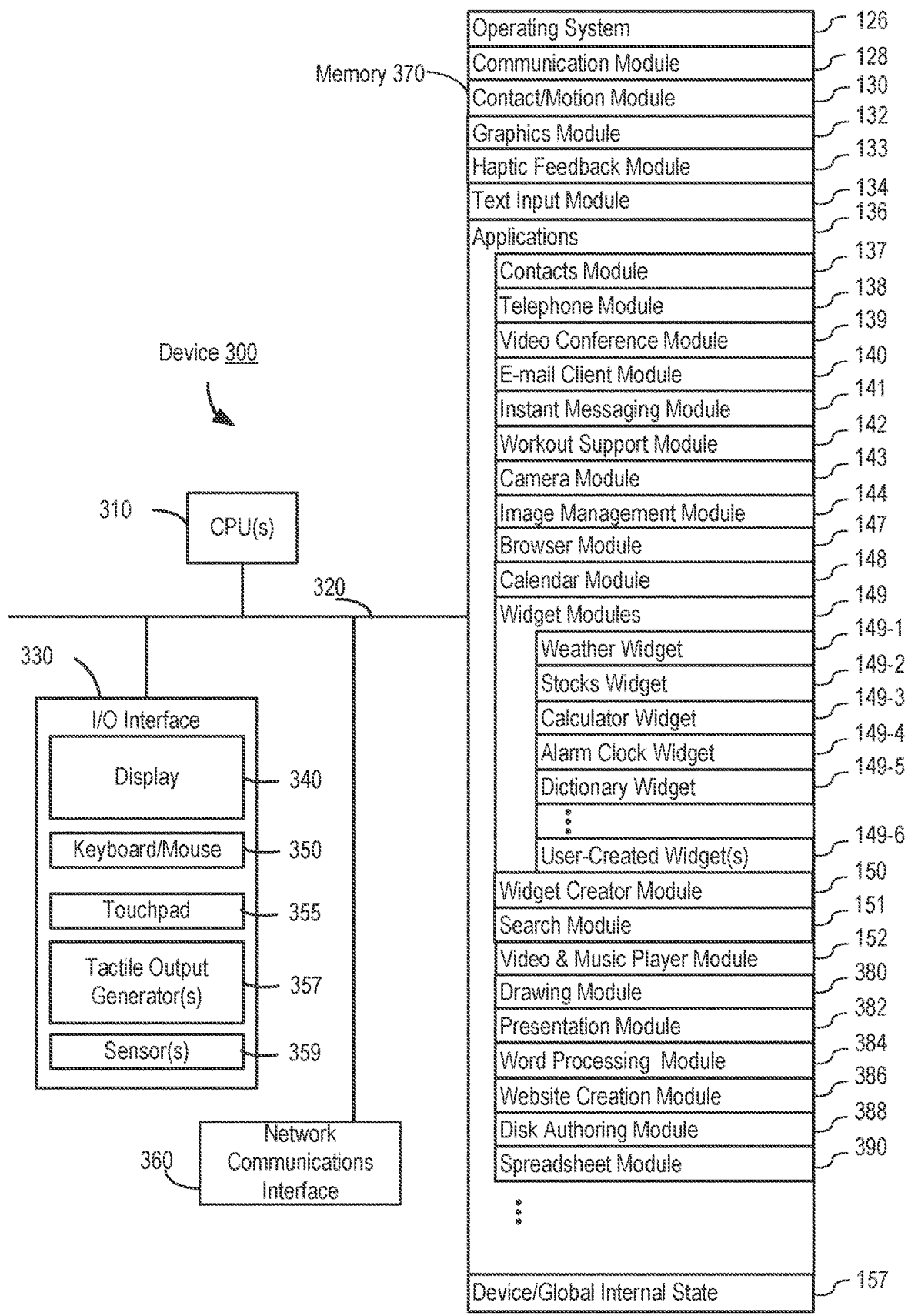
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
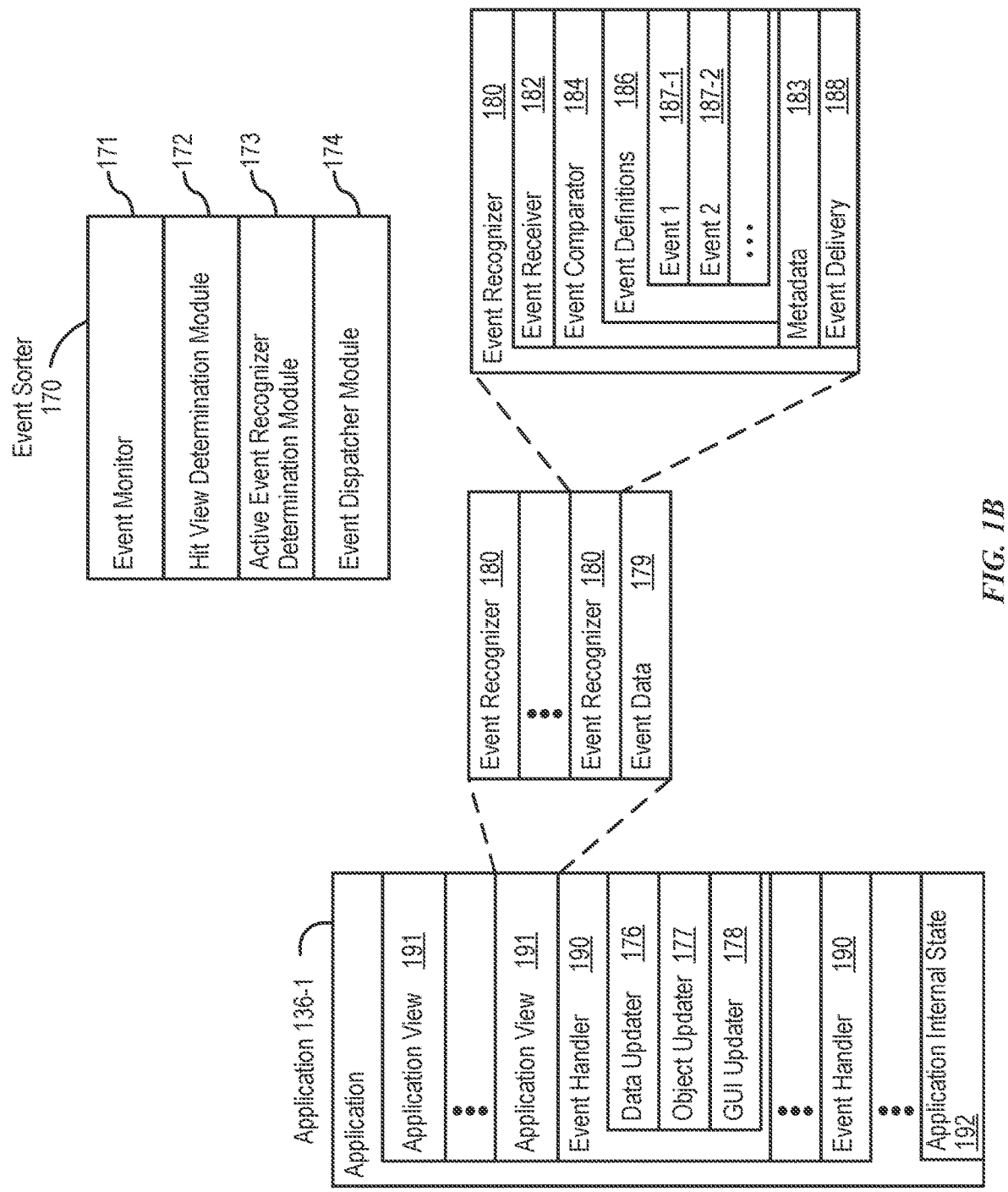
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
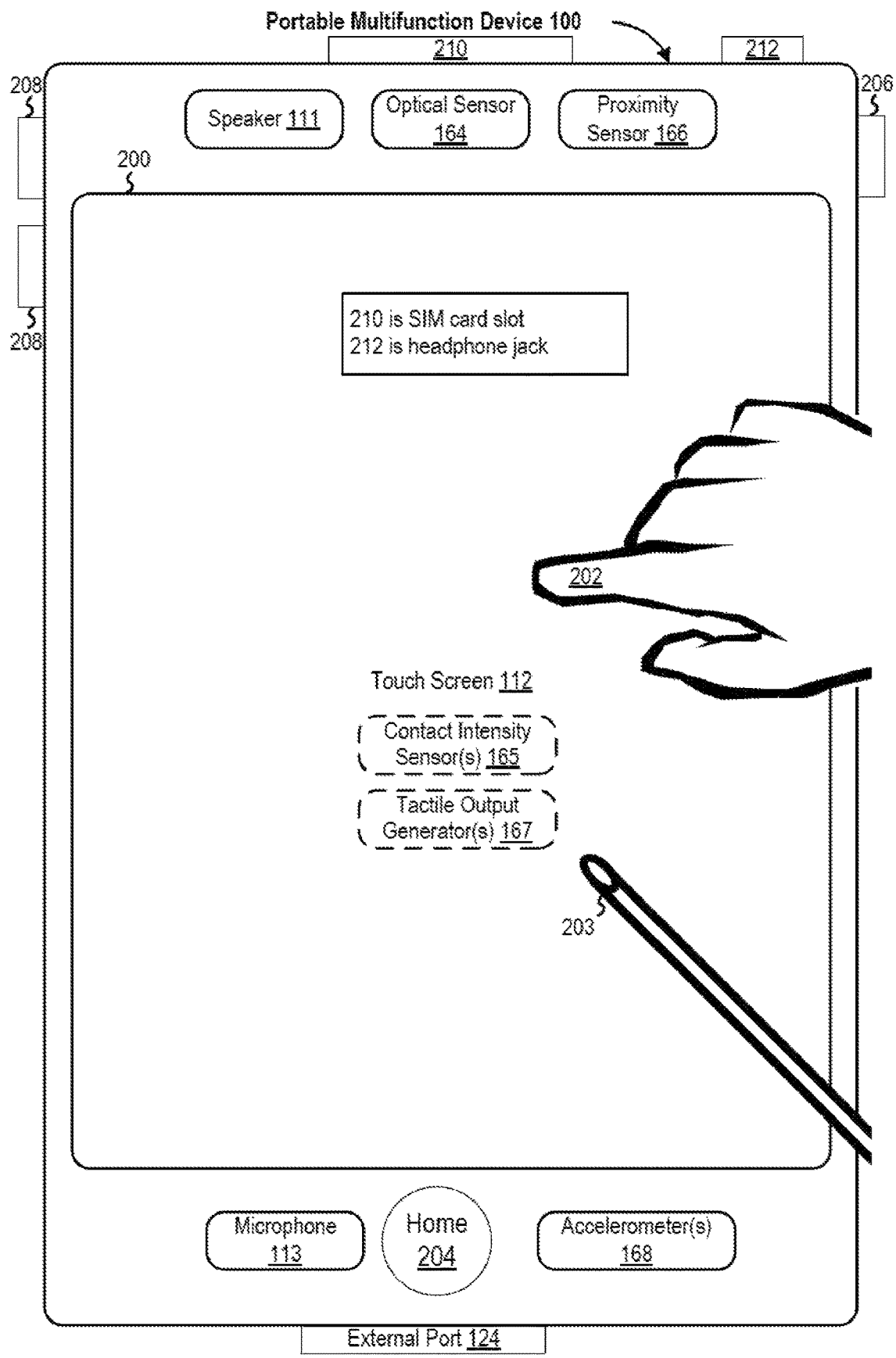
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
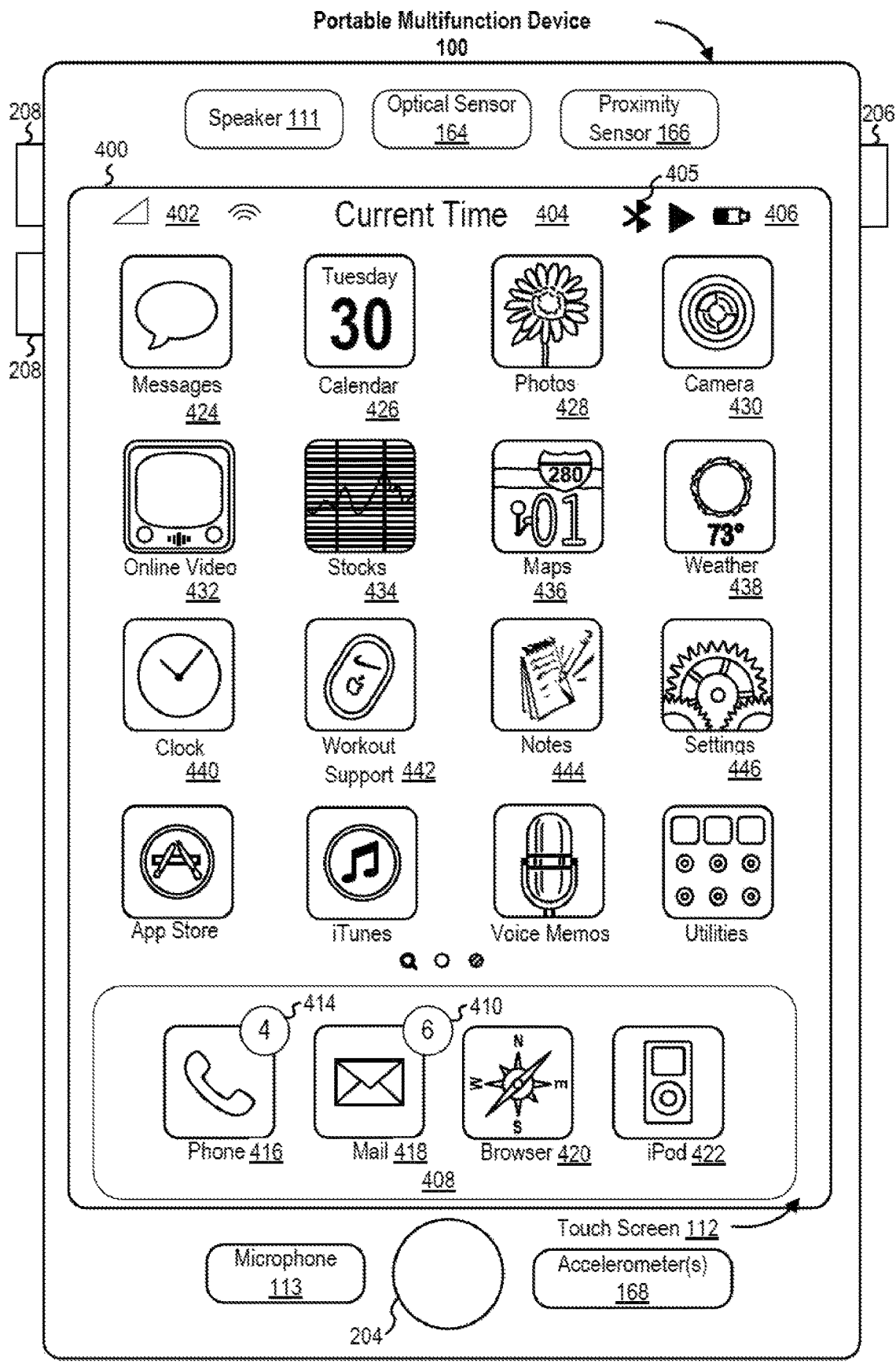
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
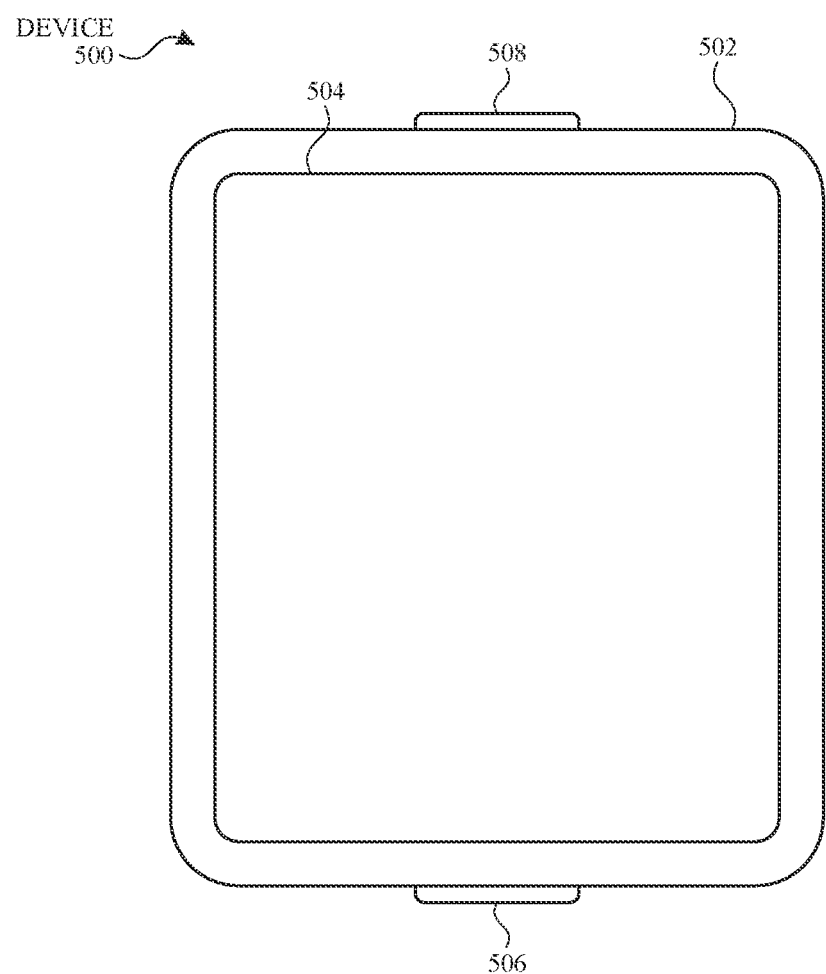
FIG. 5A illustrates a personal electronic device in accordance with some embodiments.
Figure 6A:
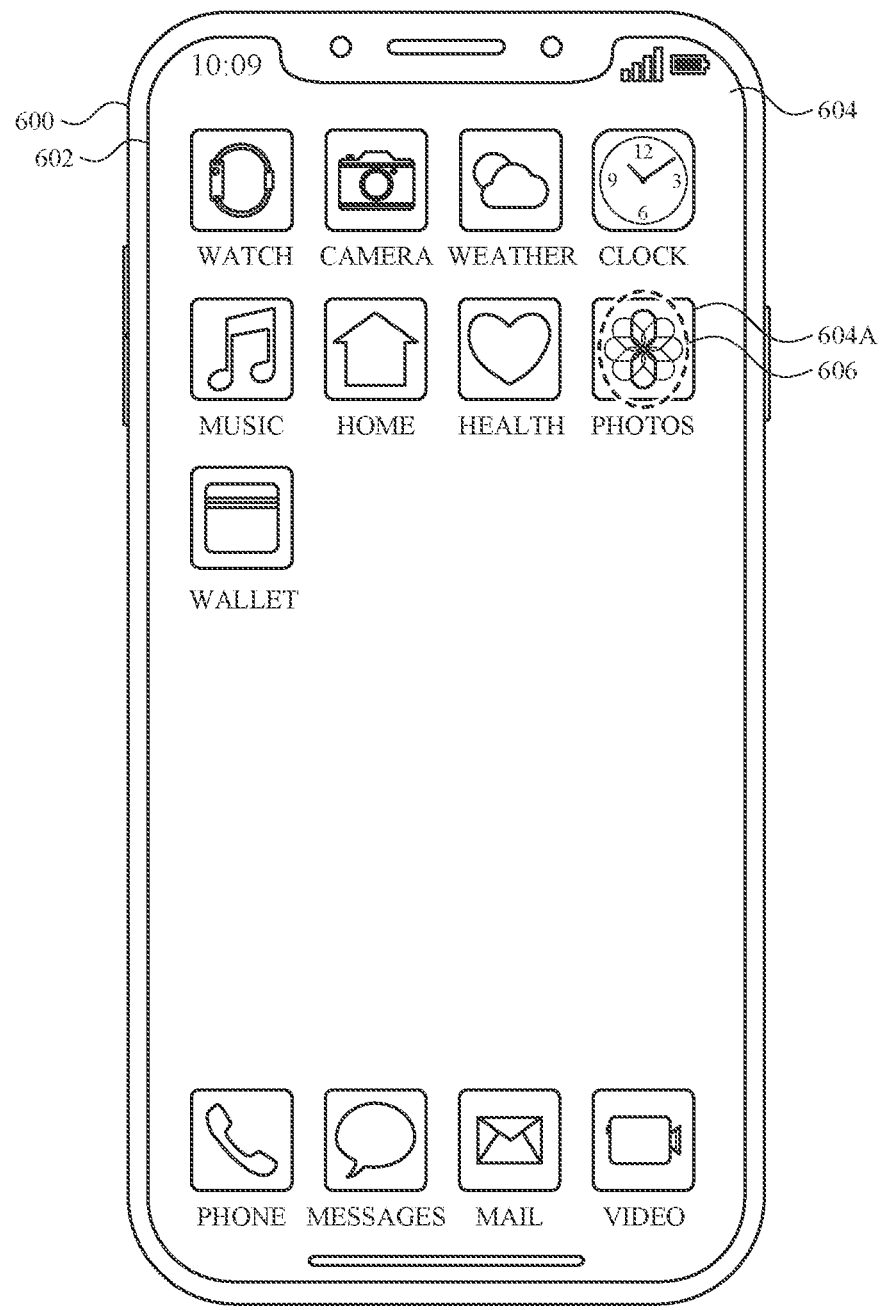
FIGS. 6A-6N illustrate exemplary user interfaces for navigating a collection of media items.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
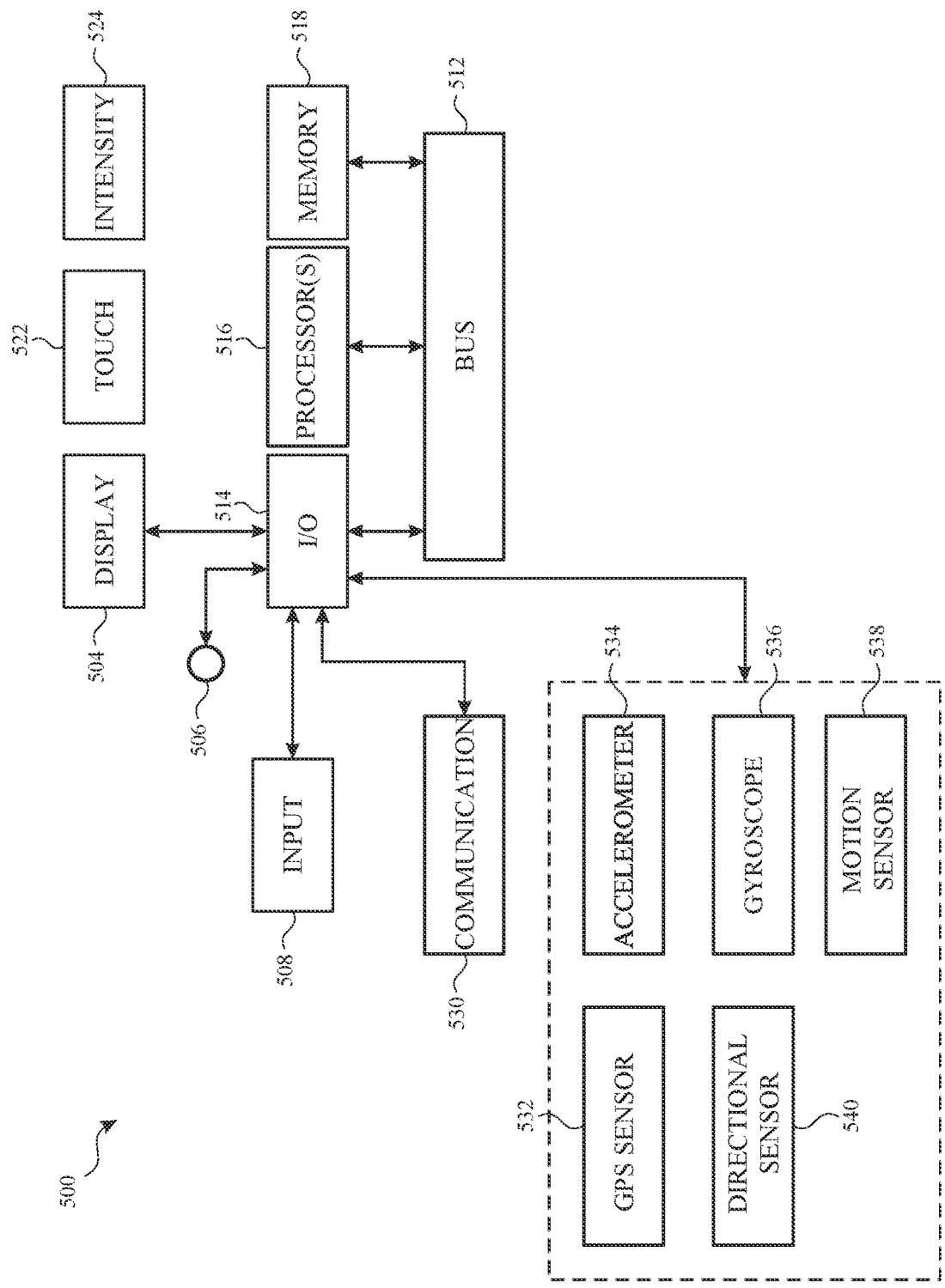
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, and 1500 (FIGS. 7, 9, 11, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
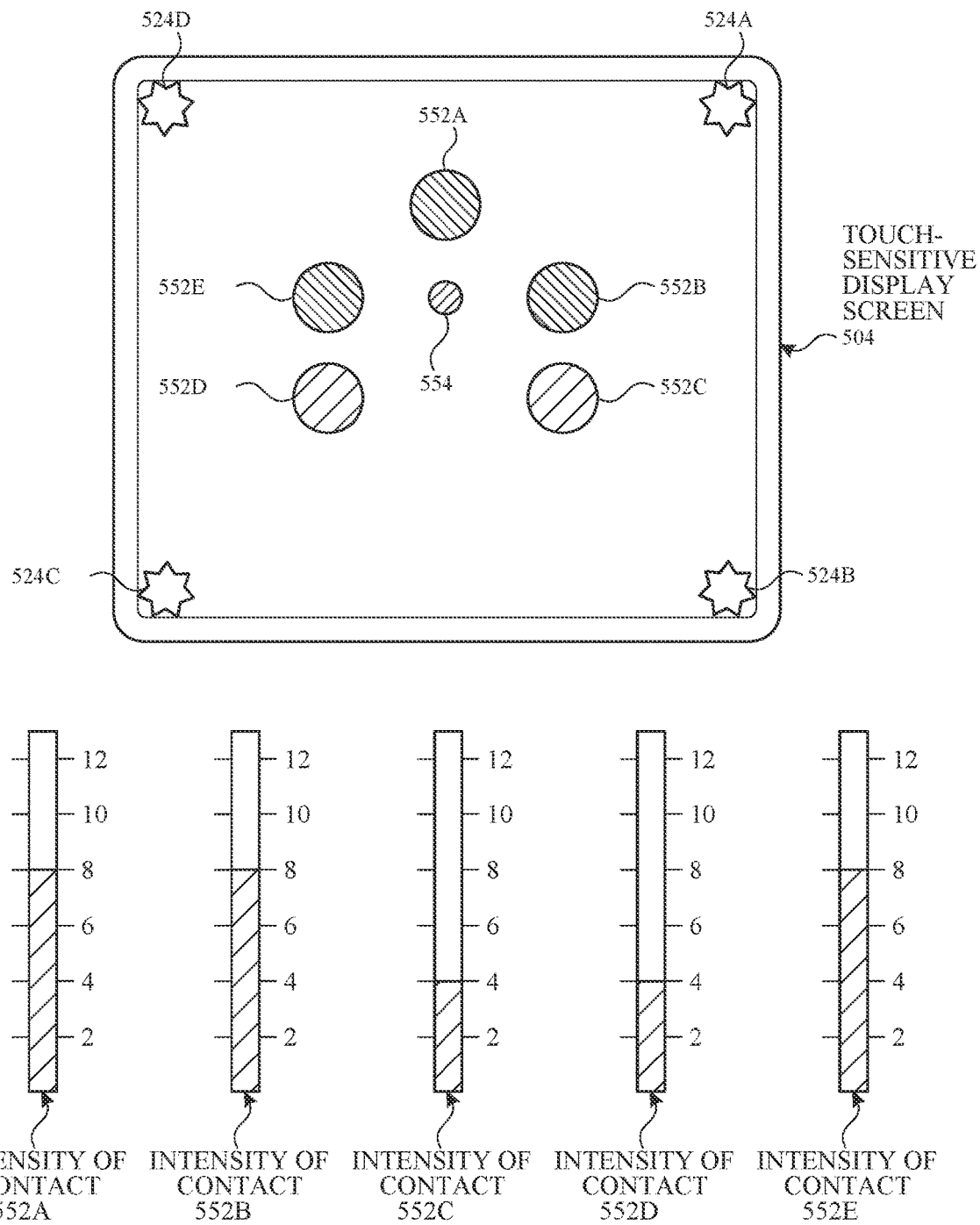

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6N illustrate exemplary user interfaces for navigating a collection of media items, in accordance with some embodiments. The user interfaces in these figures are used to illustrate the processes described below, including the processes in FIG. 7.

FIG. 6A illustrates an exemplary home screen 604 displayed on a touch-sensitive display 602 of electronic device 600. In some embodiments, electronic device 600 includes one or more features of devices 100, 300, or 500. Home screen 604 includes affordances corresponding to one more applications, including affordance 604A associated with a media library application (e.g., entitled "Photos"). Affordance 604A can be used to launch or otherwise open the media library application. As shown, electronic device 600 receives user input 606 at a location of affordance 604A. In response to user input 606, electronic device 600 displays view 608, as shown in FIG. 6B.

Figure 6B:
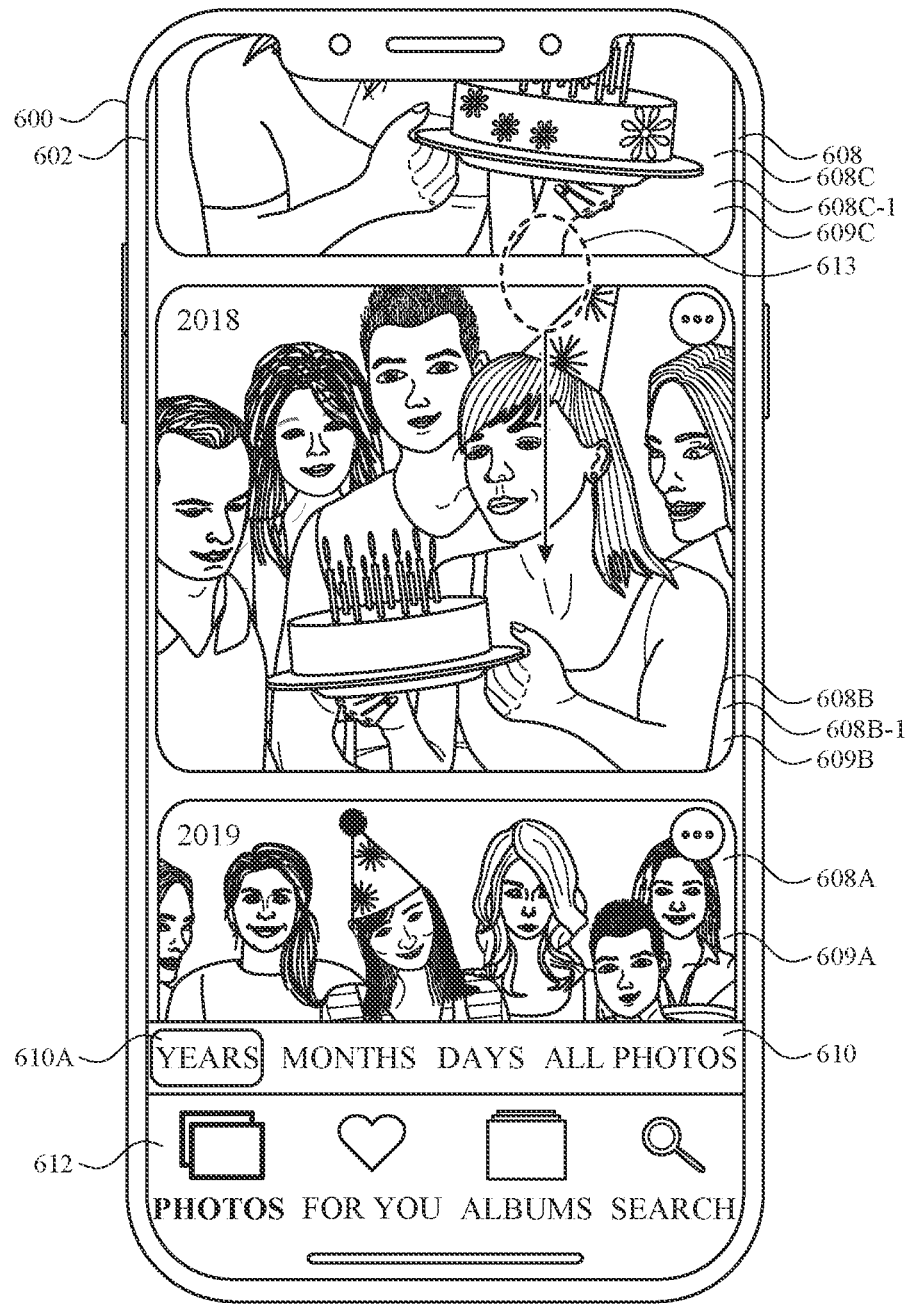

FIG. 6B illustrates an exemplary view (e.g., years view 608) of a media library (a collection of media items). For example, electronic device 600 displays years view 608 in response to receiving user input 606. As shown in FIG. 6B, exemplary years view 608 includes a plurality of tiles 608A-608C, each representing a calendar year. As shown, tile 608A represents the year 2019 and includes a region 608A-1 that includes a representative media item 609A (e.g., a picture) from the year 2019. Tile 608B represents the year 2018 and includes a region 608B-1 that includes a representative media item 609B from the year 2018. Tile 608C represents the year 2017 and includes a region 608C-1 that includes a representative media item 609C from the year 2017. In this example, the regions 608A-1, 608B-1, and 608C-1 occupy the entire respective tiles 608A, 608B, and 608C. In some embodiments, a region (e.g., 608A-1) occupies less than all of a representation (e.g., tile) of a time period. Years view 608 provides a way to display a summarization of a media library by year using representations (e.g., tiles) for each year, each representation including a media item selected from that year. In FIG. 6B, tiles 608A, 608B, 608C are displayed in a single-column view in chronological order.

A summarized view of a media library (e.g., years view 608) is useful if a media item selected to represent a time period is selected (e.g., by electronic device 600 and/or a cloud-based service) to be relevant to content that the user is likely to want to view, which can help guide efficient navigation through the media library to locate desired media items. However, the media library summarized by a view (e.g., 608) can include many different media items (e.g., hundreds or thousands), and selecting a media item to represent a time period such as a year (and that is likely to be relevant to what a user is browsing for) can present a challenge.

In this example, each of the representative media items 609A-609C displayed in tiles 608A-608C are relevant to a recurring event (also referred to as a "recurring temporal event" herein) that is associated with the current date. In FIG. 6B (and other figures herein), a box that identifies the current date (e.g., the date when the respective interface illustrated on the device is displayed) is included above electronic device 600 for the benefit of the reader, but is not included in the respective interface displayed on the device. In the example in FIG. 6B, the current date (e.g., Feb. 17, 2019) is the birthday of a person (also referred to as an "individual" herein) associated with the user (e.g., the user, a significant person to the user (e.g., such as a family member of the user and/or a friend of the user), and/or any person otherwise associated with the user (e.g., user's account, user's device)). For example, the person's birthday is saved in the user's contacts, or in the user's calendar, or the like. As shown in FIG. 6B, each of tiles 608A-608C includes a picture (609A, 609B, and 609C) selected from the person's birthday (February 17) in each of the years 2019 (608A), 2018 (608B), and 2017 (608C). For example, the tile representing the current year 2019 includes a picture 609A of the birthday celebration from the current day (e.g., Feb. 17, 2019), the tile representing previous year 2018 includes a picture 609B from the previous year's birthday (Feb. 17, 2018), and the tile representing previous year 2017 includes a picture 609C from that year's birthday (Feb. 17, 2017). In this example, accessing the years view 608 on the date of a significant recurring event, the birthday (February 17) of the user's daughter (e.g., who is holding the cake in media item 609B), causes the electronic device 600 to present a view for browsing media items that has been populated with representative media items that are relevant to the significant recurring event over time, and thus that the user is likely to browse. For example, on the daughter's birthday (e.g., in 2019), the user is likely to want to view pictures of their daughter (e.g., and her birthday) over the years, and by presenting the images as shown in years view 608 of FIG. 6B, the number of user inputs and time needed to access such media is reduced. These pictures are selected by the electronic device, in part, through analysis of the photos to determine their contents.

In some embodiments, if a media item relevant to the recurring event is not available (e.g., no pictures have been taken on Feb. 17, 2019), then a recent media item (e.g., another picture taken on Feb. 17, 2019; a most recent picture) is selected as the representative media item for the corresponding time period (e.g., the year 2019).

In some embodiments, a view (e.g., years view 608) includes one or more affordances for accessing one or more other views of the media library. For example, years view 608 includes a ribbon 610 that includes affordances (e.g., 610A-610D) for accessing different views of the media library (e.g., years view, months view, days view, all photos view). As shown in FIG. 6B, affordance 610A is selected (as indicated by the box around "Years"), providing an indication of the currently active view (a years view), as well as the time increment organization of the current view (e.g., the current tiles each represent a year time increment, as indicated by the text "Years").

In some embodiments, a view (e.g., years view 608) includes one or more affordances (e.g., in area 612) for performing and/or accessing functions of a media application. For example, years view 608 includes application function affordances area 612 for performing or accessing functions of the photos applications, such as viewing media items according to a chronological organization ("Photos", currently selected), viewing a media sharing interface ("For You"), accessing specific albums ("Albums"), or searching the media library ("Search").

Years view 608 is an example of a view of a media library according to a particular increment of time (a year). In some embodiments, the increment of time represented by each tile in a view are different time increment. For example, other increments of time can be used, such as months, weeks, days, or the like, instead of years. The functions and characteristics described with respect to an exemplary years view can be applied to views for presenting media items according to any time increments, which are intended to be within the scope of this disclosure. In some embodiments, the representation (e.g., tile) of each time period displayed in a view represents the same time increment size (e.g., each represent a different calendar year, or each represent a different calendar month). In some embodiments, the representations (e.g., tile) of time periods displayed in a view represent two or more time increment sizes (e.g., one tile in the view represents a calendar year and one in the view represents a calendar month).

In some embodiments, a view is navigable (e.g., scrollable) for accessing additional tiles (e.g., that are not currently displayed) in the view. For example, years view 608 is vertically scrollable. In some embodiments, a view is navigable for accessing tiles representing every time period (e.g., according to the current time increment) that is represented in the media library. For example, while in the years view, vertical scrolling can be used to cause display of tiles for every year represented by media items in the media library—thus, if there are media items for every year between 2005 and 2019, a tile for each of these years (e.g., 15 total) can be accessed in years view 608 (e.g., via scrolling). Each of these tiles can include a respective representative media item selected based on the recurring event (e.g., user's daughter's birthday in FIG. 6B). In this way, the device provides an interface with easy navigation and relevant summarization for navigating a collection of media items. In this example, at FIG. 6B electronic device 600 receives user input 613, which is a vertical swipe gesture in a downward direction representing a request to scroll years view 608 based on the downward direction of the vertical swipe gesture.

Figure 6C:
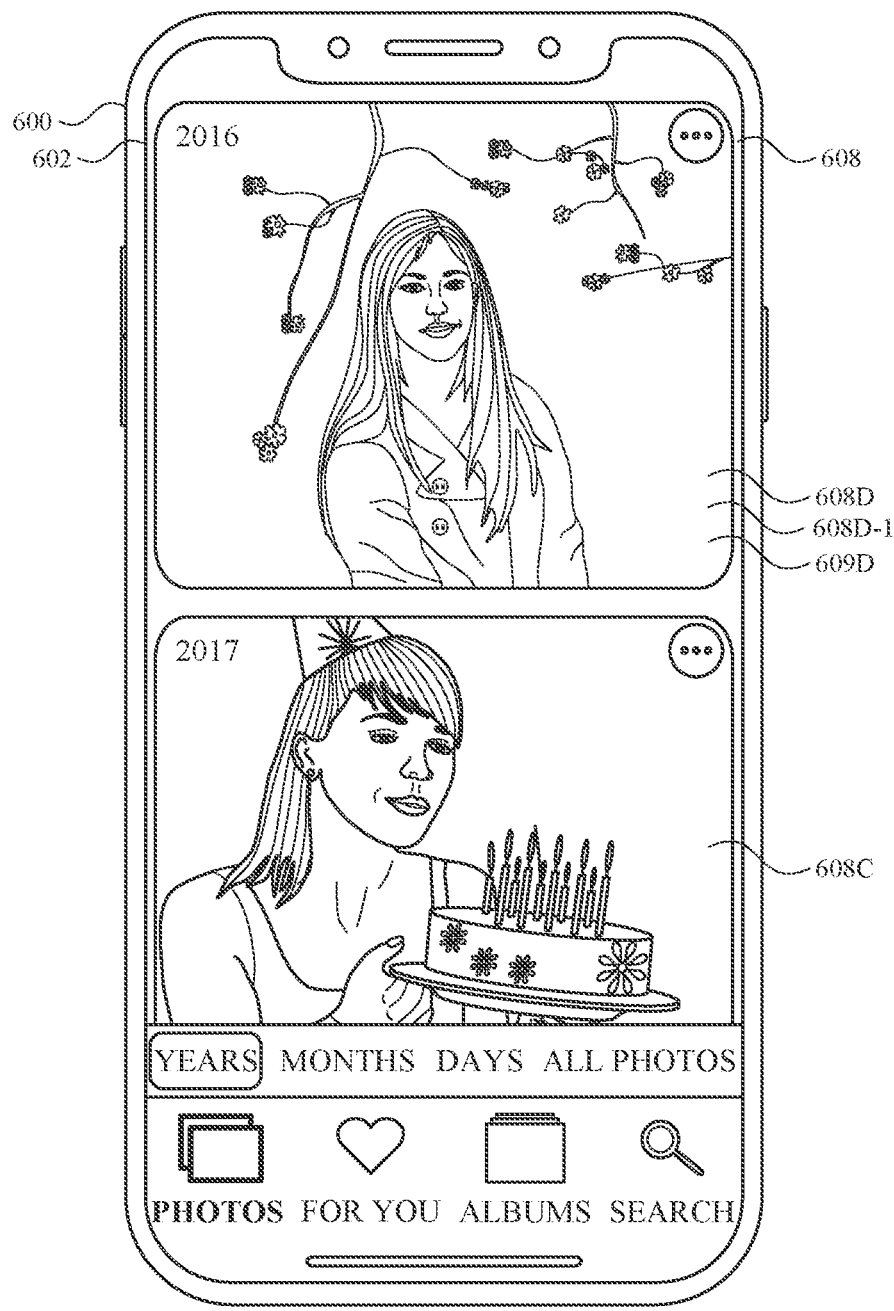

FIG. 6C illustrates years view 608 after navigation (e.g., in response to electronic device 600 receiving user input 613). In response to user input 613, which is a swipe gesture in a downward direction representing a request to navigate downward, electronic device 600 has scrolled years view 608 downward to display a tile 608D for the year 2016, while also displaying tile 608C. In some embodiments, if a recurring event is a significant event associated with a person (e.g., a birthday, an anniversary), a media item depicting the person is selected from a corresponding time period without regard to the particular day within the corresponding time period that the media item is from. For example, as shown in FIG. 6C, tile 608D includes a representative media item 609D that depicts the person (the user's daughter) whose birthdays (from the years 2017 to 2019) are shown in tiles 608A-608C. However, media item 609D is from Feb. 27, 2016 and not from Feb. 17, 2016 (the daughter's birthday). In some embodiments, the media item depicting the person is selected based on being a good depiction of that person. For example, the media item 609D can be selected because it is a high-quality portrait picture of the user's daughter, and thus can be selected instead of images from the daughter's birthday Feb. 17, 2016 because it is a better depiction of the user's daughter than the pictures from Feb. 17, 2016 in the media library (e.g., there are no pictures from the birthday on Feb. 17, 2016). For instance, a picture of an individual that is a portrait shot (e.g., taken in a portrait mode, or a close up of the individual's face) is optionally selected instead of a picture of an individual that is not a portrait shot. Likewise, where the device determines that a significant event is an anniversary, representative media items can be selected as media items that depict the two individuals whose anniversary it is (e.g., regardless of whether actually taken on the anniversary date). These pictures are selected by the electronic device, in part, through analysis of the photos to determine their contents.

In some embodiments, a media items is selected as a representative media item based on one or more of the following: whether the media item has been favorited by user, image quality of the media item (e.g., high quality images have priority), length of the media item (e.g., a sequence of images or a video) (e.g., longer media items have priority), image composition of the media item (e.g., whether the media item depicts a well-composed scene, such as one in which subjects are centered and visible and exposure is correct, and the like), action that occurs during the media item (e.g., movement within the image frame is prioritized over a video in which the subject remains still), and whether one or more persons are depicted in the media item (e.g., the user and/or their family get priority over others persons).

In some embodiments, if a media item from a particular day within a corresponding time period is not available (e.g., not included in the media library), a media item (e.g., depicting the person associated with the significant event) is selected from the corresponding time period from a day other than the particular day. For example, a good picture (e.g., 609D from Feb. 27, 2016) of the user's daughter can be selected as the representative media item if a picture from the daughter's birthday of Feb. 17, 2016 is not available in the user's library, even if the selected picture is not from the birthday date or a birthday celebration event.

Figure 6D:
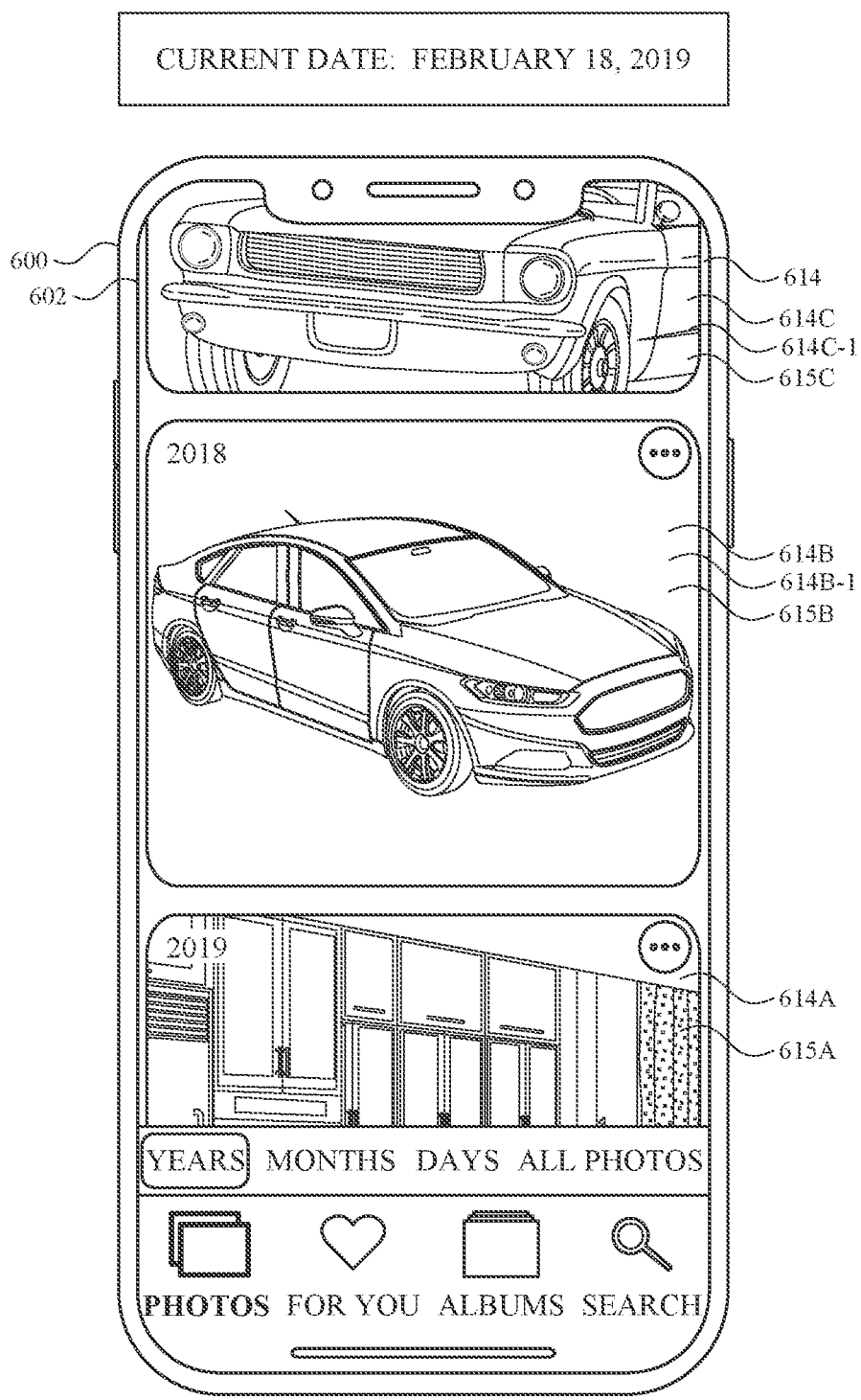

FIG. 6D illustrates another example of an exemplary years view (e.g., 614). For example, electronic device 600 displays years view 614 in response to a user input similar to user input 606, but received on a date (e.g., Feb. 18, 2019) different from the date in the example described in FIGS. 6B-6C (e.g., Feb. 17, 2019). For example, electronic device 600 displays years view 614 instead of years view 608 when the current date is not associated with the user's daughter's birthday (e.g., the current date is Feb. 18, 2019 and the daughter's birthday is February 17).

In an alternative example, electronic device 600 displays years view 614 in response to user input 606 (FIG. 6A), instead of years view 608 (e.g., where the current date is not associated with a significant recurring event such as a birthday). In such example, electronic device 600 displays years view 614 instead of years view 608 on February 17 (e.g., of 2019) if that date is not associated with the user's daughter's birthday (and, optionally, no other significant recurring event) as described with respect to FIGS. 6B-6C (e.g., the user's daughter's birthday is instead on November 1st). In such example, the media displayed in years view 614 in FIG. 6B would be media from February 17 of each respective year.

Years view 614, similar to years view 608, includes tiles 614A-614C that each include a regions (614A-1, 614B-1, and 614C-1) that includes a representative media item (615A, 615B, and 615C) selected based on a recurring event. The representative media items in tiles 614A-614C are relevant to a recurring event associated with the current date, Feb. 18, 2019. Examples of recurring events include a day of the year, a day of the month, a day of the week, or the like. In some embodiments, a good media item is selected as the representative media item for a respective time period based on the recurring event. Media items from the day of the recurring event can be selected to represent their respective time periods (e.g., years). In the example depicted in FIG. 6D, the recurring event is the day of the year February 18th. As shown in FIG. 6D, tile 614B includes a representative media item 615B taken on the day of the year February 18 in the year 2018, and tile 614C includes a representative media item 615C taken on the day of the year February 18 in the year 2017. Tiles 614B and 614C each include a picture of a car because the media library includes media items captured on the dates Feb. 18, 2017 and Feb. 18, 2018 at an annual car show attended by the user. Thus, the media items from the dates Feb. 18, 2017 and Feb. 18, 2018 are associated with the recurring event (the day of the year) February 18th and selected as the representative media items from those respective years based on the recurring event (e.g., based on being from the day of the year within the respective time period, 2017 or 2018). Tile 614A for the current year does not include an image of a car, but does include a representative media item 615A from the current date Feb. 18, 2019 (e.g., the media library does not include any images from a car show in 2019). These pictures are optionally selected by the electronic device, in part, through analysis of the photos to determine their contents and the location at which the photos were taken (using the photo meta data).

In some embodiments, a media item is selected as a representative media item based on one or more quality metrics. For example, a media item can be selected because it is a good representation of a set of media items from that time period and/or for the recurring event (e.g., the best media item of a set depicting similar subject matter, or having a common theme (e.g., nature, cars, family gathering)). A media item can be selected because it is a good (also referred to as a good quality, a high quality, or a prioritized media item) media item based on one or more quality metrics (e.g., the media item depicts the user, has good lighting and/or composition, includes action (e.g., for videos or sequences of images), or the like). Thus, in this example, the media items selected in each of tiles 614A, 614B, and 614C represent a good media item and/or a best representation for their respective days of the year. In some embodiments, a representative media item for one time period is selected independent of a representative media item for another time period. For example, media items 615B and 615C, both depicting a car, can be selected independently of each other as a good quality image from each respective day (e.g., not selected based on each showing a car or having been taken at the same location). In some embodiments, a representative media item for one time period is selected at least in part on one or more media items from another time period. For example, one or both of media items 615B and 615C, both depicting a car, can be selected because of the common theme of car pictures that exists in media items from both of their respective days (e.g., media items selected based on each showing a car and/or having been taken at the same location (based on photo meta data).)

Including a selection of media items that have been selected based on a recurring event over the course of multiple time periods can include several efficiency benefits. For example, the device provides an interface for viewing and navigating between media items from multiple time periods (e.g., over multiple years) in an efficient manner (e.g., using an intelligently selected representative media item). The efficient interface utilizes a representative media item for a time period that is likely to be relevant to the user's navigation of the media library. In the example of a birthday or other significant event, the number of inputs and user effort (in addition to device resource usage) is reduced by providing easy access to present and/or past recurring event-related pictures when the event is associated with the current date. In other examples of recurring events, such as a day of the year scenario, the device provides easy access to media items relevant to the current date, but in previous time periods.

As noted above, an exemplary years view is navigable (e.g., scrollable vertically, horizontally) to access tiles representing other years. In some embodiments, a time period view (e.g., years view, months view, days view) can be used to access representative media items for sub-periods within a selected time period.

Figure 6E:
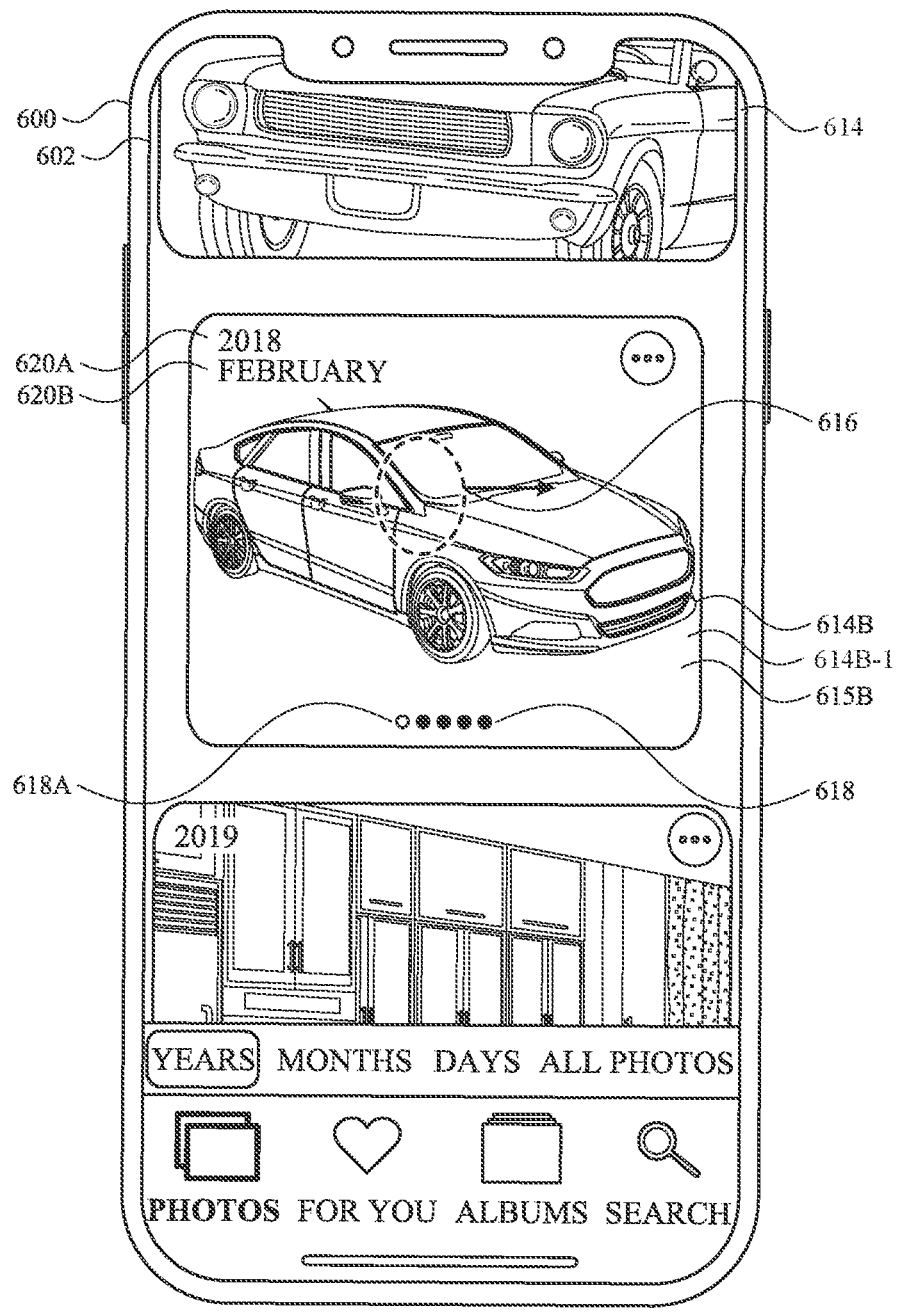

Turning to FIG. 6E, electronic device 600 receives user input 616 representing a press and hold gesture at a location of tile 614B. In response to receiving user input 616, electronic device 600 displays metadata 620B (which was not previously displayed), in addition to metadata 620A (displayed before user input 616). Metadata 620A identifies the time period represented by the tile 614B. Metadata 620B identifies a sub-period represented by the tile 614B. In this example, metadata 620A indicates that tile 614B represents the year 2018, and metadata 620B indicates that tile 614B also represents the month of February. Accordingly, metadata 620A and 620B together indicate that the representative media item depicted therein is from February of 2018. In addition, as will be explained in more detail below, the metadata can provide an indication of where the device will navigate to in response to selection of the tile. Any combination of metadata (e.g., as described herein) can be displayed before (e.g., without) input, or in response to input.

As shown in FIG. 6E, also in response to receiving user input 616, and while user input 616 continues to be detected (e.g., is determined to be on the touch screen display), electronic device 600 causes tile 614B to reduce in size. This can provide visual feedback that the user input 616 (a touch) is still detected, and that a sub-period navigation operation can be performed. In some embodiments, the device (e.g., 600) displays paging indicators in response to user input (e.g., press and hold gesture). For example, electronic device 600 displays paging dots 618 in response to receiving user input 616, and while user input 616 continues to be detected, which include a dot with a different appearance (e.g., 618A is unshaded) representing a relative position (within a plurality of sub-periods represented by the paging dots) of the sub-period representation that is currently displayed within the tile 614B. The display of paging dots can provide feedback regarding that the touch is still detected, and/or that a sub-period navigation operation can be performed.

Figure 6F:
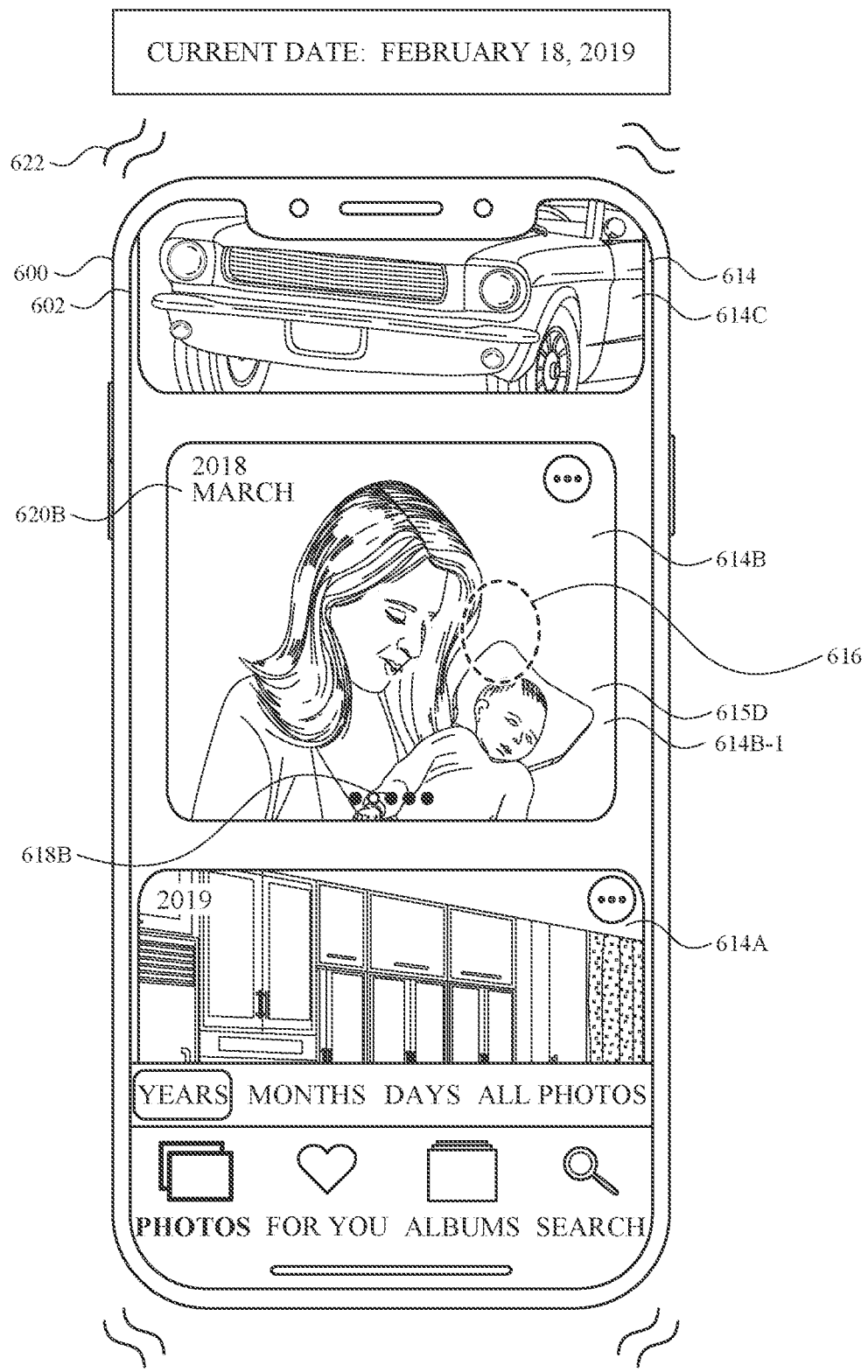

FIG. 6F illustrates navigating between sub-periods while in a view (e.g., a years view) of a particular time increment (e.g., years). In FIG. 6F, in response to movement associated with user input 616 to the right, electronic device 600 has navigated to the right by one sub-period and replaced the representative media item for February 2018 displayed within tile 614B of FIG. 6E with a representative media item 615D from March 2018 (as indicated by metadata 620B, which has been updated to say "March"). In this example, a first recurring event is the day of the year February 18, which was used to select media items for tiles in the years view of FIG. 6E. However, representative media item 615D is selected based on a second recurring event associated with the current date. In this example, the second recurring event is a day of the month, and in particular the 18th day of the month. In some embodiments, the first recurring event and the second recurring event are both associated with the current date. For example, representative media item 615D is from the 18th day of March 2018 (the date of Mar. 18, 2018). Thus, both the first recurring event and the second recurring event are associated with the current date because they include the current date—February 18th and the 18th day of the month both include the current date Feb. 18, 2019. In this example, the media item 615D from Mar. 18, 2018 depicts a candid shot of the user's family taken on that particular day. Accordingly, similar to how each year tile in FIG. 6D illustrates previews of media items according to a one-year time increment between representations (e.g., arranged vertically), scrolling (e.g., horizontally) through sub-periods within a tile provides previews of media items according to a one-month increment (where the sub-periods each represent a month) between representations. In some embodiments, the first recurring event is associated with a first time increment (e.g., years, months, weeks, or days), and the second recurring event is associated with a second time increment (e.g., years, months, weeks, or days) different than the first time increment. In some embodiments, the second time increment of the sub-periods is smaller than the first time increment. For example, the second time increment in the example in FIG. 6F is months, while the first time increment is years, and thus the second time increment is a smaller time increment than the first increment (months are smaller than years).

As further shown in FIG. 6F, paging dots 618 have been updated to show a second paging dot 618B as currently selected, indicating that the representative media item (and thus, displayed sub-period) has changed. In some embodiments, a paging dot can represent one or more sub-period transitions. For example, tile 614B includes five paging dots, but can be used to view representative media items for twelve calendar months. Thus, each paging dot represents more than one month. In this way, progress can be indicated without cluttering the interface.

FIG. 6F also illustrates electronic device 600 providing tactile output 622 (e.g., vibration) that indicates that a transition between sub-periods occurs. For example, while user input 616 continues to be detected in FIG. 6F, electronic device 600 outputs tactile output 622 contemporaneous in time (e.g., at the same time) as the transition (e.g., replacing display operation) from the February 2018 sub-period's representative media item 615B to the March 2018 sub-period's representative media item 615D. Thus, the tactile output can provide positive tactile feedback that a transition has occurred. Additionally, electronic device 600 can continue navigating (e.g., scrolling) through sub-periods of the time period 2018 while movement associated with user input 616 is detected (e.g., to the right in this example), providing a tactile output 622 at each transition between sub-periods as described above.

Figure 6G:
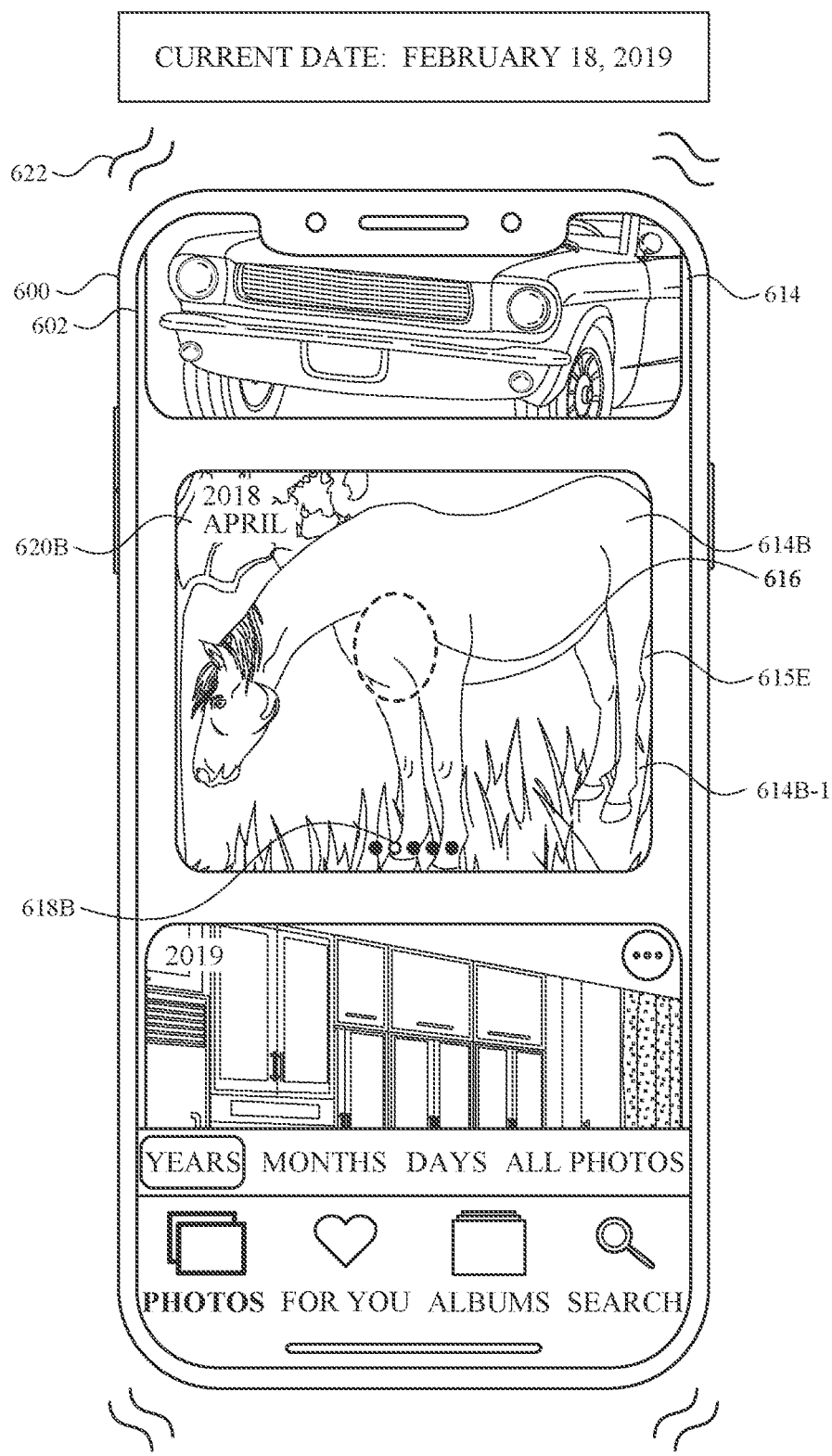

Turning to FIG. 6G, in response to continuing to detect movement associated with user input 616 to the right, electronic device 600 navigates (e.g., scrolls) to the right by another sub-period and replaces the representative media item 615D for March 2018 displayed within tile 614B of FIG. 6F with a representative media item 615E from April 2018 (as indicated by metadata 620B which has been updated to say "April"). For example, the displacement of user input 616 from its initial location (e.g., touch down in FIG. 6E) was maintained, and in response to continue to detect such movement, electronic device 600 continues to navigate to a sup-period for April 2018. Similar to representative media item 615D, media item 615E is selected based on the second recurring event associated with the current date, the 18th day of the month, and thus is a media item from Apr. 18, 2018. In this example, the picture 615E from Apr. 18, 2018 depicts a horse that corresponds to a trip taken to a farm on that particular day.

In some embodiments, continuing to detect movement associated with a user input (e.g., 616) includes continuing to detect that the user input has moved from its initial location (e.g., of touch down). For example, electronic device 600 can transition from March 2018 to April 2018 (FIGS. 6F-6G) without detecting further movement (e.g., at FIG. 6F), so long as the displacement of user input 616 to the right in FIG. 6F (e.g., that caused the transition from February 2018) away from the touch down location of user 616 continues to be detected (e.g., at a location that is beyond a threshold distance)—thus, a user need only press and hold and move to the right once (and maintain) to continue transitioning between sub-periods. In some embodiments, continuing to detect movement associated with a user input (e.g., 616) includes detecting further movement of the user input. For example, further movement at FIG. 6F of user input 616 to the right can cause electronic device 600 to display the transition from March 2018 to April 2018. In some embodiments, the time between transitions depends on the amount of movement detected. For example, if user input 616 has moved to the right from its initial location by a small amount (and has stopped), transitions can occur less frequently (e.g., once per second), but if the user input 616 has moved to the right a larger amount, transitions can occur more frequently (e.g., once every 0.5 seconds). The change in transition speed can be continuous (e.g., linearly related to movement amount) or be done based on one or more discrete levels (e.g., slow, normal, fast; 2 seconds, 1 second, 0.5 second). In some embodiments, movement of a user input in a different direction (e.g., to the left of the initial location of user input 616) causes the device to transition through sub-periods (e.g., in a different direction than movement to the right) in a different direction (e.g., in a reverse order). For example, movement of user input 616 to the left of its initial location while the sub-period April 2018 is displayed can cause electronic device 600 to transition in reverse order, than would be done for movement to the right, and display March 2018, then February 2018, then January 2018, or until the user input 616 or movement is no longer detected.

As further shown in FIG. 6G, tactile output 622 is provided to indicate a transition between sub-period representations: between representative media item 615D and representative media item 615E within tile 614B. Additionally, paging dot 618B continues to be displayed as selected (e.g., it represents more than one page transition).

In the examples depicted in FIGS. 6E to 6G, the representative media item within tile 614B was replaced twice while the movement of user input 616 continued to be detected (e.g., a press and hold followed by a drag to the right). In FIG. 6G, user input 616 continues to be detected but has moved back to its initial location (e.g., shown in FIG. 6E), and thus the movement associated with user input 616 is no longer detected. In response to ceasing to detect the movement of user input 616 while user input 616 continues to be detected, electronic device 600 ceases to navigate through sub-periods. In this example, because user input 616 is still detected (tap a hold), tile 614B continues to be displayed smaller and additional movement (e.g., left or right) can cause navigation between sub-periods. For example, subsequent movement of user input 616 can cause the April 2018 representative media item to be replaced: movement to the right to replace it with May 2018, or movement to the left to replace it with March 2018. In some embodiments, navigation through sub-periods is circular (which can also be referred to as "looping"). For example, after navigation causes all twelve months of the year to be displayed (e.g., beginning at February 2018, progressing to December 2018 and looping back to January 2018 after December 2018) and while scrolling continues, the device (e.g., 600) will replace the twelfth month (e.g., February 2018 in this example) with the first month (e.g., February 2018 in this example) and continue transitioning through sub-periods instead of stopping at the twelfth month. For instance, if user input 616 were held with movement to the right indefinitely, December 2018 would be reached, followed by January 2018, followed by February 2018, and then March 2018, and continue navigating and looping, until electronic device 600 ceases to detect user input 616 (or movement associated with user input 616). In some embodiments, scrolling through sub-periods is not circular (e.g., in this example, would stop at January 2018, which is the twelfth month based on starting from February 2018). In some embodiments, non-circular navigation has fixed beginning and endpoints (e.g., which are the first and last months of a calendar year) (e.g., in this example, would stop at December 2018 navigating to the right, and step at January 2018 navigating to the left).

Figure 6H:
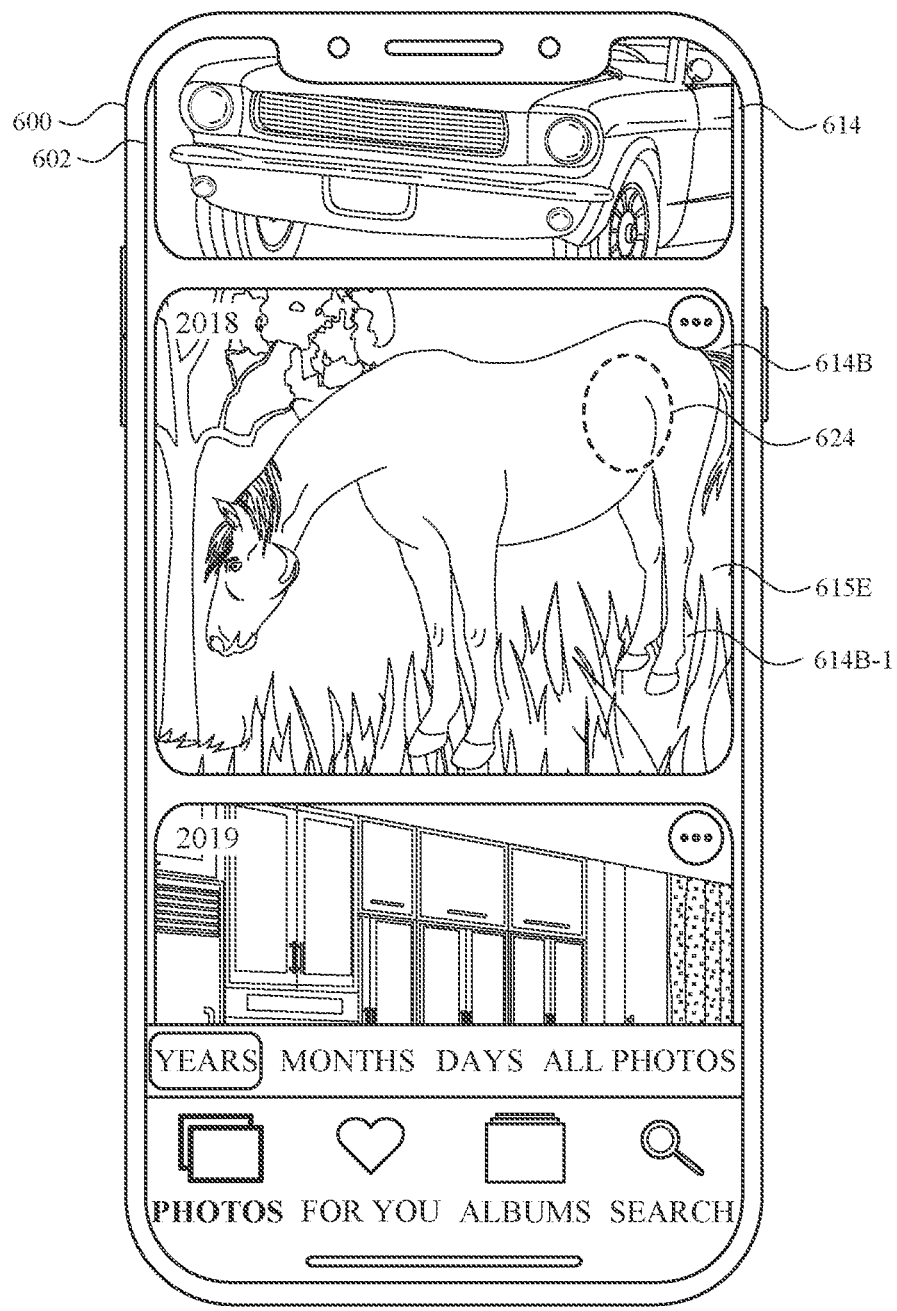

In FIG. 6H, user input 616 has been removed and tile 614B has returned to normal size in response to electronic device 600 ceasing to detect user input 616 (e.g., after liftoff of user input 616 and prior to detecting user input 624). Also in response to ceasing to detect user input 616, electronic device 600 no longer displays metadata 620B and paging dots 618. In some embodiments, metadata (e.g., 620B) and/or paging dots (e.g., 618) are displayed even while no user input is detected. In some embodiments, in response to ceasing to detect a user input that causes navigation between sub-periods, the device maintains the representative media item of the sub-period displayed at the time that the user input ceased to be detected. For example, the representative media item 615E is displayed in tile 614B at the moment when user input 616 ceases to be detected (e.g., is lifted off the touch-sensitive display), and continues being displayed after user input 616 ceases to be detected, as shown in FIG. 6H. Thus, despite being from April 2018 (e.g., and not from the day of the year of the years view 614, February 18th), media item 615E is maintained within the representative media item region in tile 614B so that subsequent selection can be performed by the user of that sub-period, in order to control the focus of the a next view (e.g., months view) displayed in response to such subsequent selection. In other words, after navigating to April 2018 in years view 614, selection of tile 614B while media item 614E is maintained allows navigation to a months view that is focused on the month April 2018.

In some embodiments, selection of a tile representing a time period can cause an electronic device (e.g., 600) to display a different view of the media library according to a different time increment. In some embodiments, a plurality of views of a media library are arranged in a hierarchy of views. For example, selection of an affordance (e.g., a tile) in one view (e.g., a years view) causes an electronic device (e.g., 600) to display a next view in the hierarchy of views (e.g., a months view). In some embodiments, each view in the hierarchy of views is arranged and/or organized according to different time increments (e.g., years, months, weeks, days, or the like). In this way, a device can provide efficient and intuitive navigation between views having different time increment organizations. At FIG. 6H, electronic device 600 receives user input 624 (e.g., a tap input) at a location associated with tile 614B, representing selection of the tile.

Figure 6I:
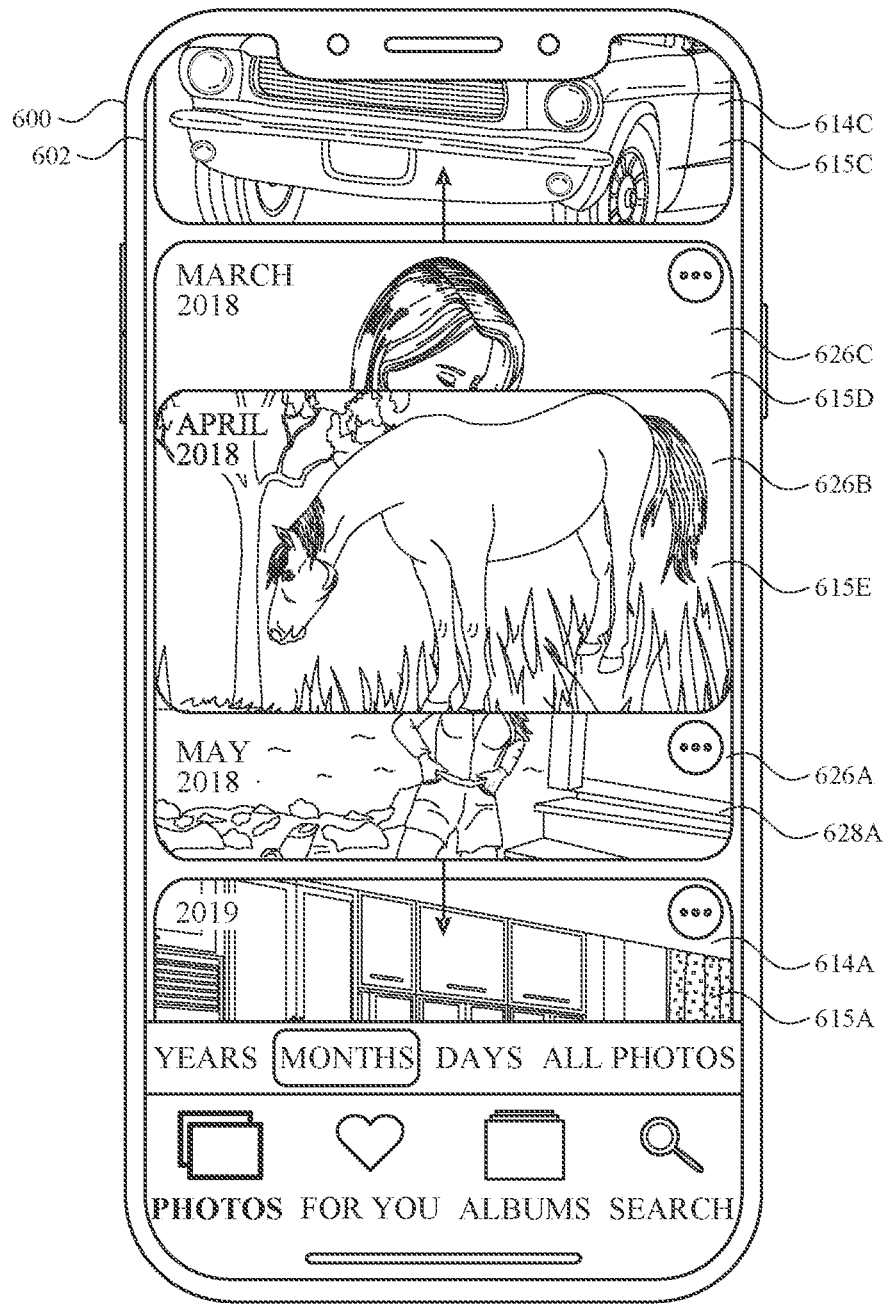
Figure 6J:
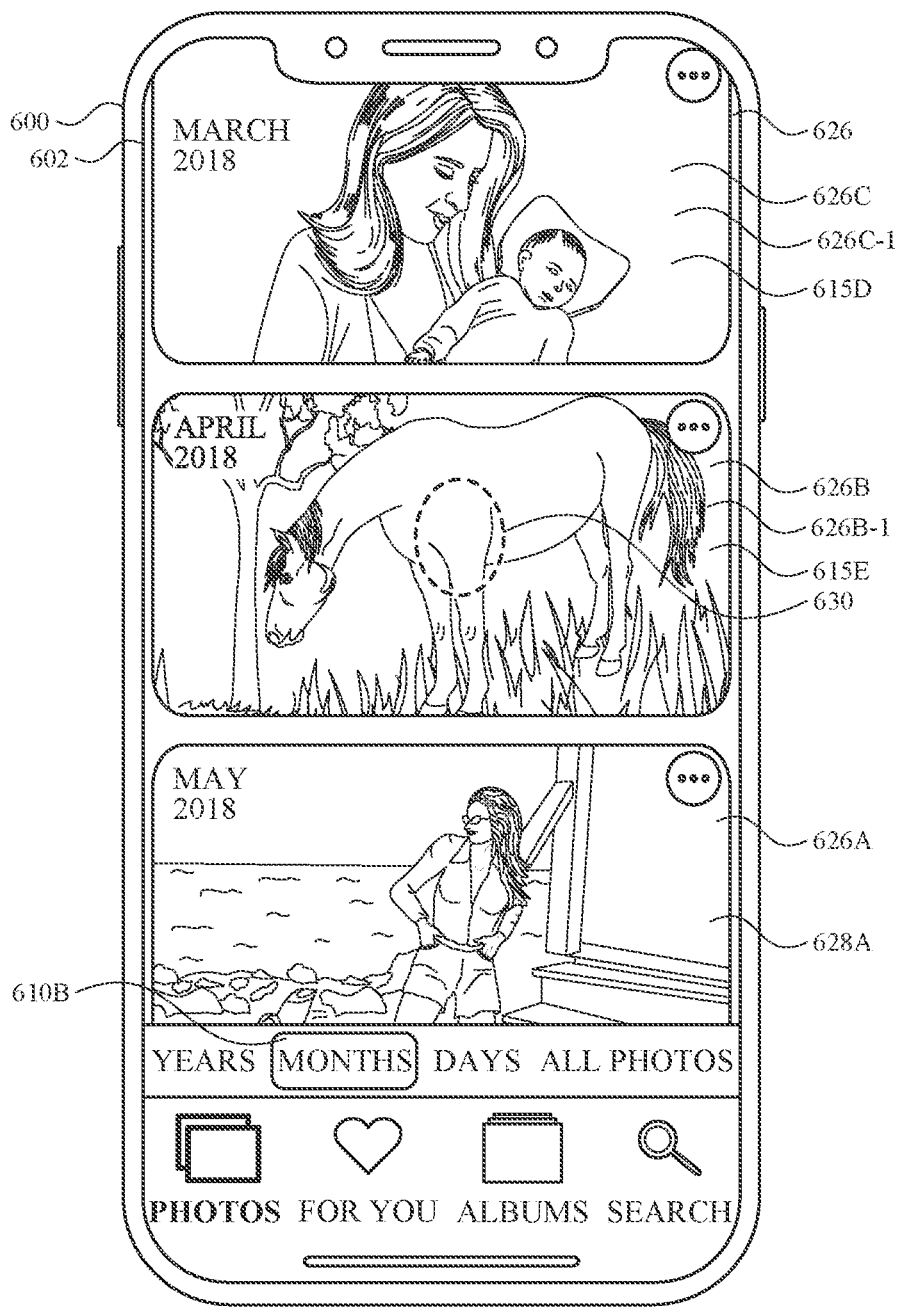

FIGS. 6I-6J illustrate an exemplary transition between views of the media library according to different time increments. FIG. 6I illustrates an animated transition between a years view 618 and an exemplary months view 626 (of FIG. 6J), displayed by electronic device 600 in response to user input 624 selection of year tile 614B. As shown in FIG. 6I, month tiles 626A, 626B, and 626C are at least partially displayed. The selected year tile 614B has been replaced by (e.g., overlaid by, turned into, transformed into) month tile 626B, which includes the same representative media item 615E as the selected year tile 614B in FIG. 6H. This provides visual continuity when switching between views—the sub-period represented by the selected year tile is a focal point (e.g., center) of the animated transition and/or the resulting new view (e.g., months view) and includes the same representative media item. In this example, tile 626B is centered vertically during the transition to the new view (months view). Further, tiles 626A and 626C appear to flow out from under tile 626B, visually emphasizing 626B is the tile that includes the representative media item that has been selected. During the animated transition, year tiles 614C and 614A are still displayed, but will cease to be displayed (e.g., by being animatedly pushed off the display, covered by the month tiles (e.g., 626C and 626A), or faded out) as a result of the animation. In some embodiments, the media item displayed in the first view (e.g., years view) remains in place and/or at a same size during a transition to a second view (e.g., months view). For example, the horse depicted in media item 615E in years view 614 in FIG. 6H can appear to not move position or change in size during the transition to being displayed in a month tile 626B in months view 626, even if the tile frame changes size around it (e.g., 626B is smaller than 614B). Remaining static while other aspects of the interface change can further provide visual emphasis of the selected media item and visual continuity to a user.

FIG. 6J illustrates an exemplary months view 626. Electronic device 600 displays months view 626 as shown in FIG. 6J in response to receiving user input 624. Months view 626, similar to years view 614, includes tiles 626A-626C that include representative media items (628A, 615E, and 615D) selected based on a recurring event. However, months view 626 is organized according to a different time increment than years view 614—specifically, months rather than years. Thus, a day of the year recurring event (a first recurring event) is not used to select media items for a months view, but rather a related recurring event (a second recurring event) of a day of the month is used, where both the day of the year and the day of the month recurring events are associated with the current date. For example, the day of the year and the day of the month both include the current date. In the example in FIG. 6J, the representative media items in tiles 626A-626C are relevant to a second recurring event associated with the current date, Feb. 18, 2019. Similar to as discussed above with respect to scrolling between sub-periods, the tiles 626A-626C are relevant to a recurring event that is a particular day of the month—in this example, the 18th day of the month. Thus, representative media item 628A is from May 18, 2018, representative media item 615E is from Apr. 18, 2018, and representative media item 615D is from Mar. 18, 2018. Also in FIG. 6J, affordance 610B is shown as selected to indicate that the current view is a months view (e.g., and affordance 610A is no longer selected).

As discussed above, in order to maintain continuity when transitioning between views in a hierarchy or navigating sub-periods in a view, a representative media item for a time period (e.g., a year) can also be a representative media item for a particular sub-period (e.g., a month) of that time period. In such case, the representative media item can be considered to have been selected based on either or both a first recurring event (e.g., day of the year) and a second recurring event (e.g., day of the month). For example, in FIG. 6E, media item 615B is selected based on satisfying the day of the year recurring event of February 18th, but can also be considered to be selected based on satisfying the day of the month recurring event of the 18th day of the month.

In an alternative example to the one shown in FIG. 6J, such as when a recurring event is associated with one or more particular individuals (persons) (e.g., for a birthday, an anniversary, a holiday), a representative media item is selected from a time period represented by the corresponding tile without necessarily being from a particular day in that time period. For example, if a recurring event is a birthday associated with an individual (as illustrated in FIG. 6B) and a user input selection (similar to 624) is received at a location of tile 608B (FIG. 6B) while representative media item 609B is displayed, a view changes from a years view to a months view. Because displaying media items depicting the individual is important, representative media items for the resulting displayed month tiles can be media items selected based on whether they depict the individual whose birthday it is (and thus based on the same recurring event used in the years view) but from any day within the representative month, and not necessarily from the same day of the month as the birthday. Thus, representative media items for tiles in views at different levels of a hierarchical set of views can be selected based on the same recurring event (e.g., selected for being a good depicting of the individual whose birthday it is).

In some embodiments, a months view (or any other increment) includes one or more of the features described above with respect to a years views. For example, months view 626 is navigable (e.g., scrollable vertically, horizontally) to access additional tiles representing other times periods (months) of the view. In some embodiments, tiles representing months (or any other increment) include one or more of the features described above with respect to years tiles. For example, a user input (e.g., press and hold associated with movement in a direction) can be used to navigate (within a month tile) representative media items of sub-periods of the month (e.g., weeks, days).

At FIG. 6J, electronic device 600 receives user input 630 representing a tap gesture at a location of tile 626B representing selection of tile 626B.

Figure 6K:
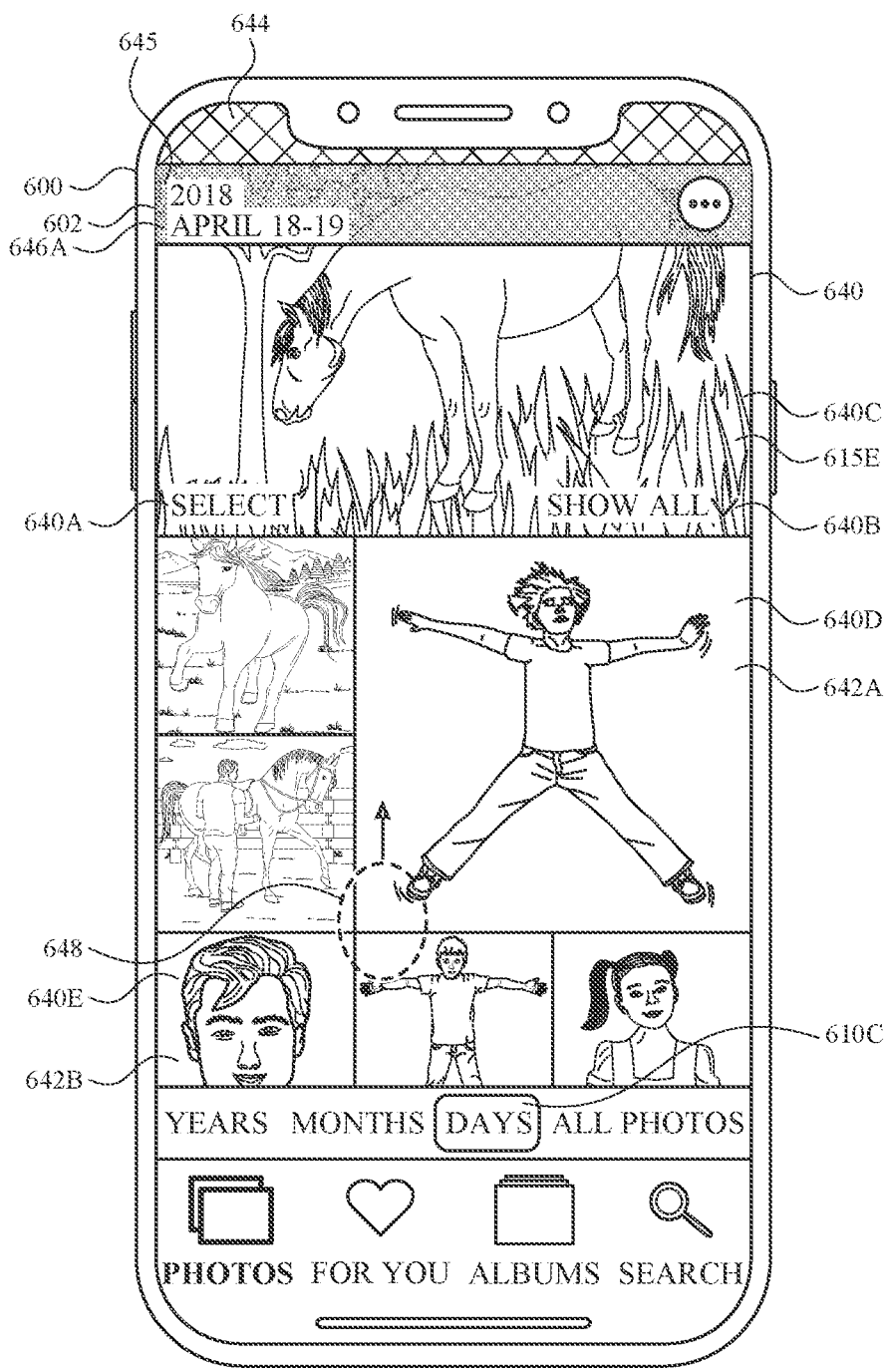
Figure 6L:
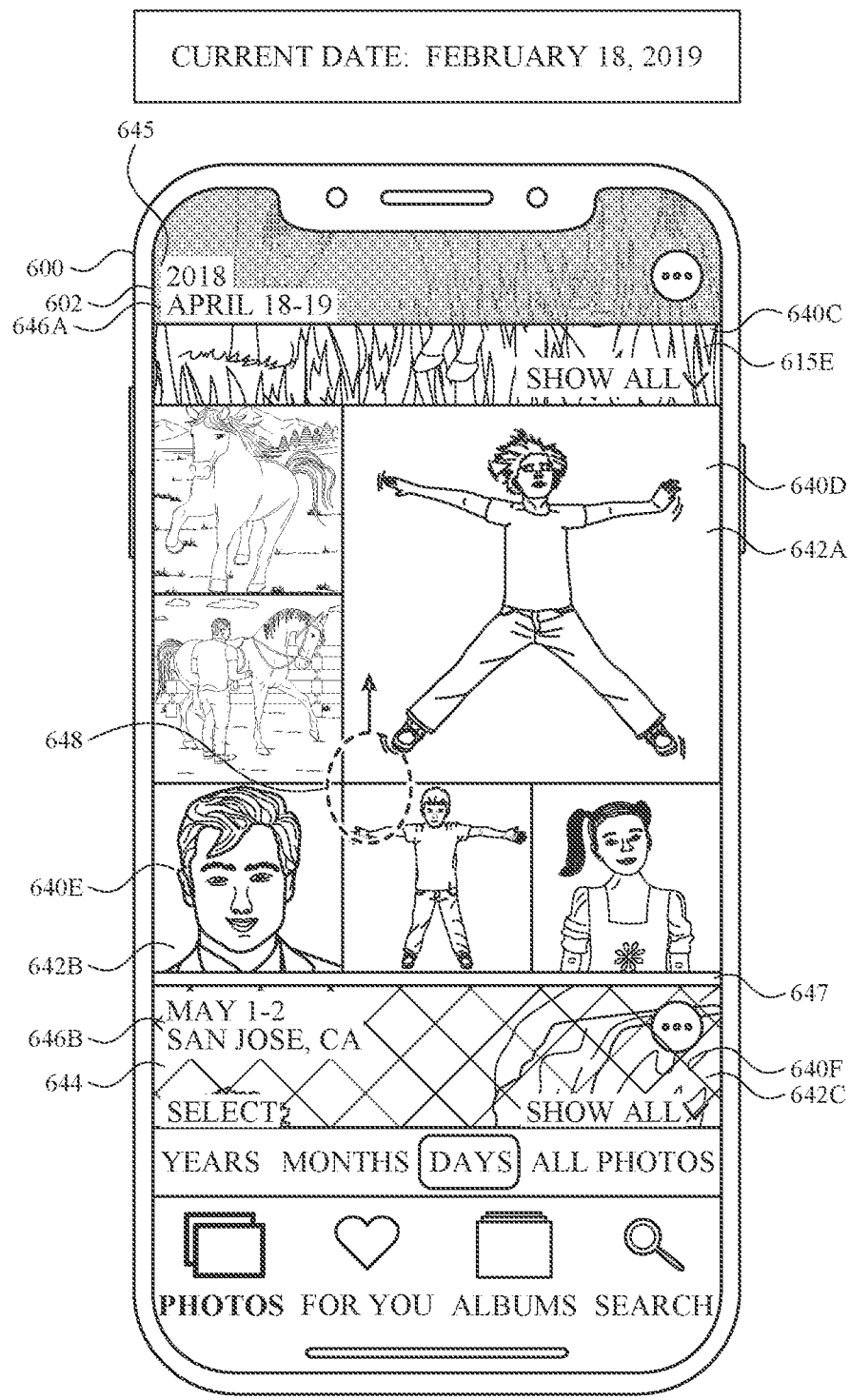
Figure 6M:
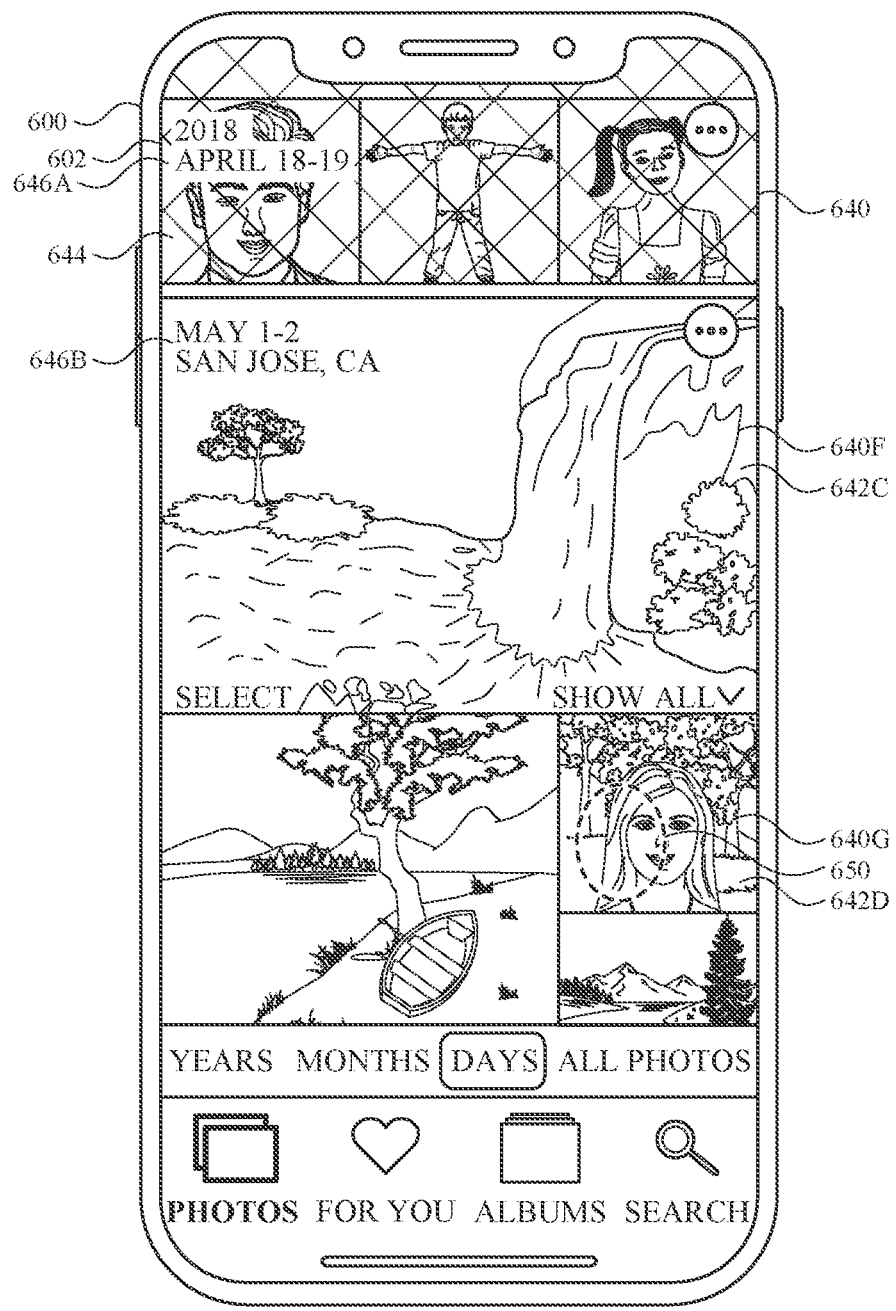
Figure 6N:
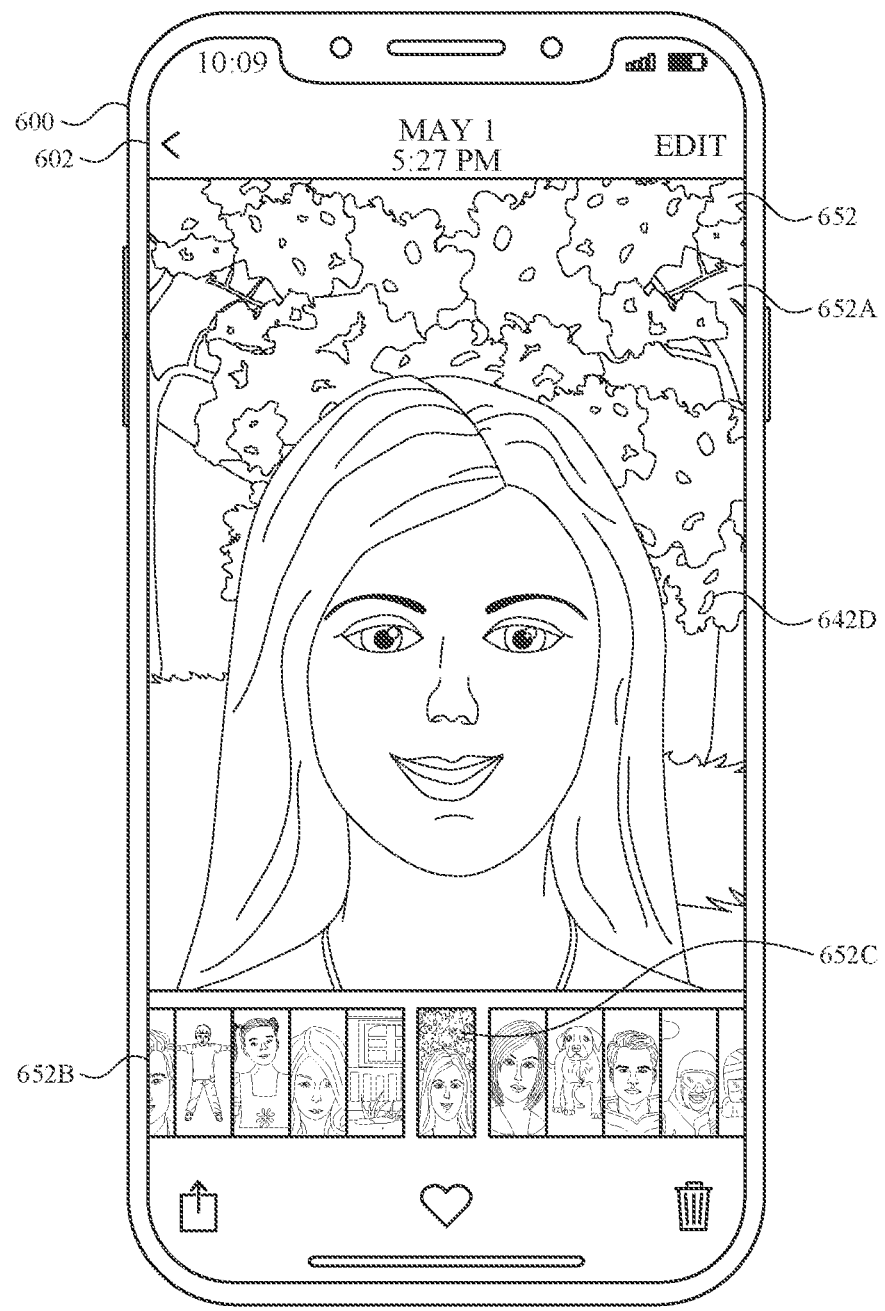

FIGS. 6K-6M illustrate an exemplary days view 640 of a media library. As shown in FIG. 6K, days view 640 includes representations (e.g., thumbnails, cropped and/or reduced-size previews) of media items from the media library from one or more time periods. In some embodiments, a days view (e.g., 640) includes a plurality of representations of media items from a particular time period of the one or more time periods. In some embodiments, the plurality of representations are grouped in the days view according to their particular time period of the one or more time periods. In some embodiments, a particular time period is a combination of two smaller time periods. For example, days view 640 in FIG. 6K includes representation 640C (including media item 615E), representation 640D (including media item 642A), and representation 640E (including media item 642B), among others, from the time period of April 18-19, 2018 as indicated by metadata 646A. In some embodiments, the particular time period is a sub-period of another time period (or of another sub-period, an example of a time period) represented (e.g., by a tile) in a different view. For example, in FIG. 6K, the media item representations displayed are from the sub-period of April 18-19, 2018, which is a sub-period of the time period of April 2018 represented by tile 626B (FIG. 6J), which is a sub-period of the time period of 2018 represented by tile 614B (FIG. 6H). In some embodiments, a days view is a level in a hierarchy of multiple views. For example, a hierarchy of views can include a years view, a months view, and a days view. Selection of a tile in a years view causes the device to display a months view, and selection of a tile in a months view causes the device to display a days view.

A days view provides an exemplary technique for providing a low-level, high-detail interface for viewing multiple individual media items in the media library from the same time period. That is, one or more of the years view or months view can be used to locate a representative media item and/or time period of interest, and focus in by navigating down through the hierarchy to the days view to a smaller time period. Alternatively, the days view can be accessed directly by selecting affordance 610C (which is shown as selected in FIG. 6K, indicating that the current view is the days view).

In some embodiments, the one or more time periods represented in the days view includes one or more days. For example, as shown in FIG. 6K, media items for Apr. 18, 2018 and Apr. 19, 2018 are grouped and presented together as April 18-19, 2018, as indicated by metadata 646A.

In some embodiments, a days view (e.g., 640) includes a curated set of media items (e.g., less than all media items available from the particular time period). For example, days view 640 includes representations of fewer than all of the media items in the media library from the dates April 18-19, 2018. For example, high-quality media-items can be selected to be part of the curated set (e.g., media items that meet one or more qualifications based on: lighting, subject matter, composition, sharpness/focus of subjects, inclusion of movement of the subject or action, or the like). In some embodiments, a days view (e.g., 640) includes an affordance (e.g., 640B) that, in response to selection, causes all media items (e.g., from a particular time period, or from the media library) to be displayed (e.g., in the days view). For example, days view 640 includes a show all affordance 640B that causes electronic device 600, in response to user input representing selection of 640B, to display the full set of media items from April 18-19, 2018 (in other words, the superset that includes the curated set and other additional media items). In some embodiments, selecting a show all affordance (e.g., 640B) in a days view causes just the full set of media items from one particular time period corresponding to the show all affordance to be displayed, and other time periods still include a respective curated set of media items. For example, if days view 640 in FIG. 6K is scrolled (e.g., vertically as shown in FIGS. 6L-6M) to reveal representative media items from time period(s) not included in April 18-19, 2018, then those time period(s) would be presented as curated sets of media items (whose full sets can be accessed by one or more respective select all affordances).

In some embodiments, a days view (e.g., 640) includes a media selection affordance (e.g., 640A) that, in response to selection, causes the device (e.g., 600) to enter a selection mode for selecting media items. For example, days view 640 includes a media selection affordance 640A that causes electronic device 600, in response to detecting user input representing selection of 640A, to enter a selection mode allowing selection of one or more of the media items in days view 640 (e.g., for sending via an electronic message, adding to an album, marking for deletion, or other operation).

In some embodiments, a days view (e.g., 640) includes an indication of a boundary between time periods. For example, days view 640 in FIG. 6K includes an indication 644 that is displayed as media items having a dimmed or darkened appearance, and indicates the boundary between the beginning of representations of media items from the time period April 18-19, 2018 and the end of representations of media items from a preceding time period (e.g., Apr. 14, 2018) that are arranged vertically above and accessible via navigation of (e.g., scrolling of) the days view. In this way, an excessive white space or other area is not needed to visually emphasize a boundary between media items that are from different time periods, saving space on a display. Further, dimming or darkening media items that are from a time period that is not the current focus of the days view visually emphasizes the media items from the time period that is the current focus of the days view, which potentially makes the interface more intuitive to a user and potentially reduces power consumption of a display (e.g., versus displaying high-brightness white space). In some embodiments, an indication of a boundary (e.g., 644) is overlaid on one or more representations of media items (e.g., from a time period that is not the current focus of the days view), and moves to remain overlaid as the representations move during navigation (e.g., are scrolled up or down). For example, when the indicator is overlaid, its position tracks movement of the position of any underlying representations of media items.

In some embodiments, a days view includes display of metadata (e.g., 646A, 646B) related to media items (e.g., from the time period that is the current focus of the days view). In some embodiments, a days view includes a banner area (e.g., 645 in FIG. 6L) that includes metadata related to media items (e.g., from the time period that is the current focus of the days view) and/or that provides separation between media items from different time periods. In some embodiments, a days view includes a separation area (e.g., 647 in FIG. 6L) that provides separation between media items of different days view time periods. For example, in FIG. 6L, a small separation area 647 is displayed between media items from two different time periods (April 18-19 and May 1-2). In some embodiments, the banner area (e.g., 645) or the separation area (e.g., 647) is partially overlaid on representations of media items from one or more time periods that are the current focus of the days view. For example, banner area 645 can be a persistent banner that includes metadata for the currently focused on time period, and navigating the days view can cause media items to scroll under the banner (e.g., until the banner is replaced with a persistent banner from a another time period, or until the metadata of the banner is updated to reflect the new current focused on time period). In some embodiments, metadata common to multiple displayed time periods (e.g., a year) is only displayed once (e.g., at the top of the display). For example, in 646A in FIG. 6L includes the year 2018, but 646B does not.

In some embodiments, an indication of a boundary (e.g., 644) is overlaid on at least a portion (e.g., all visible portions) of representations of media item(s) from a time period that is not the current focus of the current view (e.g., a days view). For example, in FIG. 6L, all visible portions of the representation of a media item from the period May 1-2, 2018 are displayed overlaid with indication 644 and thus have a dimmed/darkened appearance, and representations of media items from April 18-19, 2018 are not displayed overlaid with 644.

In some embodiments, a days view (e.g., 640) includes displayed of metadata that includes information about one or more media items or group of media items (e.g., from a time period). For example, days view 640 in FIG. 6K includes metadata 646A identifying the time period that the media items displayed (e.g., below the metadata and currently the focus of the days view) are from—April 18-19 of 2018.

In some embodiments, representations of media items in a days view (e.g., 640) can be arranged having non-uniform sizes. For example, in FIG. 6K, representation 640C is displayed the largest (e.g., is a key media item at the top of the currently focused section of the days view that includes the media items from the period April 18-19, 2018), representation 640D is displayed smaller than 640C but larger than other representations, and representation 640E is displayed smaller than both of the other two. In some embodiments, the size of a representation of a media item in a view (e.g., days view) depends on one or more factors such as dimensions of the media item, whether the media item has an important status (e.g., has been favorited by a user), whether it depicts action (e.g., for a media item that can be played back over time), whether it depicts particular individuals, the quality of the media item (e.g., composition, lighting, focus), whether it is a good representation of other media items in the time period or of an event (e.g., a picture of an entire family for a time period that includes a family vacation), and whether it is selected for automatic playback.

In some embodiments, a days view (e.g., 640) is navigable (e.g., scrollable). In some embodiments, the days view is navigable (e.g., scrollable) to display additional (e.g., not yet displayed) portions or representations of media items from the time period currently in focus. For example, in FIG. 6K, electronic device 600 receives user input 648 which is a swipe gesture in an upward direction representing a request to scroll upward. In response to receiving user input 648, electronic device 600 displays more of representation 640E of media item 642B, as shown in FIG. 6L.

In some embodiments, the days view is navigable (e.g., scrollable) to display additional (e.g., not yet displayed) representations of media items from one or more time periods (e.g., of the same time period if all representations do not fit on the display concurrently; of one or more different time periods). For example, in FIG. 6K, electronic device 600 receives user input 648 which is a swipe gesture in an upward direction representing a request to navigate the days view upward. In response to receiving user input 648, electronic device 600 scrolls days view 640 upward to display a portion of representation 640F, as shown in FIG. 6L. In this example, representation 640F is from the time period May 1-2, 2018 as indicated by metadata 646B (which also includes a location associated with the group of media items included in this time period, which is "San Jose, Calif." (which can also be written San Jose, Calif.)). As shown in FIG. 6L, the time period May 1-2, 2018 is not currently in focus in the days view 640, so representation 640F (of media item 642C) is displayed as overlaid with an indication of a boundary 644 (dimmed appearance).

In response to detecting user input 648 (in FIG. 6L) moving further in an upward direction while continuing to be detected on the touch screen display, electronic device 600 scrolls days view 640 upward to the state shown in FIG. 6M. In FIG. 6M, electronic device 600 displays additional representations of media items from the time period May 1-2, 2018 due to the scrolling navigation—representation 640G (of media item 642D) is displayed. Notably, also in response to user input 648 moving further in the upward direction, electronic device 600 displays, as shown in FIG. 6M, the representations of media items from the time period April 18-19, 2018 overlaid with an indication of a boundary 644 (dimmed appearance) because that time period is no longer currently in focus in the days view 640. Additionally, as shown in FIG. 6M, in response to detecting user input 648 moving further in the upward direction, electronic device 600 ceases to display the representations of media items from the time period May 1-2, 2018 as overlaid by an indication of a boundary 644 (dimmed appearance) because the May 1-2, 2018 time period is now currently in focus in the days view 640 due to the scrolling. In some embodiments, a time period is considered in focus if it occupies a particular location on the display (e.g., the center of the display, or the center of the days view). In some embodiments, a time period is considered in focus if an edge (e.g., top) of a representation (e.g., a first representation for the time period, such as 640F) is past (e.g., above, below) a particular location on the display (e.g., above a halfway point on the display).

As described above, a device can be used to navigate between various views of a hierarchy to view a media library at different layers of granularity and summarization (e.g., summarized by year, by month, by days, etc.). Further, it can be important to access media items in a one-up view for viewing detail of a selected media item. FIG. 6N illustrates an exemplary one-up view of a selected media item.

At FIG. 6M, electronic device 600 receives user input 650 which is a tap gesture representing selection of the representation 640G of media item 642D. At FIG. 6N, in response to receiving user input 650, electronic device 600 displays exemplary one-up view 652. One-up view 652 includes one-up area 652A that includes a large-scale view of a media item—in this example, of media item 642D selected in FIG. 6M. One-up view 652 also includes a scrubbing area 652B that can be used (e.g., via user input) to perform scrubbing through one or more adjacent media items (e.g., adjacent in the curated set of media items in the media library, or adjacent in the full set of media items in the media library) to cause display of another media item (e.g., the media item at which scrubbing ceases) in the one-up area 652A (e.g., by replacing display of media item 642D). One-up view 652 also includes area 652C that includes a representation of the media item being viewed in the one-up area 652A—in this example, media item 642D. For example, a swipe gesture within scrubbing area 652B to move another representation into area 652C would cause the corresponding media item to be displayed in area 652A.

FIG. 7 is a flow diagram illustrating a method for navigating a collection of media items using an electronic device in accordance with some embodiments. Method 700 is performed at a device (e.g., 100, 300, 500) with a display device and one or more input devices. Some operations in method 700 are, optionally, combined, the orders of some operations are, optionally, changed, and some operations are, optionally, omitted.

As described below, method 700 provides an intuitive way for navigating a collection of media items. The method reduces the cognitive burden on a user for navigating a collection of media items, thereby creating a more efficient human-machine interface. For battery-operated computing devices, enabling a user to navigate a collection of media items faster and more efficiently conserves power and increases the time between battery charges.

The electronic device (e.g., 600) receives (702), via the one or more input devices (e.g., 602), a first input (e.g., 606; selection of 610A; selection of 610B). In response to receiving the first input, the electronic device (e.g., 600) displays (704), via the display device (e.g., 602), a first view (e.g., 608, 614, 626) (e.g., years view, months view; a summarized view with less than all photos of a media library) of a collection of media items (e.g., media items in a media library) that includes multiple different media items that are associated with corresponding dates and times (e.g., plurality of years, plurality of months), including concurrently displaying a representation (e.g., 608B, 614B, 626B) (e.g., a tile that includes a representative media item) of a first time period (e.g., previous year 2018) and a representation (e.g., 608C, 614C, 626C) (e.g., tile that includes a representative media item) of a second time period (e.g., previous year 2017) that is different from the first time period.

In accordance with a determination (706) that a current time (e.g., Feb. 18, 2019) is associated with a first recurring temporal event (e.g., day of the week, day of the month, holiday, birthday, anniversary, or the like): the representation (e.g., 608B in FIG. 6B, 614B in FIG. 6D, 626B in FIG. 6J) of the first time period (e.g., 2018 for years views 608 or 614 in FIGS. 6B and 6D, April for months view 626 in FIG. 6J) includes a first region (e.g., 608B-1, 614B-1, 626B-1) that is occupied by a first representative media item (e.g., 609B, 615B, 615E) from the first time period (e.g., taken during the time period) that is selected based on the first recurring temporal event (e.g., individual's birthday, day of the year February 18 for FIG. 6D, the 18th day of the month for FIG. 6J), and the representation (e.g., 608C, 614C, 626C) of the second time period (e.g., 2017 for years views 608 or 614 in FIGS. 6B and 6D, March for months view 626 in FIG. 6J) includes a second region (e.g., 608C-1, 614C-1, 626C-1) that is occupied by a second representative media item (e.g., 609C, 615C, 615D) from the second time period (e.g., taken during the time period) that is selected based on the first recurring temporal event.

In accordance with a determination (708) that the current time (e.g., Feb. 17, 2019) is associated with a second recurring temporal event (e.g., individual's birthday in FIG. 6B), wherein the second recurring temporal event is different from the first recurring temporal event (e.g., day of the year February 18): the first region (e.g., 608B-1 in FIG. 6B) of the representation (e.g., 608B) of the first time period (e.g., 2018) is occupied by a third representative media item (e.g., 609B) from the first time period that is selected based on the second recurring temporal event (e.g., individual's birthday) and is different from the first representative media item (e.g., 615B in FIG. 6D) from the first time period, and the second region (e.g., 608C-1) of the representation (e.g., 608C) of the second time period (e.g., 2017) is occupied by a fourth representative media item (e.g., 609C) from the second time period that is selected based on the second recurring temporal event and is different from the second representative media item (e.g., 615C) from the second time period.

Selecting and displaying representative media items based on a particular recurring temporal event associated with a current time automatically provides dynamically and contextually relevant media items when displaying a collection of media items, reducing the time a user spends navigating interfaces to find such relevant media items. Performing an operation when a set of conditions has been met without requiring further user input enhances the operability of the electronic device and makes the user-device interface more efficient (e.g., by helping the user to provide proper inputs and reducing user mistakes when operating/interacting with the electronic device) which, additionally, reduces power usage and improves battery life of the device by enabling the user to use the electronic device more quickly and efficiently.

In some embodiments, a current time includes one or more of a current time of day (e.g., hour, minute) and a current date (e.g., Feb. 18, 2019). For example, the current time can be: a time of day, a date associated with the current time of day, a day of the week associated with the current time and/or date, day of the month associated with the current time or date, and/or a range of time/dates that include the current time. In some embodiments, the current time is associated with a recurring temporal event when both fall on the same day of the week, both fall on the same day of the month, or both fall on the date of a significant event (e.g., birthday, anniversary, holiday, or the like).

In some embodiments, selecting a representative media item based on a recurring temporal event includes one or more of selecting the representative media item: from a day of the week associated with the current time, from a day of the month associated with the current time, from a day of the year associated with the current time, and from a range of time/dates that include the current time (e.g., recent dates and/or times). In some embodiments, selecting a representative media item based on a recurring temporal event includes selecting the representative media item that is representative of a significant event (e.g., birthday, anniversary, holiday). In some embodiments, selecting a representative media item for a time period that includes the current time includes selecting a recent media item (e.g., the most recent media item).

In some embodiments, when the current time (e.g., Feb. 17, 2019) is associated with the second recurring temporal event (e.g., individual's birthday in FIG. 6B), the representation (e.g., 609B in FIG. 6B) of the first time period (e.g., 2018) excludes the first representative media item (e.g., 615B in FIG. 6D). In some embodiments, the first time period includes the current time (e.g., Feb. 17, 2019). For example, the first time period can be 2019 when the current time is Feb. 17, 2019.

In some embodiments, when the current time (e.g., Feb. 17, 2019) is associated with the second recurring temporal event (e.g., individual's birthday in FIG. 6B), the representation (e.g., 608C of FIG. 6B) of the second time period (e.g., 2017) excludes the second representative media item (615C of FIG. 6D).

In some embodiments, a view (e.g., years view, months view) (e.g., 608, 614, 626, 640) of a collection of media items is a graphical presentation of the collection of media items. For example, different views (e.g., 608, 614, 626, 640) of the same plurality of media items can present the media items (a portion or all of the collection) in different ways, such as having one or more different: visual arrangements of media items, organization of media items (e.g., by year, month, day, event, persons depicted, location, or the like), ordering of media items, curation of presented media items (e.g., only presenting a subset of media items), and the like.

In some embodiments, a media item (e.g., 609A-609C, 615A-615C, 628A) is selected as a representative media item based on having one or more attributes. In some embodiments, one or more attributes of a media item include one or more of the following: whether a media item has been favorited by user, media item image quality (e.g., high quality images have priority), length of a sequence of images or a video (e.g., longer media items have priority), image composition of a media item (e.g., a media item depicts a well-composed scene, such as one in which subjects are centered and visible and exposure is correct, and the like), action that occurs during the media item (e.g., movement within the image frame is prioritized over a video in which the subject remains still), and individuals depicted (e.g., the user and/or their family get priority over other persons). In some embodiments, the one or more attributes used to select the representative media item depend on the recurring temporal event that selection is based on. For example, a recurring temporal event that is an individual's birthday (e.g., as shown in FIG. 6B) will cause selection of a representative media item associated with an attribute that indicates the corresponding media item depicts that individual.

In some embodiments, the electronic device (e.g., 600) displays metadata (e.g., identifying a year, month, day, or event) (e.g., 620A and/or 620B) visually associated with (e.g., overlaid on) a representation (e.g., 614B) of a time period (e.g., 2018) (e.g., overlaid on the corresponding representative media item). For example, the text "2018" can be overlaid on a representation 614B of a time period for the year 2018, as shown in FIGS. 6D-6E.

In some embodiments, a view (e.g., first view) (e.g., 608, 614, 626) includes any number of representations (e.g., 608A-608D, 614A-614C, 626A-626C) of time periods. In some embodiments, the view (e.g., first view) (e.g., 608, 614, 626) includes a number of representations of time periods equal to the number of time periods represented by the media library. For example, if a first view is a years view and the media library includes media items from each year of 10 full years, then the first view can include 10 representations of time periods (years in this example). In some embodiments, if some time periods (e.g., years) do not include media items in the media library (e.g., are 'empty'), then representations for such time periods can be excluded from the first view (e.g., no tile displayed for a year that has no media items).

In some embodiments, the first view (e.g., 608, 614, 626) is navigable (e.g., scrollable) to display representations of time periods. For example, as shown in FIGS. 6B-6C, the exemplary first view 608 can be scrolled (e.g., vertically) to display representations of time periods, all of which are not necessarily displayed concurrently (e.g., display device displaying the view can display 3 at a time).

In some embodiments, representations of time periods in a view (e.g., first view) (e.g., 608, 614, 626) are arranged chronologically. For example, the first view can be arranged chronologically from oldest on top to newest on bottom— thus, representations of older time periods are displayed above representations for newer time periods (e.g., as shown in views 608, 614, and 626). Further, in such example, navigating up in the first view (e.g., scrolling up) causes representations of even older time periods to be displayed (if available), navigating down in the first view (e.g., scrolling down) causes representations of even newer time periods to be displayed (if available).

In some embodiments, the representation (e.g., 614B of FIG. 6D) of the first time period (e.g., 2018) includes a single representative media item (e.g., 615B) selected from the collection of media items for the first time period (e.g., 614B does not include two representative media items), and the representation (e.g., 614C of FIG. 6D) of the second time period (e.g., 2017) includes a single representative media item (e.g., 615C) selected from the collection of media items for the second time period (e.g., 614C does not include two representative media items).

In some embodiments, each single representative media item (e.g., 615A, 615B, 615C in FIG. 6D) for a corresponding representation (e.g., 614A, 614B, 614C) of a time period (e.g., 2019, 2018, 2017) occupies at least a predetermined threshold amount of its corresponding representation of a time period (e.g., at least 25%, 33%, 50%, 66%, 75%). For example, in the example shown in FIG. 6D, each media item occupies 100% of a representation of a media item (e.g., of a tile, such as 614B) (e.g., regions 614B-1 and 614C-1 occupy their entire respective tiles). In other examples, the representative media item (e.g., 615B) in a representation (e.g., 614B) of a time period can occupy less than 100%, but still at least some threshold amount such as 75%. The remaining area can include other information or content associated with the corresponding time period (e.g., one or more other media items, textual information, metadata, or the like).

In some embodiments, a respective media item (e.g., first, second, third, fourth representative media items) (e.g., 615B, 615C) from a respective time period (e.g., first, second time periods) (e.g., 2018, 2017) that is selected based on a corresponding recurring temporal event (e.g., first, second recurring temporal events) (e.g., day of the year, day of the month) is selected based on one or more of: in accordance with the corresponding recurring temporal event including a day of the year (e.g., February 18) of the current time (e.g., Feb. 18, 2019), the respective media item (e.g., 615B, 615C) being from (e.g., captured on, saved on) the day of the year (e.g., February 18) of the current time (e.g., Feb. 18, 2019); in accordance with the corresponding recurring temporal event including a day of the month (e.g., the 18th day of the month) of the current time (e.g., Feb. 18, 2019), the respective media item (e.g., 615B, 615C) being from the day of the month (e.g., the 18th day of a month) of the current time (e.g., Feb. 18, 2019); and in accordance with the corresponding recurring temporal event including a day of the week (e.g., Monday; the first day of the week) of the current time (e.g., Monday, Feb. 18, 2019), the respective media item being from the day of the week (e.g., Monday; the first day of the week) of the current time (e.g., Monday, Feb. 18, 2019).

In some embodiments, the current time (e.g., Feb. 18, 2019) is associated with the first recurring temporal event (e.g., day of the year February 18). In accordance with the first time period (e.g., 2018) and the second time period (e.g., 2017) representing different calendar years: the first recurring temporal event is a day of the year (e.g., month and day that occurs in multiple years; February 18), and the first representative media item (e.g., 615B in FIG. 6D) from the first time period (e.g., 2018) that is selected based on the first recurring temporal event is selected based on the first representative media item being from a plurality of media items from (e.g., captured on, saved on) the day of the year (e.g., February 18) from a first calendar year (e.g., 2018) represented by the first time period (e.g., 2018), and the second representative media item (e.g., 615C in FIG. 6D) from the second time period that is selected based on the first recurring temporal event is selected based on the second representative media item being from a plurality of media items from (e.g., captured on, saved on) the day of the year from a second calendar year (e.g., 2017) represented by the second time period (e.g., 2017), wherein the first calendar year and the second calendar year are different. For example, where each representation of different time periods each represents a different year (e.g., as shown in 6D), a representative media item in at least one (e.g., all) representation is selected from the same day of the year as the current time. For example, if the first time period represents the year 2018, and the day of the year of the first recurring temporal event is February 18, then the first representative media item is selected from media items from Feb. 18, 2018. For example, if the second time period represents the year 2017, and the day of the year of the first recurring temporal event is February 18, then the second representative media item is selected from media items from Feb. 18, 2017.

In some embodiments, the current time (e.g., Feb. 18, 2019) is associated with the first recurring temporal event (e.g., the 18th day of the month), and in accordance with the first time period (e.g., April 2018) and the second time period (e.g., March 2018) representing different calendar months: the first recurring temporal event is a day of the month (e.g., day that occurs each month, such as the 1st, 5th, 8th, or 21st day of the month) (e.g., the 18th day of the month), and the first representative media item (e.g., 615E in tile 626B of FIG. 6J) from the first time period (e.g., April 2018) that is selected based on the first recurring temporal event is selected based on the first representative media item being from a plurality of media items from (e.g., captured on, saved on) the day of the month (e.g., 18th day of the month) from a first calendar month (e.g., April 2018) represented by the first time period (e.g., April 2018), and the second representative media item (e.g., 615D) from the second time period that is selected based on the first recurring temporal event is selected based on the second representative media item being from a plurality of media items from (e.g., captured on, saved on) the day of the month (e.g., 18th day of the month) from a second calendar month (e.g., March 2018) represented by the second time period (e.g., March 2018), wherein the first calendar month and the second calendar month are different. For example, where each representation of different time periods each represents a different month (e.g., as shown in FIG. 6J), a representative media item in at least one (e.g., all) representation is selected from the same day of the month as the current time. For example, if the first time period represents the month of April 2018, and the day of the month of the first recurring temporal event is the 18th day of the month, then the first representative media item is selected from media items from Apr. 18, 2018. For example, if the second time period represents the month of March 2018, and the day of the month of the first recurring temporal event is the 18th day of the month, then the second representative media item is selected from media items from Mar. 18, 2018. In some embodiments, the first calendar month (e.g., April) and the second calendar month (e.g., March) are from the same calendar year (e.g., 2018). In some embodiments, the first calendar month and the second calendar month are from different calendar years (e.g., December 2017 and January 2018).

In some embodiments, the current time (e.g., Feb. 18, 2019) is associated with the first recurring temporal event, and the first recurring temporal event is a significant event (e.g., a significant personal event) that occurs at the current time, and the first representative media item (e.g., 609B in FIG. 6B) from the first time period (e.g., 2018) that is selected based on the first recurring temporal event (e.g., user's daughter's birthday on February 17th) is selected based on one or more characteristics of the significant event, and the second representative media item (e.g., 609C in FIG. 6B) from the second time period (e.g., 2017) that is selected based on the first recurring temporal event is selected based on one or more characteristics of the significant event.

In some embodiments, a significant event is a holiday. In some embodiments, a significant event is a birthday (e.g., of the user, or another individual (person) associated with the user such as a member of the user's family), an anniversary (e.g., a wedding anniversary between the user and their spouse), or the like. In some embodiments, a significant event is determined based on a calendar entry (e.g., defined by the user) associated with the device or associated with a user account that is associated with the device. In some embodiments, a significant event is determined based on information stored regarding one or more individuals (e.g., a birthday saved in contact information). For example, a media item is selected as a representative media item for a corresponding time period if the media item represents the significant event well. In some embodiments, the significant event is associated with one or more characteristics that are used to select a representative media item. In some embodiments, characteristics are used based on what a media items depicts (e.g., family members, a particular person, a Christmas tree). For example, a significant event can be a holiday such as Christmas, and a representative media item can be selected based on a family characteristic (e.g., whether it depicts the user's family) (e.g., because the user takes many pictures with their family each year during Christmas), and/or based on a holiday-related characteristic (e.g., whether it depicts a Christmas tree). As another example, a birthday of a particular person (e.g., user's daughter) causes media items that include the particular person (e.g., and the device user) as representative media items.

In some embodiments, the significant event is a holiday, and the first representative media item (e.g., 615B) that is selected based on the one or more characteristics of the significant event is selected based on the first representative media item being a media item from the first time period that is representative of the one or more characteristics of the holiday, and the second representative media item (e.g., 615C) that is selected based on the one or more characteristics of the significant event is selected based on the second representative media item being a media item from the second time period that is representative of the one or more characteristics of the holiday. In some embodiments, a media item that matches one or more of those characteristics (e.g., that best matches) is selected as a representative media item for a corresponding time period. For example, the holiday of "Christmas" can be associated with the characteristic "tree" (e.g., a Christmas tree), and thus a picture that includes a depiction of a Christmas tree can be selected based on the picture including such tree (e.g., determined based on analysis of the image by one or more image recognition algorithms). For further example, the holiday of Christmas can further be associated with the characteristic "family." Thus, a picture depicting members of the user's family standing in front of a Christmas tree can be selected as the representative media item (e.g., selected instead of a picture of just a tree, and other pictures) based on it being associated with two characteristics (e.g., depicts a tree, depicts a user's family). In some embodiments, the first time period includes the significant event, and the second time period does not. For example, the first time period can be December, and the significant event can be Christmas (e.g., which is included in December). In such example, a second time period can be November (e.g., in a months view), which does not include the Christmas holiday, but the second representative media item for the second time period can still be selected based on the one or more characteristics of the significant event. For example, a media item from November that depicts the user's family can be selected based on the holiday Christmas being associated with a "family" characteristic.

In some embodiments, the significant event is an anniversary (e.g., wedding anniversary) for a first individual (e.g., the user) and a second individual (e.g., user's spouse), and the first representative media item that is selected based on the one or more characteristics of the significant event is selected based on the first representative media item being a media item from the first time period that depicts the first individual and the second individual (e.g., the first individual and the second individual are identified in the one or more characteristics), and the second representative media item that is selected based on the one or more characteristics of the significant event is selected based on the second representative media item being a media item from the second time period that depicts the first individual and the second individual. In some embodiments, a media item for a corresponding time period is selected based on quality or rating metrics (e.g., metrics used to determine whether the media item is a good photograph or a photograph that the user has indicated is a good or important media item, such as whether the first individual and the second individual are prominently featured in the media item, whether there are a large number of other faces detected in the media item). For example, a media item that prominently features the first and second individuals together without a large number of other faces can be selected over other media items that don't have such features.

Selecting and displaying representative media items based on an anniversary between two individuals based on the media item depicting the two individuals automatically provides dynamically and contextually relevant media items when displaying a collection of media items, reducing the time a user spends navigating interfaces to find such relevant media items. Performing an operation when a set of conditions has been met without requiring further user input enhances the operability of the electronic device and makes the user-device interface more efficient (e.g., by helping the user to provide proper inputs and reducing user mistakes when operating/interacting with the electronic device) which, additionally, reduces power usage and improves battery life of the device by enabling the user to use the electronic device more quickly and efficiently.

In some embodiments, the significant event is a birthday of a third individual (e.g., the user, or another individual) (e.g., user's daughter as discussed with respect to FIGS. 6B-6C), and the first representative media item (e.g., 609B in FIG. 6B) that is selected based on the one or more characteristics of the significant event (e.g., user's daughter's birthday) is selected based on the first representative media item being a media item from the first time period (e.g., 2018) that depicts the third individual (e.g., the third individual is identified in the one or more characteristics), and the second representative media item (e.g., 609C) that is selected based on the one or more characteristics of the significant event is selected based on the second representative media item being a media item from the second time period (e.g., 2017) that depicts the third individual. In some embodiments, a representative media item selected based on the one or more characteristics (e.g., depicts a third individual) of the significant event is from a particular corresponding time period (e.g., first time period, or second time period), but is not necessarily from the same day of the year, day of the month, day of the week (or the like) as the current time. For example, in the case of the birthday of the third individual, a representative media item for a previous year 2018 can be a good picture of the third individual from 2018 but not necessarily be from the same day of the year (e.g., February 17) as the current time (e.g., the third individual's birthday) (e.g., current time is Feb. 17, 2019 and representative media item is from Mar. 27, 2018). Similarly, a representative media item for a month tile can be the best picture of the third individual from that month, and does not necessarily need to be from the same day of the month as the current time (e.g., the third individual's birthday) (e.g., current time is Feb. 17, 2019 and representative media item for a tile representing March 2018 is from Mar. 27, 2018). In some embodiments, the media item (e.g., 609A, 609B, 609C) is selected based on quality or rating metrics (e.g., metrics used to determine whether the media item is a good photograph or a photograph that the user has indicated is a good or important media item, such as whether the third individual is prominently featured in the media item, whether there are a large number of other faces detected in the media item. For example, a media item that prominently features the third individual without a large number of other faces can be selected over other media items that don't have such features.

In some embodiments, in accordance with the third individual being a significant individual, the birthday of the third individual is a significant event; and in accordance with the third individual not being a significant individual, then the birthday of the third individual is not a significant event. In some embodiments, the user is a significant individual. In some embodiments, criteria for whether an individual is a significant individual includes one or more of: whether the individual is marked as a favorite individual (e.g., by the user), whether the individual is a close family member (e.g., child of the user, spouse of the user, parent of the user, sibling of the user), whether the media library of the user includes more than a threshold amount of media items that depict that individual (e.g., the user has a high number of pictures of the individual). For example, a birthday of a third individual is a significant event if the third individual is the user's child. As another example, an individual that is a casual acquaintance would not qualify as a significant individual, and thus their birthday would not be considered a significant event, even if the user's account or device was aware of the acquaintance's birthday; in the case of the casual acquaintance's birthday (not a significant event), if no significant event was associated with the current time that includes the acquaintance's birthday, then another recurring temporal event can be used (to select representative media items) such as a day of the year (for a year view) or a day of the month (for a month view). Similarly, in the case of an anniversary, the anniversary can be considered a significant event if one or more (or all of) of the individuals (whose anniversary it is) is considered a significant individual.

Selecting and displaying representative media items based on an individual's birthday based on the media item depicting the individual automatically provides dynamically and contextually relevant media items when displaying a collection of media items, reducing the time a user spends navigating interfaces to find such relevant media items. Performing an operation when a set of conditions has been met without requiring further user input enhances the operability of the electronic device and makes the user-device interface more efficient (e.g., by helping the user to provide proper inputs and reducing user mistakes when operating/ interacting with the electronic device) which, additionally, reduces power usage and improves battery life of the device by enabling the user to use the electronic device more quickly and efficiently.)

In some embodiments, in accordance with a determination that the current time is associated with the first recurring temporal event: the first representative media item (e.g., 615B in FIG. 6D) that is selected based on the first recurring temporal event (e.g., day of the year February 18th) is selected based on the first representative media item being a media item from a particular day (e.g., the same day of the year, same day of the month, or same day of the week as the current time) (e.g., day of the year February 18th) within the first time period (e.g., 2018), and the second representative media item (e.g., 615C in FIG. 6D) that is selected based on the first recurring temporal event is selected based on the second representative media item being a media item from a particular day (e.g., the same day of the year, same day of the month, or same day of the week as the current time) (e.g., day of the year February 18th) within the second time period (e.g., 2017). For example, where the first representative media item is selected to represent the entire year (e.g., upon initial display of a year view) for a previous year 2018, then the first representative media item is from the same day of the year in 2018 as the current time. As another example, if the first representative media item is selected to represent a month (e.g., in a months view, or horizontally scrolling through months in a years view tile), then the first representative media item is from the same day of the month as the current time.

In some embodiments, in accordance with a determination that the current time is associated with the second recurring temporal event (e.g., user's daughter's birthday) (and, optionally, not associated with the first recurring temporal event): the third representative media item (e.g., 609B in FIG. 6B) that is selected based on the second recurring temporal event is selected based on the third representative media item being a media item from the first time period (e.g., 2018) and without a requirement that the third representative media item is from a particular day (e.g., February 17) within the first time period (e.g., the same day of the year, same day of the month, or same day of the week as the current time), and the fourth representative media item (e.g., 609C in FIGS. 6B-6C) that is selected based on the second recurring temporal event is selected based on the fourth representative media item being a media item from the second time period (e.g., 2017) and without a requirement that the fourth representative media item is from a particular day (e.g., February 17) within the second time period (e.g., the same day of the year, same day of the month, or same day of the week as the current time). For example, where the third representative media item is selected to represent the entire year (e.g., upon initial display of a year view) for a previous year 2018, then the third representative media item is selected from the year 2018, but is not necessarily selected from the same day of the year in 2018 as the current time (Feb. 17, 2019). For example, if the second recurring temporal event is a significant event, such as a birthday of an individual, a high quality media item (e.g., a portrait photograph) of that individual from 2018 can be selected that is not necessarily from the day of the individual's birthday in 2018 (e.g., because the media library might not include any for that particular birthday, but a user would still want to see a good picture of that person over the years). As another example, if the third representative media item is selected to represent a month (e.g., in a months view, or horizontally scrolling through months in a years view tile), then the third representative media item is from the month it represents, but not necessarily the same day of the month as the current time.

In some embodiments, a single recurring temporal event is selected to be associated with the current time. For example, a significant event recurring temporal event can take priority over a day of the year/month/week recurring temporal event; thus, a significant event is used to select representative media items if it exists for the current time, otherwise a day of the year/month/week recurring temporal event is used when no significant event exists for the current time.

In some embodiments, the electronic device (e.g., 600) receives, via the one or more input devices, a second input (e.g., 616 in FIG. 6E). In response to receiving the second input: in accordance with a determination that a duration of the second input exceeds a threshold duration (e.g., is a press and hold gesture), and in accordance with a determination that the second input corresponds to a location of the representation (e.g., 614B of FIG. 6E) of the first time period, the electronic device displays, via the display device, information (e.g., 620B) (e.g., a month) related to the first time period (e.g., 2018 in FIG. 6E) (e.g., a year). In some embodiments, the information is displayed visually associated with (e.g., overlaid on, displayed just below or above) the first representation (e.g., 614B in FIG. 6E). In some embodiments, the information identifies an event and/or time period that includes less than all of the first time period. For example, if the first time period is a calendar year (e.g., 2018), the information displayed in response to a press and hold can be a month (e.g., the particular month from 2018 that the currently displayed representative media item is from). In some embodiments, in accordance with a determination that a duration of the second input does not exceed the threshold duration (e.g., is a tap gesture), and in accordance with a determination that the second input corresponds to a location of the representation of the first time period, the electronic device (e.g., 600) displays, via the display device, a different view (e.g., months view such as 626 in FIG. 6J) (e.g., months view or a days view, different from the current first view that is a years view) than the current view (e.g., 614 in FIG. 6D). In some embodiments, the second input is received at a location of the representation (e.g., 614C of FIG. 6D) of the second time period (e.g., 2017). In some embodiments, in accordance with a determination that the duration of the second input exceeds the threshold duration (e.g., is a press and hold gesture), and in accordance with a determination that the second input corresponds to a location of the representation of the second time period, the electronic device displays, via the display device, information (e.g., a month) related to the second time period (e.g., 2017 in FIG. 6D) (e.g., a year). In some embodiments, the second input is received at a location associated with any representation of any time period in the first view and, in response, the electronic device (e.g., 600) displays information visually associated with the selected representation related to the corresponding time period of the selected representation.

Providing access to information related to the first time period in response to user input allow a user to access information without cluttering the display before such information is needed (e.g., requested). Providing additional control options without cluttering the UI with additional displayed items enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the determination that the duration of the second input (e.g., 616 in FIG. 6E) exceeds the threshold duration (e.g., is a press and hold gesture), and in accordance with the determination that the second input corresponds to the location of the representation (e.g., 614B) of the first time period (e.g., 2018), the electronic device (e.g., 600) reduces the size of the representation of the first time period. For example, in response to receiving input 616, representation 614B is reduced in size in FIG. 6E (e.g., compared to FIG. 6D before input 616). In some embodiments, the representation (e.g., 614B) remains at a reduced size for as long as the input is detected (e.g., until lift off of the contact of 616). In some embodiments, the representation reduces in size temporarily and then returns to normal size (e.g., bounces back without requiring lift off).

Reducing the size of a representation provides feedback about the state of a device (e.g., that a press and hold gesture has been detected) and that the device is ready to perform another operation in response to a further manipulation of the input (e.g., horizontal swipe to navigate sub-periods). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the first representative media item (e.g., 614B in FIG. 6E) is displayed in the first region (e.g., 614B-1), wherein the first representative media item is from a first sub-period (e.g., February 2018) included within the first time period (e.g., 2018) (e.g., first representative media item is from February 2018, which is a sub-period of the year 2018): the electronic device (e.g., 600) receives, via the one or more input devices, a third input (e.g., 616; movement of 616). In response to receiving the third input: in accordance with a determination that the third input (e.g., a swipe; a press and hold that is dragged) includes movement in a first direction (e.g., left or right) (e.g., 616 moves to the right as shown in FIG. 6F), and in accordance with a determination that the third input corresponds to (e.g., starts at) a location of the representation (e.g., 614B) of the first time period, the electronic device (e.g., 600) navigates through a plurality of sub-periods (e.g., the calendar months of 2018) included within the first time period including replacing display of, via the display device, the first representative media item (e.g., 615B in FIG. 6E) from the first sub-period (February 2018) in the first region with display of a fifth representative media item (e.g., 615D in FIG. 6F) from the first time period (e.g., 2018) (e.g., replacing first representative media item from a first month with a representative media item from a different month) that is selected based on the first recurring temporal event (e.g., day of the year February 18 that includes the current date) (e.g., the same significant event, such as a birthday or anniversary, as the first representative media item) or a third recurring temporal event (e.g., different than the first recurring temporal event) (e.g., day of the month that includes the current date) (e.g., 18th day of the month) related to the first recurring temporal event, wherein the fifth representative media item is from a second sub-period (e.g., March 2018 as shown in FIG. 6F) included within the first time period that is different from the first sub-period (e.g., the fifth representative media item is from a second sub-period (e.g., March) that is adjacent to the first sub-period (e.g., February), which are both sub-periods of the first time period (e.g., the year 2018)). For example, in response to receiving an input 616 (e.g., an exemplary third input) that is a press and hold that is dragged horizontally (e.g., to the right, an exemplary first direction) on a representation of the year 2018, the electronic device (e.g., 600) navigates through one or more of a plurality of sub-periods included within the time period associated with the location of the received input (e.g., the first time period in the case of the third input), wherein navigating through the one or more plurality of sub-periods includes replacing display of a displayed representative media item for one sub-period from the time period with a representative media item from another sub-period from the time period. In some embodiments, navigating includes scrolling (e.g., continuously) through representative media items corresponding to sub-periods. For example, while the third input continues to be detected (e.g., has not been lifted off a touch-sensitive surface), the electronic device (e.g., 600) can scroll through (e.g., replacing display of) representative media items of sub-periods continuously (e.g., stopping on each for a predetermined amount of time, such as one second), until the third input ceases to be detected.

Navigating through representative media items from sub-periods of a first time period within a region of a representation of the first time period allows the user to easily and logically navigate through a collection of media items in predictable and logical increments while displaying previews of underlying content, thereby reducing the number of inputs needed to navigate the collection to find media items. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a recurring temporal event (e.g., the first recurring temporal event) is related to another recurring temporal event (e.g., the third recurring temporal event) based on representing a day that includes the current time with respect to different time intervals. For example, an exemplary first recurring temporal event can represent a day of the year February 18 and be related to an exemplary third recurring temporal event that represents a day of the month that is the 18th day of the month because both include the current time, Feb. 18, 2019. In some embodiments, whether the first recurring temporal event is used or the third recurring temporal event is used to select the fifth representative media item (e.g., 615D in FIG. 6F) depends on whether the first recurring temporal event is associated with a significant event. For example, if the first recurring temporal event is a signification event (e.g., birthday) associated with a person characteristic, then the person characteristic of the significant event can also be used to select a media item that depicts the person from within the appropriate sub-period (e.g., March 2018). If the first recurring temporal event is a day of the year/month/week, then moving down the hierarchy of views means that the related third recurring temporal event should be used. For example, when scrolling through representative media items for months, media items from each month are needed, and thus a day of month recurring event is used instead of a day of the year recurring event; however, the day of the year and the day of the month are related in that they both include the current date. In some embodiments, the representations of time periods (e.g., 614A-614C) are navigable (e.g., scrollable) along an axis (e.g., vertically), and the third input is in a direction different than the axis (e.g., not in a direction along the axis, substantially perpendicular to the vertical axis, horizontally) (e.g., horizontally to the right as shown in FIG. 6F).

In some embodiments, one or more representations of other time periods (e.g., time periods that do not correspond to the location of the third input) continue to be displayed (e.g., unchanged in response to the third input) while navigating through sub-periods of the first time period (e.g., in FIG. 6F, tiles 614A and 614C remain unchanged in response to user input 616). For example, in response to a press and hold that is dragged horizontally on a representation of the year 2018 (e.g., an exemplary third input), the electronic device (e.g., 600) replaces the representative media item displayed in the first region from being a representative media item from a first month (e.g., an exemplary first sub-period) with a representative media item from a second month (e.g., an exemplary second sub-period); however, representations for the years 2017 and 2019 can remain displayed and unchanged (as shown in FIG. 6F).

In some embodiments, the third input (e.g., 616) is a press and hold gesture that is dragged in the first direction (e.g., to the right as shown in FIGS. 6E-6F) while contact is maintained with the one or more input devices. In some embodiments, the electronic device (e.g., 600) navigates (e.g., scrolls) in a first direction (e.g., to the right) in response to the third input including movement in the first direction. In some embodiments, the device scrolls in a second direction (e.g., opposite the first; to the left) in response to the third input including movement in the second direction.

In some embodiments, while the third input (e.g., 616) including the movement in the first direction (e.g., to the right) continues to be detected (e.g., contact on the input device(s) is continuously maintained without lift off) (e.g., as shown in FIG. 6F): the electronic device (e.g., 600) continues to navigate through the plurality of sub-periods included within the first time period including replacing display of, via the display device, the fifth representative media item (e.g., 615D in FIG. 6F) in the first region with display of a sixth representative media item (e.g., 615E in FIG. 6G) from the first time period (e.g., 2018) that is selected based on the first recurring temporal event (e.g., the same significant event, such as a birthday or anniversary) or the third recurring temporal event (e.g., day of the month that includes the current date, where the first recurring temporal event is a day of the year that includes the current date), wherein the sixth representative media item is from a third sub-period (e.g., April 2018) included within the first time period (e.g., 2018) that is different from the first sub-period (e.g., February) and from the second sub-period (e.g., March) (e.g., fifth representative media item is from March, which gets replaced with sixth representative media item which is from April). For example, in response to an input 616 including movement that continues to be detected, electronic device 600 continues navigating sub-periods (months) of the year 2018 which includes replacing the currently displayed representative media item from a sub-period with the next sub-period's representative media item as shown in FIGS. 6F-6G. In some embodiments, a representative media item for a sub-period is maintained (e.g., displayed in the first region) for a predetermined amount of time. For example, a media item 615E can be displayed in the first region for 1 second before the continuing to navigate causes it to be replaced with another media item. In some embodiments, the speed of continuous navigation (e.g., the length of the predetermined amount of time that a sub-period representation is maintained) (e.g., of replacing display of representative media items) depends on a characteristic of the movement (e.g., amount/amplitude in a particular direction, speed of movement). In some embodiments, the electronic device (e.g., 600) performs circular scrolling through the sub-periods (e.g., scrolls through each month individually between January and December, then begins again at January and repeats, so longs as the movement associated with the input is maintained). In some embodiments, while navigating through the plurality of sub-periods, the electronic device (e.g., 600) outputs, via one or more tactile output devices (e.g., 167, 357), a tactile output (e.g., 622) in conjunction with (e.g., contemporaneous in time with) replacing display of any representative media item (e.g., 615D in FIG. 6F) from a sub-period of the plurality of sub-periods with another representative media item (e.g., 615E in FIG. 6G) from another sub-period of the plurality of sub-periods.

Outputting a tactile output as navigation between sub-period representative media items occurs provides improved feedback to the user while holding a navigation gesture by revealing the internal state of the device to the user and that the device has responded to user input. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while a representative media item (e.g., 615E in FIG. 6G) from a fourth sub-period (e.g., April 2018) of the plurality of sub-periods (e.g., months of 2018) other than the first sub-period (e.g., February 2018) is displayed in the first region (e.g., 614B-1 in FIG. 6G) (e.g., a representative media item different than the original representative media item is currently displayed as the representative media item): in accordance with a determination that the third input (e.g., 616) is no longer detected (e.g., lift off from the one or more input devices): the electronic device (e.g., 600) ceases to navigate through the plurality of sub-periods (e.g., months) included within the first time period (e.g., 2018), and maintains (e.g., after determining that the third input is no longer detected, after detecting lift off of the third input), in the first region (e.g., 614B-1 in FIG. 6H), display of the representative media item (e.g., 615E in FIG. 6H) from the fourth sub-period of the plurality of sub-periods other than the first sub-period (e.g., February 2018) is displayed in the first region. In some embodiments, an input (e.g., 624 in FIG. 6H) representing selection (e.g., a tap) of the representative media item (e.g., 615E in FIG. 6H) displayed upon ceasing to navigate causes the device to display a second view (e.g., 626 in FIGS. 6I-6J) of the collection of media items that includes concurrently displayed representations (e.g., 626A, 626B, and 626C) of a plurality of representative media items (e.g., 628A, 615E, and 615D) for a plurality of the two or more sub-periods (e.g., March 2018, April 2018, and May 2018 as shown in FIG. 6J) (e.g., changes from a years view to a months view). In some embodiments, the selected representative media item (e.g., 615E in FIG. 6H) is included in the initial display of the second view (e.g., 615E in FIG. 6J) (e.g., centered, displayed first or prominently). For example, selecting a representation (e.g., 614B in FIG. 6H) of a year (e.g., 2018) causes the device to display a month representation (e.g., 626B in FIG. 6J) with the same representative media item (e.g., 615E) as that which was displayed in the selected representation of the year. For further example, the month representation can be one of a plurality of month tiles from the year that are displayed in response to the selection (e.g., multiple months from 2018 are displayed in response, as shown in FIG. 6J).

Maintaining display of a representative media item from a sub-period in accordance with the third input no longer being detected provides a quick way to switch between representative media items for different sub-periods with a smaller number of inputs. Reducing the number of inputs needed to perform an operation enhances the operability of the electronic device and makes the user-device interface more efficient (e.g., by helping the user to provide proper inputs and reducing user mistakes when operating/interacting with the electronic device) which, additionally, reduces power usage and improves battery life of the device by enabling the user to use the electronic device more quickly and efficiently.

In some embodiments, the current time (e.g., Feb. 17, 2019) is associated with the first recurring temporal event (e.g., user's daughter's birthday). The electronic device (e.g., 600) receives, via the one or more input devices, a fourth input (e.g., 613)(e.g., an upward swipe, a downward swipe) that includes movement in a second direction (e.g., downward) (e.g., a vertical direction, different from the first direction) (e.g., substantially perpendicular to a sub-period navigation direction). In response to receiving the fourth input, navigating (e.g., scrolling) the first view (e.g., 608 in FIGS. 6B-6C) of the collection of media items to display, via the display device, one or more other representations (e.g., 608D in FIG. 6C) of one or more respective other time periods (e.g., 2016) different from the first time period (e.g., 2018) and from the second time period (e.g., 2017), wherein each of the one or more other representations of the one or more respective other time periods includes a respective region (e.g., 608D-1) that is occupied by a respective representative media item (e.g., 609D) from the respective other time period (e.g., 2016), the respective representative media item selected based on the first recurring temporal event (e.g., user's daughter's birthday).

In some embodiments, the first view (e.g., 614, 626) organizes the collection of media items using a first time-based grouping (e.g., media is presented grouped by year), and while displaying the first view of the collection of media items, the electronic device (e.g., 600) receives, via the one or more input devices, a fifth input (e.g., 624, 630) (e.g., a tap) that corresponds to selection of the representation (e.g., 614B, 626B) of the first time period (e.g., 2018, April 2018). In response to receiving the fifth input: in accordance with the first view representing a first level in a hierarchy of views (e.g., Years in the hierarchy of Years-Months-Days) (e.g., first view is years view 614), the electronic device (e.g., 600) displays, via the display device, a second view (e.g., 626) (e.g., changes from a years view to a months view) of the collection of media items that includes multiple different media items that are associated with corresponding dates and times, wherein the second view is different from the first view (e.g., 614), and wherein the second view presents the collection of media items organized by a second time-based grouping (e.g., media is presented grouped by month in 626); and in accordance with the first view representing a second level in a hierarchy of views (e.g., Months in the hierarchy of Years-Months-Days) (e.g., first view is months view 626) that is different than the first level, displaying, via the display device, a third view (e.g., days view 640) (e.g., changes from a months view to a days view) of the collection of media items that includes multiple different media items that are associated with corresponding dates and times, wherein the third view is different from the first view and the second view, and wherein the third view presents the collection of media items organized by a third time-based grouping (e.g., media is presented grouped by one or more days). In some embodiments, a time-based grouping is based on a time increment (e.g., year, month, week, day, or the like)

Displaying views of a collection of media items that are arranged in a hierarchy, each with a different time-based grouping, based on whether a selection is made at a particular level of the hierarchy, allows a user to step through logical presentations of media items automatically, depending on a current view's level, in response to selection of a representation of time period. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the current time (e.g., Feb. 18, 2019) is associated with the first recurring temporal event (e.g., day of the year February 18) (e.g., day of the week, day of the month, holiday, birthday, anniversary, etc.), and wherein displaying the second view (e.g., months view 626) comprises: concurrently displaying a representation (e.g., 626B in FIG. 6J) of a third time period (e.g., April 2018) and a representation (e.g., 626C of FIG. 6J) of a fourth time period (e.g., March 2018) that is different from the third time period, including: the representation of the third time period includes a third region (e.g., 626B-1) that is occupied by a seventh representative media item (e.g., 615E) from the third time period (e.g., taken during the time period) that is selected based on the first recurring temporal event (e.g., the same significant event, such as a birthday or anniversary) or a fourth recurring temporal event (e.g., day of the month of the 18th day of the month) (e.g., day of the month) related to the first recurring temporal event (e.g., February 18) (e.g., day of the year) (e.g., selected based on the date associated with the current time (current date, holiday, birthday, anniversary), day of the week associated with the current time, day of the month associated with the current time, a range of time/dates that include the current time), wherein the third time period is a sub-period included within the first time period (e.g., 2018); and the representation of the fourth time period includes a fourth region (e.g., 626C-1) that is occupied by an eighth representative media item (e.g., 615D) from the fourth time period (e.g., taken during the time period) that is selected based on the first recurring temporal event (e.g., the same significant event, such as a birthday or anniversary) or the fourth recurring temporal event related to the first recurring temporal event, wherein the fourth time period is a sub-period included within the first time period. In some embodiments, a recurring temporal event (e.g., the first recurring temporal event) is related to another recurring temporal event (e.g., the fourth recurring temporal event) based on representing a day that includes the current time with respect to different time intervals. For example, an exemplary first recurring temporal event can represent a day of the year February 18 and be related to an exemplary fourth recurring temporal event that represents a day of the month that is the 18th day of the month because both include the current time, Feb. 18, 2019. In some embodiments, whether the first recurring temporal event is used or the fourth temporal event is used to select the seventh and eighth representative media items (and, optionally, other representations in the second view) depends on whether the first recurring temporal event is associated with a significant event. For example, if the first recurring temporal event is a birthday associated with a person characteristic, then the person characteristic can be used to select a media item that depicts the person from within the appropriate time period. If the first recurring temporal event is a day of the year/month/week, then moving down the hierarchy of views means that the related fourth recurring temporal event should be used (e.g., in a months view, media items for each month are needed, and thus a day of month recurring event is used instead of a day of the year recurring event; however, the day of the year and the day of the month are related in that they both include the current date). In some embodiments, the second view includes any number of representations of time periods. In some embodiments, the second view includes a number of representations of time periods equal to the number of time periods represented by the media library. For example, if a second view is a months view and the media library includes media items from each month (e.g., 12 per year) of exactly 10 full years, then the second view can include 120 (e.g., 10 multiplied by 12) representations of time periods (months in this example). In some embodiments, if some months do not include media, then a representations for such months can be excluded from the second view. In some embodiments, the second view is navigable (e.g., scrollable) to display representations of time periods. For example, the second view can be scrolled (e.g., vertically) to display representations (e.g., of more months), all of which are not necessarily displayed concurrently (e.g., display device can display 3 at a time).

In some embodiments, in accordance with a determination that the fifth input (e.g., 624 in FIG. 6H) (e.g., corresponding to selection of the representation of the first time period) is received while the seventh representative media item (e.g., 615E) is displayed (e.g., alone) in the first region (e.g., 614B-1) of the representation (e.g., 614B) of the first time period (e.g., 2018) in the first view (e.g., 614 in FIG. 6H), the representation (e.g., 626B in FIG. 6J) of the third time period (e.g., April 2018) (e.g., that includes the seventh representation occupying the third region) is displayed at a first location (e.g., a central location, a visually emphasized location, or a location that is otherwise a visual focus of the second view) in the second view (e.g., tile 626B with media item 615E is displayed centered in months view 626 in FIG. 6J); and in accordance with a determination that the fifth input is received while the eighth representative media item (e.g., 615D) is displayed (e.g., alone) in the first region of the representation of the first time period in the first view, the representation of the fourth time period (e.g., 626C in FIG. 6J) (e.g., that includes the eighth representation occupying the fourth region) is displayed at the first location (e.g., instead of the representation of the third time period) in the second view (e.g., if 615D is displayed in tile 614B as shown in FIG. 6F when input 624 was received, then tile 626C in FIG. 6J would be displayed in the center of view 626 in FIG. 6J). For example, the month corresponding to the representative media item that is displayed in the region of a representation of a year when the representation of the year is selected (e.g., tapped) is the month that is displayed (e.g., a representation thereof) centered on the display in response to selection of the representation of the year (and moving from the years view to the months view in a hierarchy of views).

In some embodiments, the representations (e.g., 626A, 626B, 626C) of time periods in the second view (e.g., 626 in FIG. 6J) are smaller than representations (e.g., 614A, 614B, 614C) of time periods in the first view (e.g., 614 in FIG. 6H). For example, the representations in view 614 that each represent a year are larger than representations in view 626 that each represent a month. The size of a representation of a time period can provide an intuitive visual indication of the current view (e.g., level in the hierarchy of views). In some embodiments, in response to selection (e.g., via input 624) of a representation (e.g., 614B in FIG. 6H) of a time period in the first view causes representations (e.g., 626A, 626C) of time periods that are sub-periods of the selected time period to animatedly emerge from the selected representation (e.g., to display the second view) (e.g., as shown in FIGS. 6I-6J). For example, upon selection of a representation of a year, individual representations of the months of that particular year can appear to be created and/or emerge from the location of the selected year representation, which can provide a visual indication that the device is moving down a hierarchy of related views.

Displaying a representation of a time period that is a sub-period of another time period when a representation of the other time period is selected, and including the same representative media item, provides the user with feedback regarding the navigation operation. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying a representation of a time period that is a sub-period of another time period when a representation of the other time period is selected, and including the same representative media item, maintains the context of the user and thus reduces the number of inputs needed to navigate to a desired sub-period after moving between levels of a hierarchy of views. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the current time (e.g., Feb. 18, 2019) is associated with the first recurring temporal event (e.g., 18th day of the month) (e.g., day of the week, day of the month, holiday, birthday, anniversary, etc.), and wherein displaying the third view (e.g., days view 640 in FIG. 6K) comprises: displaying, via the display devices, a plurality of representations (e.g., 640C, 640B, 640D) of media items (e.g., 615E, 642A, 642B) from the first time period (e.g., April 2018) (e.g., fewer than all (e.g., a curated set) from the first time period, or all photos from the first time period).

In some embodiments, while displaying the plurality of representations (e.g., 640C, 640B, and 640C in FIG. 6K) of media items from the first time period (e.g., April 2018), the electronic device (e.g., 600) receives, via the one or more input devices, a sixth input (e.g., 648 in FIG. 6K) (e.g., a swipe, a scroll). In response to receiving the sixth input, the electronic device (e.g., 600) updates the third view (e.g., days view 640 scrolls as shown in FIGS. 6K-6M) of the collection of media items, including: transitioning the plurality of representations of media items from the first time period off of the display (e.g., 640C and 640B are no longer displayed in FIG. 6M) (e.g., scrolling, sliding, covering up, fading to black, ceasing to display); and displaying a plurality of representations (e.g., 640F and 640G in FIG. 6M) of media items (e.g., 642C, 642D) from the second time period (e.g., May 2018 in FIG. 6M) (e.g., swipe to reveal the media items from the unselected, adjacent days/events). In some embodiments, media items are arranged chronologically in the third view. For example, the third view (e.g., days view 640) can be arranged chronologically from oldest on top to newest on bottom, such that scrolling up to display representations of media items from the second time period means that the second time period precedes the first time period chronologically.

In some embodiments, while displaying the plurality of representations of media items (e.g., 640F, 640G in FIG. 6M) from the first time period (e.g., May 2018) in the third view (e.g., 640 in FIG. 6M), the electronic device (e.g., 600) receives, via the one or more input devices, a seventh input (e.g., 650 in FIG. 6M) (e.g., a tap) that corresponds to selection of a media item (e.g., 642D) of the plurality of representations of media items from the first time period. In response to receiving the seventh input, the electronic device (e.g., 600) replaces display of, via the display device, the third view (e.g., 640 in FIG. 6M) with display of a one-up view (e.g., 652 in FIG. 6N) of the selected media item (e.g., 642D) of the plurality of representations of media items from the first time period. In some embodiments, a one-up view includes an area (e.g., 652A) that includes a representation of a media item (e.g., 642D in FIG. 6N) displayed having larger dimensions than other representations concurrently displayed (e.g., in 652B) and/or larger dimensions than prior to being selected in another view (e.g., as displayed in representation 640G in days view 640 in FIG. 6M). In some embodiments, the area (e.g., 652A) occupies at least a threshold amount of display area (e.g., at least 75% of the display area). In some embodiments, a one-up view (e.g., 652) includes a scrubbing region (e.g., 652B) (e.g., outside of the area 652A) that includes representations of a plurality of media items from the media library (e.g., media items that are adjacent in the media library to the media item in the area 652A). In some embodiments, the representations in the scrubbing region are displayed at a smaller size than the representation in the area (e.g., 652A). In some embodiments, electronic device receives input (e.g., a directional gesture, a tap) (e.g., in scrubbing region 652B) and in response navigates between media items (e.g., changes which media item is displayed within the area 652A). The input can be a gesture (e.g., a directional swipe in the area; a tap or directional swipe in the scrubbing region).

In some embodiments, at a subsequent current time (e.g., Feb. 19, 2019) that is subsequent to the current time (e.g., Feb. 18, 2019): subsequent to receiving the first input (e.g., 606), the electronic device (e.g., 600) receives, via the one or more input devices, an eighth input (e.g., another input like 606). In response to receiving the eighth input, the electronic device (e.g., 600) displays, via the display device, the first view (e.g., a years view like 608 or 614, a months view like 626; a summarized view with less than all photos of a media library) of the collection of media items that are associated with corresponding dates and times (e.g., plurality of years, plurality of months), including concurrently displaying the representation (e.g., 614B) of the first time period (e.g., 2108) and the representation (e.g., 614C) of the second time period (e.g., 2017) that is different from the first time period, including: in accordance with a determination that the subsequent time is associated with a fifth recurring temporal event (e.g., day of the year February 19) (e.g., day of the week, day of the month, holiday, birthday, anniversary, etc.) that is different from the first recurring temporal event (e.g., day of the year February 18) and the second recurring temporal event (e.g., user's daughter's birthday February 17): the first region (e.g., 614B-1) of the representation of the first time period is occupied by a ninth representative media item from the first time period (e.g., taken during the time period) that is selected based on the fifth recurring temporal event (e.g., selected based on the date associated with the current time (current date, holiday, birthday, anniversary), day of the week associated with the current time, day of the month associated with the current time, a range of time/dates that include the current time); and the second region (e.g., 614C-1) of the representation of the second time period is occupied by a tenth representative media item from the second time period (e.g., taken during the time period) that is selected based on the fifth recurring temporal event. For example, entering years view 614 on a different day subsequent to Feb. 18, 2019 causes the same representations for the years 2018 and 2017 to be displayed, but with representative media items selected based a different recurring temporal event based on the subsequent date. In some embodiments, the first view is displayed at any number of times, having representative media items selected based on any number of recurring temporal events. For example, the electronic device (e.g., 600) can display the first view a successive number of occurrences (e.g., a different times), each occurrence including representative media items occupying the regions in respective representations of time periods (e.g., first time period, second time period, and so on) selected based on a different recurring temporal event associated with each occurrence. In some embodiments, a recurring temporal event can be used again. For example, in a subsequent year (e.g., 2020) on the same day of the year as the current date (Feb. 18, 2019), a day of the year (e.g., February 18) recurring temporal event can be used again to select representative media items—but the first view can include a representation for an additional year since last used.

Displaying a first view at different times that results in selection and display of different representative media items for the same time periods based on different particular recurring temporal events automatically provides dynamically and contextually relevant media items when viewing a collection of media items, reducing the burden of navigating through the collection to find such relevant media items. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below. For example, method 900 optionally includes one or more of the characteristics of the various methods described above with reference to method 700. For brevity, these details are not repeated below.

FIGS. 8A-8Q illustrate exemplary user interfaces for navigating a collection of media items, in accordance with some embodiments. The user interfaces in these figures are used to illustrate the processes described below, including the processes in FIG. 9.

FIGS. 8A-8D illustrate automatic playback of content in one view of a media library, but not in another view of the media library. FIG. 8A illustrates days view 640, which includes representation 640F of media item 642C from the time period May 1-2, 2018. At FIG. 8A, electronic device 600 receives user input 802 which is a swipe gesture in a downward direction representing a request to navigate days view 640 downward.

Figure 8B:
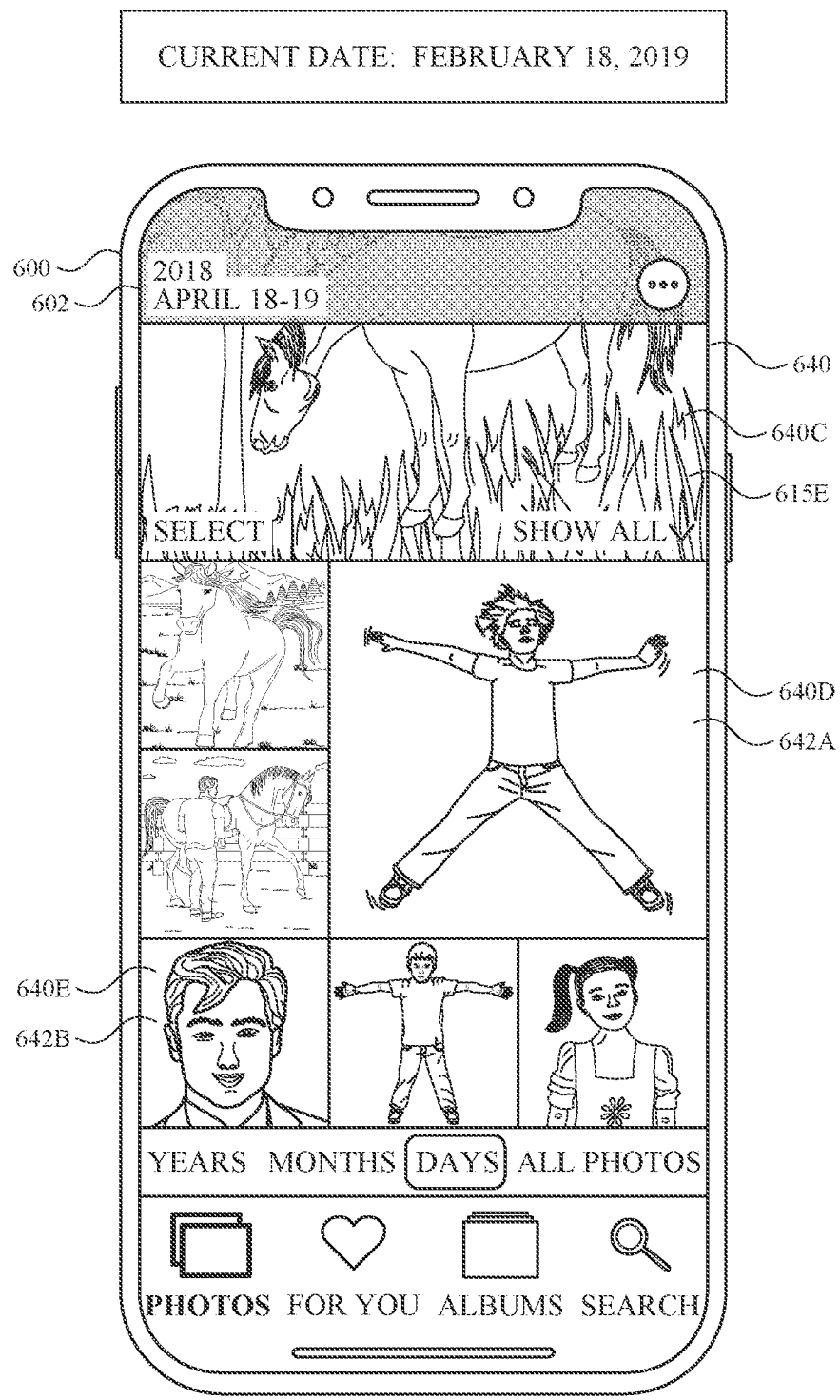

FIG. 8B illustrates days view 640 after a navigation operation (e.g., at a different scroll position than FIG. 8A). In this example, days view 640 is displayed as shown in FIG. 8B in response to receiving user input 802 at FIG. 8A. In FIG. 8B, representations of media items from the time period April 18-19, 2018 are now displayed, including representation 640C of media item 615E, representation 640D of media item 642A, and representation 640E of media item 642B. In some embodiments, a view (e.g., days view 640) automatically plays back content over time. In this example, media item 615E and media item 642A are associated with (e.g., include) content that can be played back over time. In some embodiments, content that can be played back over time is a video or a sequence of images (e.g., an animated media item). In FIG. 8B, media items 615E and 642A are displayed at a first time, and at a first state in their playback. Notably, representation 640E of media item 642B is also associated with content that can be played back over time.

Figure 8C:
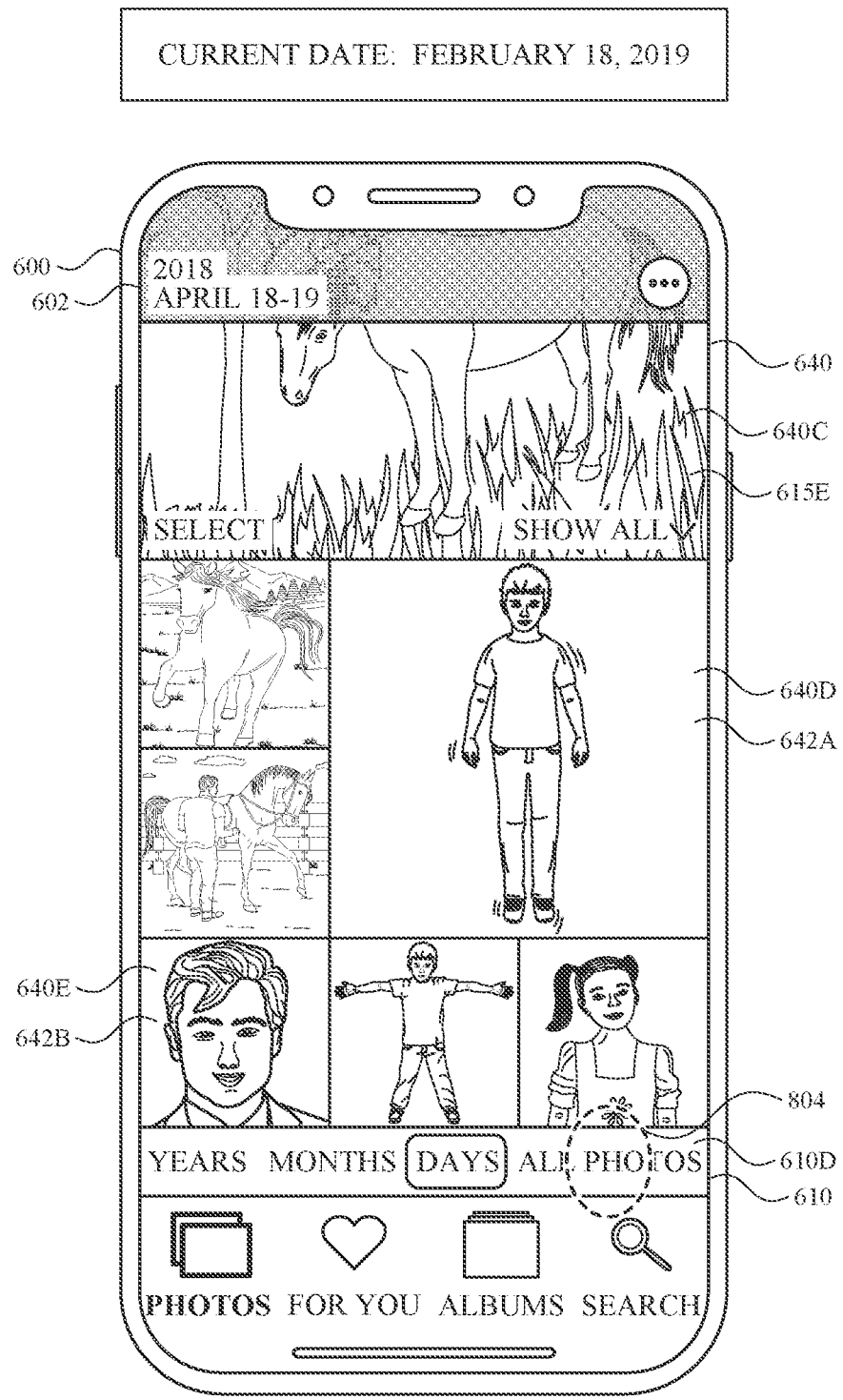

FIG. 8C illustrates days view 640 at a second time, different than the first time of FIG. 8B. In this example, the second time is subsequent to the first time. As shown in FIG. 8C, representation 640C of media item 615E has changed—the horse in the image has moved its head—due to electronic device 600 automatically playing back the content associated with media item 615E (e.g., a sequence of images) over time. Likewise, representation 640D of media item 642A has changed—the child is now in a standing position and no longer is jumping with arms and legs extended from his sides—due to electronic device 600 automatically playing back the content associated with media item 642A (e.g., a sequence of images) over time.

In some embodiments, automatic playback of a media item's content depends on a scrolling position of the representation of the media item. In some embodiments, automatic playback of the content begins based on the corresponding representation being displayed at a threshold location. For example, in FIG. 8A, representations 640C and 640D are not displayed, and in FIGS. 8B and 8C electronic device 600 has scrolled days view 640 downward to reveal representations 640C and 640D. While scrolling, for example, the content in representations 640C and 640D may not initially begin automatic playback upon first being displayed (e.g., entering view from the top of display 602), but begin playing upon reaching or crossing a threshold location (e.g., entering the middle 80% of the display area). In some embodiments, automatic playback of the content ceases based on the corresponding representation no longer being displayed at a threshold location. For further example, representations 640C and 640D can cease automatically playing back in response to continued scrolling that causes the representations to cross or exit a threshold location (e.g., exiting the middle 80% of the display area).

In some embodiments, an electronic device (e.g., 600) automatically plays back content in fewer than all of the representations associated with content that can be played back over time. For example, in FIG. 8C, representation 640E of media item 642B has not changed from FIG. 8B. In this example, media item 642B is associated with content that can be played back over time (e.g., a video), but has not been played back over time automatically in FIGS. 8B-8C.

In some embodiments, representations of media items that include content that is automatically played back are displayed at a larger size than representations of content that are not selected for automatic playback. For example, in days view 640 in FIGS. 8B and 8C, representations 640C and 640D (played back automatically) are displayed at a larger size than representation 640E (not played back automatically) as well as larger than the other representations (e.g., which are not associated with content that can be played back over time). In some embodiments, a representation of content selected for automatic playback is displayed larger (e.g., than one or more other representations) based on the representation being selected for automatic playback. For example, representations 640C and 640D can be displayed larger because they are selected for automatic playback. In some embodiments, a representation is selected for automatic playback based on the representation being displayed larger. For example, representations that have been selected to be displayed larger (e.g., based on other considerations, such as because it has been favorited by a user previously) are selected (and/or prioritized over other representations) because they are displayed larger. Thus, important and/or high-quality representations are selected for automatic playback, and are displayed larger for emphasis and improved viewing experience.

In some embodiments, the electronic device (e.g., 600) concurrently displays two or more representations of media items automatically playing back content over time. For example, in FIGS. 8B to 8C, electronic device 600 has concurrently played back content in representations 640C and 640D (e.g., between the first time and the second time). In some embodiments, the electronic device (e.g., 600) concurrently displays no more than a maximum number of representations automatically playing back content over time. In the example shown in FIGS. 8B and 8C, the maximum number of representations that are played back over time automatically is two. Thus, the reason that representation 640E (which is associated with content that can be played back over time) is not played back automatically can be because representations 640C and 640D are playing back. In another example, if representation 640E were not being played back over time, representation 640C can be selected for playback concurrently with 640D. In this way, an electronic device automatically plays back content in up to a select number of representations, so as to automatically enhance the media library viewing experience without overwhelming device resources and a user with a high number of concurrently-moving representations.

In some embodiments, play back of content from two or more media items is concurrent (e.g., they play back at the same time). In some embodiments, play back of content from two or more media items is sequential (e.g., they play back one at a time). In some embodiments, play back of content of a media item repeats automatically (e.g., loops the content playback). In some embodiments, play back of content of a media item does not repeat (or repeats only a predetermined number of times) (e.g., plays back once then stops automatically playing back, without further input).

In some embodiments, an electronic device (e.g., 600) that displays a view (e.g., 640) selects the content to be automatically played back. In some embodiments, one or more remote devices (e.g., a server, a cloud-based service) selects the content to be automatically played back. In some embodiments, a combination of the displaying electronic device and one or more remote devices selects the content to be automatically played back.

At FIG. 8C, electronic device 600 receives user input 804 representing selection of affordance 610D in ribbon 610. Affordance 610D is associated with an all photos view.

Figure 8D:
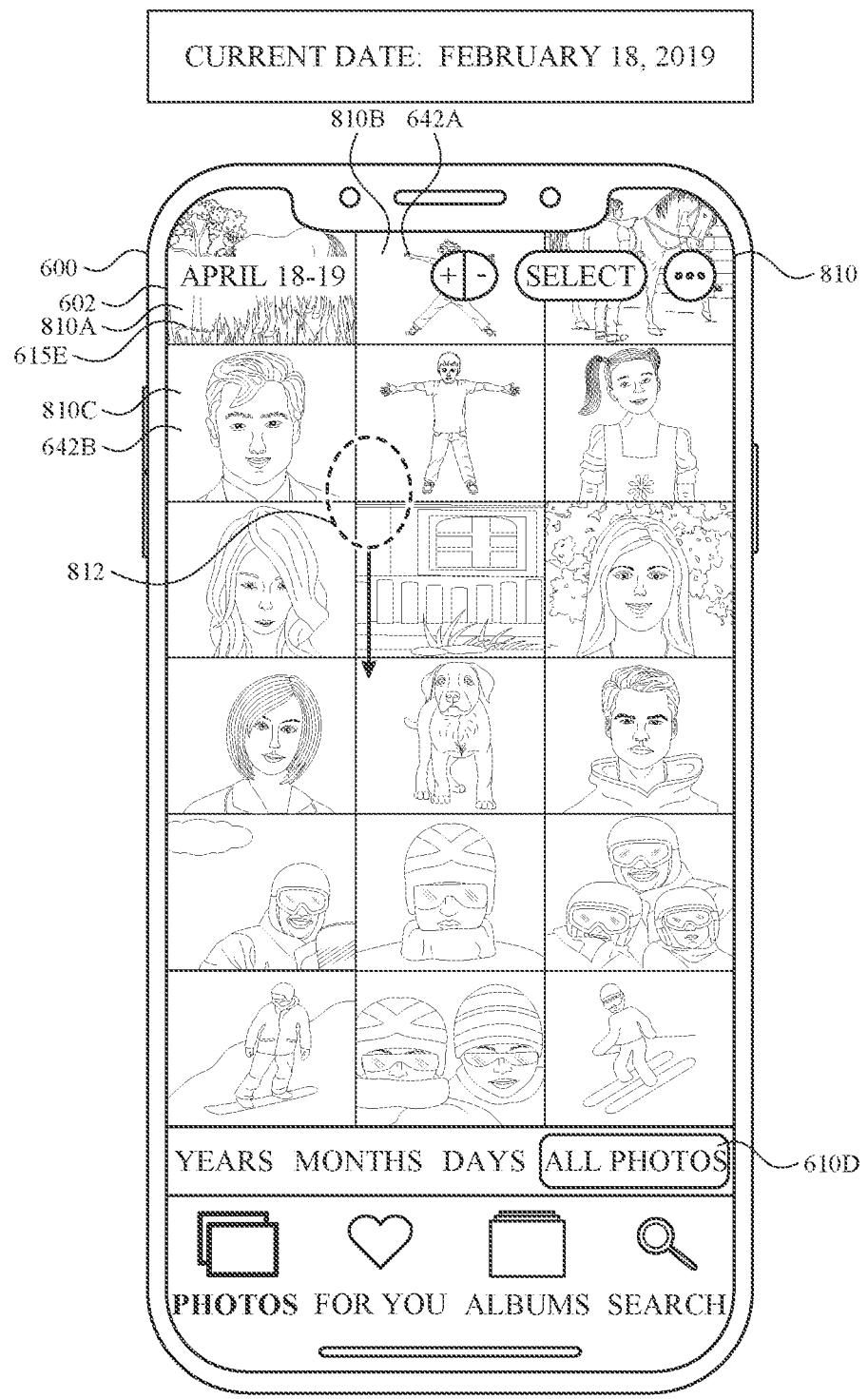

FIG. 8D illustrates an exemplary all photos view 810. For example, electronic device 600 displays all photos view 810 in response to user input 804. As shown in FIG. 8D, affordance 610D indicates the current view is an all photos view (e.g., as indicated by the text "All Photos"). In some embodiments, an all photos view (e.g., 810) includes representations of a non-curated set of media items from a media library (e.g., all media items from the media library). For example, days view 640 can include representations of a curated set of media items from the time period April 18-19, 2018 (e.g., a selected number of fewer than all of the media items from those days), and all photos view can include representations of a non-curated set of the media items from the time period April 18-19, 2018 (e.g., all of the media items from those days). For example, in FIG. 8E, all photos view includes a representation 810G of a media item that was not depicted in the days view 640.

In some embodiments, representations of media items in a days view are arranged chronologically. In some embodiments, the chronological arrangement in a days view is based on times that media items were captured (e.g., by an imaging device, represented in metadata of the media item) (e.g., rather than when the media item was added to the media library).

In some embodiments, representations of media items in an all photos view are arranged chronologically. In some embodiments, the chronological arrangement is based on times that media items were added to the media library. For example, a media item that includes metadata indicating that it was captured on Jan. 1, 2014, but was added to (e.g., saved to) the media library on Dec. 1, 2016 would be chronologically ordered using the Dec. 1, 2016 date. This can occur, for example, where a media item is saved at a date later than its captured date because a copy of the media item was received from another user who captured it previously—thus, the time when the media item is added does not necessarily coincide with the time that the media item was captured, which would be substantially similar when an electronic device both captures the media item and stores it to the media library (e.g., immediately thereafter). In such example, representations of media items in the all photos view would be arranged such that a given representation would have been added to the media library after an adjacent representation in one direction (e.g., a neighboring representation to the left, in the case of a left to right ascending date arrangement) and before another adjacent representation in the opposite direction (e.g., a neighboring representation to the right, in the case of a left to right ascending date arrangement). In some embodiments, the chronological arrangement is based on times that media items were captured. In some embodiments, an all photos view is arranged non-chronologically. In some embodiments, media items for different time periods are grouped into a combined time period and presented as if they were from a single time period (e.g., April 18-19, 2018).

In some embodiments, media items from first time period are grouped (e.g., in a days view, in an all photos view) with media items of a second time period (e.g., adjacent to the first time period) if one or more of the first time period and the second time period do not include more than a threshold amount of media items. In some embodiments, time periods for a plurality of time periods (e.g., adjacent to each other) are grouped until the combined group includes more than a threshold amount of media items. For example, media items from Apr. 18, 2018 and Apr. 19, 2018 are grouped together into the combined time period April 18-19, 2018 (even though they represent separate days) in exemplary days view 640 in FIG. 8B. In some embodiments, representations of media items are arranged grouped by time period (e.g., April 18-19, 2018) but not displayed strictly chronologically (e.g., layout is optimized for presentation of important items) within those groups (e.g., the left to right, top to bottom order of media items in 640 at FIG. 8B is different than the left to right, top to bottom order of media items in 810 in FIG. 8E). In some embodiments, a days view (e.g., 640) and an all photos view (e.g., 810) are arranged differently. For example, in a days view (e.g., 640), representations of media items are arranged grouped by time period (e.g., April 18-19, 2018) but not displayed strictly chronologically (e.g., layout is optimized for presentation of important items) within those groups, whereas an all photos view (e.g., 810) can have all of the media items arranged chronologically (e.g., the order that representations are presented corresponds to the actual chronology used to arrange). For example, in all photos view 810, time and date for a given representation always ascends (e.g., is more recent) when moving to the right and/or down, in the case of a left to right and top to bottom ascending date arrangement, but this is not necessarily true for view 640.

In some embodiments, representations in an all photos view (e.g., 810) are displayed as a multi-column multi-row array (e.g., a grid). In some embodiments, representations in an all photos view (e.g., 810) are displayed at a uniform size. For example, as shown in FIG. 8D, the representations of media items (e.g., 810A, 810B, 810C) are displayed at a uniform size in a grid (e.g., each having the same width and/or each having the same height).

In some embodiments, an all photos view includes metadata. For example, in FIG. 8E, the dates April 18-19 are displayed at the top. In some embodiments, the displayed metadata indicates corresponds to the media items at a particular location on the display. For example, in FIG. 8E, the metadata April 18-19 corresponds to the media items closest to the top edge of the display. In some embodiments, metadata is displayed based on zoom level. For example, electronic device 600 can forgo displaying metadata if a zoom level is too high (e.g., zoomed in) and/or too low (e.g., zoomed out, as in FIGS. 8F-8G).

Figure 8E:
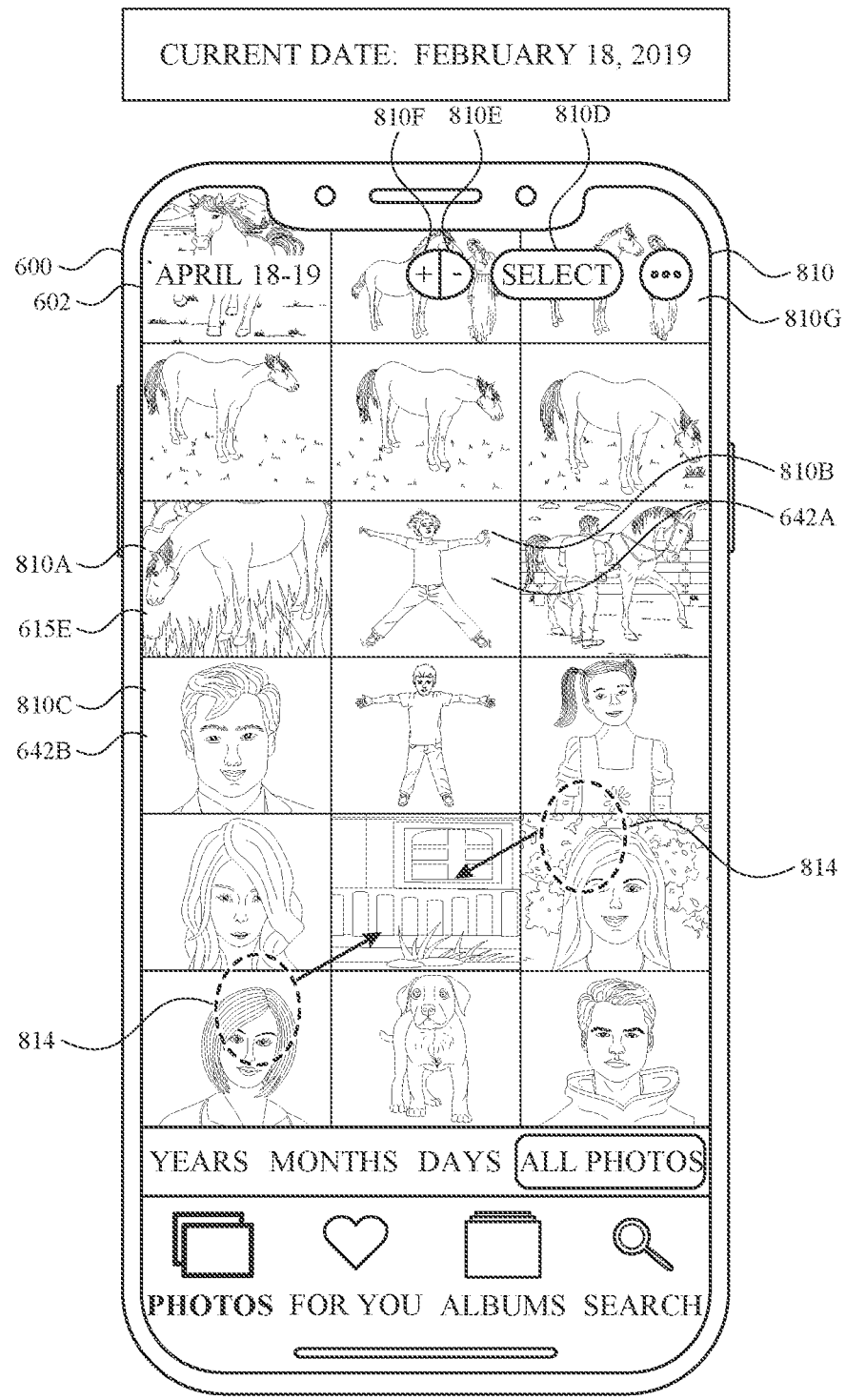

FIGS. 8D-8E illustrate scrolling of an all photos view. In some embodiments, an all photos view (e.g., 810) is navigable (e.g., scrollable). At FIG. 8D, electronic device 600 receives user input 812 which is a vertical downward swipe gesture representing a request to scroll all photos view 810.

At FIG. 8E, electronic device 600 has scrolled all photos view 810 in response to user input 812. In some embodiments, an all photos view is navigable (e.g., scrollable) to display representations of an entire media library. For example, all photos view 810 can be continually scrolled (e.g., vertically) to display a representation of each of the media items that are included in the media library—that is, a user can navigate through their entire media library in the all photos view.

In some embodiments, an all photos view (e.g., 810) includes a media selection affordance (e.g., 810D) that, in response to selection, causes the device (e.g., 600) to enter a selection mode for selecting media items. For example, all photos view 810 in FIG. 8E includes a media selection affordance 810D that causes electronic device 600, in response to user input representing selection of 810D, to enter a selection mode allowing selection of one or more of the media items in all photos view 810 (e.g., for sending via an electronic message, adding to an album, marking for deletion, or other operation).

FIGS. 8E-8I illustrate adjusting a zoom level of an all photos view. In some embodiments, an electronic device (e.g., 600) adjusts a zoom level of an all photos view in response to receiving user input. For example, in FIG. 8E, electronic device 600 receives user input 814 which is a two-contact pinch gesture representing a request to zoom out. An all photos view can be initially displayed (e.g., a default display at a default zoom level) (e.g., in response to selection of 610D) at any level of zoom (e.g., in a multi-column multi-row array having any number of columns and/or rows).

Figure 8F:
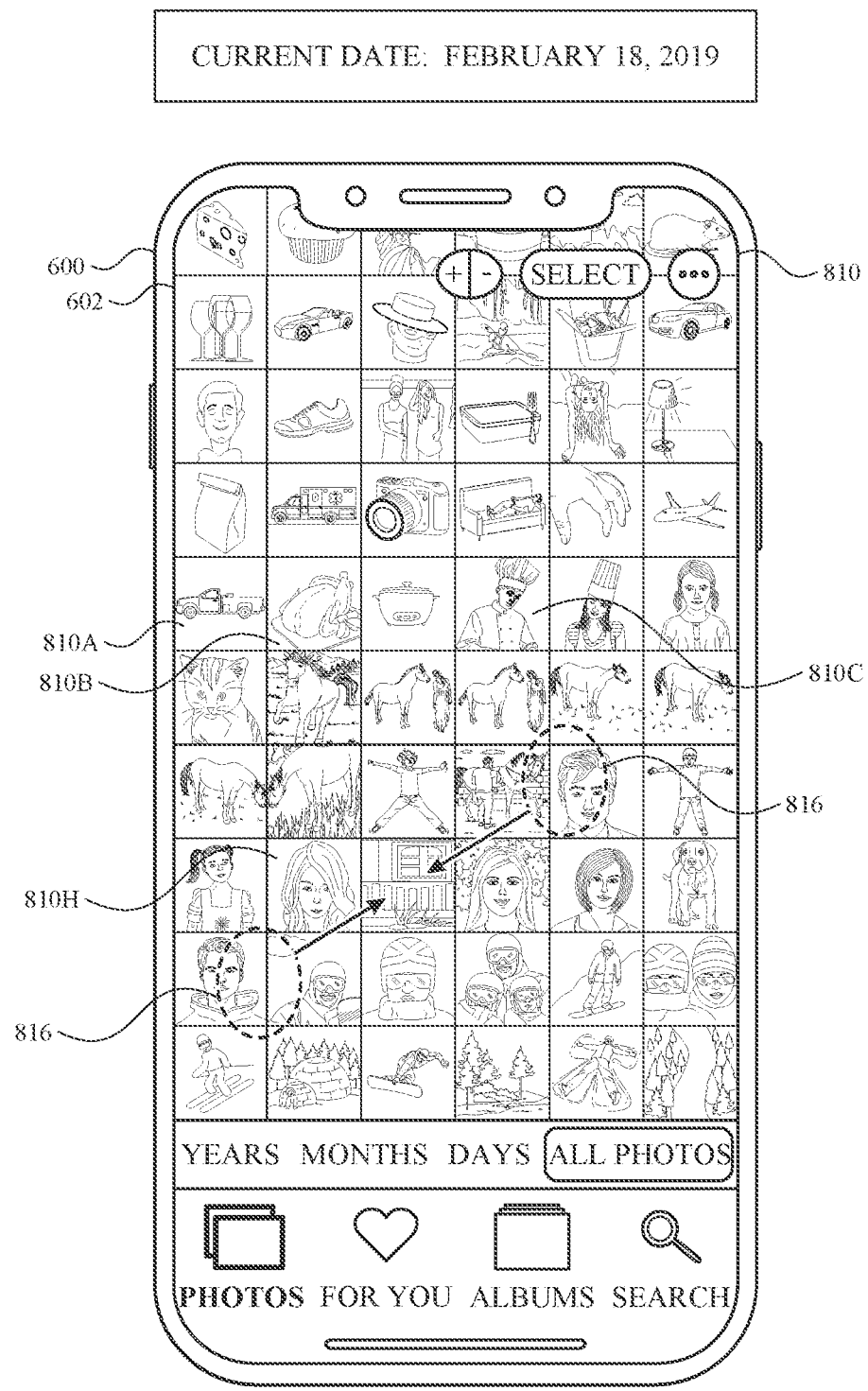

FIG. 8F illustrates all photos view 810 after having zoomed out. In response to receiving user input 814 in FIG. 8E, electronic device 600 has zoomed out all photos view 810 as shown in FIG. 8F. In some embodiments, zooming (e.g., in or out) an all photos view includes re-arranging representations of media items. In some embodiments, re-arranging representations of media items includes changing one or more spacing dimensions (e.g., horizontal width, vertical height). For example, in FIG. 8E, all photos view 810 included an array having three columns of media items (e.g., along the short axis of electronic device 600), and in FIG. 8F zooming out included changing the number of columns to six (e.g., number of representations went up, the width of each media item went down). For further example, in FIG. 8E, all photos view 810 included an array having six rows of media items (e.g., along the long axis of electronic device 600), and in FIG. 8F zooming out included changing the number of rows to ten (e.g., number of representations went up, the height of each media item went down). In some embodiments, changing the one or more spacing dimensions includes changing one or more dimensions of the representations of media items arranged within the view. For example, representations (e.g., 810A, 810B, 810C) of media items from FIG. 8E have been made smaller in both height and width. In some embodiments, re-arranging representations of media items includes changing layout positioning of representations of media items. For example, media items in all photos view 810 in FIG. 8E that were not displayed in the same row are now displayed in the same row in FIG. 8F after zooming out—thus, the relative layout of media items has changed due to the grid dimensions changing and the constraint of maintaining chronological order of the media items. Notably, zooming out of all photos view 810 in FIG. 8F has revealed new representations of media items (e.g., representation 810H of FIG. 8F). In some embodiments, to zoom out, the representations shown in all photos view 810 of FIG. 8F are selected based on a location of user input 814 of FIG. 8E. In response to receiving user input 814, electronic device 600 determines a location based on user input 814 (e.g., identifies a location directly between the two touch inputs) and a representation corresponding to the location (e.g., displayed at that identified location or closest representation to the identified location). The device identifies a region on the display at FIG. 8E at which the representation corresponding to the identified location is being displayed. When updating to display all photos view 810 of FIG. 8F, electronic device 600 arranges the representations such that the representation corresponding to the identified location is displayed at an updated region on the display, such that the updated region is a subset of the original region. As a result, the device anchors the representation corresponding to the identified location, enabling the user to more easily locate representations on the display and to maintain continuity when viewing representations.

In some embodiments, a request to zoom an all photos view is received as a user input selection associated with an affordance. For example, affordance 810E of FIG. 8E can be selected to cause all photos view 810 to be zoomed out. As another example, affordance 810F of FIG. 8E can be selected to cause all photos view 810 to be zoomed in.

Figure 8G:
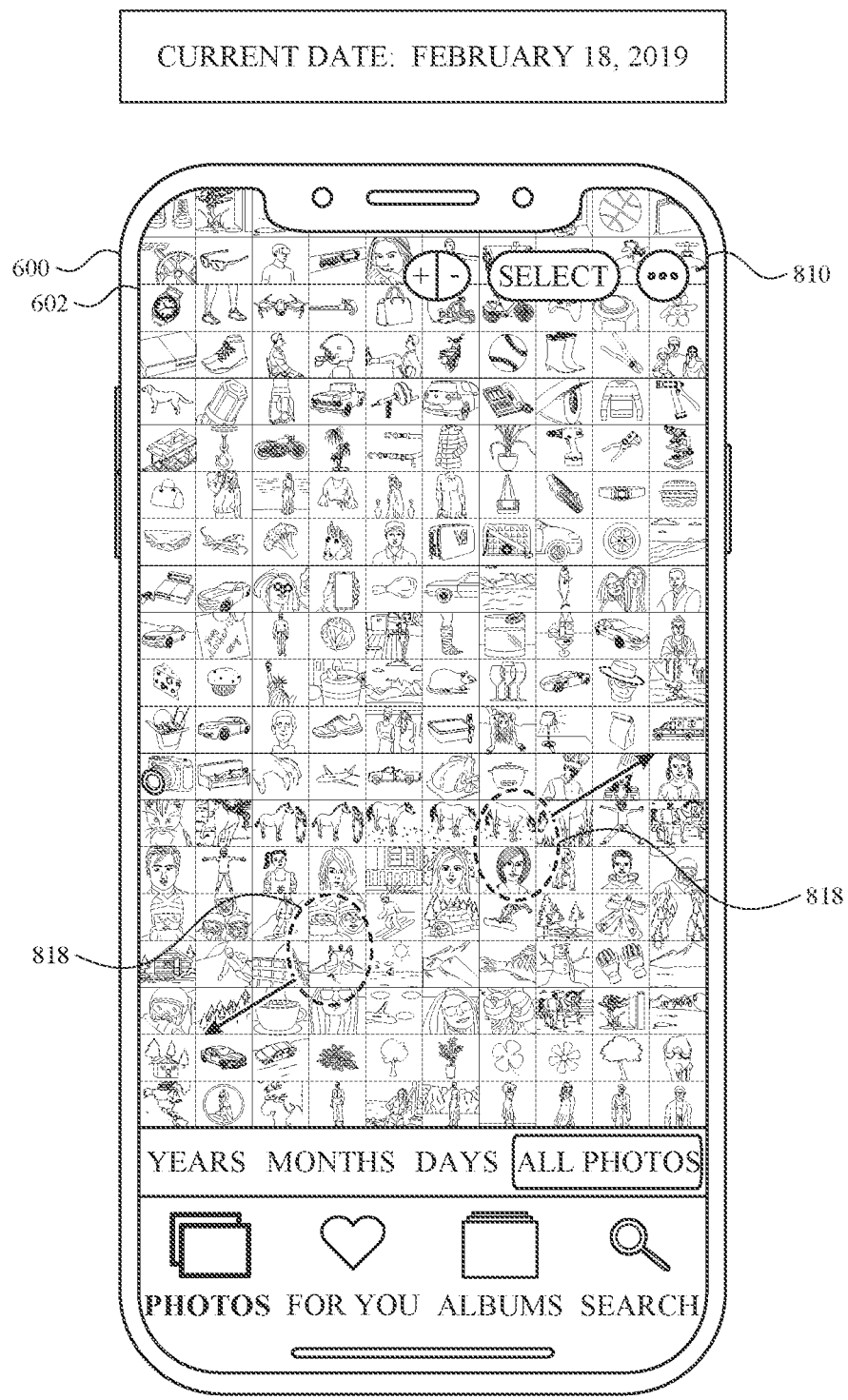

In some embodiments, an all photos view can be zoomed to be a multi-column multi-row array of any size (e.g., any number of columns, any number of rows). For example, by allowing the all photos view to be zoomed in or out to varying numbers of columns and/or numbers of rows, a highly-customizable navigation experience is achieved that allows a user to efficiently navigate a collection of media items. For example, at FIG. 8F, electronic device receives user input 816 which is a two-contact pinch gesture representing a request to zoom out (again). FIG. 8G illustrates all photos view 810 after having zoomed out further. In response to receiving user input 816 in FIG. 8F, electronic device 600 has zoomed out all photos view 810 as shown in FIG. 8G. As shown in FIG. 8G, the multi-column multi-row array has a width of ten media items, and the representations of media items have been re-arranged (e.g., made smaller).

In some embodiments, electronic device 600 anchors the representation corresponding to an identified location based on user input 816, as discussed above with respect to user input 814.

In some embodiments, a view (e.g., 810) snaps to fully-displayed representations in response to a request to zoom. For example, as shown in FIG. 8F, each row in all photos view 810 includes the full width of each representation, rather than having a portion of a representation (e.g., on the right edge) partially cut off. In other words, the view fits a plurality of representations across one or more dimensions (e.g., width, height) of the viewable area of the display 602. In some embodiments, a view includes partially displayed representations of one or more representations (e.g., in the vertical dimension along a navigable axis, scrolling can cause partially representations).

Figure 8H:
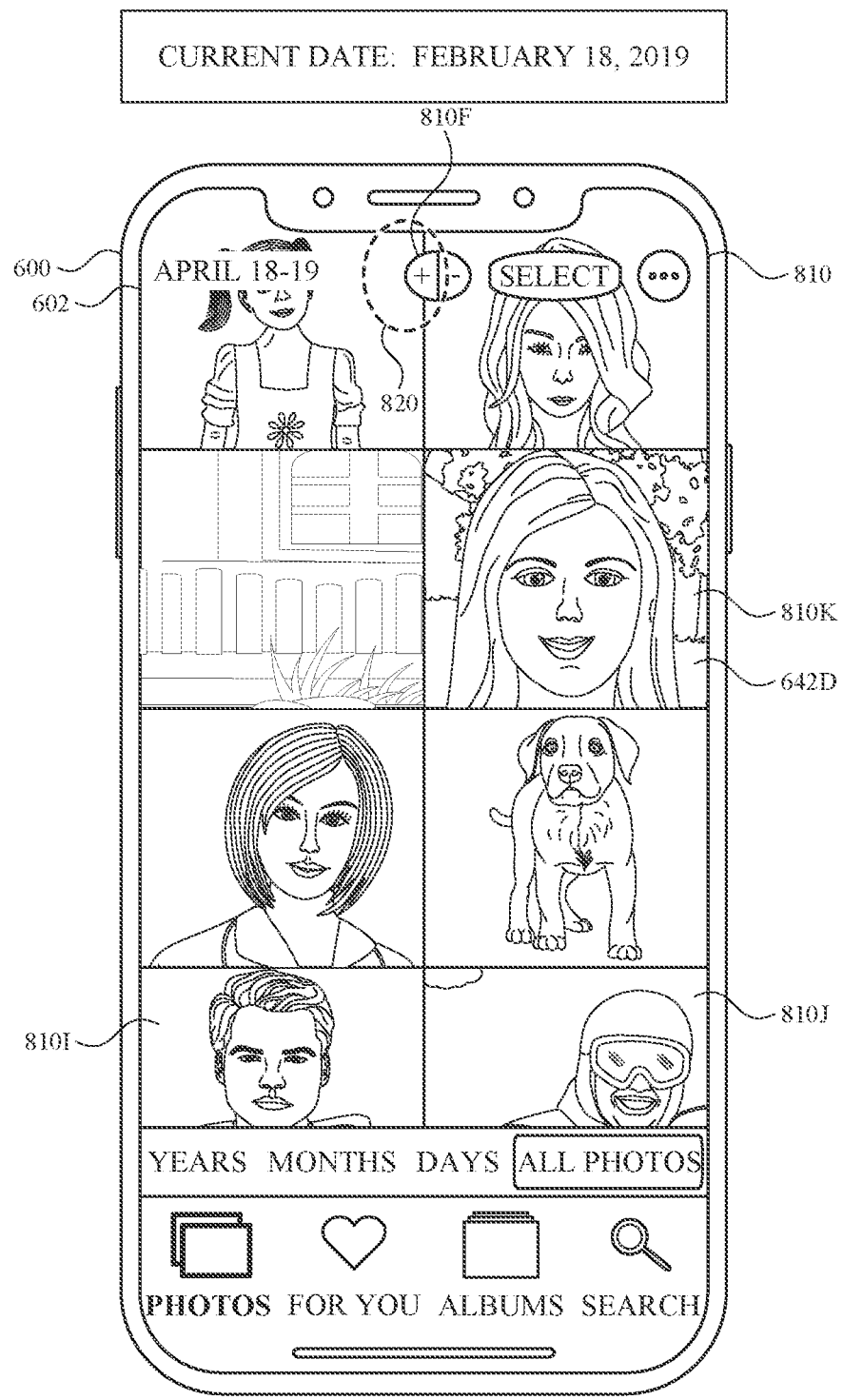
Figure 81:
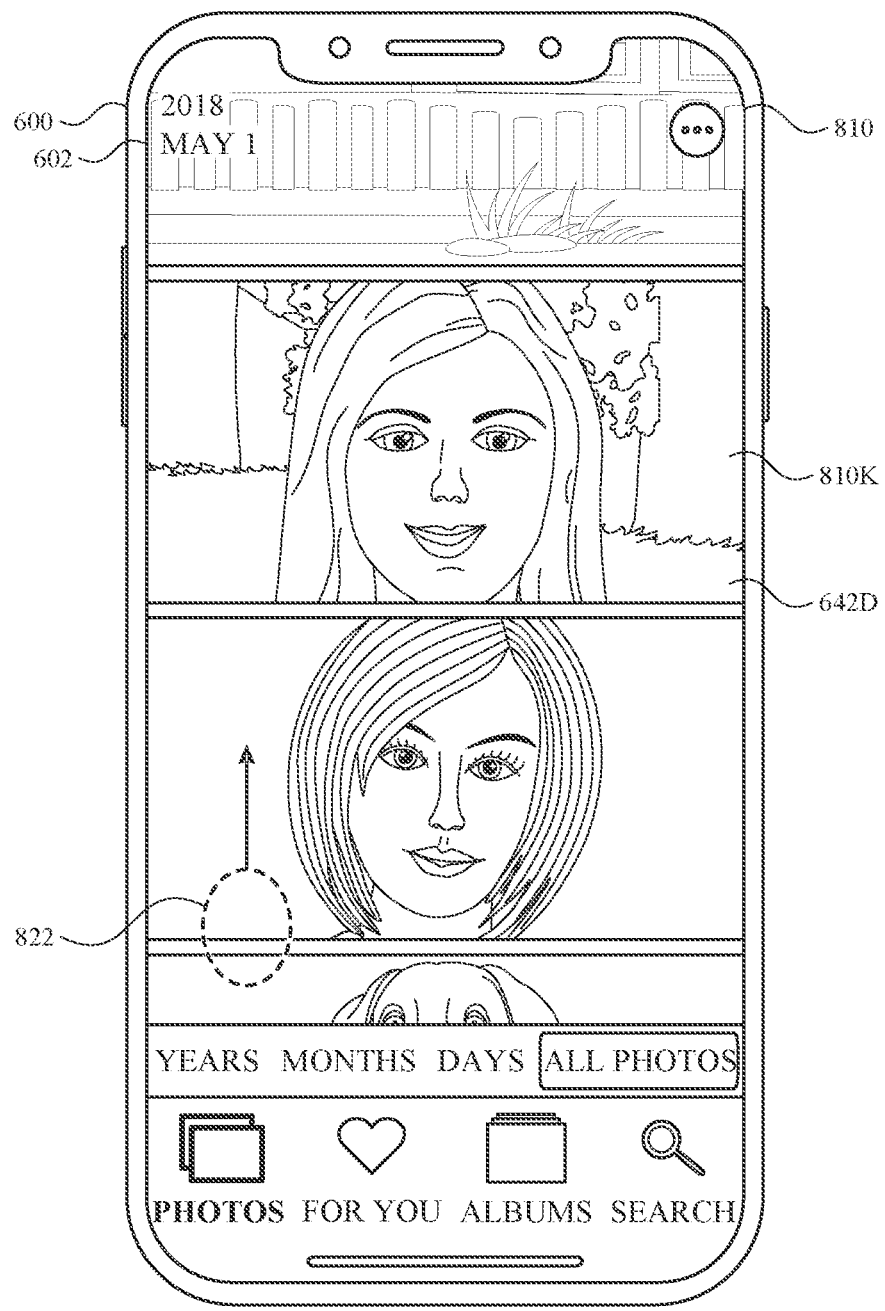

FIGS. 8G-8I illustrate exemplary zooming in of an all photos view. At FIG. 8G, electronic device (e.g., 600) receives user input 818 which is a two-contact de-pinch gesture representing a request to zoom in. In response to receiving user input 818 in FIG. 8G, electronic device 600 has zoomed in all photos view 810 as shown in FIG. 8H. As shown in FIG. 8H, all photos view has zoomed in from being arranged in a multi-column multi-row array with a number of columns (width) of ten media items (FIG. 8G) to being arranged in a multi-column multi-row array with a number of columns (width) of two media items. As shown in FIG. 8H, the multi-column multi-row array has a number of columns (width) of two media items, and the representations (e.g., 810I, 810J) of media items have been re-arranged (e.g., made bigger, re-flowed to maintain sequential order of the view that is chronological left to right and then top to bottom). In some embodiments, to zoom in, the representations shown in all photos view 810 of FIG. 8G are selected based on a location of user input 818 of FIG. 8G. In response to receiving user input 818, electronic device 600 determines a location based on user input 818 (e.g., identifies a location directly between the two touch inputs) and a representation corresponding to the location (e.g., displayed at that identified location or closest representation to the identified location). The device identifies a region on the display at FIG. 8G at which the representation corresponding to the identified location is being displayed. When updating to display all photos view 810 of FIG. 8H, electronic device 600 arranges the representations such that the representation corresponding to the identified location is displayed at an updated region on the display, such that the updated region includes the original region (or at least a portion of the original region). As a result, the device anchors the representation corresponding to the identified location, enabling the user to more easily locate representations on the display and to maintain continuity when viewing representations.

In some embodiments, an all photos view can be arranged as a grid having a single media item width. For example, in FIG. 8H electronic device 600 receives user input 820 which is a tap representing selection of affordance 810F, representing a request to zoom in. In response to receiving user input 820, electronic device 600 has zoomed in all photos view 810 as shown in FIG. 8I. As shown in FIG. 8I, the multi-column multi-row array is zoomed into a single-item array (e.g., an array with one column, and one or more rows) (e.g., an array with one row, and one or more columns) that has a width of one media item, and the representations (e.g., 810I, 810J, 810K) of media items have been re-arranged vertically (e.g., which includes making the representations larger).

Figure 8J:
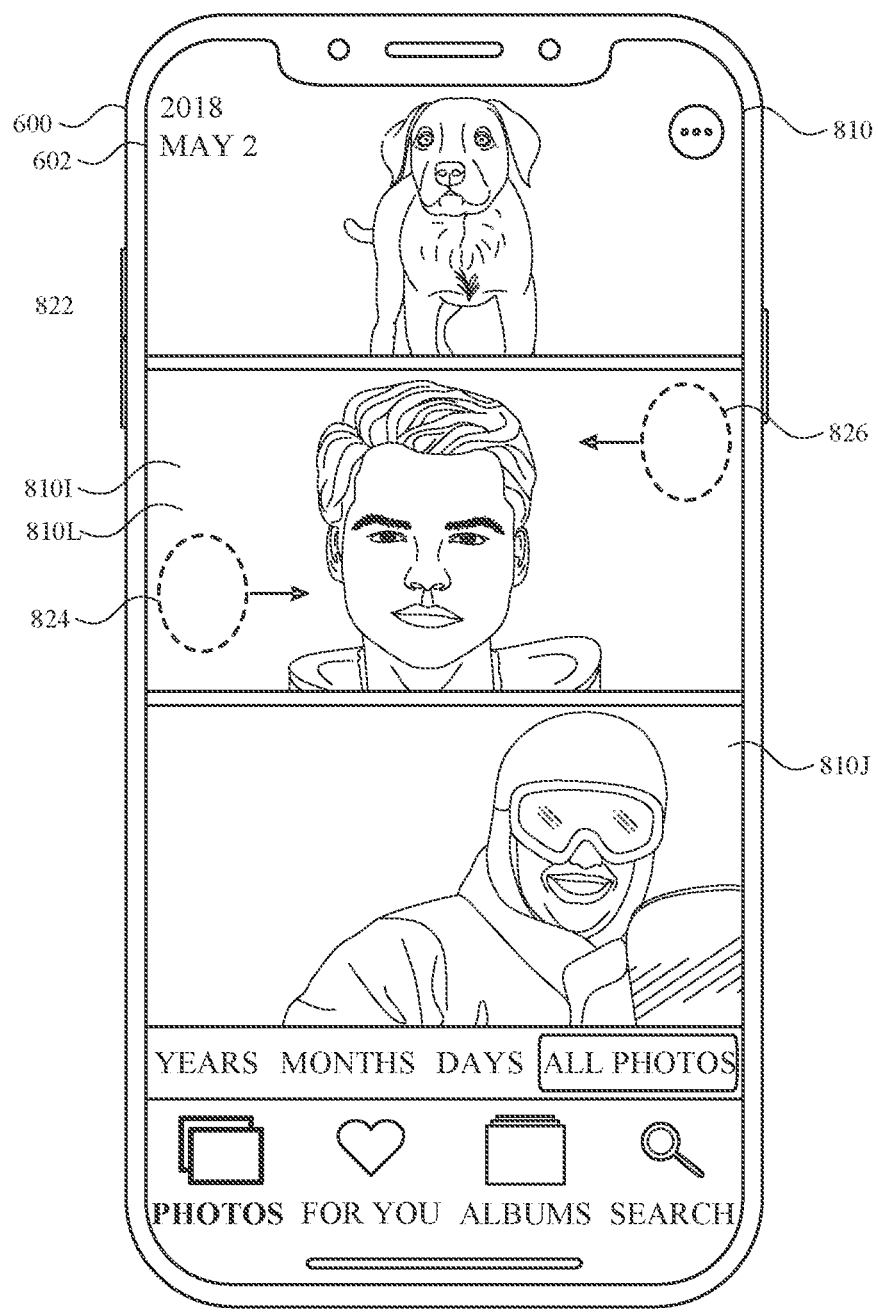

As noted above, an all photos view can be navigable. FIGS. 8I-8J illustrate scrolling of the single-item array all photos view 810. At FIG. 8I, electronic device 600 receives user input 822 which is a swipe gesture in an upward direction representing a request to scroll upward. At FIG. 8J, in response to receiving user input 822, electronic device 600 has scrolled the all photos view 810 upward to display other representations (e.g., representation 810I). As can be seen in FIGS. 8I-8J, the single-item array all photos view 810 maintains the same ordering of media items from the media library as shown in the more zoomed out states such as FIGS. 8D-8H, except as an array with a single column.

Figure 8K:
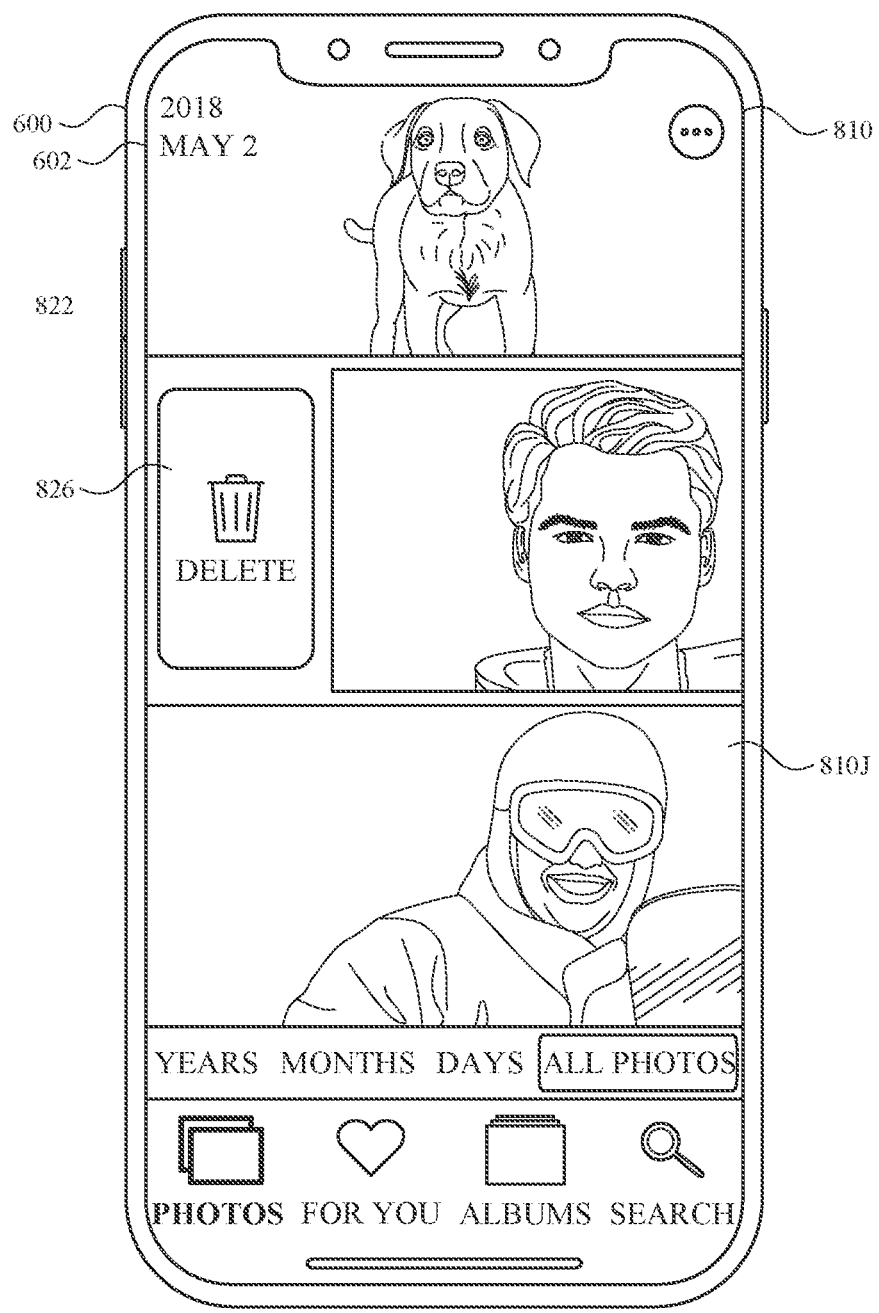
Figure 8L:
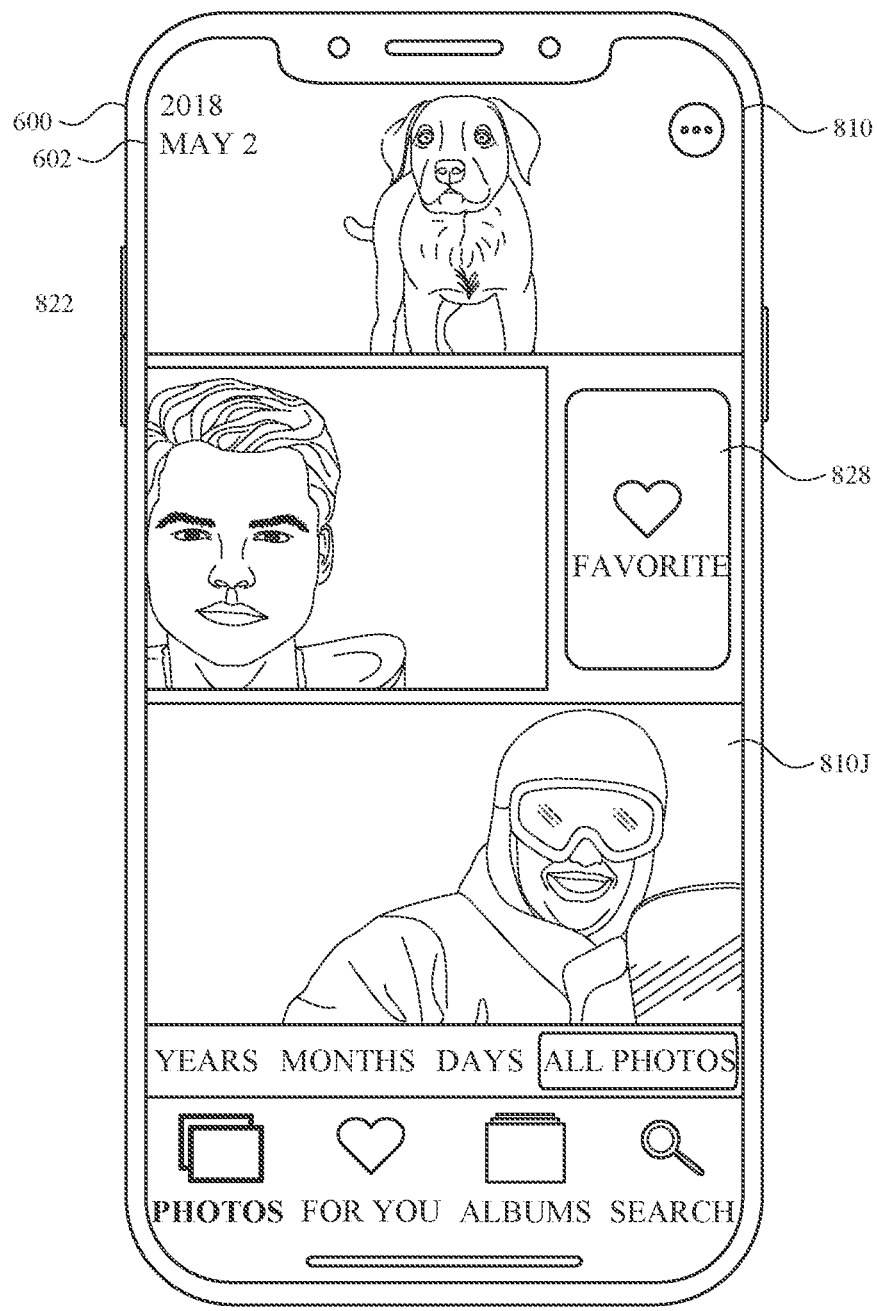

FIGS. 8J-8L illustrate using a directional swipe gesture on a displayed representation to perform one or more actions. In some embodiments, a directional swipe gesture (e.g., 824, 826) at a location of a displayed representation (e.g., 810I) of a media item (e.g., 810L) causes the electronic device (e.g., 600) to perform an action related to the media item. For example, at FIG. 8J, electronic device 600 receives user input 824 which is a directional swipe gesture to the right that begins at a location associated with representation 810I of media item 810L. In response to receiving user input 824, electronic device 600 causes deletion of the media item 810L associated with representation 810I from the media library. As another example, in response to receiving user input 824, electronic device can display a delete affordance 826 (as shown in FIG. 8K) that, when selected, causes electronic device to cause deletion of the media item 810L associated with representation 810I from the media library. In some embodiments, the action performed in response to a directional swipe gesture depends on the length of the directional swipe gesture (e.g., from touch down to lift off of the contact). In some embodiments, the electronic device performs a first action if the length of the directional swipe is below a threshold length and a second action if the length of the directional swipe is equal to or above the threshold length. For example, in response to user input 824 being below a threshold distance (e.g., a predetermined number of pixels, a proportion of the display dimensions) electronic device 600 displays affordance 826 without causing deletion of the media item 810L, and in response to user input 824 being equal to or above the threshold distance (e.g., a predetermined number of pixels, a proportion of the display dimensions) electronic device 600 causes deletion of the media item 810L. In some embodiments, the electronic performs the first action while the user input contact (e.g., 824) is still detected (e.g., regardless of length of the directional swipe, but while the contact and the movement is detected). For example, while user input 824 is moving to the right affordance 826 is displayed, and in response to lift off at a distance above the threshold length the media item 810L is deleted (e.g., without requiring selection of affordance 826). In some embodiments, in response to the user input contact exceeding the threshold length while contact is still detected, the electronic device (e.g., 600) displays an indication that the threshold length has been exceeded (e.g., moves affordance 826, ceases display affordance 826, changes a color of affordance 826, replaces affordance 826). In some embodiments, in response to the swipe length movement falling below the threshold length while contact is still detected (e.g., input has been dragged back toward the original touch down location), the electronic device (e.g., 600) displays an indication that the threshold length is no longer exceeded (e.g., moves affordance 826, begins displaying affordance 826, changes a color of affordance 826).

As another example of an action performed in response to a directional swipe gesture, in response to receiving user input 826 at FIG. 8J which is a directional swipe gesture to the left, electronic device 600 causes the media item 810L associated with representation 810I to be marked as a favorite media item (e.g., by updating metadata in the media library). As another example, in response to receiving user input 826, electronic device can display a favorite affordance 828 that, when selected, causes electronic device to cause the media item 810L associated with representation 810I to be marked as a favorite media item the media library. Similar to as described above with respect to user input 824 and affordance 826 of FIG. 8K, a length of user input 826 can determine whether a first action (e.g., display affordance 828 without marking as a favorite) is performed or a second action is performed (e.g., marking as a favorite) based on a threshold length.

In some embodiments, electronic device (e.g., 600) performs an action, of two or more actions, in response to a directional swipe, wherein which action (of the two or more actions) is performed depends on the direction of the directional swipe. For example, electronic device 600 can perform the one or more actions associated with deleting the media item 810L represented by representation 810 in response to user input 824 (e.g., a swipe to the right on representation 810I), and perform the one or more actions associated with marking the media item 810L represented by representation 810I as a favorite in response to user input 826 (e.g., a swipe to the left on representation 810I).

Figure 8M:
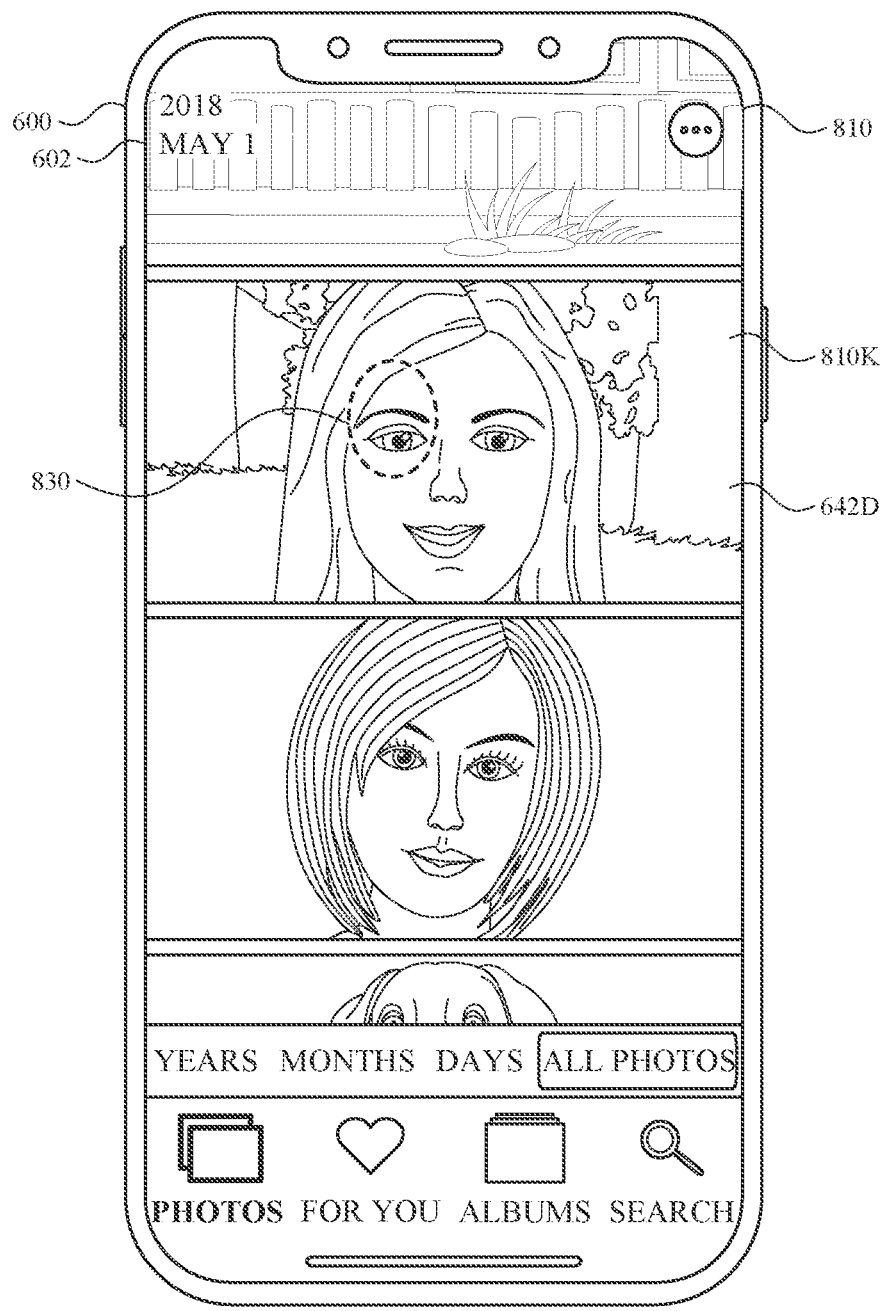
Figure 8N:
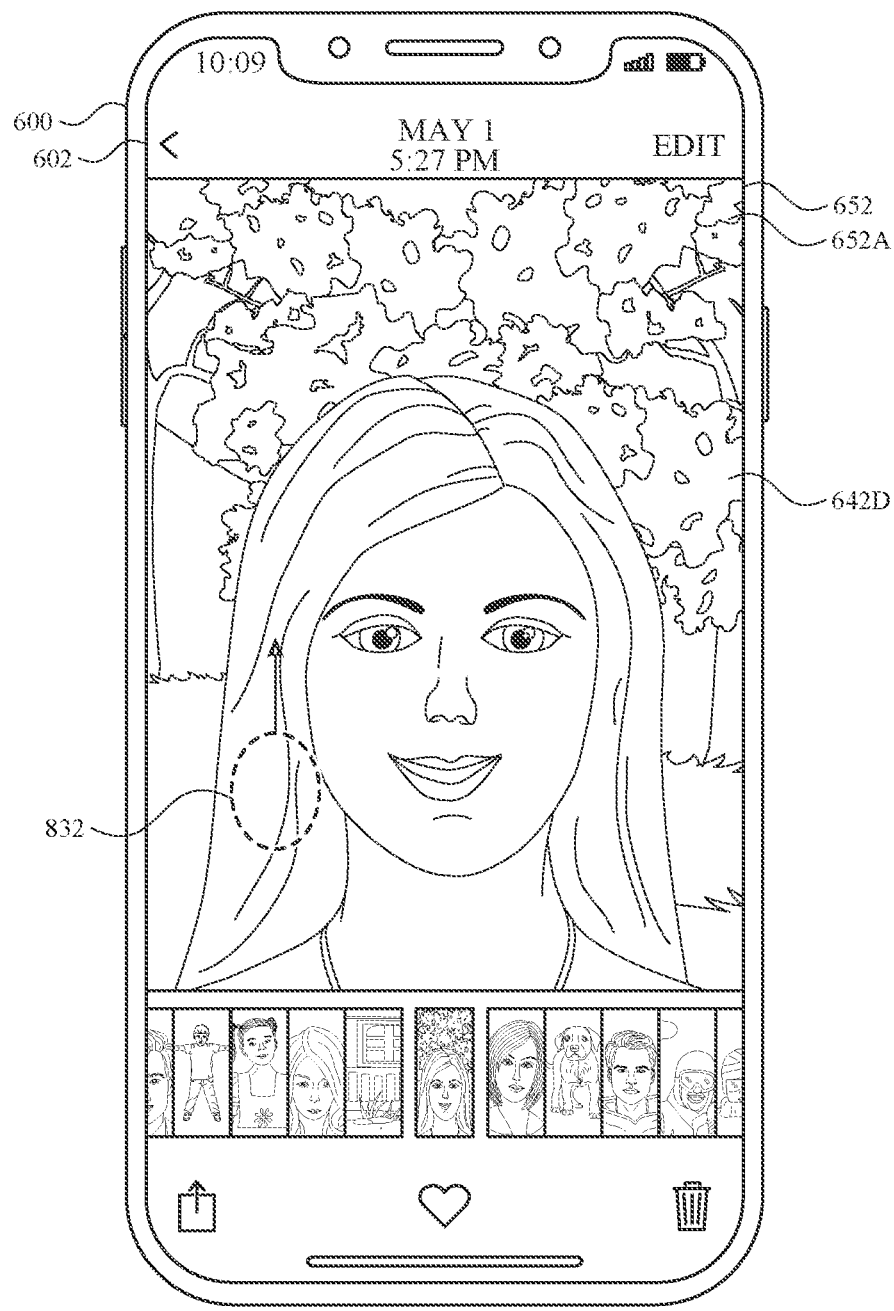

FIGS. 8M-8N illustrate an exemplary technique for entering a one-up view from an all photos view. In this example, all photos view 810 in FIG. 8M is in the same state as shown in FIG. 8I (e.g., prior to electronic device 600 receiving user input 822). In some embodiments, in response to receiving user input (e.g., 830 in FIG. 8M) associated with a location of a displayed representation (e.g., 810K) of a media item (e.g., 642D), the electronic device (e.g., 600) displays a one-up view (e.g., 652) of the media item (e.g., 642D). For example, in FIG. 8M, electronic device 600 receives user input 830 which is a tap at a location associated with representation 810K of media item 642D and, in response to receiving user input 830 displays one-up view 652 as shown in FIG. 8N. As shown in FIG. 8N, media item 642D is displayed in area 652A in an enlarged size. At FIG. 8N, electronic device 600 receives user input 832 which is a directional swipe gesture in an upward direction.

Figure 8O:
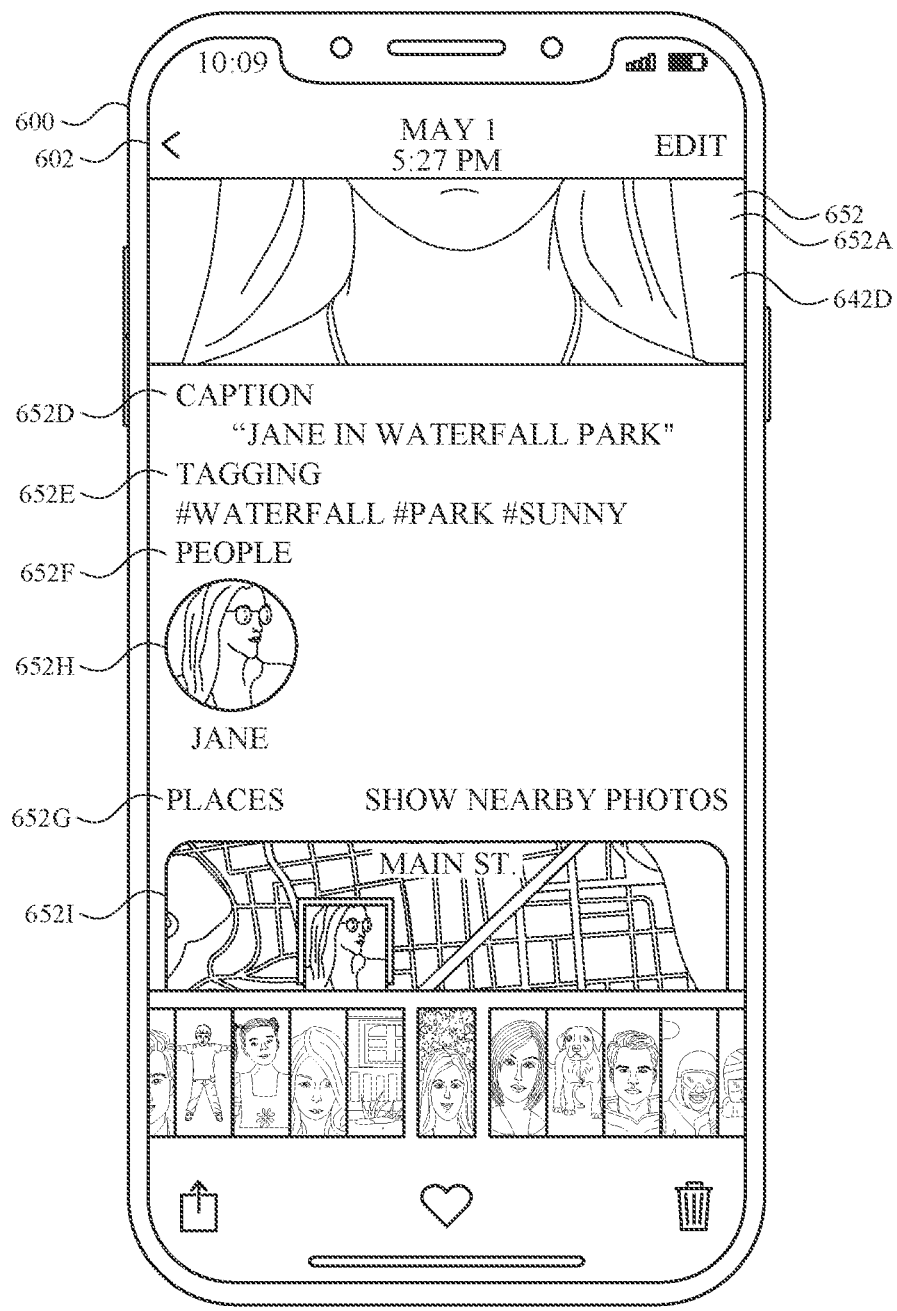

FIG. 8O illustrates an exemplary one-up view that includes exemplary regions for viewing and modifying information associated with a media item. For example, one-up view 652 in FIG. 8O includes a plurality of regions 652D-652G for viewing and/or editing information associated with media item 642D. In some embodiments, one or more regions for viewing and modifying information associated with a media item are displayed in response to receiving user input associated with a displayed representation of a media item (e.g., displayed in a one-up view). For example, electronic device 600 displays one-up view 652 as shown in FIG. 8O in response to receiving user input 832 in FIG. 8N.

In some embodiments, a caption region (e.g., 652D) includes display of one or more captions associated with the media item. For example, caption region 652D includes a heading "CAPTION") and caption text ("JANE IN WATERFALL PARK") associated with the media item 642D (e.g., saved with the media item in the media library). In some embodiments, selection of a location associated with the caption region (e.g., within it) causes the electronic device (e.g., 600) to display an interface for editing (e.g., adding, modifying, and/or deleting) a caption associated with the media item. For example, in response to user input selection of the heading "CAPTION" in region 652D, or the text "JANE IN WATERFALL PARK", electronic device 600 can display a text entry interface (e.g., a text entry marker and a keyboard) for editing the caption text. In some embodiments, the caption region includes an affordance that, when selected, causes display of the text entry interface for editing the caption text.

In some embodiments, a tag region (e.g., 652E) includes display of one or more tags (e.g., keywords, hashtags) associated with the media item. For example, tag region 652E includes a heading "TAGGING") and tags (#WATERFALL, #PARK, and #SUNNY) associated with the media item 642D (e.g., saved with the media item in the media library). In some embodiments, selection of a location associated with the tag region (e.g., within it) causes the electronic device (e.g., 600) to display an interface for editing (e.g., adding, modifying, and/or deleting) a tag associated with the media item. For example, in response to user input selection of the heading "TAGGING" in region 652E, electronic device 600 can display a text entry interface (e.g., a text entry marker and a keyboard) for editing the caption text. In some embodiments, the tagging region includes an affordance that, when selected, causes display of the text entry interface for editing a tag. In some embodiments, in response to user input selection of a tag in a tag region, the electronic device displays representations of one or more media items that are associated with the selected tag. For example, in response to selection of the tag "#PARK" in tag region 652E, electronic device 600 can display a view (e.g., similar to a days view, similar to an all photos view, or in another presentation) of representations of media items that also include the tag "#PARK".

As shown in FIG. 8O, one-up view 652 also includes people region 652F, which includes indicators for one or more individuals depicted in the media item 642D in area 652A. In this example, people region 652F includes person indicator 652H identifying the woman in the photos as Jane. In some embodiments, in response to user input selection of a person indicator, the electronic device displays representations of one or more media items that depict the individual associated with the selected person indicator. For example, in response to selection of the person indicator 652H associated with Jane in people region 652F, electronic device 600 can display a view (e.g., similar to a days view, similar to an all photos view, or in another presentation) of representations of media items that also include Jane.

As shown in FIG. 8O, one-up view 652 also includes places region 652G, which includes a map and indicator for a geographic location associated with the media item 642D in area 652A (e.g., where the media item was taken). In this example, places region 652G includes map 652I that includes an indicator of the location that media item 642D was captured (e.g., as determined based on geographic location information in metadata associated with the media item in the media library). In some embodiments, in response to user input selection of the map, the electronic device displays a larger representation of the map and/or one or more media items (or indicators thereof) from one or more similar geographic locations.

In some embodiments, one-up view 652 is scrollable (e.g., vertically) to display one or more regions. For example, an upward directional swipe at one-up view 652 in FIG. 8O (e.g., swipe up on region 652E) can display one or more regions or reveal more of a partially displayed region. For example, in response to an upward swipe, electronic device 600 can scroll the regions upward and display more of the partially-displayed map 652I in places region 652G.

Figure 8P:
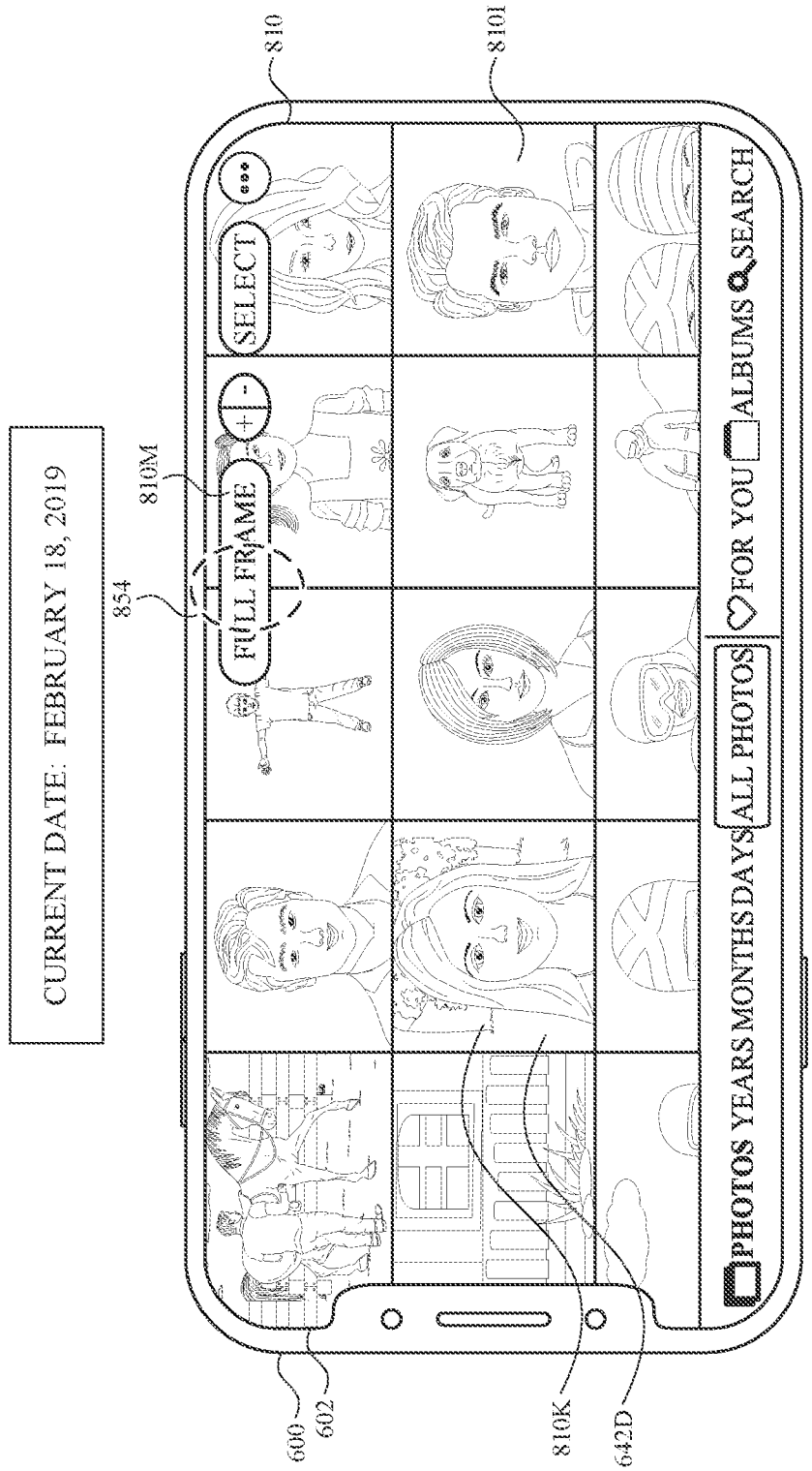
Figure 8Q:
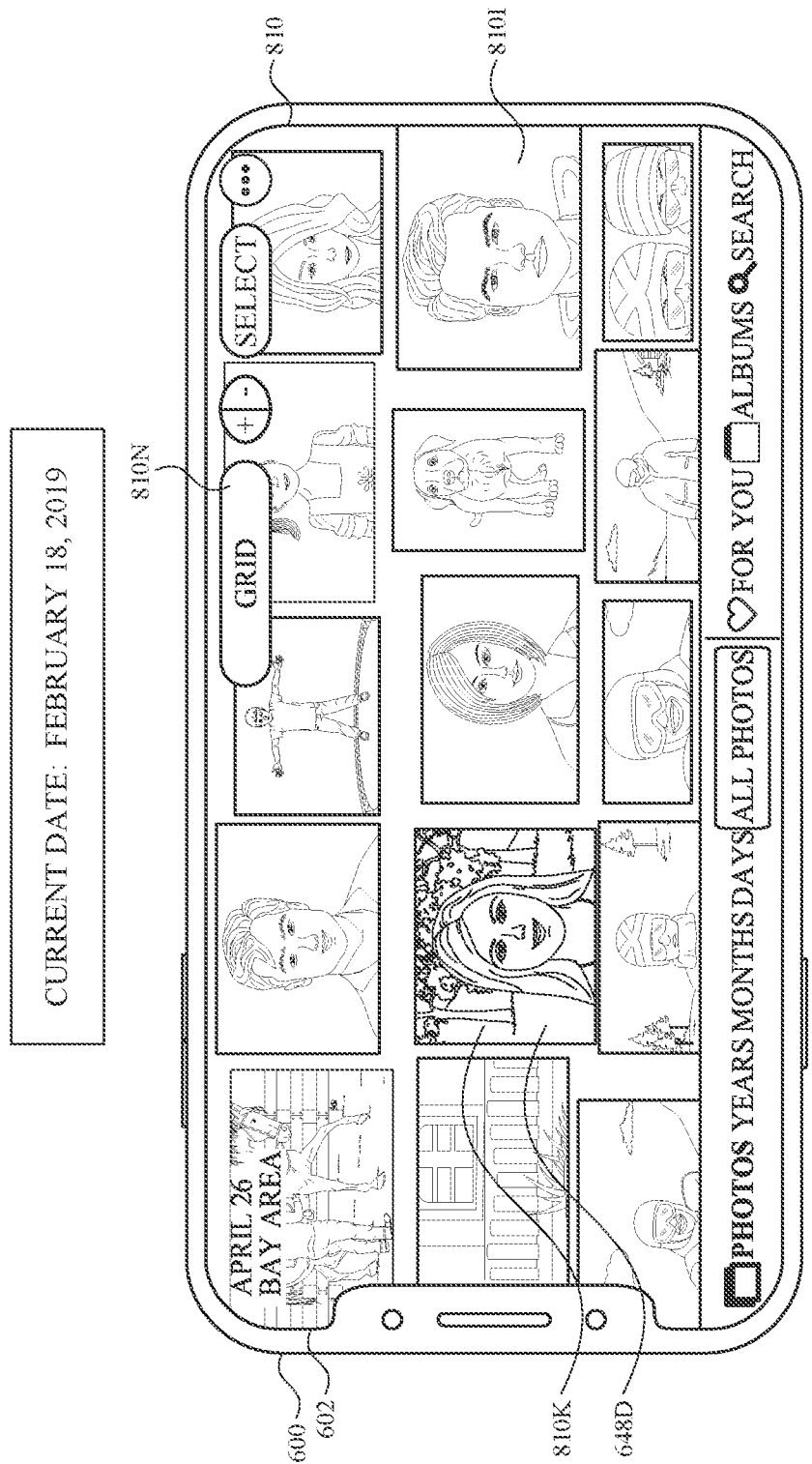

FIGS. 8P-8Q illustrate changing representations of media items in a view from having uniform aspect ratios to having the actual respective aspect ratios of the represented media items.

FIG. 8P illustrates exemplary all photos view 810 that has representations of media items arranged in a multi-column multi-row array and having uniform aspect ratios (e.g., each representation has the same width and/or height). In this example, each representation shown (e.g., 810I and 810K) in FIG. 8P has the same width and height. In this example, all photos view 810 is displayed in a landscape view (e.g., in response to detecting rotation of the device to be substantially horizontal). In some embodiments, other views (e.g., 608, 614, 626, 640) can be displayed in a landscape view. In some embodiments, a view (e.g., 810) includes an affordance (e.g., 810M) for causing display of representations in the actual aspect ratios of their underlying media items. For example, in FIG. 8P, all photos view 810 includes full frame affordance 810M. In some embodiments, the affordance (e.g., 810M) for causing display of representations in the actual aspect ratios of their underlying media items is displayed in accordance with one or more conditions being met. In some embodiments, the conditions include one or more of: that the representations are currently being displayed having uniform aspect ratios, that the electronic device (e.g., 600) is currently in a specific orientation (e.g., in a horizontal landscape mode), that the electronic device (e.g., 600) is a particular type of electronic device (e.g., the affordance is displayed on some devices but not others), and that the electronic device (e.g., 600) includes a display that meets display dimension criteria (e.g., the affordance is displayed on a device with a large display, but not on a device with a small display). For example, affordance 810M is displayed in response to electronic device 600 being placed in landscape mode (e.g., turned horizontally, as detected by one or more accelerometers).

FIG. 8Q illustrates exemplary all photos view 810 that has representations of media items displayed in the actual aspect ratios of their underlying media items (e.g., each representation has an aspect ratio that is not necessarily the same as the other representations). In this example, electronic device 600 displays all photos view 810 in FIG. 8Q in response to receiving user input 854 representing selection of full frame affordance 810M. As shown, the uniform aspect ratio representations of FIG. 8P have transitioned to be replaced with representations of varying aspect ratios, which represent the actual aspect ratios of the underlying media item of each respective representation. For example, representation 810K in FIG. 8Q has a shorter width than representation 810K in FIG. 8P, since the media item was taken in a portrait style (e.g., aspect ratio having longer vertical height dimension than horizontal width). In some embodiments, representations of media items displayed having the same actual aspect ratios of the underlying media items do not include cropping of the underlying media item. For example, representations of media items displayed in an array style (e.g., as a uniform grid) (e.g., as in FIG. 8P) can be cropped versions of the underlying media items, but representations of media items displayed in the full frame style (e.g., as in FIG. 8Q) can be non-cropped versions of the underlying media items (e.g., which include the entirety of the media item, displayed at a reduced size). Providing the ability to display actual aspect ratio of media items while in an all photos view (e.g., at a customized level of zoom with other representations) allows easy viewing and comparison of media item characteristics without the need to select and view a media item (e.g., in a one-up view).

In some embodiments, the electronic device (e.g., 600) displays an affordance (e.g., 810N) for displaying representations in an arrangement having uniform aspect ratios. For example, in FIG. 8Q, electronic device 600 has replaced full frame affordance 810M with grid affordance 810N in response to receiving user input 854. For further example, in response to receiving selection of affordance 810N at FIG. 8Q, electronic device 600 can return to the display of the all photos view 810 as shown in FIG. 8P, with representations having uniform aspect ratios.

FIG. 9 is a flow diagram illustrating a method for navigating a collection of media items using an electronic device in accordance with some embodiments. Method 900 is performed at a device (e.g., 100, 300, 500) with a display device and one or more input devices. Some operations in method 900 are, optionally, combined, the orders of some operations are, optionally, changed, and some operations are, optionally, omitted.

As described below, method 900 provides an intuitive way for navigating a collection of media items. The method reduces the cognitive burden on a user for navigating a collection of media items, thereby creating a more efficient human-machine interface. For battery-operated computing devices, enabling a user to navigate a collection of media items faster and more efficiently conserves power and increases the time between battery charges.

The electronic device (e.g., 600) displays (e.g., 902), via the display device, a first plurality of representations (e.g., 640F and 640G in FIG. 8A) of media items (e.g., 642C and 642D in FIG. 8A) in a first view (e.g., days view 640 in FIG. 8A) of a collection of media items (e.g., the collection comprising media items 642C, 642D, 615E, 642A, and 642B in FIGS. 8A-8B) (e.g., a media library; media items from a particular time period, such as a day or an event (e.g., multiple days)), wherein a plurality of media items (e.g., 615E, 642A, and 642B in FIG. 8B) in the collection of media items include content that can be played back over time (e.g., videos or sequences of images).

While displaying the first plurality of representations (e.g., 640F and 640G in FIG. 8A) of media items (e.g., 642C and 642D in FIG. 8A) in the first view (e.g., days view 640 in FIG. 8B), the electronic device (e.g., 600) receives (904), via the one or more input devices, a first input (e.g., 802) (e.g., a swipe to scroll) that corresponds to a request to navigate (e.g., scroll) through a portion of the first view of the collection of media items that includes representations (e.g., 640C, 640D, and 640E in FIG. 8B) of two or more media items (e.g., 615E, 642A, and 642B) that include content that can be played back over time (e.g., videos or sequences of images).

In response to receiving the first input (e.g., 802), the electronic device (e.g., 600) navigates (906) through (e.g., scrolls, pans) the first view (e.g., 640) of the collection of media items (e.g., scrolls view 640 down as shown in FIGS. 8A-8B) and while navigating through the first view of the collection of media items automatically playing content from two or more (e.g., 615E and 642A as shown in FIGS. 8B-8C) of the media items in the plurality of media items (e.g., 615E, 642A, and 642B in FIG. 8B). For example, in response to input 802, electronic device 600 scrolls day view 640 from the state shown in FIG. 8A to the state shown in FIG. 8B, then automatically plays media items 615E and 642A as shown in FIGS. 8B to 8C (e.g., showing the representations of both media items change from being played back over time).

After navigating through the first view (e.g., 640) of the collection of media items, the electronic device (e.g., 600) receives (908), via the one or more input devices, a second input (e.g., 804) (e.g., tap on an affordance, such as an All Photos affordance) that corresponds to a request to switch to a second view (e.g., all photos view 810) of the collection of media items.

In response to receiving the second input (e.g., 804), the electronic device (e.g., 600) displays (910) a second plurality of representations (e.g., 810A, 810B, 810C in FIG. 8D) (e.g., can be representations of the same media items as the first view, or of a different a set (e.g., superset or subset) of media items from the collection in the first view; can be different aspect ratios, sizes, ordering, etc.) of media items (e.g., 615E, 642A, 642B in FIG. 8D) in the second view (e.g., all photos view 810 in FIG. 8D) of the collection of media items.

While displaying the second plurality of representations (e.g., 810A, 810B, 810C in FIG. 8D) of media items (e.g., 615E, 642A, 642B in FIG. 8D) in the second view (e.g., all photos view 810 in FIG. 8D) of the collection of media items, the electronic device (e.g., 600) receives (912), via the one or more input devices, a third input (e.g., 812) (e.g., a swipe to scroll) that that corresponds to a request to navigate (e.g., scroll) through a portion of the second view of the collection of media items that includes representations of two or more media items (e.g., 615E and 642A) (e.g., the same two or more as in the first view, or a different two or more) that include content that can be played back over time (e.g., videos or sequences of images).

In response to receiving the third input (e.g., 812), the electronic device (e.g., 600) navigates (914) through (e.g., scrolls view 810 as shown in FIGS. 8D-8E) the second view of the collection of media items without automatically playing content from media items in the plurality of media items (e.g., does not automatically play back content from media items 615E and 642A). For example, no media items that can be played back over time are automatically played in an all photos view (e.g., 810).

Automatically playing back content in a first view of a collection of media items, but not in a second view of a collection of media items provides the user with different interface options for viewing media items that result automatically depending on the selected view. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of media items in the collection (e.g., 615E, 642A, and 642B) (e.g., media items that include content that can be played back over time) includes at least one media item (e.g., 642B) that includes content that can be played back over time that is not selected for automatic playback (e.g., media item 642B is not played back in FIGS. 8B-8C), and wherein the at least one media item is different from the two or more media items (e.g., 615E and 642A). For example, at least one video/sequence of images is not automatically played back (e.g., in days view 640). While navigating through the collection of media items, the electronic device (e.g., 600) forgoes automatically playing content from the at least one media item (e.g., media item 642B is not played back in FIGS. 8B-8C) of the plurality of media items that is not selected for automatic playback. In some embodiments, the electronic device (e.g., 600) prevents more than a predetermined number (e.g., one, two, or three) of the plurality of media items from playing back at the same time. For example, in FIGS. 8B-8C, only two media items 615E and 642A are played back at a time.

Forgoing automatically playing content from at least one media item avoids distracting a user, as well as reduces power usage by playing back fewer media items concurrently. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the two or more media items (e.g., 615E and 642A) that are selected for automatic playback are displayed larger than the one or more media items not selected for automatic playback (e.g., 642B) (e.g., larger in at least one respective dimension) (e.g., automatic playing content is larger in x-direction dimension, in y-direction dimension, or in both). For example, in days view 640 in FIGS. 8B-8C, media items 615E and 642A (selected for automatic playback) are displayed larger than 642B (not selected). In some embodiments, in accordance with a determination that media items are selected for automatic playback, displaying the media items selected for automatic playback includes displaying the media items at a size greater than a playback threshold size, and in accordance with a determination that media items are not selected for automatic playback, displaying the media items not selected for automatic playback includes displaying the media items at a size less than a playback threshold size. For example, a playback threshold size can be a minimum size at which content to be played back is displayed (e.g., to avoid displaying video content at a size that is too small for a user to comfortably view it).

Displaying automatically played back content larger than content that is not automatically played back allows the user to view the played content more easily without requiring further input. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the two or more media items (e.g., 615E and 642A) are selected for automatic playback based on the two or more media items having a higher priority than other media items (e.g., 642B) that are not selected for automatic playback. In some embodiments, a media items is prioritized (e.g., selected) for automatic playback based on one or more of the following: whether the media item has been favorited by user, image quality of the media item (e.g., high quality images have priority), length of the media item (e.g., a sequence of images or a video) (e.g., longer media items have priority), image composition of the media item (e.g., whether the media item depicts a well-composed scene, such as one in which subjects are centered and visible and exposure is correct, and the like), action that occurs during the media item (e.g., movement within the image frame is prioritized over a video in which the subject remains still), and persons depicted in the media item (e.g., the user and/or their family get priority over others persons).

In some embodiments, displaying representations (e.g., 810A, 810B, 810C in FIG. 8D) of media items (e.g., 615E, 642A, 642B in FIG. 8D) in the second view (e.g., 810 in FIG. 8D) of the collection of media items comprises: displaying, via the display device, the representations (e.g., 810A, 810B, 810C in FIG. 8D) of media items in the second view arranged as a multi-row multi-column array (e.g., as a grid) having a first spacing (e.g., horizontal dimensions of media items, vertical dimensions of media items). For example, exemplary second view 810 in FIG. 8D includes representations arranged in an exemplary multi-row (e.g., six rows are displayed, more can be accessed by navigating) multi-column (e.g., three columns) array. In some embodiments, a spacing (e.g., first spacing) of a multi-row multi-column array includes horizontal dimensions between media items in the array and/or vertical dimensions between media items in the array. For example, an exemplary first spacing can indicate that each media item occupies a 200 pixel (width) by 200 pixel (height) area (e.g., if the media item is displayed occupying its entire area, then the media item representation has dimensions of 200 pixels by 200 pixels). In some embodiments, a media item can occupy less than the area created by the spacing dimensions. In some embodiments, a spacing (e.g., first spacing) includes uniform horizontal dimensions (e.g., of media items), uniform vertical dimensions (e.g., of media items), or both. For example, media items can be horizontally spaced at a uniform increment of 200 pixels (e.g., the left edge of one media item is 200 pixels from the left edge of the next media item in the row), and media items can be vertically spaced at a uniform increment of 200 pixels (e.g., the top edge of one media item is 200 pixels from the top edge of the next media item in the row). In some embodiments, horizontal dimensions and vertical dimensions are different. The electronic device (e.g., 600) receives, via the one or more input devices, a fourth input (e.g., 814, 818) (e.g., de-pinch, pinch, tap on an affordance (e.g., 810E or 810F, +/− buttons; arrows)). In response to receiving the fourth input: in accordance with a determination that the fourth input corresponds to a request to zoom in (e.g., is a de-pinch such as 818) (e.g., input on touch-sensitive surface is a de-pinch, input is a selection of a zoom in affordance), the electronic device (e.g., 600) re-arranges the representations of media items in the second view to have a second spacing (e.g., changes all photos view 810 from FIG. 8G to FIG. 8H), including: reducing one or more of: a number of displayed rows of representations of media items, and a number of displayed columns of representations of media items (e.g., in FIG. 8H, the number of displayed rows (four) and columns (two) has changed from the number of rows (twenty) and columns (ten) in FIG. 8G); and increasing sizes (e.g., height and/or width) of the representations of media items in the second view (e.g., in FIG. 8H, the sizes of the displayed representations have increased from FIG. 8G). In some embodiments, the sizes of the representations of media items in the second view are uniform (e.g., each representation has the same dimensions). In some embodiments, the sizes of all representations remain uniform in response to increasing and/or decreasing. In response to receiving the fourth input: in accordance with a determination that the fourth input corresponds to a request to zoom out (e.g., pinch gesture such as 814) (e.g., input on touch-sensitive surface is a pinch, input is a selection of a zoom out affordance), the electronic device (e.g., 600)

re-arranges the representations of media items in the second view to have a third spacing (e.g., changes all photos view 810 from FIG. 8E to FIG. 8F), including: increasing one or more of: the number of displayed rows of representations of media items, and the number of displayed columns of representations of media items (e.g., in FIG. 8F, the number of displayed rows (ten) and columns (six) has changed from the number of rows (six) and columns (three) in FIG. 8E); and reducing sizes (e.g., height and/or width) of the representations of media items in the second view (e.g., in FIG. 8F, the sizes of the displayed representations have decreased from FIG. 8E).

In some embodiments, subsequent to receiving the fourth input (e.g., 814, 818), the electronic device (e.g., 600) receives, via the one or more input devices, a fifth input (e.g., 816, 820) (e.g., de-pinch, tap on a zoom in affordance). In response to receiving the fifth input: in accordance with a determination that the fifth input corresponds to a request to zoom in (e.g., is input 820, a tap on zoom affordance 810F) (e.g., input is a de-pinch, input is a selection of a zoom in affordance) while displaying the representations of media items in the second view having the second spacing (e.g., all photos view 810 as shown in FIG. 8H) (e.g., a second zoom in request), the electronic device (e.g., 600) re-arranges the representations of media items in the second view to have a fourth spacing (e.g., changes all photos view 810 from FIG. 8H to FIG. 8I), including: reducing one or more of: the number of displayed rows of representations of media items, and the number of displayed columns of representations of media items (e.g., in FIG. 8I, the number of displayed rows (three) and columns (one) has changed from the number of rows (four) and columns (two) in FIG. 8H); and increasing sizes (e.g., height and/or width) of the representations of media items in the second view (e.g., in FIG. 8I, the sizes of the displayed representations have increased from FIG. 8H). In response to receiving the fifth input: in accordance with a determination that the fifth input corresponds to a request to zoom out (e.g., is input 816) (e.g., input is a pinch, input is a selection of a zoom out affordance) while displaying the representations of media items in the second view having the third spacing (e.g., all photos view 810 as shown in FIG. 8F) (e.g., a second zoom out request), the electronic device (e.g., 600) re-arranges the representations of media items in the second view to have a fifth spacing (e.g., changes all photos view 810 from FIG. 8F to FIG. 8G), including: increasing one or more of: the number of displayed rows of representations of media items, and the number of displayed columns of representations of media items (e.g., in FIG. 8G, the number of displayed rows (twenty) and columns (ten) has changed from the number of rows (ten) and columns (six) in FIG. 8F); and reducing sizes (e.g., height and/or width) of the representations of media items in the second view (e.g., in FIG. 8G, the sizes of the displayed representations have decreased from FIG. 8F).

In some embodiments, re-arranging the representations of media items in the second view (e.g., 810) to have the second spacing includes re-arranging the representations of media items in the second view into a single-item array of representations of media items (e.g., as shown in FIG. 8I) (e.g., a column that is vertically scrollable, or a row that is horizontally scrollable). While displaying the single-item array of representations of media items, the electronic device (e.g., 600) receives, via the one or more input devices, a sixth input (e.g., 822, 824, 826) (e.g., vertical swipe, horizontal swipe) at a location of a representation (e.g., 810I in FIG. 8J) of a first media item (e.g., 810L) from the collection of media items. In response to receiving the sixth input: in accordance with a determination that the sixth input represents a swipe (e.g., is input 822, a downward swipe) gesture in a first direction (e.g., vertically, up, down), the electronic device (e.g., 600) navigates (e.g., scrolls) through the collection of media items to display a representation of a second media item from the collection of media items (e.g., changes all photos view from FIG. 8I to FIG. 8J) (e.g., scrolls the single-item width array to reveal a new media item). In some embodiments, the single-item width array can be scrolled in multiple directions (e.g., up or down). In accordance with a determination that the sixth input represents a swipe (e.g., is input 824, 826; a horizontal swipe) gesture in a second direction (e.g., horizontally, left, right) different from (e.g., perpendicular to or substantially perpendicular to) the first direction (e.g., down), the electronic device (e.g., 600) performs an action (e.g., marks for deletion; marks as a favorite) associated with the first media item. In some embodiments, the electronic device (e.g., 600) forgoes navigating the collection in response to the swipe (e.g., 824, 826) in the second direction. In some embodiments, performing an action includes deleting (or marking for deletion) the corresponding media item. In some embodiments, performing an action includes marking a media item as a favorite media item (or something similar, such as a 'liked' or 'important' or 'starred' media item). In some embodiments, performing an action includes displaying an affordance (e.g., 826, 828) (e.g., a delete affordance, a favorite affordance) that when selected causes another action to be performed (e.g., mark media item for deletion, mark media item as a favorite). In some embodiments, a swipe gesture in the second direction (e.g., right) modifies a first stored property (e.g., deletes a media item), and a swipe gesture in a third direction (e.g., left) modifies a second stored property (e.g., marks the item as a favorite) (e.g., as shown in FIGS. 8J-8L). In some embodiments, representations of media items in the singe-item width array (e.g., as shown in FIG. 8I) are each displayed at a uniform size (e.g., same dimensions and aspect ratio, which can require cropping of image content from the underlying the media items) (e.g., in FIG. 8I, the representations are rectangles of uniform size). In some embodiments, representations of media items in the singe-item width array are each displayed at the respective aspect ratio of their corresponding media item (e.g., each representation has the same aspect ratio as the underlying media item, which can result in representations with different aspect ratios being displayed in the single-item width array). For example, a media item that has dimensions of 200 pixels by 500 pixels will be displayed at that aspect ratio (e.g., 200:500), and a media item that has dimensions of 600 pixels by 400 pixels will be displayed at that aspect ratio (e.g., 600:400).

Re-arranging representations of media items into a single-item width array in response to a request to zoom in provides an intuitive way for the user to enter such an arrangement easily and without requiring additional controls or gestures. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Using a directional gesture to either navigate or modify a property of a media item, depending on the direction, allows the user an intuitive way to perform either action without requiring additional controls or gestures. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, navigating through the first view (e.g., 640) of the collection of media items comprises scrolling the collection of media items in the first view (e.g., scrolling 640 from FIG. 8A to FIG. 8B). In some embodiments, automatically playing content from two or more of the media items (e.g., 615E and 642A as shown in FIGS. 8B-8C) in the plurality of media items while navigating through the collection of media items comprises, while scrolling the collection of media items in the first view: automatically playing content from a first media item (e.g., 615E) of the two or more media items (e.g., 615E and 642A as shown in FIGS. 8B-8C) based at least in part on a scroll position of the first media item in the first view (e.g., a media item begins playing upon reaching a predetermined position on the display) (e.g., media item 615E begins playback upon reaching a predetermined position as all photos view 640 is scrolled in response to input 802). In some embodiments, other factors affect whether a media item begins automatically playing, including whether a predetermined number of media items are already automatically playing. For example, the device can automatically playback no more than the predetermined number of media items (e.g., two at a time), and thus any media item in excess of the predetermined number would not begin playing back until at least one of the other media items ceases to be played back.

Automatically playing content based on a scroll position provides an intelligent interface that takes into account the likelihood that a media item is at an appropriate location on a display. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while scrolling the collection of media items in the first view (e.g., scrolling 640 from FIG. 8A to FIG. 8B), and while automatically playing content from the first media item (e.g., 615E) of the two or more media items (e.g., 615E and 642A as shown in FIGS. 8B-8C): the electronic device (e.g., 600) automatically plays content from a second media item (e.g., 642A) of the two or more media items (e.g., 615E and 642A as shown in FIGS. 8B-8C) based at least in part on a scroll position of the second media item in the first view; and ceases to automatically play content from the first media item (e.g., 615E) of the two or more media items while continuing to display a representation of the first media item of the two or more media items. In some embodiments, the first media item ceases automatically playing based at least in part on a scroll position. For example, in response to the second media item (e.g., 642A) reaching a scroll position that causes it to automatically playback, or in response to the first media item (e.g., 615E) reaching a different scroll position associated with ceasing automatic playback, the first media item ceases automatically playing. In some embodiments, the first media item ceases automatically playing in response to reaching a second predetermined scrolling position (e.g., different than the scrolling position that caused it to begin automatically playing) (e.g., begins playing upon appearing on the display during navigation and ceases playing just before being scrolled off the display as navigation continues).

In some embodiments, media items (e.g., 615E, 642A, 642B in FIG. 8C) that are displayed in the first view (e.g., 640) of the collection of media items are selected so as to exclude one or more media items that are displayed in the second view (e.g., 810) of the collection of media items (e.g., by excluding media items that are similar to each other) (e.g., all photos view 810 includes media items that are not included in days view 640). For example, the second view (e.g., 810) can include representations for every media item in the media library (e.g., accessible by scrolling the second view), whereas the first view (e.g., 640) includes a subset of fewer than the media items included in the second view.

In some embodiments, the first plurality of representations (e.g., 640C, 640D, 640E in FIG. 8C) of media items (e.g., 615E, 642A, 642B) in the first view (e.g., 640) include representations that are at least two different sizes (e.g., aspect ratios and/or dimensions) (e.g., in FIG. 8C, representations having different sizes are displayed), and the second plurality of representations (e.g., 810A, 810B, 810C in FIG. 8D) of media items (e.g., 615E, 642A, 642B) in the second view (e.g., 810) include representations that are each uniform in size (e.g., have the same dimensions) (e.g., in FIG. 8D, representations that are each the same size are displayed). For example, all displayed representations of media items in the second plurality of representations of media items in the second view are displayed at the same size.

In some embodiments, while displaying either the first view (e.g., 640) or the second view (e.g., 810): the electronic device (e.g., 600) receives, via the one or more input devices, a seventh input (e.g., selection of media item 842D in 8A, 8H, or 8J) (e.g., 830) (e.g., a tap) that corresponds to selection of a representation (e.g., 810K in FIG. 8M) of a media item (e.g., 642D). In response to receiving the seventh input, the electronic device (e.g., 600) replaces display of, via the display device, the first view or the second view with display of a one-up view (e.g., 652 as shown in FIG. 8N) of the selected media item (e.g., 642D).

In some embodiments, while displaying the one-up view (e.g., 652 in FIG. 8N) of the selected media item (e.g., 642D), receiving, via the one or more input devices, an eighth input (e.g., 832) (e.g., an upward swipe). In response to receiving the eighth input, and while continuing to display at least a portion of the selected media item (e.g., in area 642D as shown in FIG. 8O): in accordance with a determination that the eighth input is a swipe gesture in a third direction (e.g., up), displaying, via the display device, one or more options (e.g., 652D, 652E in FIG. 8O) (e.g., affordances, text entry fields) for entering information (e.g., one or more captions, one or more tags) to associate with the selected media item. In some embodiments, the electronic device (e.g., 600) receives entry of information (e.g., a caption, a tag) via the one or more options (e.g., selection of the option and character input thereafter), and causes the entered information to be stored and associated with the selected media item. In some embodiments, the one or more options includes an affordance (e.g., 652D, 652E), a text entry field, or other graphical element that can be selected and/or indicate that information can be entered. In some embodiments, the information includes one or more of a caption for the selected media item, and a tag (e.g., a hashtag) for the selected media item. In some embodiments, the one or more options are displayed with additional fields (e.g., 652F, 652G) that include data (e.g., metadata) about the selected media item, including one or more of: people (e.g., face and/or name) depicted in the selected media item (e.g., as shown by 652H), an identifier of a device that captured the media item (e.g., a camera model), a geographic location of the media item (e.g., where it was captured) (e.g., as shown by 652I), among other relevant information. In some embodiments, the one or more options are displayed in a scrollable interface. For example, the interface 652 can be scrolled to reveal the one or more options (or the data about the selected media item). In some embodiments, the eighth input gesture is a tap on an affordance, which causes the device to display the one or more options in response (e.g., instead of swipe, or alternatively to swipe). In some embodiments, in response to an input that corresponds to selection of a tag associated with the selected media item (e.g., selection of the tag "#PARK" in FIG. 8O), the device displays one or more representations of other media items that are also associated with the selected tag (e.g., tap a tag to view a smart album for that tag).

Using a directional gesture to access options for entering information for a displayed media item provides the user with an intuitive way to perform a relevant operation on a media item without requiring additional controls or gestures. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying either the first view (e.g., 640) of the collection of media items or the second view (e.g., 644) of the collection of media items, the electronic device (e.g., 600) displays, via the display device, an indication (e.g., 644) of a boundary between a first set of media items (e.g., media items from a first day, or first range of dates) (e.g., media items from May 1-2 in FIG. 8A) of the collection of media items and a second set of media items (e.g., media items from a second day, or second range of dates) (e.g., media items from April 18-19 in FIG. 8A) of the collection of media items, wherein the first set of media items is different from the second set of media items (e.g., no overlap of included media items between the sets), wherein the first set of media items are related to each other based on satisfying a first criteria (e.g., are each from the same day, range of dates, and/or location) (e.g., each are from May 1-2, 2018 as shown in FIG. 8A), and wherein the second set of media items are related to each other based on satisfying a second criteria (e.g., are each from the same day, range of dates, and/or location) (e.g., each are from April 18-19, 2018 as shown in FIG. 8A) different from the first criteria. For example, the first set of media items does not satisfy the second criteria, and the second set of media items does not satisfy the first criteria (e.g., the sets are mutually exclusive). In some embodiments, the electronic device (e.g., 600) displays the indication of the boundary between the first set and the second set in response to a scroll of the currently displayed view (e.g., 644 is displayed on the first set in response to input 648 that causes scrolling as shown in FIGS. 6L-6M). In some embodiments, the electronic device (e.g., 600) ceases to display the indication of the boundary a predetermined amount of time after an event associated with the scrolling ends (e.g., after the input that caused the scrolling ceases to be detected by the device), or after the scrolling movement ceases). For example, an indication of the boundary between sets is displayed as a visual aid (e.g., to focus attention while scrolling through different logical groupings of media items) and fades away after some amount of time.

Displaying an indication of a boundary between different sets of media items helps a user identify boundary between groups of objects and enables faster navigation by providing improved feedback. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the indication (e.g., 644) of the boundary between the first set of media items (e.g., media items from May 1-2 in FIG. 8A) of the collection of media items and the second set of media items (e.g., media items from April 18-19 in FIG. 8A) comprises, concurrently displaying: at least a portion of the second set of media items with a dimmed appearance (e.g., as shown in FIG. 8A) while the second set of media items is not a currently viewed set of media items (e.g., is not occupying the center of the display in FIG. 8A); and at least a portion of the first set of media items without a dimmed appearance (e.g., as shown in FIG. 8A) while the first set of media items is a currently viewed set of media items (e.g., is occupying the center of the display in FIG. 8A). In some embodiments, a currently viewed set of media items is a set of media items that occupy a predetermined location (e.g., center of the display) in the current view. For example, when an object (e.g., a media item from the set) associated with the first set of media items occupies a center position (e.g., vertically where the view is scrollable vertically) of the display, the first set is the currently viewed set of media items. For example, media items from May 1-2 in FIG. 8A occupy the center of the display, and thus are a currently viewed set of media items. In some embodiments, one or more other sets can be at least partially displayed while a current set is partially displayed, where the other sets are displayed with a dimmed appearance (e.g., to emphasize focus on the currently viewed set, while still allowing adjacent sets to be visible). For example, the set of media items from April 18-19 in FIG. 8A is partially displayed concurrently with the currently viewed set from May 1-2, but with a dimmed appearance (overlaid by indicator 644). In some embodiments, there are more than one currently viewed set of media items at a time.

In some embodiments, displaying media items having a dimmed appearance includes displaying the media items having an overlay (e.g., a color, a mask) having a non-zero level of opacity (e.g., such that it obscures at least some of the visual information of the media items). For example, indication 644 can be an overlay of a gray color with a slight opacity. In some embodiments, the dimmed appearance has a dynamic opacity that is progressive and based on a position (e.g., while navigating through representations) associated with the media items being displayed with the dimmed appearance. In some embodiments, the opacity increases as the position associated with the media items being displayed with the dimmed appearance (e.g., a leading edge or boundary) moves (e.g., scrolls) in response to user input (e.g., 648, 802, 812, 822). For example, the second set of media items can be displayed with a dimmed appearance that increases in opacity (e.g., increasing the level of obscuring of the underlying media item) as a boundary between the second set of media items and the first set of media items moves (e.g., while scrolling) past a predetermined location (e.g., not displayed) on the display, toward a near edge of the display (e.g., closest display edge perpendicular to the movement direction), and/or further away from being the currently viewed set of media items (e.g., away from the center of the display). As another example, the second set of media items can be displayed with a dimmed appearance that decreases in opacity (e.g., decreasing the level of obscuring of the underlying media item) as a boundary between the second set of media items and the first set of media items moves (e.g., while scrolling) past a predetermined location (e.g., not displayed) on the display, away from the near edge of the display, and/or toward being the currently viewed set of media items (e.g., toward the center of the display). In these examples, the dimmed appearance moves with the media items (e.g., is not a static region of dimming).

Displaying non-currently viewed media items with a dimmed appearance provides the user improved feedback regarding the currently viewed media items (e.g., boundary information) and improved feedback regarding the non-currently viewed media items (e.g., are still partially visible). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the indication (e.g., 644) of the boundary between the first set of media items (e.g., media items from May 1-2 in FIG. 8A) of the collection of media items and the second set of media items (e.g., media items from April 18-19 in FIG. 8A) comprises displaying metadata (e.g., for the first set and/or for the second set) (e.g., 646A, 646B in FIG. 8A). In some embodiments, the electronic device (e.g., 600) displays metadata for the second set (e.g., 646A), when the second set is not a currently viewed set of media items (e.g., as shown in FIG. 8A), in the area with the dimmed appearance (e.g., area with indication 644) (e.g., overlaid on the media items of the second set).

In some embodiments, while displaying a third set of representations (e.g., the representations in FIG. 8P, including representations 810I and 810K) of media items from the collection of media items (e.g., in view 810) (e.g., in the second view) (e.g., in an all photos view) (e.g., in the first view) (e.g., in view 640) (e.g., in a days view), the electronic device (e.g., 600) receives, via the one or more input devices, a ninth input (e.g., 854) (e.g., a tap on an affordance), wherein the third set of representations are each displayed having a uniform aspect ratio (e.g., as shown in FIG. 8P, each representation is displayed having the same aspect ratio) (e.g., which can require cropping the underlying media item), and wherein each media item corresponding to the third set of representations is associated with an actual aspect ratio. In response to receiving the ninth input, the electronic device (e.g., 600) transitions the representations of the third set of representations from the uniform aspect ratio to the actual aspect ratio of their corresponding media item (e.g., as shown in FIG. 8Q, each representation is now displayed having the aspect ratio of its corresponding media item), and wherein at least two representations of the second set of representations have different actual aspect ratios (e.g., the representations in FIG. 8Q are displayed having at least two different aspect ratios).

Transitioning representations from a uniform aspect ratio to actual aspect ratios provides the user the ability to see the actual aspect ratios of media without requiring an excessive number of inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIG. 9) are also applicable in an analogous manner to the methods described above. For example, method 900 optionally includes one or more of the characteristics of the various methods described above with reference to method 700. For brevity, these details are not repeated below.

FIGS. 10A-10O illustrate exemplary devices and user interfaces for navigating a collection of media items, in accordance with some embodiments. The user interfaces in these figures are used to illustrate the processes described below, including the processes in FIG. 11.

FIG. 10A depicts electronic device 600, which is a smartphone with display 602. Display 602 includes a touch-sensitive surface on which electronic device 600 can detect user gestures (e.g., tap, swipe, drag). In some embodiments, electronic device 600 includes one or more features of electronic device 100, 300, or 500.

At FIG. 10A, electronic device 600 displays user interface 1000 for navigating a collection of media items (e.g., photos, videos). User interface 1000 includes photos (e.g., 1002A-1002C) being displayed in all photos view 810 with a multi-column layout. Additionally, the photos (e.g., 1002A-1002C) are all being displayed at the same initial size with the same initial aspect ratio (e.g., 1:1).

It is noted that the all photos view 810 is described above with respect to FIG. 8D. For example, as discussed above, all photos view 810 includes a non-curated set of media items (e.g., photos, videos) from a media library or representations thereof.

Returning to FIG. 10A, user interface 1000 also includes title 1003 (e.g., corresponding to metadata 646A), which provides an indication of the time period to which the displayed photos correspond. Next to title 1003, user interface 1000 includes zoom affordance 1004, which, when selected, triggers zooming in or zooming out on the displayed photos depending on whether the "+" or "−" button is activated.

As shown in FIG. 10A, a user performs a pinch out gesture to expand photo 1002A. As a result, electronic device 600 detects input 1006 with two contacts, where the distance between the two contacts is increasing.

Figure 10B:
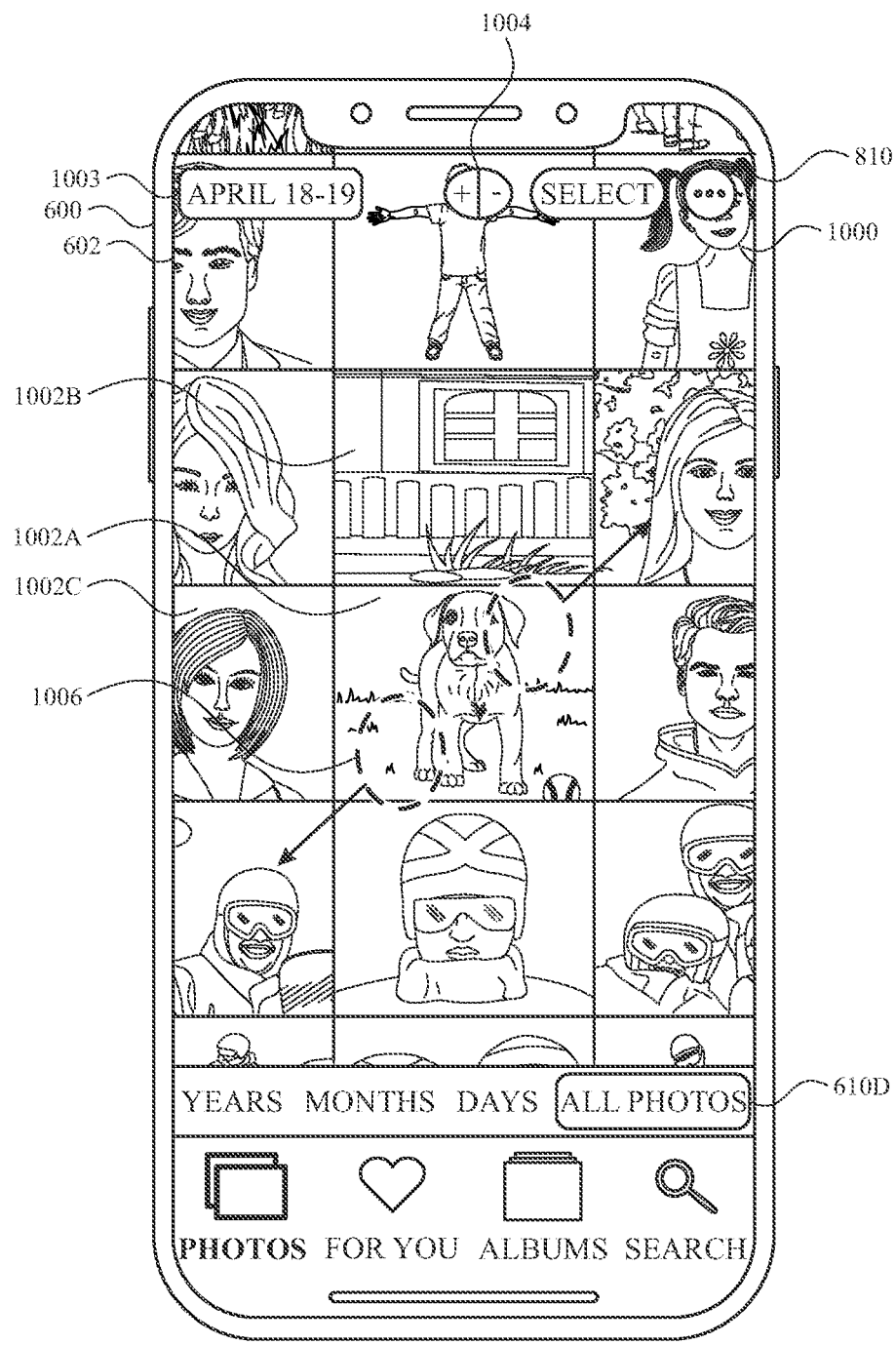

At FIG. 10B, in response to detecting input 1006, electronic device 600 increases the size of the displayed photos, where the increase in size corresponds to the change in distance between the two contacts of input 1006. In particular, photos 1002A-1002C have increased in size from the initial size in FIG. 10A to a first intermediate size, while maintaining the same aspect ratio (e.g., 1:1). The increase in size of a photo occurs via a change in level of magnification of the photo (e.g., the device zooms in on the photo). Moreover, in response to detecting input 1006, some of the photos displayed in FIG. 10A (e.g., the top row of photos) cease to be displayed in user interface 1000.

In some embodiments, in response to detecting input 1006, electronic device 600 maintains the order (e.g., sequence) of the displayed photos. Thus, in some embodiments, electronic device 600 replaces photo 1002B with photo 1002A during the transition from FIGS. 10A-10F to maintain the order. In some embodiments, electronic device 600 uses crossfading to transition from photo 1002B to photo 1002C. Techniques for crossfading are further described below with respect to FIGS. 12A-12I.

Returning to FIG. 10B, the user continues the pinch out gesture to further expand photo 1002A. As a result, electronic device 600 continues to detect input 1006 with two contacts, where the distance between the two contacts is increasing.

Figure 10C:
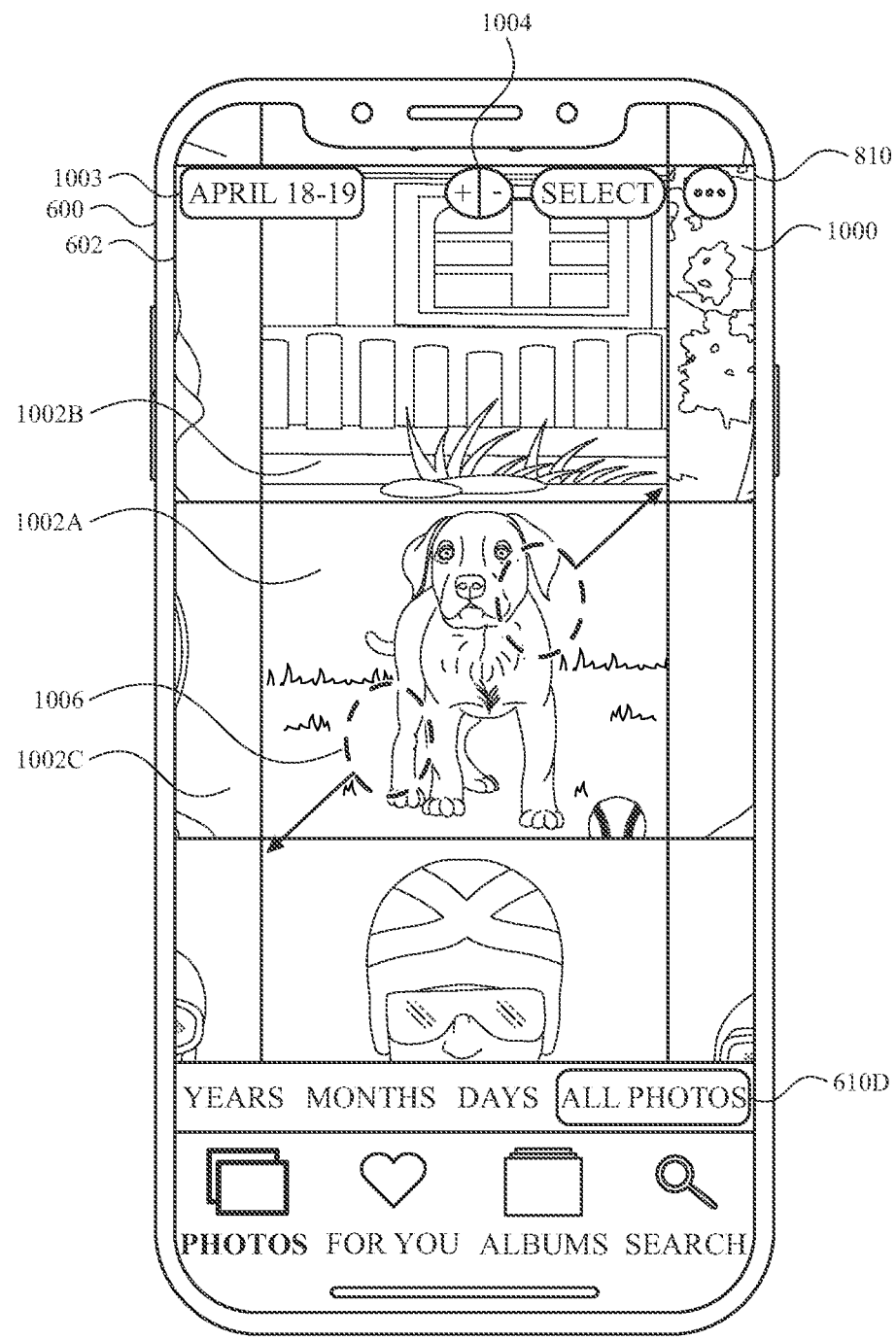

At FIG. 10C, in response to continued detection of input 1006, electronic device 600 continues to increase the size of the displayed photos based on the change in distance between the two contacts of input 1006. Specifically, photos 1002A-1002C have increased in size from the first intermediate size in FIG. 10B to a second intermediate size, while maintaining the same aspect ratio (e.g., 1:1).

As shown in FIG. 10C, the user continues the pinch out gesture to further expand photo 1002A. As a result, electronic device 600 continues to detect input 1006 with two contacts, where the distance between the two contacts is increasing.

Figure 10D:
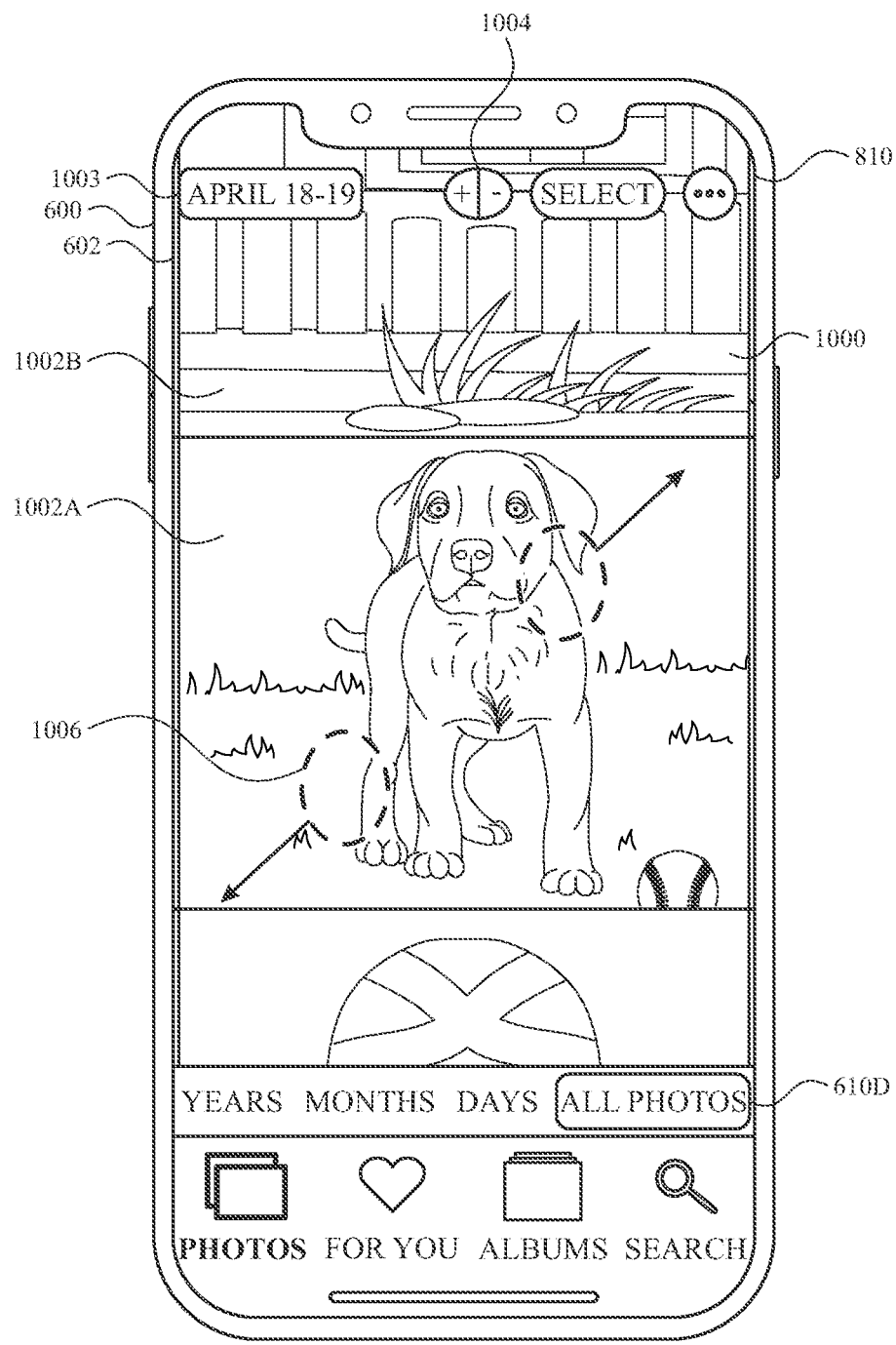

At FIG. 10D, in response to continued detection of input 1006, electronic device 600 continues to further increase the size of the displayed photos based on the change in distance between the two contacts of input 1006. In particular, photos 1002A-1002B have increased in size from the second intermediate size in FIG. 10C to a third intermediate size, while maintaining the same aspect ratio (e.g., 1:1). Moreover, photo 1002C has ceased to be displayed in user interface 1000. At the third intermediate size, photo 1002A occupies the full width of display 602 (e.g., no content is displayed to the left or right of photo 1002A).

As depicted in FIG. 10D, the user continues the pinch out gesture to further expand photo 1002A. As a result, electronic device 600 continues to detect input 1006 with two contacts, where the distance between the two contacts is increasing.

Figure 10E:
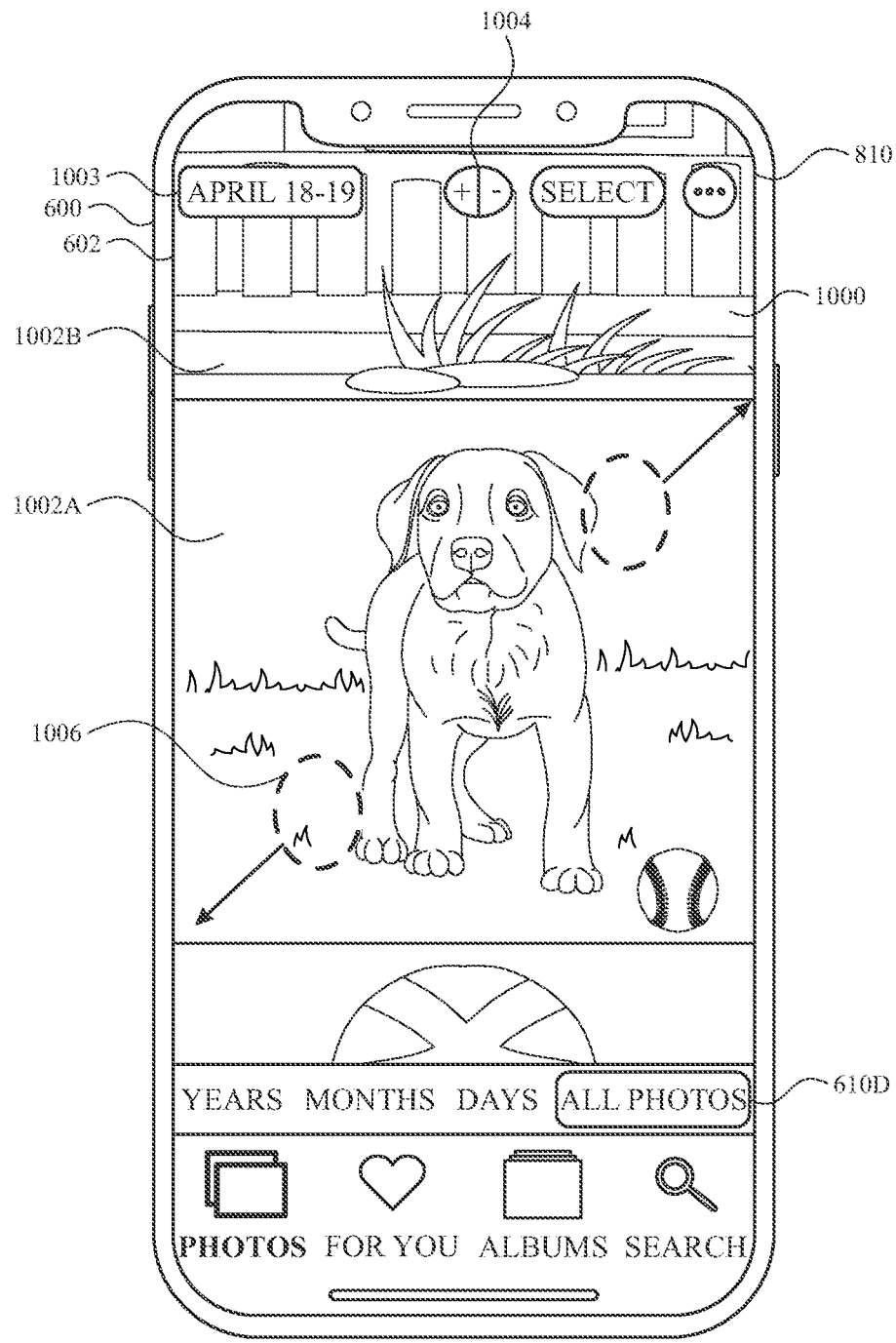

At FIG. 10E, in response to continued detection of input 1006, electronic device 600 changes the aspect ratio and increases the size of photo 1002A based on the change in distance between the two contacts of input 1006. In particular, electronic device 600 changes the aspect ratio of photo 1002A from an initial aspect ratio (e.g., 1:1) to an intermediate aspect ratio (e.g., 3:4). Further, as illustrated in FIG. 10E, electronic device 600 changes the height of photo 1002A by initially displaying top and bottom portions of photo 1002A that were not previously being displayed (e.g., in FIGS. 10A-10D). While changing the height of photo 1002A, electronic device 600 maintains the width of photo 1002A. Due to the change in height, photo 1002A has increased in size from the third intermediate size in FIG. 10D to a fourth intermediate size. The size of the photo has increased, but the level of magnification of the photo has not changed (e.g., the device does not zoom in on the photo).

In some embodiments, electronic device 600 changes the aspect ratio of a photo in response to detecting input 1006 and in accordance with a determination that the photo has reached a threshold size. For example, once the photo has reached a size that occupies the full width of display 602, electronic device 600 changes the aspect ratio. In some embodiments, electronic device 600 does not change the aspect ratio if the photo has not yet reached the threshold size.

Returning to FIG. 10E, the user continues the pinch out gesture to further expand photo 1002A. As a result, electronic device 600 continues to detect input 1006 with two contacts, where the distance between the two contacts is increasing.

Figure 10F:
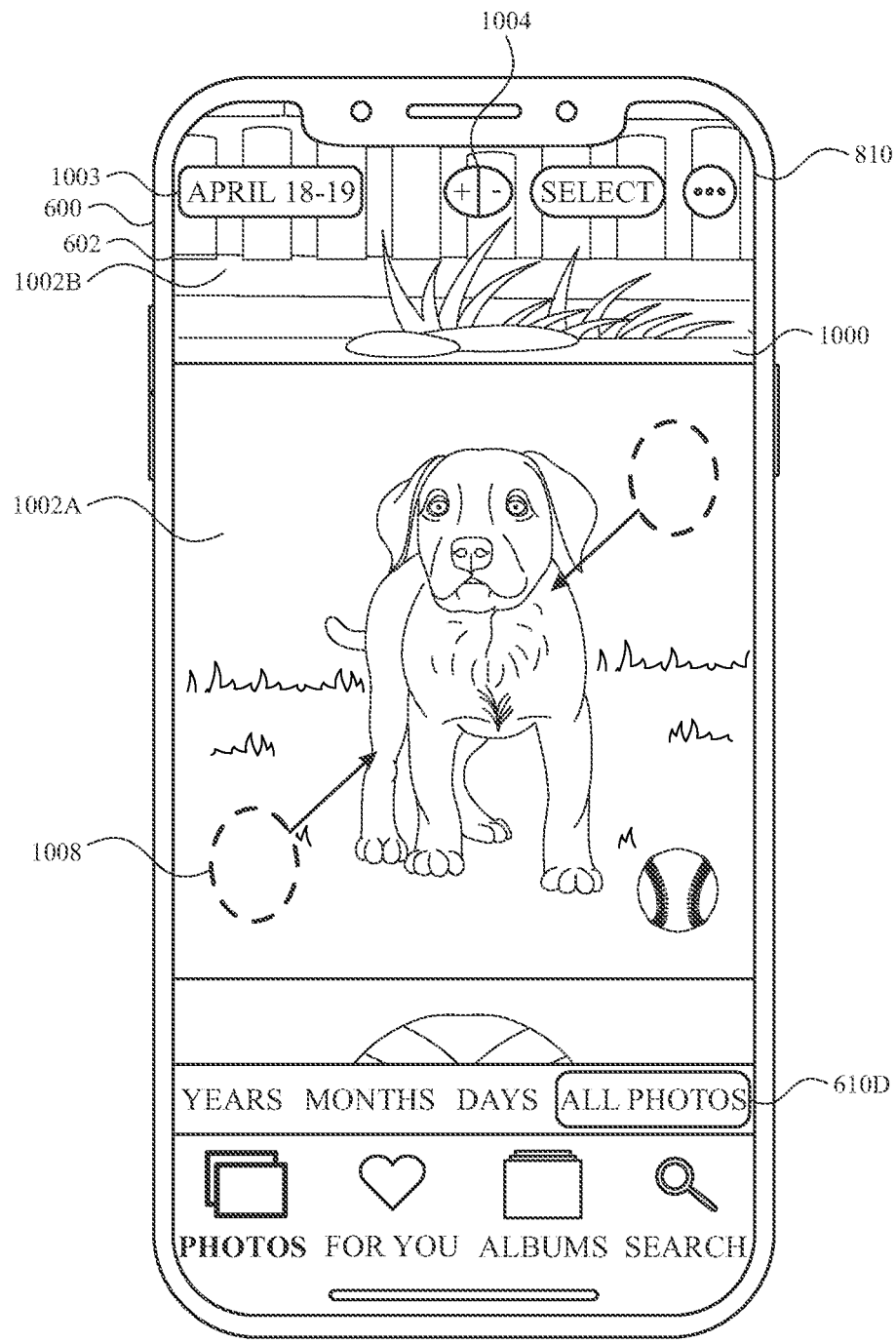

At FIG. 10F, in response to continued detection of input 1006, electronic device 600 continues changing the aspect ratio and increasing the size of photo 1002A based on the change in distance between the two contacts of input 1006. Specifically, electronic device 600 changes the aspect ratio of photo 1002A from the intermediate aspect ratio (e.g., 3:4) to a final aspect ratio (e.g., 9:16). In some embodiments, the final aspect ratio is the native (e.g., original) aspect ratio of the photo (e.g., 1002A). Additionally, electronic device 600 changes the height of photo 1002A by initially displaying top and bottom portions of photo 1002A that were not previously being displayed (e.g., in FIGS. 10A-10E). While changing the height of photo 1002A, electronic device 600 maintains the width of photo 1002A. Due to the change in height, photo 1002A has increased in size from the fourth intermediate size in FIG. 10E to a final size. Similar to FIG. 10E, the size of the photo has increased, but the level of magnification of the photo has not changed (e.g., the device does not zoom in on the photo). In some embodiments, at the final size, photo 1002A is being fully displayed (e.g., no portions fail to be displayed).

As a result of detecting input 1006, electronic device 600 has transitioned from the multi-column layout in FIG. 10A to the single-column layout in FIG. 10F. As discussed above, in the multi-column layout in FIG. 10A, electronic device 600 displays the photos at the same aspect ratio. In contrast, in the single-column layout, electronic device 600 displays the photos at their respective native aspect ratios, which can result in photos being concurrently displayed at different aspect ratios.

FIGS. 10F-10K illustrate that the operations shown in FIGS. 10A-10F can be reversed via a pinch in gesture. As shown in FIG. 10F, after photo 1002A has been fully displayed, the user performs a pinch in gesture to return photo 1002A to the state shown in FIG. 10A. As a result, electronic device 600 detects input 1008 with two contacts, where the distance between the two contacts is decreasing.

Figure 10G:
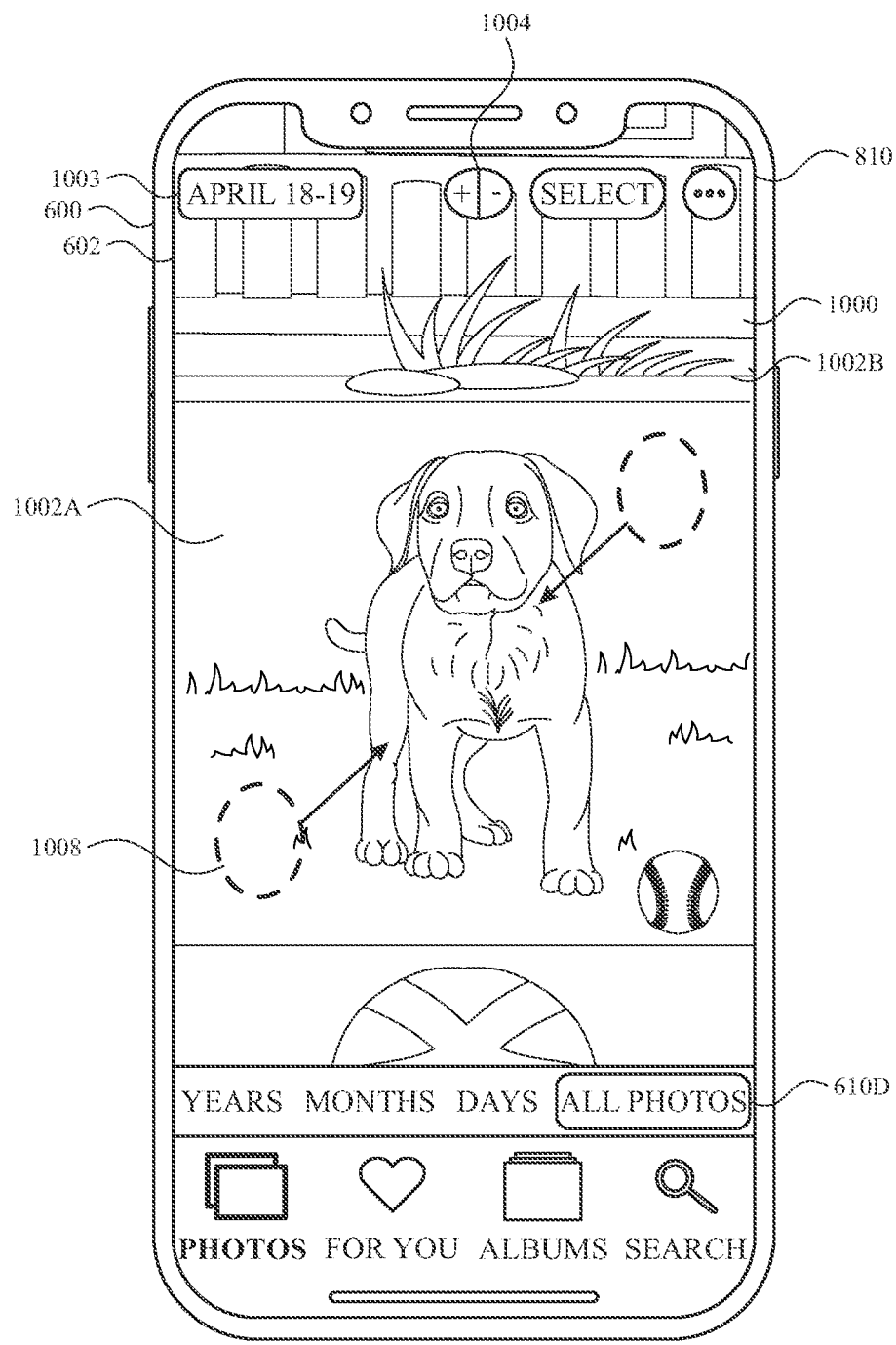

At FIG. 10G, in response to detecting input 1008, electronic device 600 changes the aspect ratio and decreases the size of photo 1002A. In particular, electronic device 600 changes the aspect ratio of photo 1002A from the final aspect ratio to the intermediate aspect ratio, and crops the photo (e.g., reduces the height of the photo while maintaining the width of the photo, ceases to display top and bottom portions of photo 1002A).

Photo 1002A is in a portrait format (aspect ratio). In some embodiments, photo 1002A is in a landscape format (aspect ratio). In some embodiments, if photo 1002A is in a landscape format, electronic device 600 crops the photo in response to detecting input 1008 by reducing the width of the photo while maintaining the height of the photo.

Figure 10H:
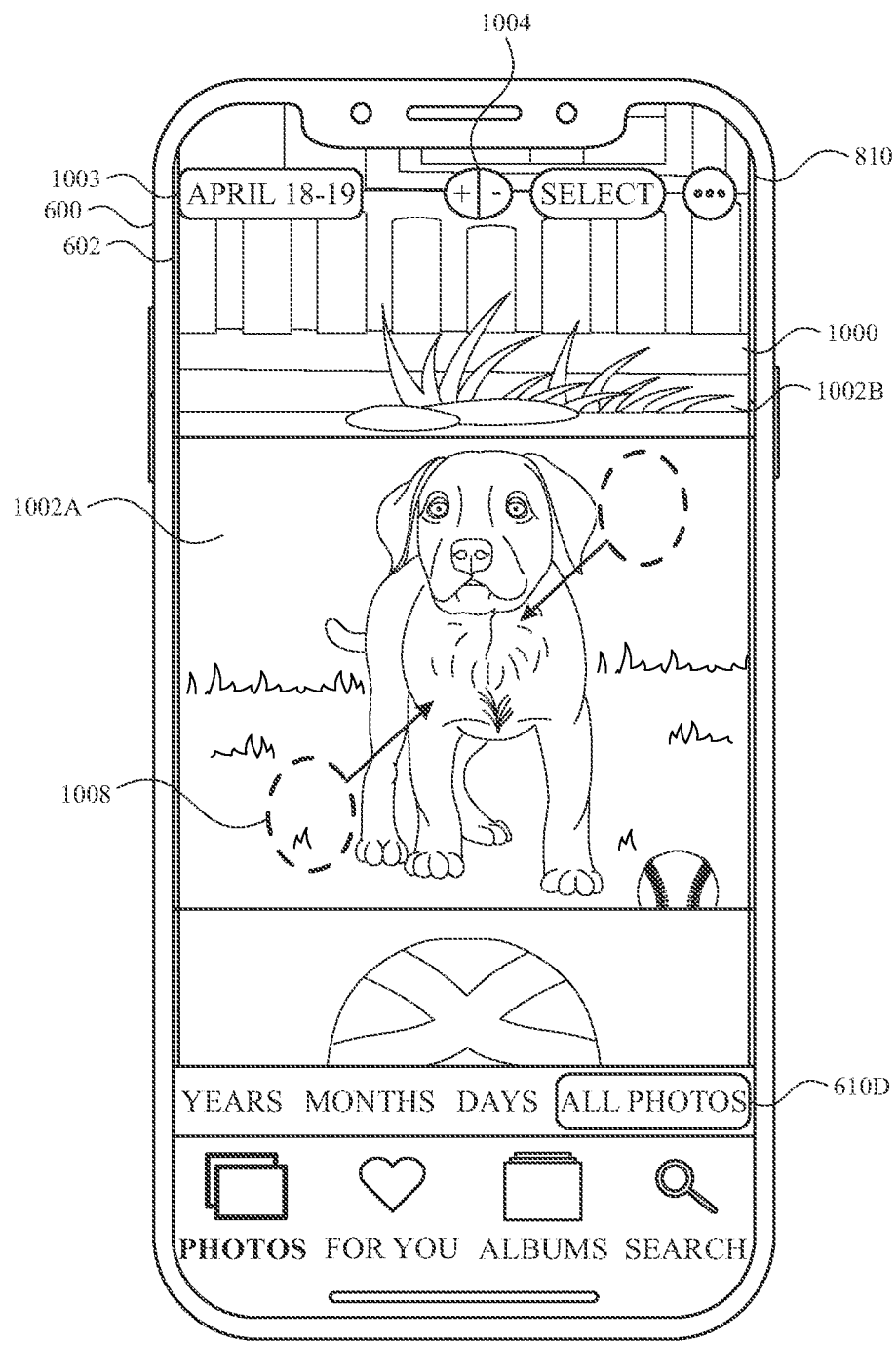

At FIG. 10H, in response to continued detection of input 1006, electronic device 600 changes the aspect ratio of photo 1002A from the intermediate aspect ratio to the initial aspect ratio, and further crops the photo (e.g., reduces the height of the photo while maintaining the width of the photo, ceases to display top and bottom portions of photo 1002A).

Figure 10I:
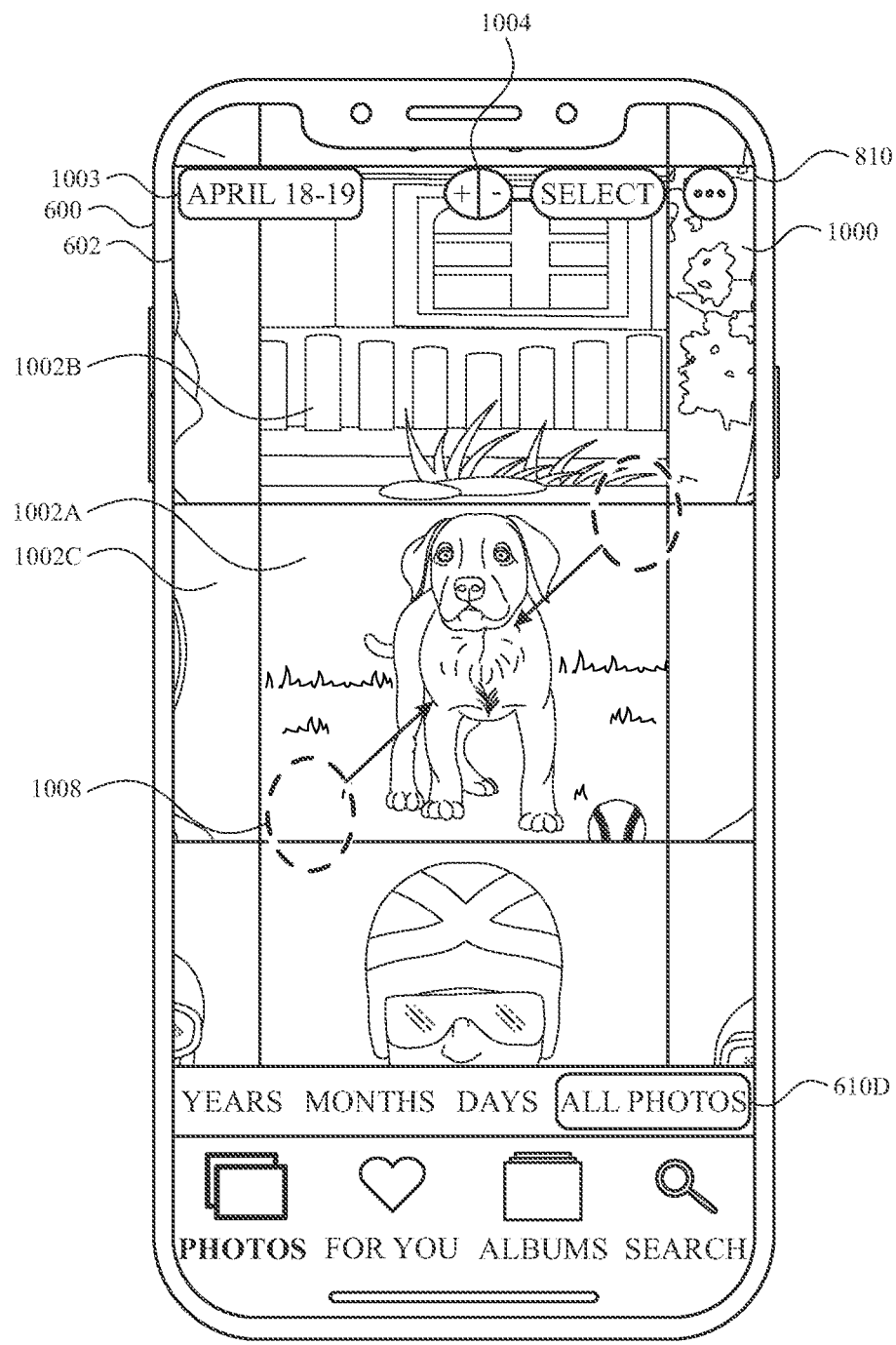

At FIG. 10I, in response to continued detection of input 1006, electronic device 600 reduces the size of the displayed photos (e.g., 1002A-1002B) while maintaining the aspect ratio of the displayed photos. Electronic device 600 reduces the size by changing the level of magnification of the displayed photos (e.g., the device zooms out on the photos).

Figure 10J:
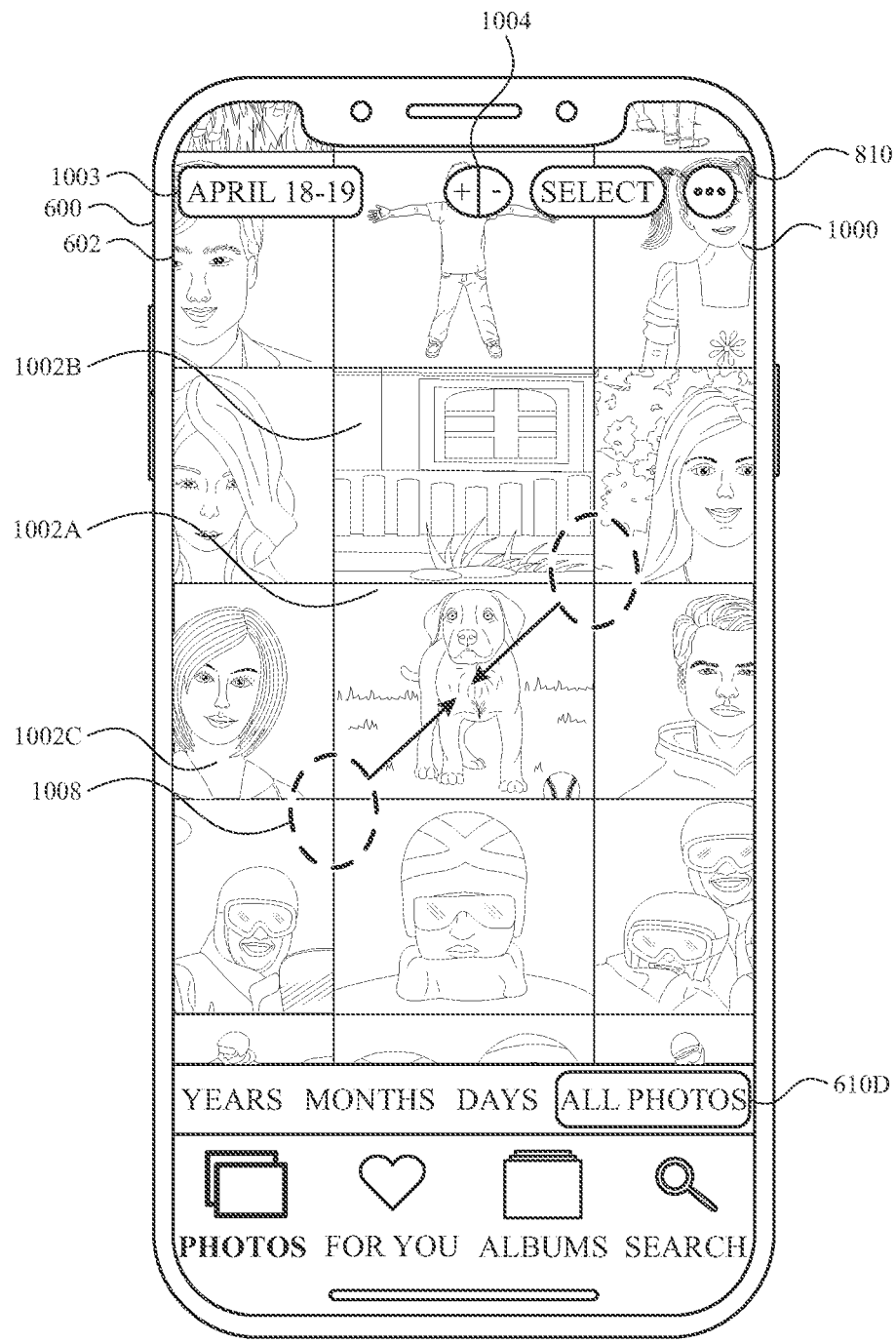
Figure 10K:
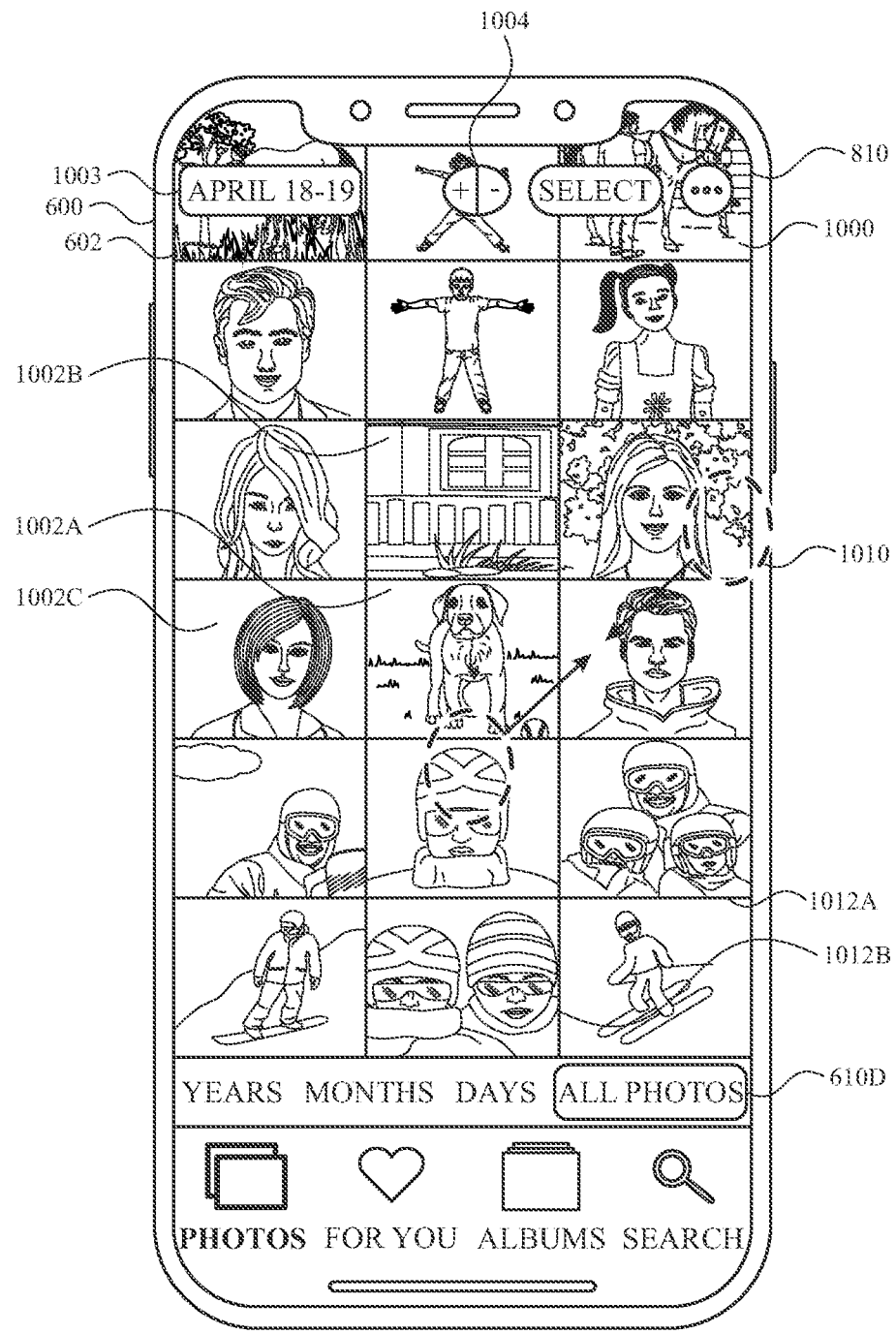

At FIGS. 10J-10K, in response to continued detection of input 1006, electronic device 600 reduces the size of the displayed photos (e.g., 1002A-1002C) while maintaining the aspect ratio of the displayed photos. Further, electronic device 600 initially displays at least a portion of a photo (e.g., 1002C) that was not previously displayed.

As shown in FIG. 10K, after photo 1002A has been returned to the state shown in FIG. 10A, the user performs a pinch in gesture to further reduce the size of the displayed photos (e.g., 1002A). As a result, electronic device 600 detects input 1010 with two contacts, where the distance between the two contacts is decreasing.

Figure 10L:
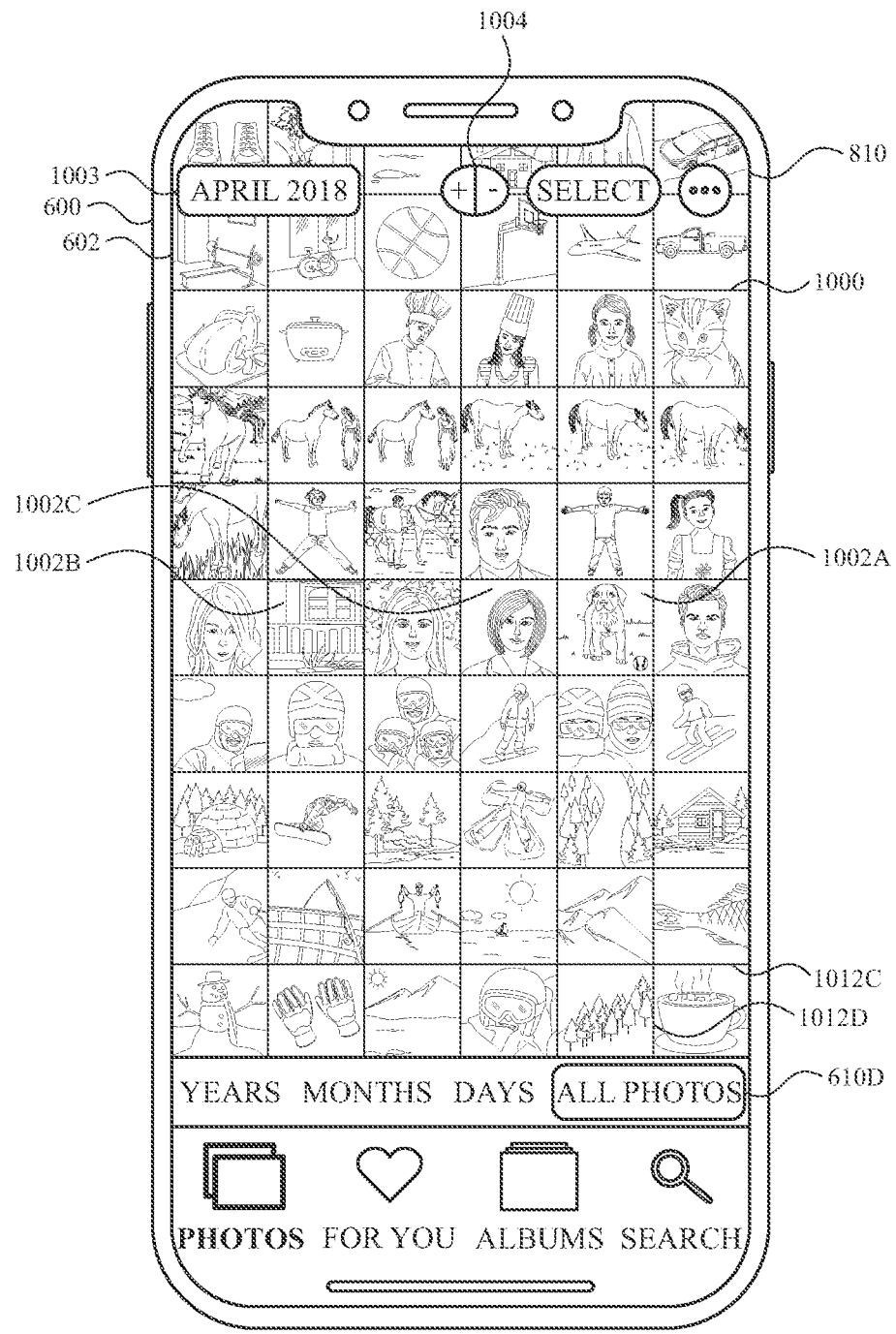

At FIG. 10L, in response to detecting input 1010, electronic device 600 changes the level of magnification of the displayed photos, but maintains the same aspect ratio. With the reduced size of the photos, electronic device 600 displays more photos in a six-column layout. Besides the number of columns, the six-column layout differs from the single-column layout (e.g., in FIG. 10F) and the three-column layout (e.g., in FIG. 10A) in another way. In particular, layouts with a number of columns that does not exceed a particular column threshold (e.g., 4, 6, 8) have displayed boundary lines (e.g., 1012A-1012B in FIG. 10K) between photos. Thus, the user can see the boundary lines between the photos. It is noted that layouts with a number of columns that does not exceed the particular column threshold can be referred to as a boundary line or keyline layout.

In contrast, layouts with a number of columns that exceeds the particular threshold do not include displayed boundary lines. For example, in FIG. 10L, boundary lines (e.g., 1012C-1012D) have been included for ease of explanation, but electronic device 600 does not actually display boundary lines between the photos. Layouts with a number of columns that exceeds the particular column threshold can be referred to as a non-boundary line or a non-keyline layout.

Returning to the non-boundary line layout in FIG. 10L, the user rotates electronic device 600 to view the photos while the device is in a landscape orientation. As a result, electronic device 600 detects a change in orientation of the device.

Figure 10M:
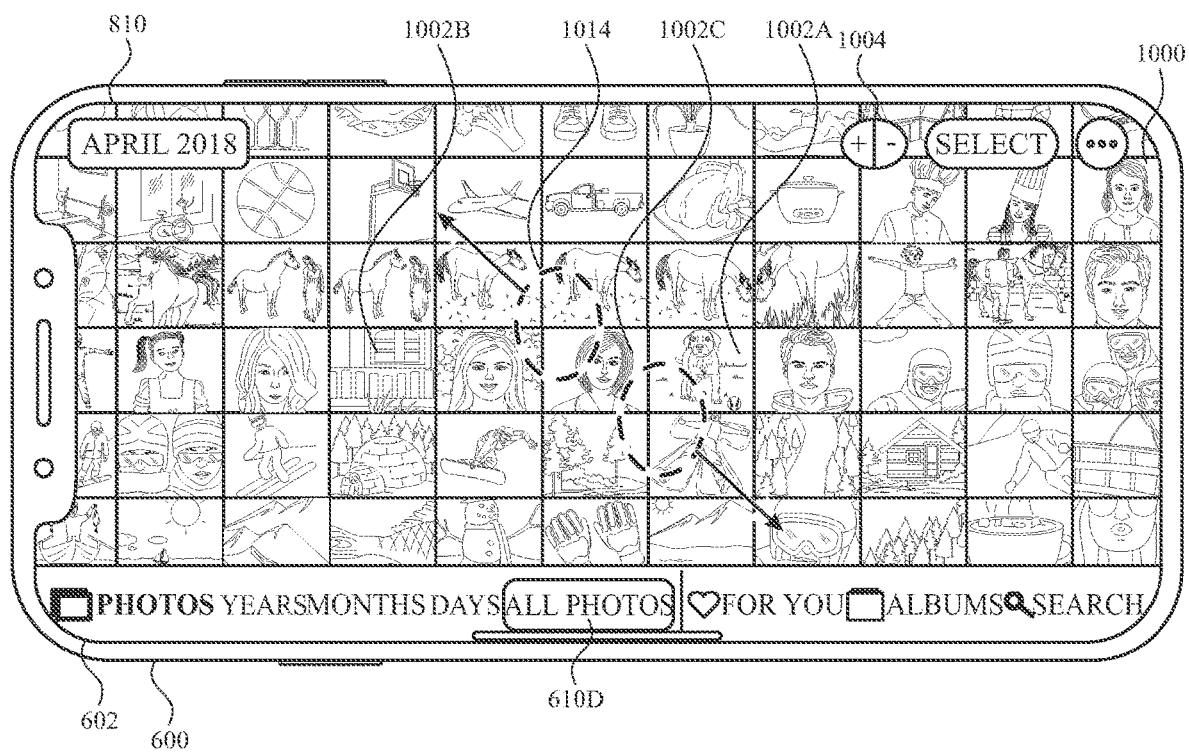

At FIG. 10M, in response to detecting the change in orientation of the device, electronic device 600 displays user interface 1000 in a landscape orientation with the photos being displayed in a non-boundary line layout. As discussed above, the boundary lines between photos in FIG. 10M are displayed for ease of explanation and are not actually displayed by electronic device 600.

While the photos are being displayed in a non-boundary line layout, a user is unable to perform certain operations. For example, as discussed below with respect to the boundary line layout in FIGS. 10N-10O, a user can perform a tap gesture on a full frame affordance (e.g., 810M) to transition the displayed photos from an initial aspect ratio (e.g., 1:1) to their respective native aspect ratios. In contrast, returning to FIG. 10M, electronic device 600 does not display the full frame affordance in a non-boundary line layout. Accordingly, in a non-boundary line layout, a user is unable to directly transition the displayed photos to their respective native aspect ratios.

In some embodiments, another operation that is unavailable in a non-boundary line layout is expanding a photo to full size in response to a tap gesture. For example, in FIG. 10A, photo 1002A is being displayed in a boundary line layout. In some embodiments, if electronic device 600 detects an input (e.g., tap gesture) at photo 1002A in a boundary line layout, electronic device 600 displays photo 1002A at full size (e.g., ceases display of the other photos (e.g., 1002B-1002C)). In contrast, if electronic device 600 detects an input (e.g., tap gesture) at photo 1002A in a non-boundary line layout, electronic device 600 forgoes displaying photo 1002A at the full size.

Returning to FIG. 10M, the user performs a pinch out gesture to expand the size of displayed photos. As a result, electronic device 600 detects input 1014 with two contacts, where the distance between the two contacts is increasing.

Figure 10N:
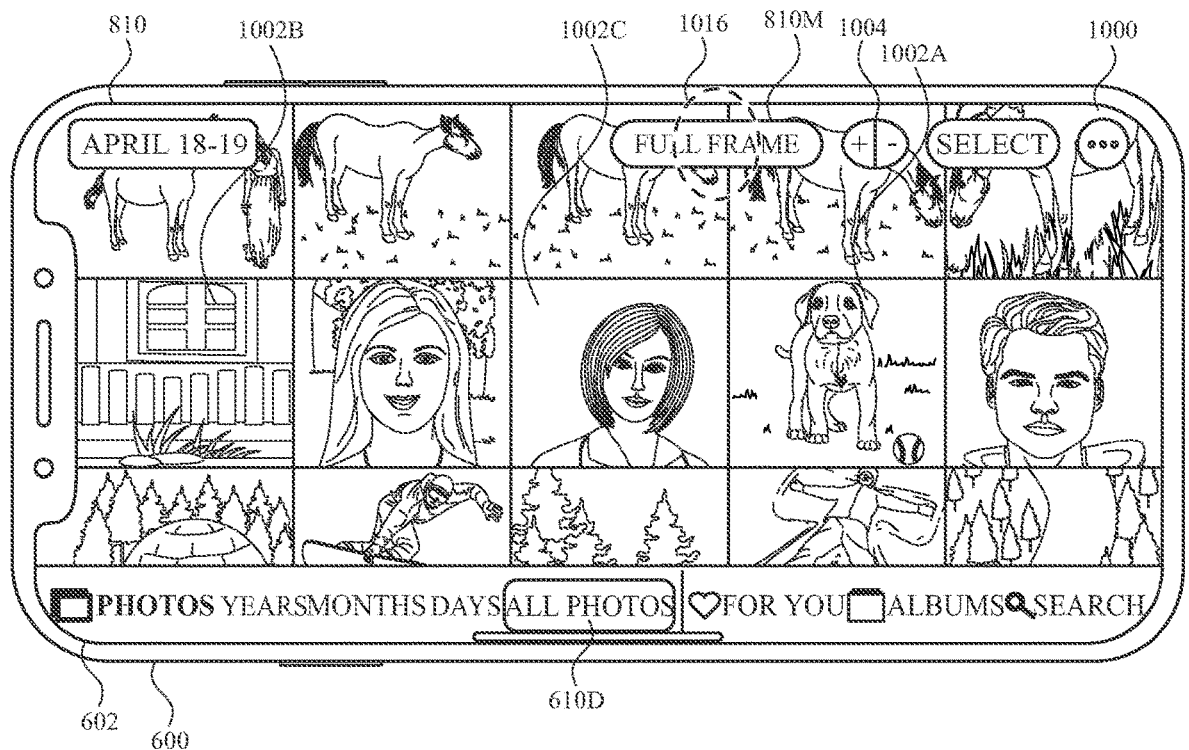

At FIG. 10N, in response to detecting input 1014, electronic device 600 expands the size of displayed photos in user interface 1000. The displayed photos are all displayed at the same aspect ratio (e.g., 1:1) in a boundary line layout. As a result, user interface 1000 now includes full frame affordance 810M, which, when selected, causes the displayed photos to transition from an initial aspect ratio (e.g., 1:1) to their respective native (e.g., original) aspect ratios.

In some embodiments, user interface 1000 includes full frame affordance 810M when the photos are being displayed in a boundary line layout, regardless of whether the user interface is in a portrait or landscape orientation.

Returning to FIG. 10N, the user performs a tap gesture to transition the photos to their respective native aspect ratios. As a result, electronic device 600 detects input 1016 at full frame affordance 810M.

At FIG. 10O, in response to detecting input 1016, electronic device 600 transitions the displayed photos to their respective native aspect ratios. For example, photo 1002C transitions from an initial aspect ratio (e.g., 1:1) to a native aspect ratio (e.g., 4:3). As another example, photo 1002A transitions from an initial aspect ratio (e.g., 1:1) to a native aspect ratio (e.g., 9:16). Accordingly, user interface 1000 in FIG. 10O includes photos with different aspect ratios. In contrast, as discussed above, FIG. 10N includes photos with all the same aspect ratio.

FIG. 11 is a flow diagram illustrating a method for navigating a collection of media items using an electronic device in accordance with some embodiments. Method 1100 is performed at a device (e.g., 100, 300, 500, 600, 1200) with a display device. Some operations in method 1100 are, optionally, combined, the orders of some operations are, optionally, changed, and some operations are, optionally, omitted.

As described below, method 1100 provides an intuitive way for navigating a collection of media items. The method reduces the cognitive burden on a user for navigating a collection of media items, thereby creating a more efficient human-machine interface. For battery-operated computing devices, enabling a user to navigate a collection of media items faster and more efficiently conserves power and increases the time between battery charges.

The electronic device (e.g., 600) displays (1102), via the display device (e.g., 602), a plurality of content items (e.g., 1002A-1002C) (e.g., photo, video, or representations thereof) in a first layout (e.g., 810 in FIG. 10A) (e.g., view, multi-column view, multi-row view) that includes a plurality of rows and a plurality of columns.

As part of displaying the plurality of content items in the first layout (e.g., 810 in FIG. 10A) that includes the plurality of rows and the plurality of columns, the electronic device displays (1104) a first content item (e.g., 1002A) of the plurality of content items at a first aspect ratio and a first size. In some embodiments, displaying the first content item (and optionally, second/third content items) at the first aspect ratio causes a portion of the respective content item to not be displayed. In some embodiments, aspect ratio refers to the ratio of width to height of the content item.

As part of displaying the plurality of content items (e.g., 1002A-1002C) in the first layout (e.g., 810 in FIG. 10A) that includes the plurality of rows and the plurality of columns, the electronic device displays (1106) a second content item (e.g., 1002B) of the plurality of content items.

As part of displaying the plurality of content items in the first layout (e.g., 810 in FIG. 10A) that includes the plurality of rows and the plurality of columns, the electronic device displays (1108) a third content item (e.g., 1002C) of the plurality of content items.

While displaying, via the display device (e.g., 602), the plurality of content items in the first layout (e.g., 810 in FIG. 10A) that includes the plurality of rows and the plurality of columns, the electronic device detects (1110) a user input (e.g., 1006) that includes a gesture (e.g., with movement, a pinch gesture). The user input corresponds to a request to change a size of the first content item (e.g., user gesture (e.g., double-tap and drag gesture, pinch gesture (e.g., detecting two contacts on the display device where the distance between the two contacts increases or decreases)), voice input). In some embodiments, the user input is detected at a location corresponding to (e.g., at/on) the plurality of content items.

In response to detecting the user input (e.g., 1006), the electronic device gradually changes (1112), as the gesture progresses, the size of the first content item (e.g., 1002A) from the first size to a second size that is different from the first size while concurrently gradually changing, as the gesture progresses, an aspect ratio of the first content item from the first aspect ratio to a second aspect ratio that is different from the first aspect ratio. In some embodiments, displaying the first content item at the second aspect ratio causes all of the first content item to be displayed. Gradually changing the size and aspect ratio of the content item in response to the user input provides the user with feedback that the two images (at the first size, at the second size) are the same image, but resized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of gradually changing the size of the first content item (e.g., 1002A) from the first size to the second size, the electronic device (e.g., 600) gradually changes the size of the first content item from the first size to the second size in conjunction with movement of the gesture (e.g., 1006) (e.g., the size changes over time in conjunction with movement of the gesture over time). In some embodiments, as part of gradually changing the aspect ratio of the first content item from the first aspect ratio to the second aspect ratio, the electronic device gradually changes the aspect ratio of the first content item from the first aspect ratio to the second aspect ratio in conjunction with movement of the gesture (e.g., the aspect ratio changes over time in conjunction with movement of the gesture over time). In some embodiments, the faster the movement of the gesture, the faster the change in size and aspect ratio of the first content item, and the slower the movement of the gesture, the slower the change in size and aspect ratio of the first content item. Gradually changing the size and aspect ratio of the content item in conjunction with the user input provides the user with feedback that it is the input that is causing the changes to happen. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of gradually changing the aspect ratio of the first content item from the first aspect ratio to the second aspect ratio, the electronic device gradually changes the aspect ratio of the first content item (e.g., 1002A) from the first aspect ratio to an intermediate aspect ratio while maintaining a magnification of the first content item (e.g., the first content item is cropped to change the aspect ratio without changing the magnification of the non-cropped portions; additional portions of the first content item are revealed (e.g., un-cropped) without changing the magnification of the initial portions of the first content item), and gradually changes (e.g., subsequent to gradually changing the aspect ratio of the first content item from the first aspect ratio to an intermediate aspect ratio while maintaining a magnification of the first content item) the aspect ratio of the first content item from the intermediate aspect ratio to the second aspect ratio while changing a magnification of the first content item (e.g., making the content bigger, making the content smaller).

In some embodiments, as part of changing the aspect ratio of the first content item from the first aspect ratio to the second aspect ratio, the electronic device crops portions of the first content item (e.g., 1002A) (e.g., removing previously displayed portions of the first content item) or reveals previously cropped portions of the first content item (e.g., keeping the existing content of the first content item at a same magnification or substantially the same magnification as the magnification of the content when it was displayed in the first aspect ratio and revealing additional portions (e.g., on one or more edges) of the first content item). Changing the aspect ratio of the content item by cropping or revealing allows more images to fit onto the screen when in a high-density view mode and allows images to be seen in at their native aspect ratio when in a low-density view mode. Changing content items to fit more onto the display enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of displaying the second content item (e.g., 1002B) in the first layout (e.g., 810 in FIG. 10A), the electronic device displays the second content item (e.g., 1002B) at the first aspect ratio. In some embodiments, as part of displaying the third content item (e.g., 1002C) in the first layout, the electronic device displays the third content item at the first aspect ratio. In some embodiments, all displayed content items in the first layout have the same aspect ratio (the first aspect ratio). Maintaining the same aspect ratio of multiple content items allows for arranging content items for display in a more space-efficient manner, thereby preserving display space and concurrently providing the user with feedback about more content items. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first aspect ratio is square (e.g., 1:1). In some embodiments, the second aspect ratio is rectangular with unequal adjacent sides (e.g., a non-square rectangle, a landscape format (wider than it is tall), a portrait format (taller than it is wide); 4:3, 3:4). Maintaining a square aspect ratio for multiple content items allows for arranging content items for display in a more space-efficient manner, thereby preserving display space and concurrently providing the user with feedback about more content items. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of displaying the second content item (e.g., 1002B) in the first layout (e.g., 810 in FIG. 10A), the electronic device (e.g., 600) displays the second content item (e.g., 1002B) at the first aspect ratio. In some embodiments, method 1100 further includes one or more of the following items. In response to detecting the user input (e.g., 1006), the electronic device changes (e.g., gradually) an aspect ratio of the second content item (e.g., 1002B) from the first aspect ratio to a third aspect ratio (and, optionally, concurrently changes the size of the second content item from the first size to a size that is different from the first size and the second size). The third aspect ratio is different from the first aspect ratio and the second aspect ratio. In some embodiments, as part of displaying, via the display device, the plurality of content items (e.g., photo, video, or representations thereof) in the first layout, the electronic device performs one or more of the following items. In accordance with a determination that the electronic device is in a portrait mode (e.g., a determination that the orientation of the device is a portrait orientation), the electronic device displays the plurality of content items in the first layout using a first quantity (e.g., 3 or 5) of columns. In accordance with a determination that the electronic device is in a landscape mode (e.g., a determination that the orientation of the device is a landscape orientation), the electronic device displays the plurality of content items in the first layout using a second quantity (e.g., 5 or 7) of columns different from the first quantity. Displaying content items in their native aspect ratio in response to user input provides the user with feedback about what the native aspect ratio is for each content item. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, method 1100 further includes, in response to detecting the user input (e.g., 1006), the electronic device displays, via the display device, a subset (e.g., less than all of the plurality of content items) of the plurality of content items in a second layout (e.g., 810 in FIG. 10F) (e.g., view, zoomed-in view, single column view, single row view) that includes a single row or a single column. In some embodiments, as part of displaying the subset of the plurality of content items in the second layout that includes the single row or the single column, the electronic device concurrently displays, on the display device, with the first content item (e.g., 1002A) at the second aspect ratio, the second content item (e.g., 1002B) of the plurality of content items at a third aspect ratio, wherein the third aspect ratio is different from the first aspect ratio, and without concurrently displaying the third content item (e.g., 1002C) of the plurality of content items. In some embodiments, displaying the second content item at the third aspect ratio causes all of the second content item to be displayed. In some embodiments, the second aspect ratio and the third aspect ratio are the same. In some embodiments, the second aspect ratio and the third aspect ratio are different. In some embodiments, in response to detecting the user input, a determination is made as to whether the distance between two detected contacts of the user input exceeds a predetermined (e.g., non-zero) threshold (e.g., at the time of liftoff of the user input). In some embodiments, in accordance with a determination that the distance exceeds the predetermined threshold (e.g., at the time of liftoff of the user input), the electronic device displays the subset of the plurality of content items in the second layout. In some embodiments, in accordance with a determination that the distance does not exceed the predetermined threshold (e.g., at the time of liftoff of the user input), the electronic device maintains display of the plurality of content items in the first layout.

In some embodiments, method 1100 further includes, while displaying, via the display device, the first content item (e.g., 1002A) at the second size and at the second aspect ratio, the electronic device detects a second user input (e.g., 1008) that corresponds to a request to change a size of the first content item (e.g., user gesture (e.g., de-pinch gesture (e.g., detecting two contacts on the display device where the distance between the two contacts increases or decreases)), voice input). In some embodiments, the user input is detected at a location corresponding to (e.g., at/on) the first content item. In some embodiments, method 1100 further includes, in response to detecting the second user input, the electronic device gradually changes the size of the first content item from the second size to the first size while concurrently gradually changing the aspect ratio of the first content item from the second aspect ratio to the first aspect ratio (e.g., to display the plurality of content items in the first layout). In some embodiments, in response to detecting the second user input, the device displays the first content item using the first layout (e.g., view, multi-column view, multi-row view).

In some embodiments, as part of changing the aspect ratio of the first content item (e.g., 1002A) from the second aspect ratio to the first aspect ratio, the electronic device performs one or more of the following items. In accordance with a determination that the first content (e.g., 1002A) item is in a portrait format (e.g., taller than it is wide), the electronic device reduces the height of the first content item (e.g., with or without reducing the width of the first content item). In some embodiments, as part of changing the aspect ratio of the first content item from the second aspect ratio to the first aspect ratio, the electronic device maintains the width of the first content item. In some embodiments, as part of changing the aspect ratio of the first content item from the second aspect ratio to the first aspect ratio, the electronic device changes the width of the first content item (e.g., increasing, decreasing). In some embodiments, changing the aspect ratio of the first content item from the second aspect ratio to the first aspect ratio is a canned transition (e.g., that does not correspond to any movement of a gesture of the second user input). In some embodiments, changing the aspect ratio of the first content item from the second aspect ratio to the first aspect ratio occurs at a rate or by an amount that is determined in accordance with movement of the gesture of the second user input (e.g., gradually, over time with (in conjunction with) the movement of the gesture).

In some embodiments, as part of changing the aspect ratio of the first content item (e.g., 1002A) from the second aspect ratio to the first aspect ratio, the electronic device performs one or more of the following items. In accordance with a determination that the first content (e.g., 1002A) item is in a landscape format (e.g., taller than it is wide), the electronic device reduces the width of the first content item (e.g., with or without reducing the height of the first content item). In some embodiments, as part of changing the aspect ratio of the first content item from the second aspect ratio to the first aspect ratio, the electronic device maintains the height of the first content item. In some embodiments, as part of changing the aspect ratio of the first content item from the second aspect ratio to the first aspect ratio, the electronic device changes the height of the first content item (e.g., increasing, decreasing). In some embodiments, changing the aspect ratio of the first content item from the second aspect ratio to the first aspect ratio is a canned transition (e.g., that does not correspond to any movement of a gesture of the second user input). In some embodiments, changing the aspect ratio of the first content item from the second aspect ratio to the first aspect ratio occurs in accordance with movement of the gesture of the second user input (e.g., gradually, over time with the movement of the gesture).

In some embodiments, method 1100 further includes, while displaying, via the display device (e.g., 602), the plurality of content items (e.g., photo, video, or representations thereof), including the first content item (e.g., 1002A) at the first size and at the first aspect ratio, in the first layout (e.g., 810 in FIG. 10M) (e.g., view, multi-column view, multi-row view) that includes the plurality of rows and the plurality of columns, the electronic device detects a third user input (e.g., 1014) that corresponds to a request to change a size of the first content item (e.g., user gesture (e.g., de-pinch gesture (e.g., detecting two contacts on the display device where the distance between the two contacts increases or decreases)), voice input). In some embodiments, the user input is detected at a location corresponding to (e.g., at/on) the first content item. In some embodiments, method 1100 further includes, in response to detecting the third user input (e.g., 1014), the electronic device displays, via the display device, a second plurality of content items (e.g., that includes the first content item; photo, video, or representations thereof) in a third layout (e.g., 810 in FIG. 10N) (e.g., more rows and/or columns than the first layout; view, multi-column view, multi-row view) that includes a second plurality of rows (e.g., different from (such as more rows than) the plurality of rows) and a second plurality of columns (e.g., different from (such as more columns than) the plurality of columns). In some embodiments, as part of displaying the second plurality of content items in a third layout that includes a second plurality of rows and a second plurality of columns, the electronic device gradually changes the size of the first content item (e.g., 1002A) from the first size to a third size (e.g., bigger than the first size) without changing the aspect ratio of the first content item. In some embodiments, as part of displaying the second plurality of content items in the third layout, the electronic device displays content items that were not displayed in the first layout (while optionally displaying all content items that were displayed in the first layout). In some embodiments, as part of displaying the second plurality of content items in the third layout, the electronic device maintains the aspect ratio of the content items of the plurality of content items (since they are included in the second plurality of content items) as they were displayed in the first layout while changing (e.g., decreasing) the size of the content items.

In some embodiments, the second layout (e.g., 810 in FIG. 10F) is different from the first layout (e.g., 810 in FIG. 10A). In some embodiments, in the first layout the second content item (e.g., 1002B) has (e.g., is at, is positioned at) a first location relative to the first content item (e.g., 1002A). In some embodiments, in the second layout a third content item (e.g., 1002C), different from the first content item, has the first location relative to the first content item. In some embodiments, as part of displaying, on the display device, the subset (e.g., less than all of the plurality of content items) of the plurality of content items in the second layout, the electronic device (e.g., 600) transitions, as a gesture (e.g., pinch gesture) of the second user input (e.g., 1006) progresses, from displaying the first content item (e.g., 1002A) in the first layout (e.g., 810 in FIG. 10A) to displaying the first content item in the second layout (e.g., 810 in FIG. 10F). In some embodiments, as part of transitioning, as a gesture of the second user input (e.g., 1006) progresses, from displaying the first content item in the first layout to displaying the first content item in the second layout, the electronic device displays a combination (e.g., a crossfade) of the second content (e.g., 1002B) and the third content (e.g., 1002C) at the first location relative to the first content item (e.g., 1002A) during the transition from displaying the first content item in the first layout to displaying the first content item in the second layout. In some embodiments, the electronic device uses crossfading techniques as described with respect to FIG. 12A-12I. Crossfading the content items provides the user with feedback about where content items have moved to when switching from the first layout to the second layout. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, method 1100 further includes, while displaying, via the display device (e.g., 602), the plurality of content items (e.g., 1002A-1002C) (e.g., photo, video, or representations thereof), including the first content item (e.g., 1002A) at the first size and at the first aspect ratio, in the first layout (e.g., 810 at FIG. 10N) (e.g., view, multi-column view, multi-row view) that includes the plurality of rows and the plurality of columns, the electronic device detects a fourth user input (e.g., 1016) (e.g., a tap on a full frame/grid affordance (e.g., 810M-810N) that corresponds to a request to change an aspect ratio of the first content item. In some embodiments, the user input is detected at a location corresponding to (e.g., at/on) the full frame/grid affordance. In some embodiments, method 1100 further includes, in response to detecting the fourth user input, the electronic device changes the aspect ratio of at least some of the plurality of content items (e.g., 1002A-1002C) while continuing to display the plurality of content items in the first layout (e.g., 810 at FIG. 10O), including changing the aspect ratio of the first content item from the first aspect ratio to a third aspect ratio (e.g., same as the second aspect ratio). In some embodiments, no additional (or fewer) content items are displayed in response to the fourth user input. In some embodiments, the device maintains the aspect ratio of some others of the plurality of content items. In some embodiments, the second layout includes greater separation between content items than the first layout. In some embodiments, the first layout includes greater separation between content items than the second layout.

In some embodiments, method 1100 further includes, while displaying the plurality of content items (e.g., 1002A-1002C) (e.g., photo, video, or representations thereof) in the first layout (e.g., 810 in FIG. 10N) (e.g., view, multi-column view, multi-row view) that includes the plurality of rows and the plurality of columns, the electronic device (e.g., 600) provides an option (e.g., 810M-810N) to change aspect ratios of at least some of the plurality of content items while continuing to display the plurality of content items in the first layout. In some embodiments, the option to change aspect ratios is an affordance which, when activated, changes the aspect ratio of the first content item from the first aspect ratio to the second aspect ratio. In some embodiments, method 1100 further includes, subsequent to displaying the plurality of content items (e.g., photo, video, or representations thereof) in the first layout, the electronic device displays the plurality of content items in a fourth layout (e.g., 810 in FIG. 10M) that includes a third plurality of rows (e.g., different from (such as more rows than) the plurality of rows and/or second plurality of rows) and a third plurality of columns (e.g., different from (such as more columns than) the plurality of columns and the second plurality of columns) without providing the option (e.g., 810M-810N) to change aspect ratios of at least some (or, optionally, all) of the plurality of content items. In some embodiments, the fourth layout includes more content items than the first layout, the second layout, and the third layout. In some embodiments, no additional (or fewer) content items are displayed in response detecting activation of the option to change aspect ratios of at least some of the content items. In some embodiments, the device maintains the aspect ratio of some others of the plurality of content items in response detecting activation of the option to change aspect ratios of at least some of the content items. In some embodiments, the fourth layout includes less separation between content items than the first layout.

Note that details of the processes described above with respect to method 1100 (e.g., FIG. 11) are also applicable in an analogous manner to the methods described below/above. For example, methods 700, 900, 1300, and 1500 optionally includes one or more of the characteristics of the various methods described above with reference to method 1100. For example, the electronic device in method 1100 can performs techniques related to displaying days view 640 and all photos view 810, as described with respect to methods 700 and 900. For brevity, these details are not repeated below.

FIGS. 12A-12O illustrate exemplary devices and user interfaces for navigating a collection of media items, in accordance with some embodiments. The user interfaces in these figures are used to illustrate the processes described below, including the processes in FIG. 13.

FIG. 12A depicts electronic device 1200, which is a tablet computer with display 1202. Display 1202 includes a touch-sensitive surface on which electronic device 1200 can detect user gestures (e.g., tap, swipe, drag). In some embodiments, electronic device 1200 includes one or more features of electronic device 100, 300, or 500.

At FIG. 12A, electronic device 1200 displays user interface 1206 for navigating a collection of media items (e.g., photos, videos). User interface 1206 includes a plurality of photos being displayed in all photos view 810 with layout 1212A. Additional details of all photos view 810 is described above with respect to FIG. 8D. For example, as discussed above, all photos view 810 includes a non-curated set of media items (e.g., photos, videos) from a media library or representations thereof.

Returning to FIG. 12A, layout 1212A includes a plurality of photos such as photos A-T and photo 1208. For ease of explanation, FIG. 12A depicts photos A-T using letters that serve as representations of an actual photo (e.g., 1208). A letter in a box represents a photo that occupies the location (e.g., region) of that box. Additionally, electronic device 1200 displays photos A-T and photo 1208 at the same initial size and at the same initial aspect ratio (e.g., 1:1). Additionally, electronic device 1200 displays photos A-T and photo 1208 in a particular sequence (e.g., top-to-bottom, left-to-right). As discussed below, electronic device 1200 maintains the sequence of photos even when certain operations are being performed (e.g., changing a magnification level of a photo).

As shown in FIG. 12A, a user performs a pinch out gesture to zoom in on photo 1208.

As a result, electronic device 1200 detects input 1210 with two contacts, where the distance between the two contacts is increasing. Electronic device 1200 detects input 1210 at a location corresponding to photo 1208. In response to detecting input 1210, electronic device 1200 zooms in on photo 1208, and initiates a transition between layout 1212A of FIG. 12A and layout 1212D of FIG. 12E.

To maintain the sequence of photos, electronic device 1200 replaces certain photos with duplicate versions of other photos during the transition, as further discussed below. Looking ahead to FIG. 12E, if electronic device 1200 did not replace certain photos, the row occupied by photos D-H in layout 1212D would instead be occupied by photos B-F, respectively. For example, without photos being replaced, photo F would remain above photo L in the transition from layout 1212A of FIG. 12A to layout 1212D of FIG. 12E. Accordingly, in this scenario, photo F rather than photo H would immediately precede photo I. As a result, the sequence of photos would not be maintained.

Figure 12B:
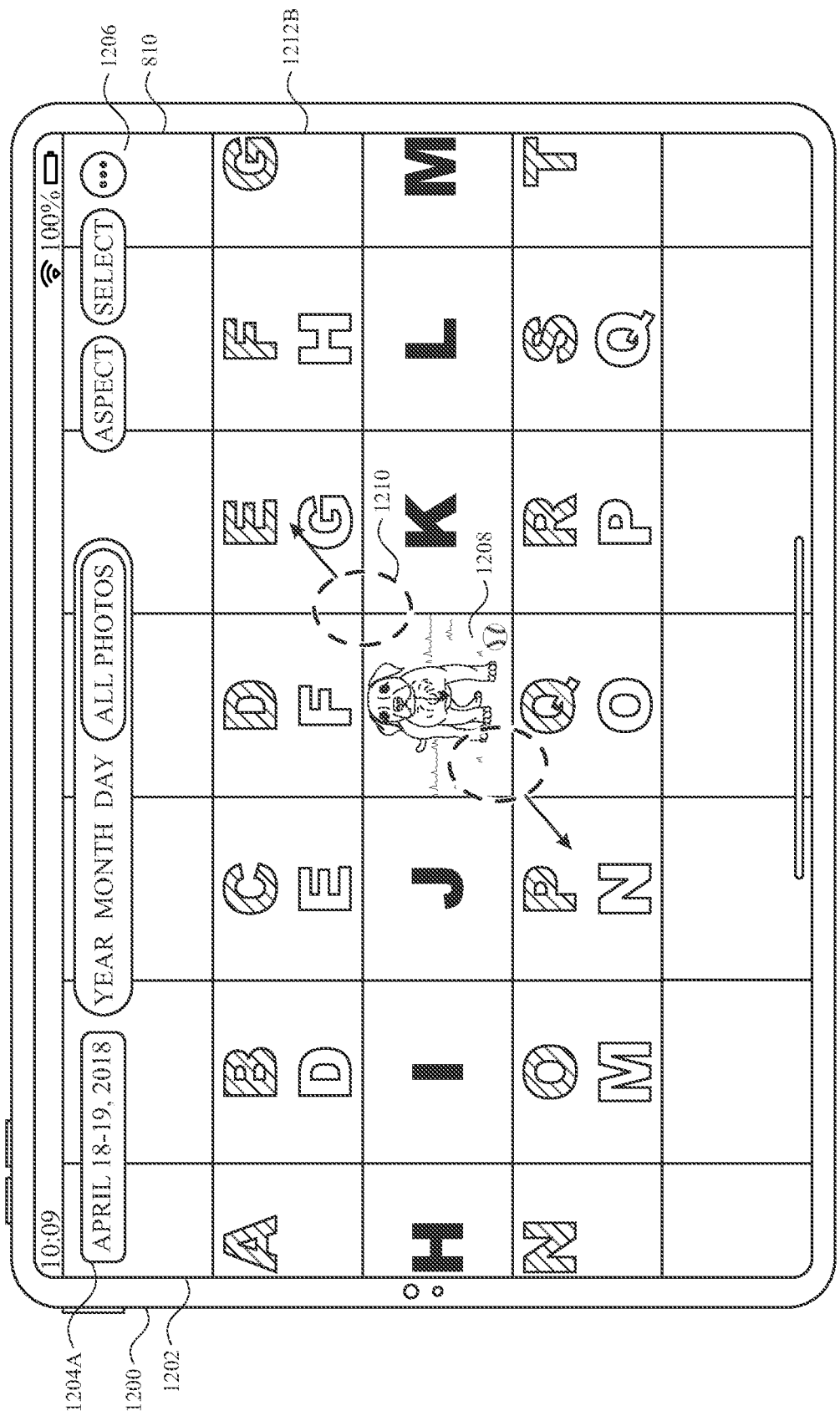

Turning to the start of the transition at FIG. 12B, electronic device 1200 begins the process of replacing certain photos using crossfading techniques, as described below. Specifically, electronic device 1200 initially displays duplicate versions of certain photos with partial opacity (e.g., 20%, 30%, 40%), as depicted in layout 1212B of FIG. 12B. It is noted that partial opacity is represented by a hollow letter (e.g., "E" in second row, third column). During the transition, a duplicate version of a photo occupies the same location (e.g., region) as a photo in the same box. For example, photo C in the third column occupies the same location as photo E in the third column. Thus, FIG. 12B depicts that electronic device 1200 displays a combination of photo C and photo E at the same location. For ease of explanation and readability, letters in the same box, which represent a combination of photos, are displayed near each other rather than on top of each other. In some embodiments, other techniques (e.g., wipe, fade in/fade out) besides crossfading can be used (in addition to, or in place of cross fading) for replacing one photo with another.

Returning to the transition at FIG. 12B, electronic device 1200 also begins reducing the opacity level (e.g., increasing the transparency level) of photos that are above and below the row in which input 1210 is being detected. Thus, electronic device 1200 reduces the opacity level of photos A-G and N-T, which have striped lettering in FIG. 12B. FIGS. 12A-12B depict the reduction in opacity by replacing a filled-in letter, which represents full opacity (e.g., 100%), with a striped letter, which represents a high opacity level (e.g., 60%, 70%, 80%). For example, the opacity level of photo C is being reduced, as indicated by the striped letter in FIG. 12B. In contrast, electronic device 1200 does not change the opacity level of the photos in the row in which input 1210 was detected. Accordingly, electronic device 1200 does not reduce the opacity level of photos H-M and photo 1208.

In addition to replacement of certain photos as discussed above, electronic device 1200 increases the size of the displayed photos in response to detecting input 1210, resulting in at least a portion of certain photos ceasing to be displayed (e.g., A, G, H, M, N, and T in the left-most and right-most columns), as shown in layout 1212B of FIG. 12B. In some embodiments, the change in size and/or opacity level of the displayed photos corresponds to the change in distance between the two contacts of input 1210. Changing the size of a photo can include changing the magnification level of a photo. For example, increasing the size of a photo can include increasing the magnification level of the photo. Similarly, reducing the size of a photo can include decreasing the magnification level of the photo.

As shown in FIG. 12B, the user continues to perform the pinch out gesture to zoom in on photo 1208. As a result, electronic device 1200 detects input 1210 with two contacts, where the distance between the two contacts continues to increase.

Figure 12C:
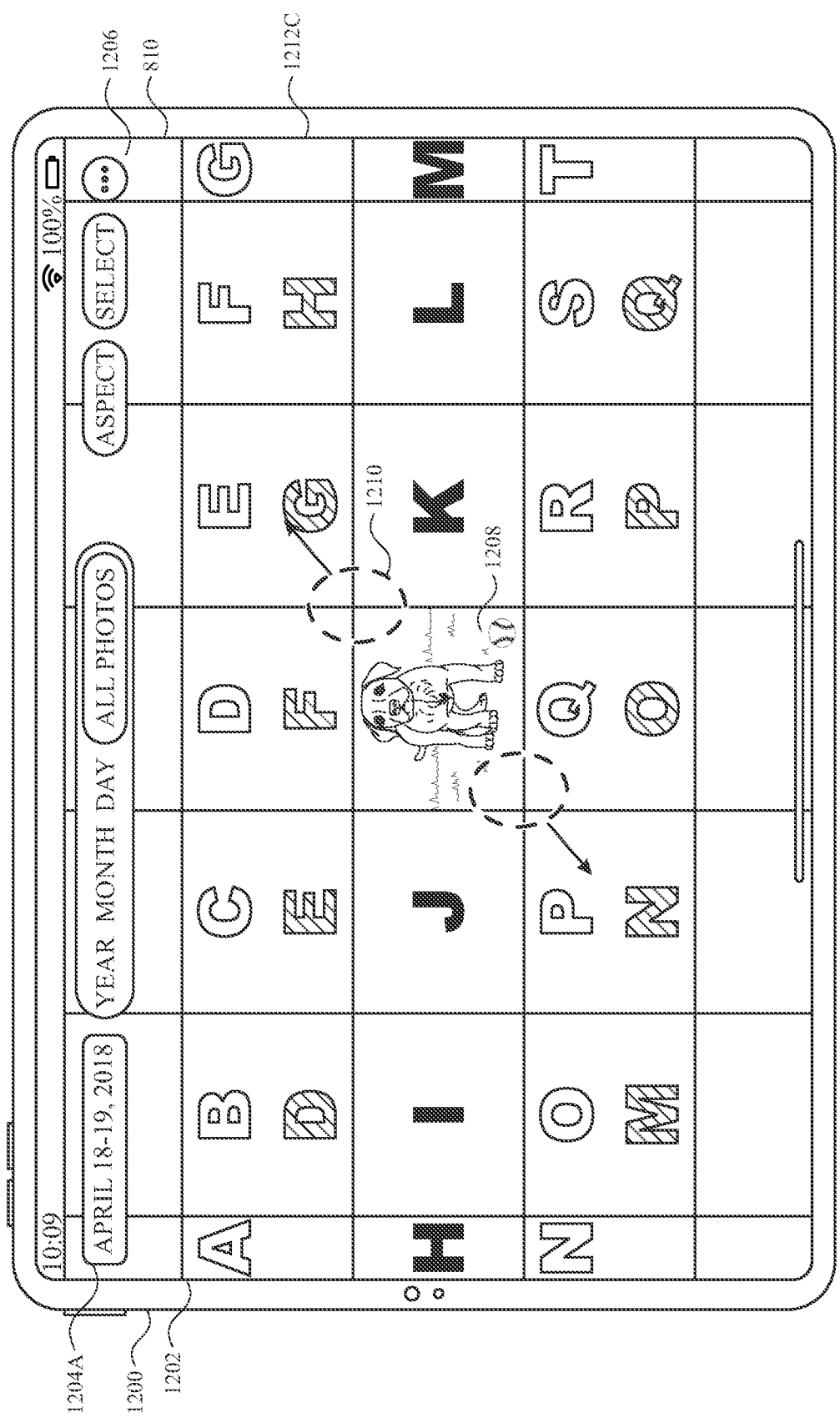
Figure 12D:
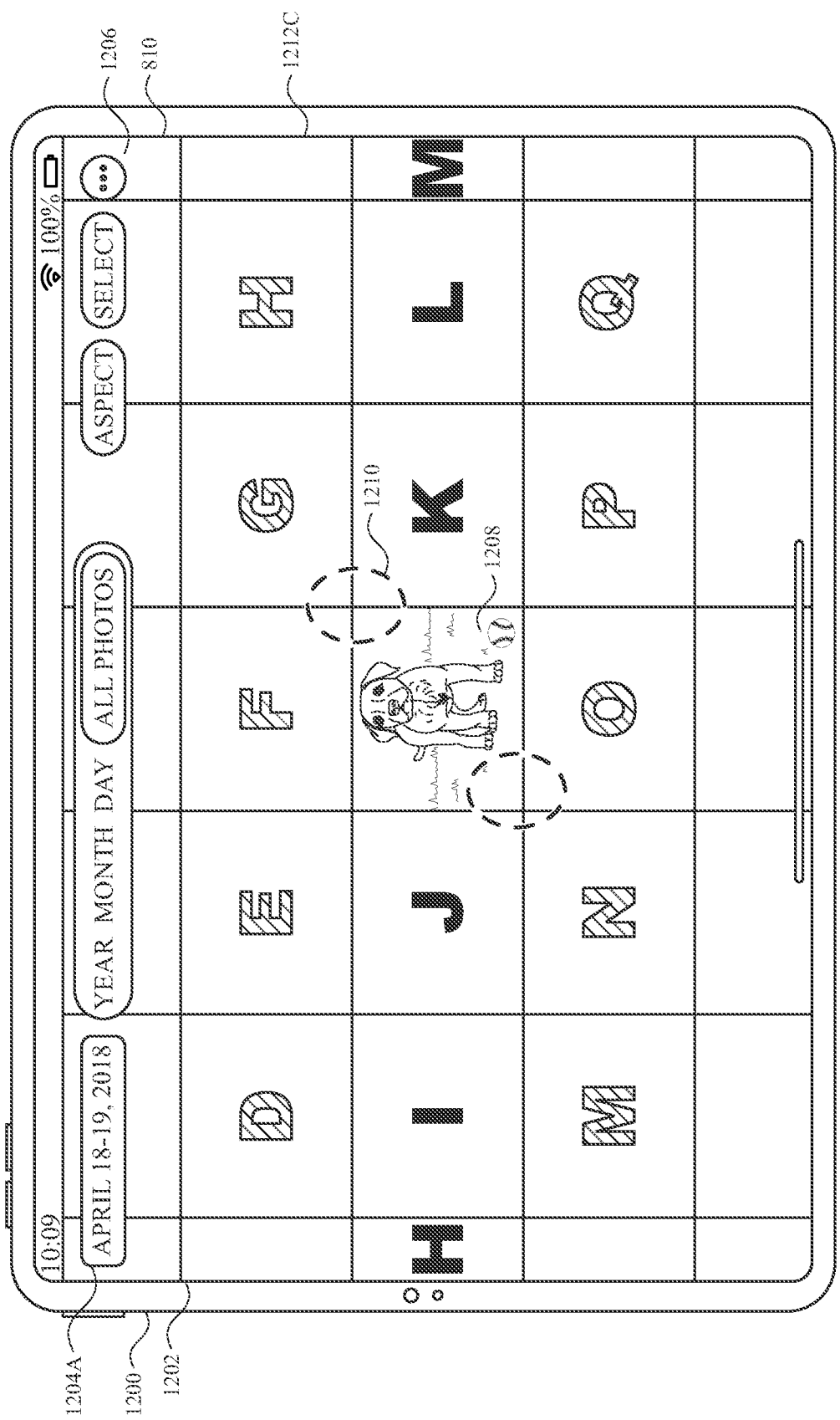
Figure 12E:
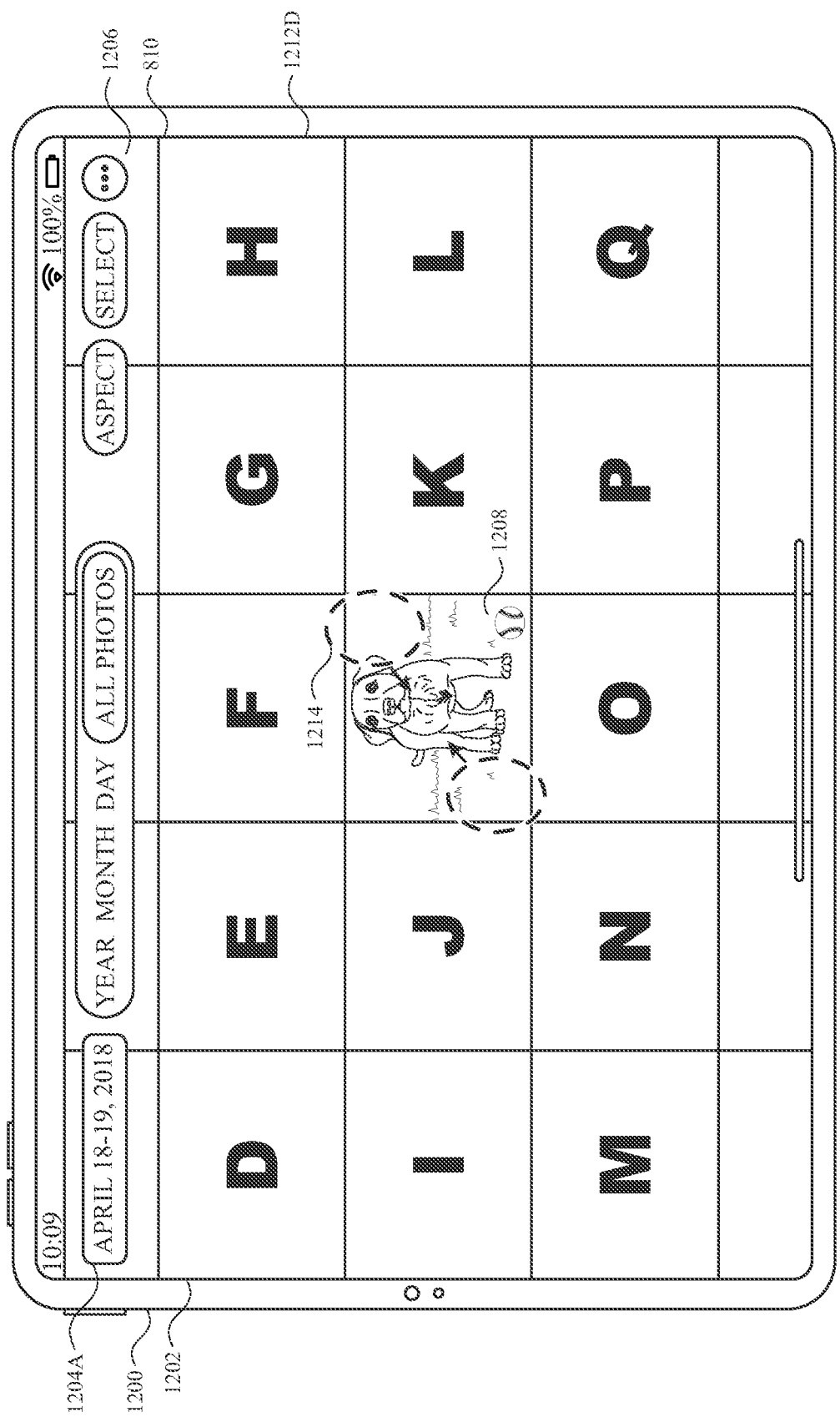

At FIG. 12C, in response to continued detection of input 1210, electronic device 1200 displays layout 1212C, as electronic device 1200 continues the transition to layout 1212D of FIG. 12E. In particular, during the continued transition, electronic device 1200 increases the opacity level (e.g., reduces the transparency level) of the photos that were initially displayed at FIG. 12B (e.g., photos D-H, M-Q). FIGS. 12B-12C depict the increase in opacity by replacing a hollow letter with a striped letter.

Additionally, during the continued transition to layout 1212D of FIG. 12E, electronic device 1200 continues to reduce the opacity level of the photos being replaced (e.g., the photos that had their opacity level reduced at FIG. 12B). Thus, electronic device 1200 continues to reduce the opacity level of photos A-G and N-T, which have hollow lettering in FIG. 12C. FIGS. 12B-12C depict the continued reduction in opacity by replacing a striped letter, which represents high opacity, with a hollow letter, which represents partial opacity. Accordingly, electronic device 1200 continues the process of replacing certain photos using crossfading techniques in order to maintain the sequence of photos. Further, during the transition, electronic device 1200 continues to increase the size of the displayed photos As shown in FIG. 12C, the user continues to perform the pinch out gesture to zoom in on photo 1208. As a result, electronic device 1200 detects input 1210 with two contacts, where the distance between the two contacts continues to increase.

At FIG. 12E, in response to continued detection of input 1210, electronic device 1200 continues the transition to layout 1212D. Specifically, electronic device 1200 completes the replacement of certain photos in order to maintain the sequence of photos. During the continued transition, electronic device 1200 further increases the opacity level of the photos that were initially displayed at FIG. 12B, where the opacity level increases to full opacity. FIGS. 12C and 12E depict the increase in opacity by replacing a striped letter with a filled-in letter.

Electronic device 1200 also further reduces the opacity level of the photos being replaced (e.g., the photos that had their opacity level reduced at FIG. 12B). In particular, electronic device 1200 ceases to display certain photos at their respective locations in layout 1212D of FIG. 12E by reducing the opacity level of the photos to zero. For example, photo C in layout 1212C of FIG. 12A is replaced by photo E, as shown in layout 1212D of FIG. 12E. As a result, electronic device 1200 completes the process of replacing certain photos to maintain the sequence of photos. Additionally, in response to detecting input 1210, electronic device 1200 displays photo 1208 at an increased size in layout 1212D (e.g., relative to its size in the previous figures).

Returning to FIG. 12C, the user performs a pinch out gesture, as discussed above. In some embodiments, instead of continuing to perform the pinch out gesture, the user maintains contact with display 602 without pinching out. As a result, electronic device 1200 detects input 1210 with two contacts, where the distance between the two contacts does not change (e.g., or does not exceed some threshold change in distance). At FIG. 12D, in response to detecting input 1210 without a corresponding change in distance, electronic device 1200 completes the replacement of certain photos, in some embodiments. Specifically, in some embodiments, while maintaining layout 1212C, electronic device 1200 ceases to display certain photos at their respective locations in layout 1212D of FIG. 12E by reducing the opacity level of the photos to zero. In so doing, electronic device 1200 prevents the user from being able to indefinitely pause the transition at a layout such as layout 1212C of FIG. 12C. In some embodiments, in response to detecting input 1210 without a corresponding change in distance, electronic device 1200 proceeds to completing the transition to layout 1212D of FIG. 12E.

Returning to FIG. 12E, once the transition to layout 1212D is complete, the user performs a pinch in gesture to revert back to layout 1212A of FIG. 12A. As a result, electronic device 1200 detects input 1214 with two contacts, where the distance between the two contacts is decreasing.

At FIG. 12F, in response to detecting input 1214, electronic device 1200 transitions from displaying layout 1212D of FIG. 12D to displaying layout 1212A. It is noted that FIGS. 12A-12E, as discussed above, illustrate a pinch gesture (e.g., input 1210) being performed at photo 1208 located near the center of display 602. As depicted in FIGS. 12B-12E, in response to detecting input 1210, electronic device 1200 anchors the zoom in operation based on the location of the pinch gesture (e.g., input 1210). Specifically, in response to detecting input 1210, electronic device 1200 maintains display of photo 1208 at a location based on where input 1210 is being detected. As a result, electronic device 1200 continues to display photo 1208 near the center of display 602, during the transition from layout 1212A of FIG. 12A to layout 1212D of FIG. 12E.

FIGS. 12F-12I illustrate the anchoring that occurs when a pinch gesture is detected somewhere other than the center of display 602. At FIG. 12F, the user performs a pinch out gesture to zoom in on photo M. As a result, electronic device 1200 detects input 1216 with two contacts, where the distance between the two contacts is increasing. Electronic device 1200 detects input 1216 at a location corresponding to photo M.

Figure 12G:
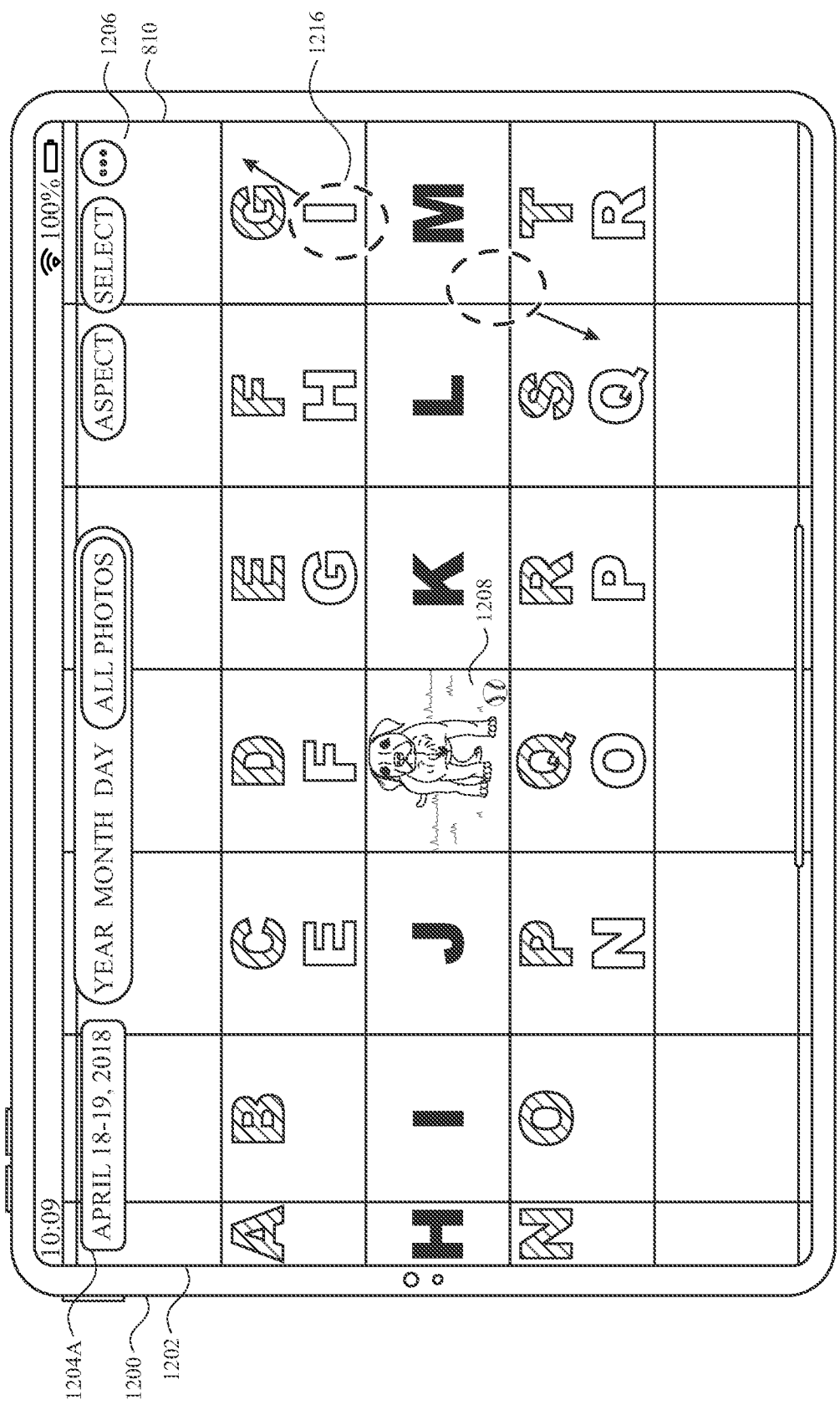
Figure 12H:
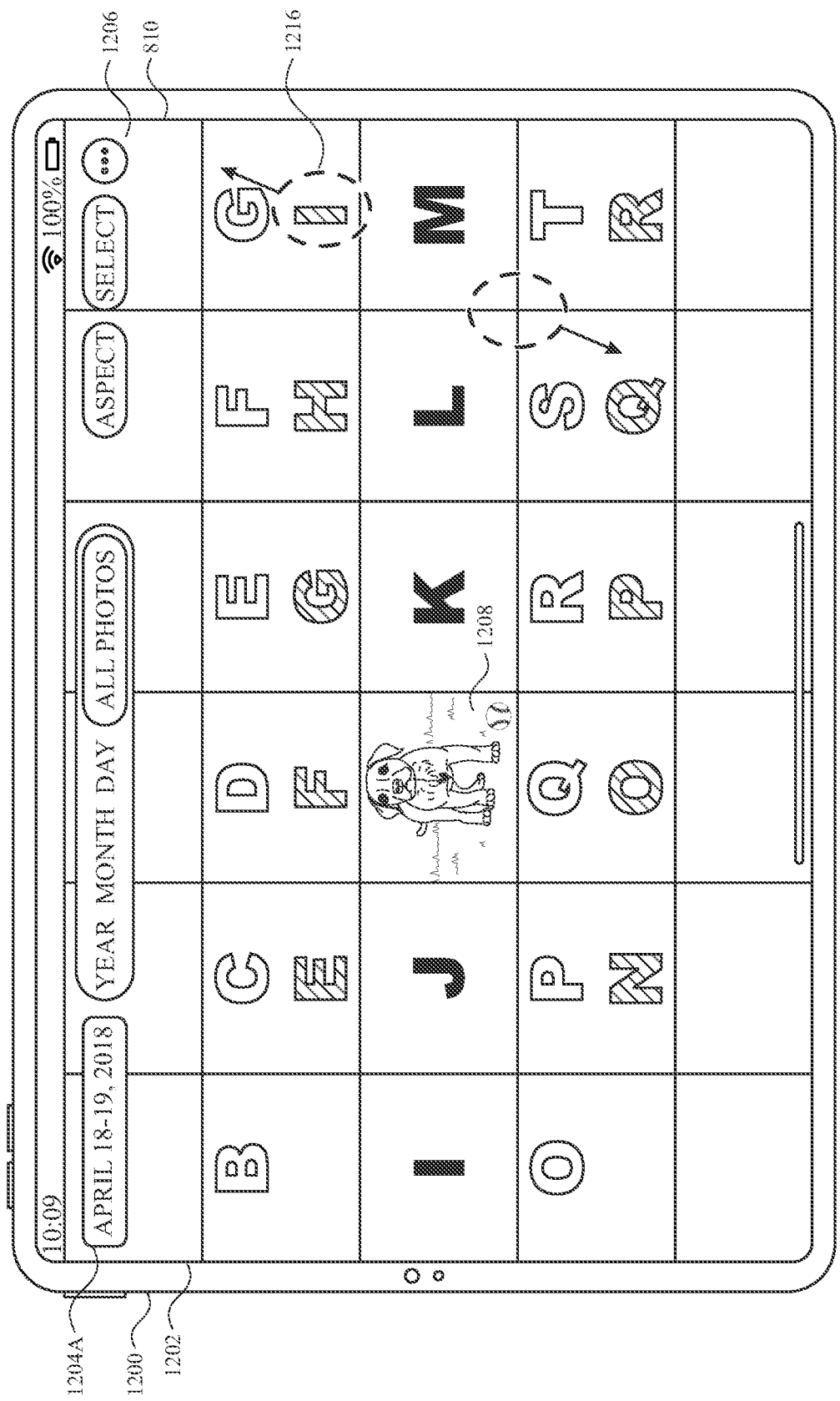
Figure 12I:
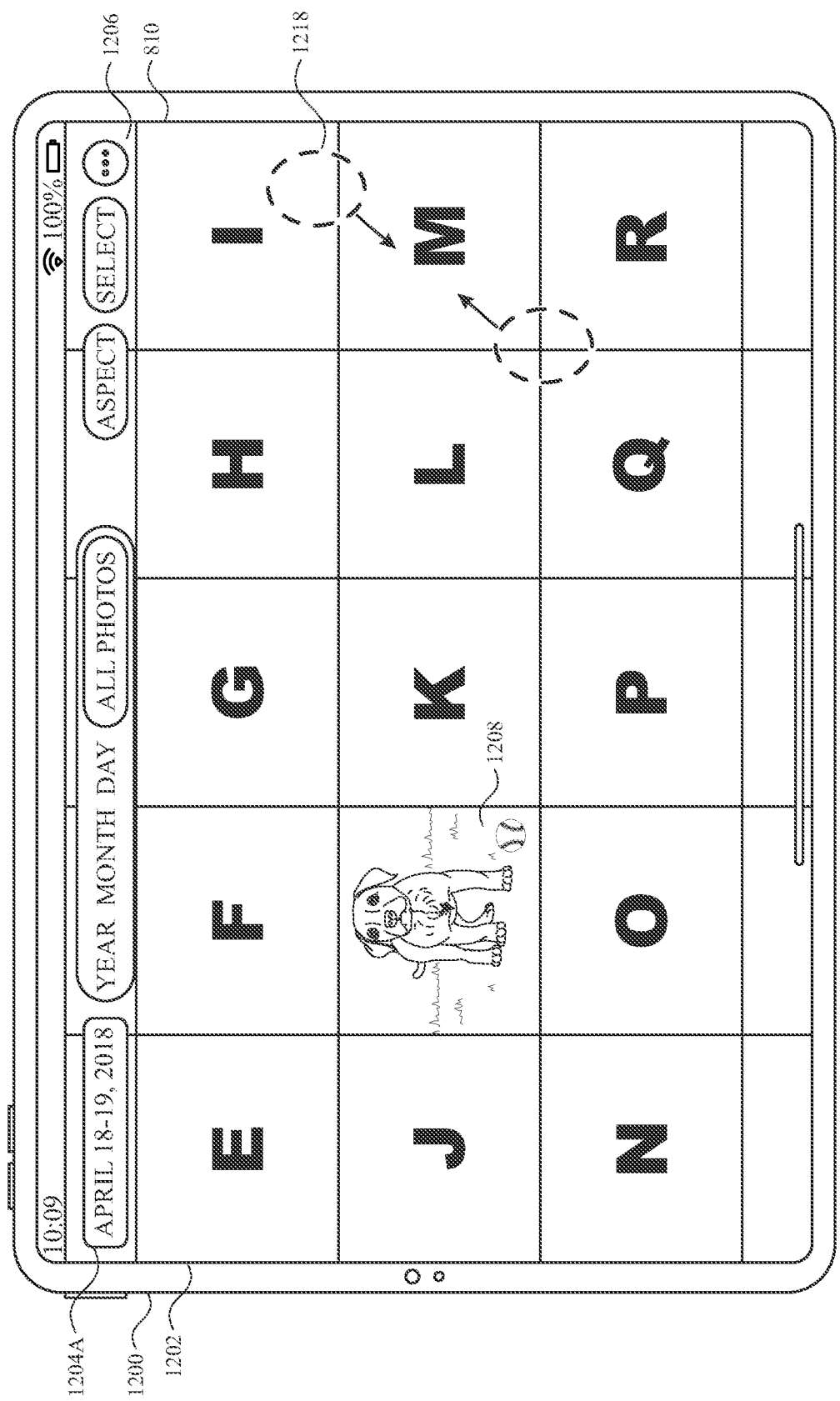

As shown in FIGS. 12G-12I, in response to detecting input 1216, electronic device 1200 initiates a transition from layout 1212A to layout 1212E. During the transition, electronic device 1200 uses the crossfading techniques described above in order to maintain the sequence of photos. Further, electronic device 1200 anchors the zoom in operation based on the location of input 1216. As a result, electronic device 1200 maintains display of photo M on the right side of display 602 during the transition. Accordingly, once the transition has completed, layout 1212E of FIG. 12I includes a different set of photos than layout 1212A of FIG. 12F.

At FIG. 12I, after the transition has completed, the user performs a pinch in gesture to revert back to layout 1212A. As a result, electronic device 1200 detects input 1218 with two contacts, where the distance between the two contacts is decreasing.

Figure 12J:
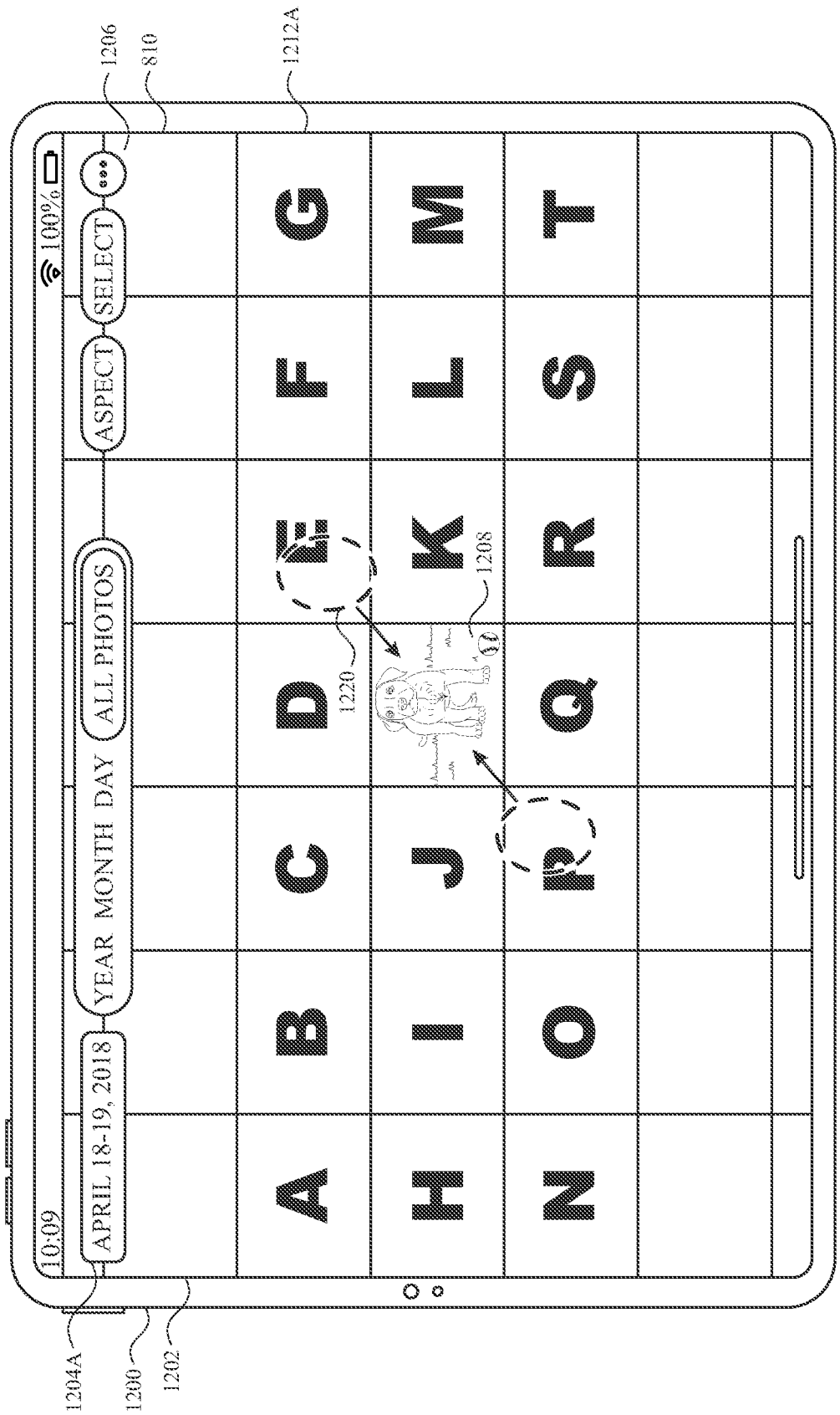

At FIG. 12J, in response to detecting input 1218, electronic device 1200 zooms out and transitions to displaying layout 1212A. The user then performs another pinch in gesture to further zoom out on the displayed photos. As a result, electronic device 1200 detects input 1220 with two contacts, where the distance between the two contacts is decreasing.

Figure 12K:
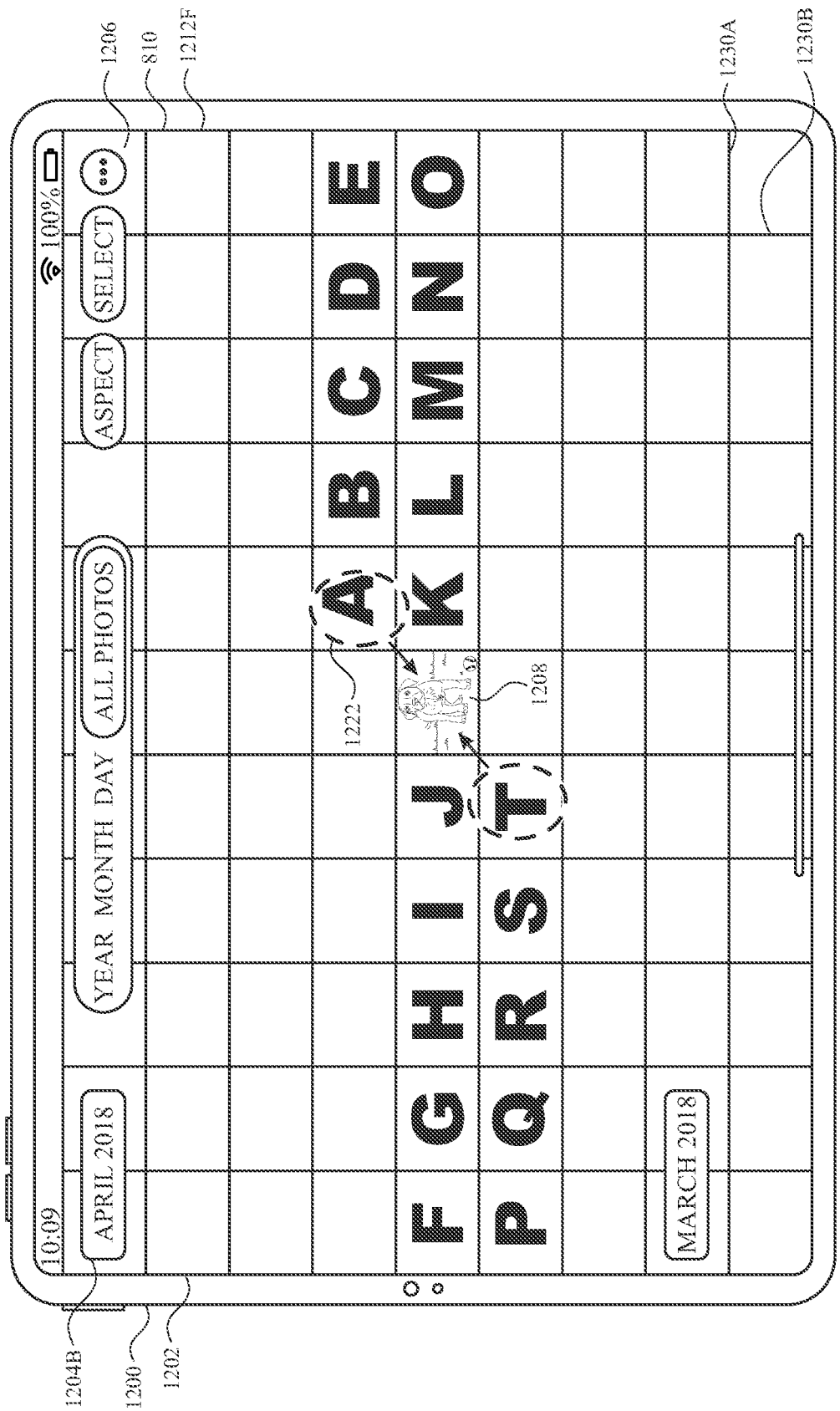

At FIG. 12K, in response to detecting input 1220, electronic device 1200 zooms out on the displayed photos, and transitions from displaying layout 1212A to layout 1212F. During the transition, electronic device 1200 replaces title 1204A with title 1204B. A title (e.g., 1204A-1204C) provides an indication of the particular time period to which one or more of the displayed photos correspond. In some embodiments, one title (e.g., 1204A) can be more detailed than another (e.g., 1204B). For example, in some embodiments, title 1204A can include a location corresponding to the displayed photos. In some embodiments, electronic device 1200 continues to display title 1204A during the transitions as long as input 1220 is being detected. Thus, in some embodiments, electronic device 1200 replaces title 1204A with title 1204B upon liftoff of input 1220. In some embodiments, electronic device 1200 replaces title 1204A with title 1204B when input 1220 satisfies one or more criteria (e.g., a change in distance corresponding to input 1220 exceeds a threshold amount).

As shown in FIG. 12K, the user performs another pinch in gesture to further zoom out on the displayed photos. As a result, electronic device 1200 detects input 1220 with two contacts, where the distance between the two contacts is decreasing.

Figure 12L:
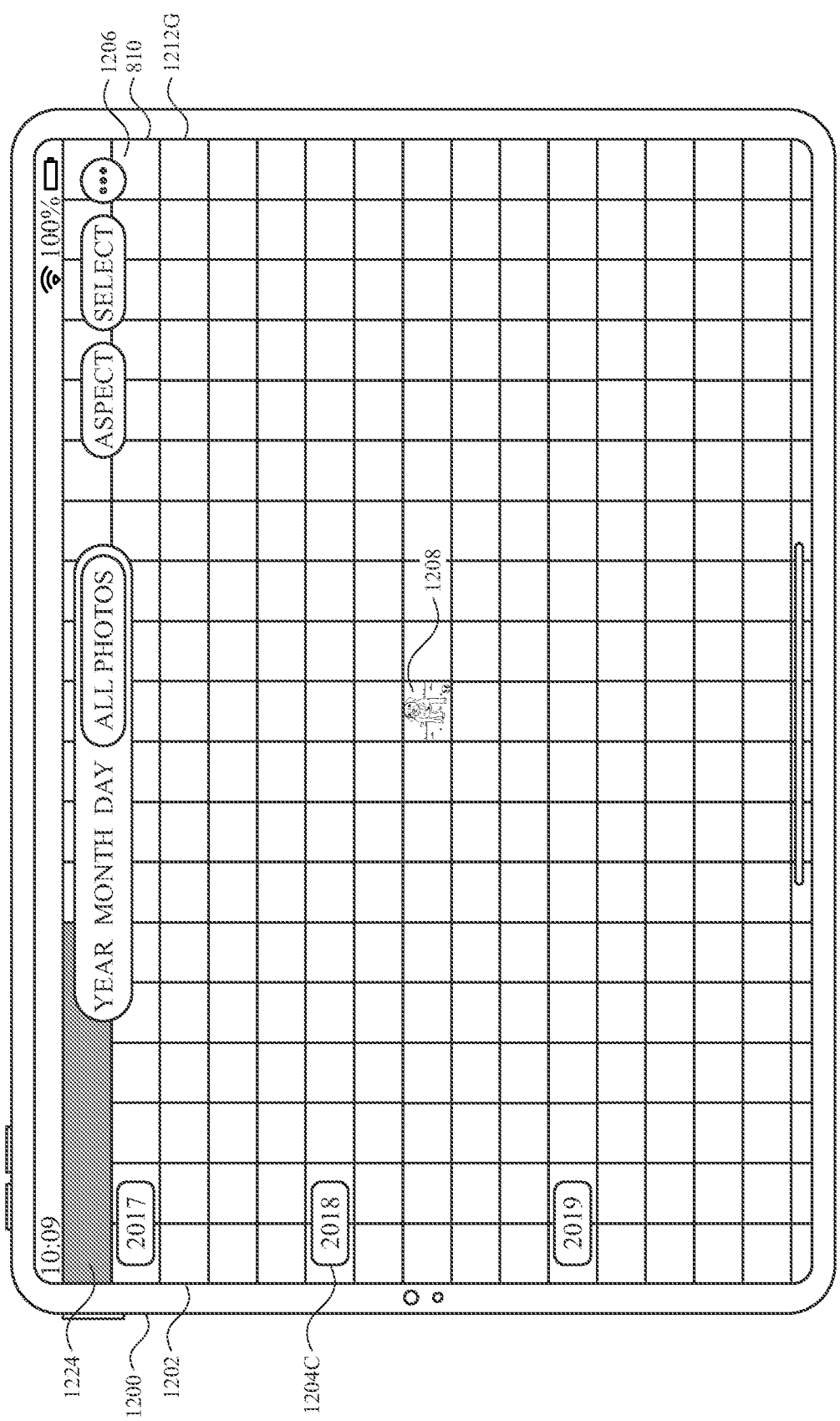

At FIG. 12L, in response to detecting input 1220, electronic device 1200 zooms out on the displayed photos, and transitions from displaying layout 1212F to layout 1212G. During the transition, electronic device 1200 replaces title 1204B with title 1204C. In some embodiments, electronic device 1200 replaces the title upon liftoff of the detected input or when some criteria is met, as discussed above with respect to FIG. 12K.

As depicted in FIG. 12L, layout 1212G includes dead space 1224, which is a region on display 602 where no photos are being displayed. In some embodiments, when electronic device 1200 transitions to a new layout of photos, electronic device 1200 maintains the sequence of photos, as discussed above. In some embodiments, as a result of maintaining the sequence during the transition, electronic device 1200 can transition to a layout of photos that has a region with no photos (e.g., dead space 1224).

Figure 12M:
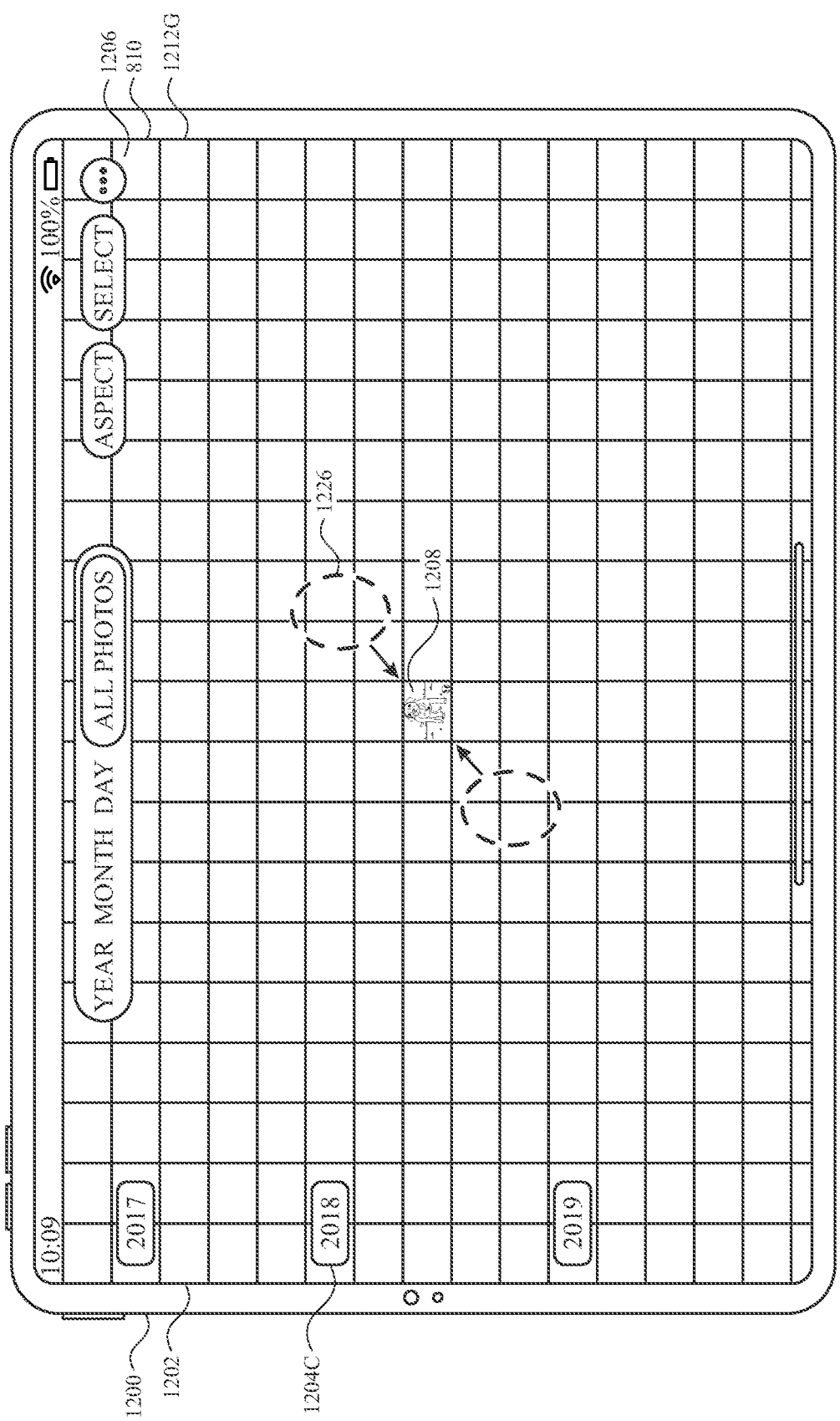

FIG. 12M illustrates the result that occurs when electronic device 1200 uses techniques to avoid displaying a region with no photos (e.g., dead space 1224). Returning to FIG. 12K, electronic device 1200 detects input 1220 while displaying layout 1212F. In some embodiments, in response to detecting input 1220, electronic device 1200 determines that the post-transition layout (e.g., 1212G) will have a region with no photos (e.g., dead space 1224). Upon making this determination, electronic device 1200 performs an operation during the transition to eliminate the region with no photos, resulting in layout 1212G of FIG. 12M.

In some embodiments, electronic device 1200 eliminates the region with no photos by summarizing one or more of the (e.g. top) rows in the post-transition layout (e.g., 1212G). In some embodiments, electronic device 1200 summarizes the rows by hiding similar photos. In some embodiments, when photos are being hidden, electronic device 1200 avoids hiding photos that are at the beginning of the sequence of photos (e.g., displayed at the top-left portion of display 602). In some embodiments, electronic device 1200 eliminates the region with no photos by duplicating photos to fill in the region.

In some embodiments, while displaying a layout (e.g., 1212G), electronic device 1200 can display a region with no photos (e.g., dead space 1224) in response to detecting a scroll gesture. In some embodiments, in response to detecting a scroll gesture, electronic device 1200 will reset (e.g., shift) the position of the photos such that there is no dead space if a scroll speed associated with the scroll gesture exceeds a threshold speed. In some embodiments, if the scroll speed does not exceed the threshold speed, electronic device 1200 uses one of the techniques described above for avoiding the dead space (e.g., summarizing, duplicating).

Returning to FIG. 12M, the user performs a pinch in gesture in an attempt to zoom in further on the displayed photos, even though the user has already reached the maximum zoom level. As a result, while displaying layout 1212G, electronic device 1200 detects input 1226 with two contacts, where the distance between the two contacts is decreasing.

Figure 12N:
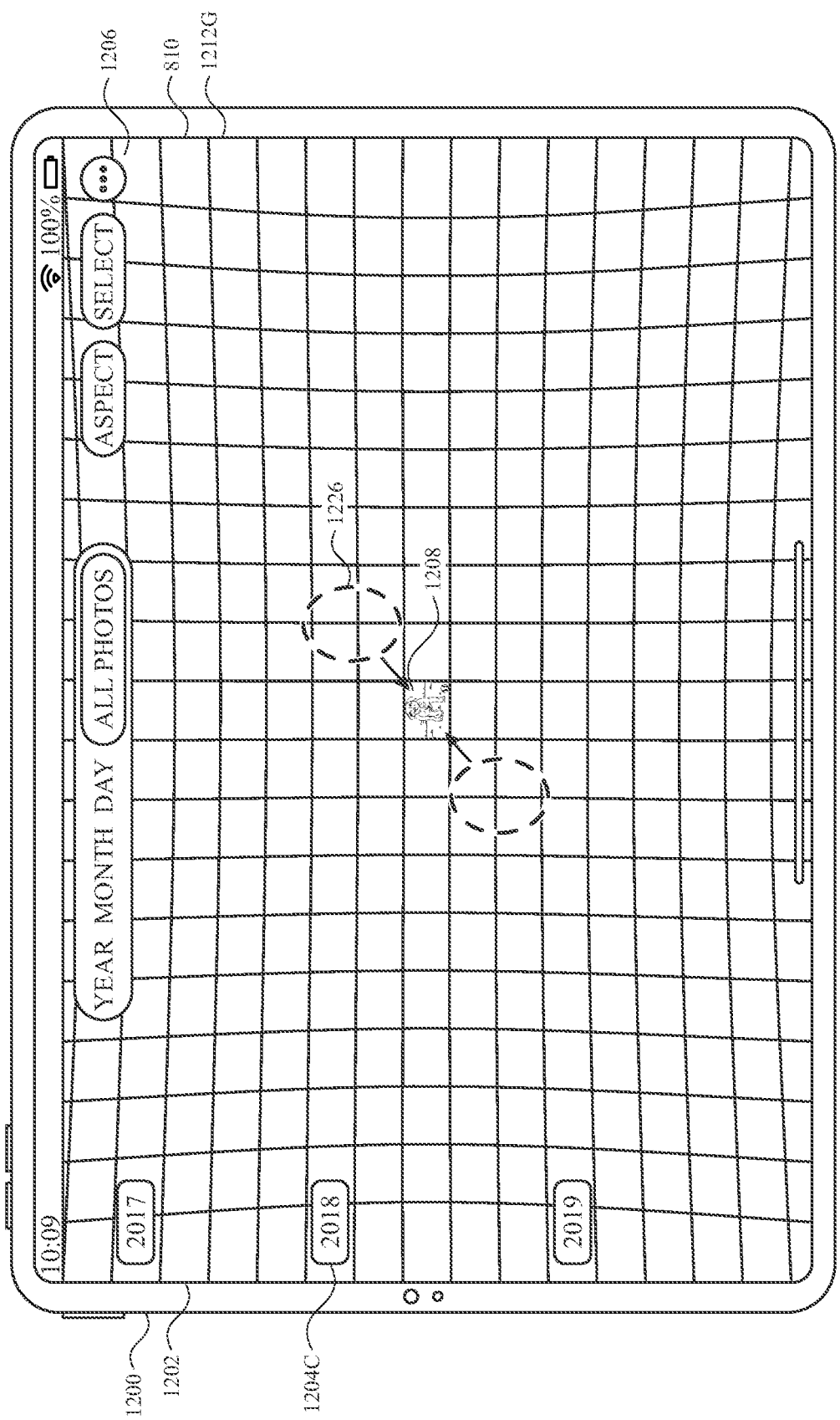
Figure 120:
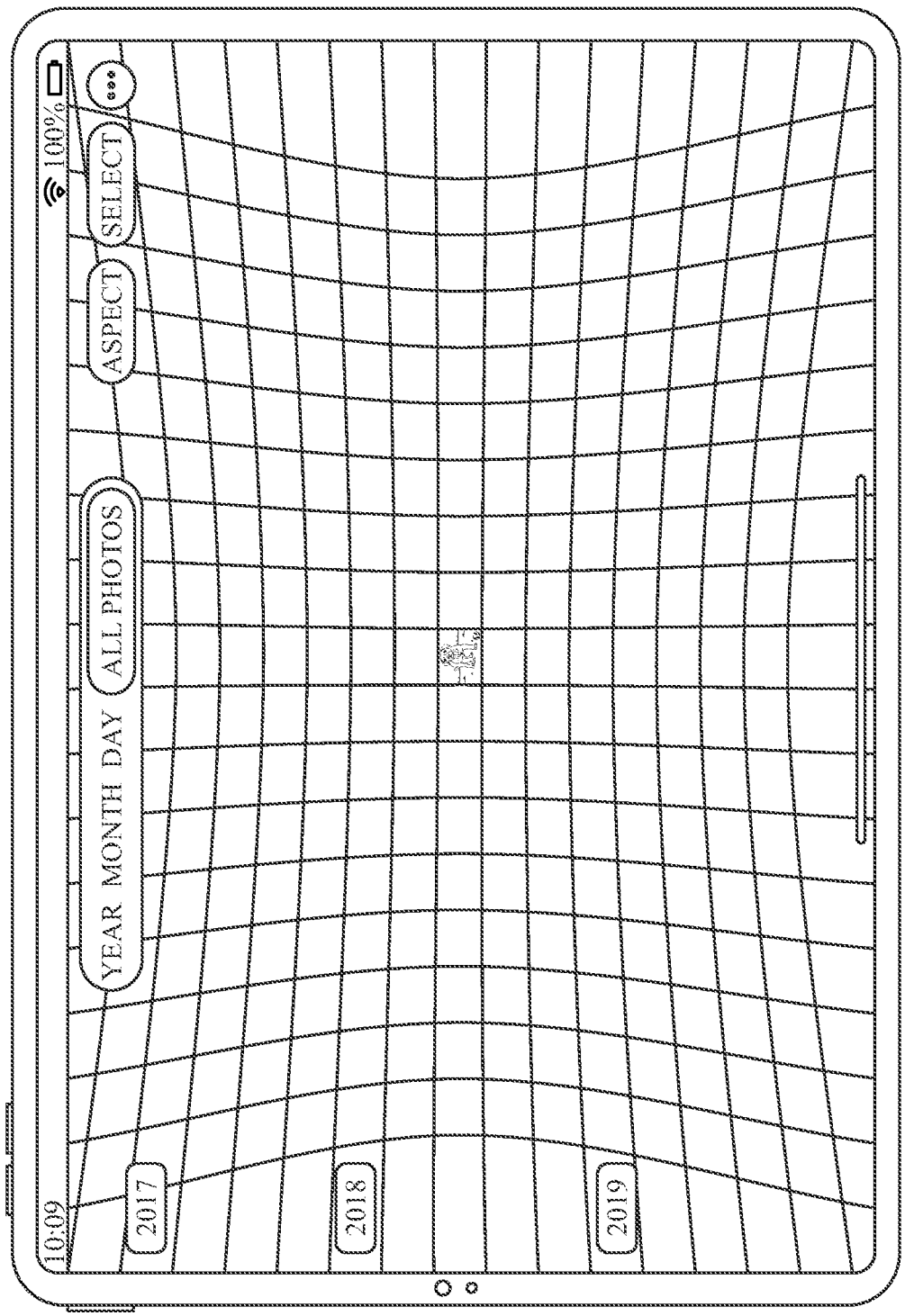

At FIG. 12N, in response to detecting input 1226, electronic device 1200 forgoes zooming in while providing an indication that the user has reached the maximum zoom level. Specifically, electronic device 1200 distorts (e.g., stretches) the photos farther away from the location at which input 1226 is detected. Additionally, electronic device 1200 does not distort the photos closer to the location at which input 1226 is detected. It is noted that, despite the distortion, the photos along the edges of layout 1212G (e.g., edges of display 602 and the status bar) remain contiguous with the edges of layout 1212G.

As shown in FIG. 12N, the user continues performing the pinch in gesture. As a result, electronic device 1200 continues to detect input 1226 with two contacts, where the distance between the two contacts is decreasing.

At FIG. 12O, in response to continued detection of input 1226, electronic device 1200 further distorts the photos farther away from the location at which input 1226 is detected while forgoing distortion of the photos closer to the location at which input 1226 is detected. The user then ceases performing the pinch in gesture. As a result, electronic device 1200 detects liftoff of input 1226. In response to detecting liftoff, electronic device 1200 ceases distortion of the photos and returns to layout 1212G, as depicted in FIG. 12M.

In some embodiments, layouts (e.g., 1212A-1212E) with a number of columns that does not exceed a particular column threshold (e.g., 4, 6, 8) have displayed boundary lines (e.g., 1228A-1228B in FIG. 12A) between photos. Thus, the user can see the boundary lines between the photos. It is noted that layouts (e.g., 1212A-1212E) with a number of columns that does not exceed the particular column threshold can be referred to as a boundary line or keyline layout.

In contrast, layouts (e.g., 1212F-1212G) with a number of columns that exceeds the particular threshold do not include displayed boundary lines. For example, in FIGS. 10K-100, boundary lines (e.g., 1230A-1230B of FIG. 12K) have been included for ease of explanation, but electronic device 600 does not actually display boundary lines between the photos. It is noted that layouts with a number of columns that exceeds the particular column threshold can be referred to as a non-boundary line or non-keyline layout.

FIG. 13 is a flow diagram illustrating a method for navigating a collection of media items using an electronic device in accordance with some embodiments. Method 1300 is performed at a device (e.g., 100, 300, 500, 600, 1200) with a display device. Some operations in method 1300 are, optionally, combined, the orders of some operations are, optionally, changed, and some operations are, optionally, omitted.

As described below, method 1300 provides an intuitive way for navigating a collection of media items. The method reduces the cognitive burden on a user for navigating a collection of media items, thereby creating a more efficient human-machine interface. For battery-operated computing devices, enabling a user to navigate a collection of media items faster and more efficiently conserves power and increases the time between battery charges.

The electronic device (e.g., 1200) displays (1302) via the display device (e.g., 1202), a plurality of content items (e.g., photos A-T, photo 1208) (e.g., photo, video, or representations thereof) in a first layout (e.g., 1212A) (e.g., view) (e.g., that includes a plurality of rows and a plurality of columns, that includes a single row or a single column).

As part of displaying the plurality of content items in the first layout, the electronic device (e.g., 1200) concurrently displays (1304) a first content item (e.g., 1208) of the plurality of content items, and a second content item of the plurality of content items (e.g., photo C in FIG. 12A).

While displaying, via the display device (e.g., 1202), the plurality of content items in the first layout, the electronic device (e.g., 1200) detects (1306) a user input (e.g., 1210) that corresponds to a request to change a size of the first content item (e.g., 1208) (e.g., user gesture (e.g., double-tap and drag gesture, pinch gesture (e.g., detecting two contacts on the display device where the distance between the two contacts increases or decreases)), voice input). In some embodiments, the user input is detected at a location corresponding to (e.g., at/on) the plurality of content items and/or on (or centered on) the first content item.

In response to detecting the user input (e.g., 1208), the electronic device (e.g., 1202) starts (1308) to transition from displaying the first content item (e.g., 1208) in the first layout (e.g., 1212A) to displaying the first content item in a second layout (e.g., 1212D). The second layout is different from the first layout. In the first layout, the second content item (e.g., photo C in FIG. 12A) has a first location relative to the first content item. In the second layout (e.g., 1212D), a third content item (e.g., photo E in FIG. 12E), different from the first content item, has the first location relative to the first content item.

As part of transitioning from displaying the first content item (e.g., 1208) in the first layout to displaying the first content item in the second layout, the electronic device (e.g., 1200) displays (1310) a combination of the second content item (e.g., photo C in the third column of FIG. 12B) and the third content item (e.g., photo E in the third column of FIG. 12B) at the first location relative to the first content item (e.g., 1208) during the transition from displaying the first content item in the first layout (e.g., 1212A) to displaying the first content item in the second layout (e.g., 1212D). In some embodiments, the second layout includes more or less rows/columns than the first layout depending on, for example, whether the user input is a pinch (more rows/columns) or de-pinch (less rows/columns) gesture. Combining the content items (e.g., crossfade) provides the user with feedback about where content items have moved to when switching from the first layout to the second layout. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of transitioning from displaying the first content item (e.g., 1208) in the first layout (e.g., 1212A) to displaying the first content item in the second layout (e.g., 1212D), the electronic device (e.g., 1200) changes the size of the first content item (e.g., 1208) without combining (e.g., without visually crossfading) the first content item with any other content item. Resizing content items without combining the items enables the user to view content at varying sizes without change a position of the item in the layout. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of transitioning from displaying the first content item (e.g., 1208) in the first layout (e.g., 1212A) to displaying the first content item in the second layout (e.g., 1212D), the electronic device (e.g., 1200) changes the size of a fourth content item (e.g., photo K in FIGS. 12A-12D) (e.g., located adjacent to the first content item, located in the same row as the first content item, located to the left and/or right of the first content item) without combining (e.g., without visually crossfading) the fourth content item with any other content item.

In some embodiments, the first layout (e.g., 1212A) (e.g., view) includes a plurality of rows (e.g., and a plurality of columns). In some embodiments, the first content item (e.g., 1208) is in a first row of the plurality of rows of the first layout (e.g., 1212A). In some embodiments, a fifth content item (e.g., photo P in FIG. 12A) is in a second row (e.g., above or below the first row), different from the first row, of the plurality of rows of the first layout. In some embodiments, as part of transitioning from displaying the first content item (e.g., 1208) in the first layout to displaying the first content item in the second layout, the electronic device (e.g., 1200) displays a combination of the fifth content item (e.g., photo P in third column of FIG. 12B) and a sixth content item (e.g., photo N in third column of FIG. 12B) (e.g., crossfading the fifth content item and the sixth content item) during the transition from displaying the first content item in the first layout to displaying the first content item in the second layout.

In some embodiments, as part of displaying the combination of the second content item (e.g., photo C in the third column of FIG. 12B) and the third content item (e.g., photo E in the third column of FIG. 12B) at the first location relative to the first content item (e.g., 1208), the electronic device (e.g., 1200) fades out (e.g., decreases the opacity of) the second content item while (e.g., concurrently with)

fading in (e.g., increasing the opacity of) the third content item (e.g., crossfading the second content item and the third content item). In some embodiments, the second content item fades out while changing in size and the third content item fades in while changing in size. In some embodiments, a plurality of content items on rows other than the row of the first content item are crossfaded. In some embodiments, all content items on rows other than the row of the first content item are crossfaded. Crossfading the content items provides the user with feedback about where content items have moved to when switching from the first layout to the second layout. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user input (e.g., 1210) includes a gesture. In some embodiments, as part of displaying the combination of the second content item (e.g., photo C in third column of FIG. 12B) and the third content item (e.g., photo E in third column of FIG. 12B) at the first location relative to the first content item (e.g., 1208), the electronic device (e.g., 1200) gradually progresses a level (e.g., a distribution, a contribution of each content item to the combination) of the combination (e.g., amount of crossfading) in conjunction with movement of the gesture of the user input (e.g., 1210). Crossfading the content items in conjunction with movement of the user input provides the user with feedback that the user input is changing the location of content items. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the gesture (e.g., 1210) includes movement (e.g., movement during one portion of the gesture (e.g., a later portion of the gesture); movement that is slower than an initial rate of movement) of one or more contacts on a touch-sensitive surface (e.g., of display 1202) of the electronic device (e.g., 1200). In some embodiments, method 1300 further includes the electronic device performing one or more of the following items. In accordance with a determination that the magnitude of the movement (e.g., corresponding to input 1210) is below a (non-zero) threshold (e.g., movement slows down, such as after being above the threshold), the electronic device completes the transition from displaying the first content item (e.g., 1208) in the first layout (e.g., 1212A) to displaying the first content item in the second layout (e.g., 1212D), including replacing the second content item (e.g., photo C in third column of FIG. 12B) at the first location relative to the first content item with the third content item (e.g., photo E in third column of FIG. 12B) at the first location relative to the first content item. Snapping to the second layout during user input when the user input slows down provides the user with feedback that the input changes the location of content items. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the gesture (e.g., input 1210) includes movement of two or more contacts on the touch-sensitive surface of the electronic device (e.g., 1200). In some embodiments, method 1300 further includes one or more of the following items. In response to detecting lift-off of the two or more contacts (e.g., corresponding to input 1210) from the touch-sensitive surface, and in accordance with a determination that the movement of the two or more contacts includes decreasing (e.g., as compared to the initial touch-down of the two or more contacts) a distance between the two or more contacts (e.g., pinching to zoom out), the electronic device decreases the size of the first content item (e.g., 1208) as part of transitioning from displaying the first content item in the first layout to displaying the first content item in the second layout. In response to detecting lift-off of the two or more contacts from the touch-sensitive surface, and in accordance with a determination that the movement of the two or more contacts includes increasing (e.g., as compared to the initial touch-down of the two or more contacts) a distance between the two or more contacts (e.g., de-pinching to zoom in), the electronic device increases the size of the first content item as part of transitioning from displaying the first content item in the first layout (e.g., 1212A) to displaying the first content item in the second layout (e.g., 1212D).

In some embodiments, the user input (e.g., 1210) includes a gesture that includes movement of one or more contacts on a touch-sensitive surface of the electronic device (e.g., 1200). In some embodiments, the first content item (e.g., 1208) in the second layout (e.g., 1212D) is displayed at a size that is based on a magnitude (e.g., distance of travel, amount of pinch/de-pinch) of the movement of the one or more contacts.

In some embodiments, the user input (e.g., 1210) includes a gesture that includes movement of one or more contacts on a touch-sensitive surface of the electronic device (e.g., 1200). In some embodiments, the third content item (e.g., photo E in third column of FIG. 12B) is selected to be combined with the second content item (e.g., photo C in third column of FIG. 12B) at the first location relative to the first content item based on the magnitude (e.g., distance of travel, amount of pinch/de-pinch). In some embodiments, different magnitudes of the gesture cause different content items to be combined with (and optionally replace) the second content item at the first location relative to the first content item. Providing different locations for content items based on the magnitude of the user input provides the user with feedback that the user input dictates where content items are located in the second layout. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of displaying, via the display device (e.g., 1202), the plurality of content items (e.g., photo, video, or representations thereof) in the first layout, the electronic device (e.g., 1200) displays, on the display device (e.g., overlaid on the plurality of content items, displayed above the plurality of content items, displayed adjacent to a content item of the plurality of content items), a first label (e.g., 1204A) (e.g., without displaying a second label, one or more indicators (e.g., date indicator, title indicator, location indicator) that include the first information (e.g., month) without including the second information (e.g., year, location, title, day, hour)). In some embodiments, as part of displaying, via the display device, the plurality of content items (e.g., photo, video, or representations thereof) in the second layout (e.g., 1212F), the electronic device displays, on the display device (e.g., overlaid on the plurality of content items, displayed above the plurality of content items, displayed adjacent to a content item of the plurality of content items), a second label (e.g., 1204B) different from the first label (e.g., 1204A) (e.g., without displaying the first label, one or more indicators (e.g., date indicator, title indicator, location indicator) that include first information (e.g., month) and second information (e.g., year, location, title, day, hour), the first information and second information corresponding to at least some of the plurality of content items (and, optionally, displayed at a location selected based on the location of the corresponding content items)). In some embodiments (e.g., when the input is a de-pinch gesture that zooms out, causing less content items to be displayed), the first layout (e.g., the starting layout) includes one or more indicators (e.g., date indicator, title indicator, location indicator) that include first information (e.g., month) without including second information (e.g., year, location, title, day, hour), the first information corresponding to at least some of the plurality of content items (and, optionally, displayed at a location selected based on the location of the corresponding content items), and the second layout (e.g., the layout resulting from the user input, a zoomed in view of the first content item) includes the first information (e.g., month) and the second information (e.g., year, location, title, day, hour), the first and second information corresponding to at least some of the plurality of content items (and, optionally, displayed at a location selected based on the location of the corresponding content items).

In some embodiments, the first label (e.g., 1204A) (e.g., title, full date, geographical location corresponding to content item) is displayed at a location adjacent to (e.g., at the top of the collection of) the plurality of content items.

In some embodiments, the second label (e.g., 1204B, 1204C) (e.g., year, combined month and year) is displayed overlaid on (e.g., on top of the collection of) the plurality of content items.

In some embodiments, the user input (e.g., 1208, 1220, 1222) includes a gesture that includes one or more contacts on a touch-sensitive surface of the electronic device (e.g., 1200). In some embodiments, displaying the one or more indicators (e.g., 1204A-1204C) (e.g., date indicator, title indicator, location indicator) that include the second information (e.g., year, location, title, day, hour) (and, optionally, the first information) is in response to detecting lift-off of the one or more contacts of the gesture.

In some embodiments, the user input (e.g., 1208, 1220, 1222) includes a second gesture that includes movement of one or more contacts on a touch-sensitive surface of the electronic device (e.g., 1200). In some embodiments, displaying the one or more indicators (e.g., 1204A-1204C) (e.g., date indicator, title indicator, location indicator) that include the second information (e.g., year, location, title, day, hour) (and, optionally, the first information) is in response to a determination that a threshold has been satisfied (e.g., a magnitude of the movement of the one or more contacts of the user input exceeds a threshold magnitude, a size of the first content item meets (e.g., exceeds, falls below) a threshold size). In some embodiments, the threshold is satisfied while transitioning from displaying the first content item (e.g., 1208) in the first layout (e.g., 1212A) to displaying the first content item in the second layout (e.g., 1212D).

In some embodiments, a display location, on the display device (e.g., 1202), of the first content item (e.g., 1208) in the second layout (e.g., 1212D) is based on an input location (e.g., on a touch-sensitive surface) of the user input (e.g., 1210). In some embodiments, the first content item is selected based on an input location of the user input. In some embodiments, the user input is a pinch/de-pinch gesture and the device determines a location (e.g., a center point) or a central content item (e.g., a content item at a center point of the gesture) based on the location of the pinch/de-pinch gesture. In some embodiments, the user input is a tap double-tap (or single tap) gesture and the device determines a location (e.g., a center point) or a central content item (e.g., a content item at a center point of the gesture) based on the location of the double-tap (or single tap) gesture. In some embodiments, the electronic device anchors the transition from displaying the first content item in the first layout to displaying the first content item in the second layout based on the determined location (e.g., a center point) or central content item.

In some embodiments, the second layout (e.g., 1212F, 1212G) includes a plurality of rows and a plurality of columns. In some embodiments, as part of displaying, via the display device (e.g., 1202), the plurality of content items (e.g., photos A-T, 1208) (e.g., photo, video, or representations thereof) in the second layout, the electronic device (e.g., 1200) forgoes displaying a number of related content items in the second layout (e.g., to eliminate dead space 1224). In some embodiments, the number (quantity of content items to not display) is selected by the electronic device such that a location of the first content item can be maintained in the transition from the first layout to the second layout without requiring one or more empty positions (no content item displayed) in a top row of the plurality of rows. In some embodiments, the device determines whether the current layout meets (e.g., is above, or is below) a magnification level. In accordance with meeting the magnification level, the device forgoes displaying the number of related content items (such that a location of the first content item can be maintained in the transition from the first layout to the second layout without requiring empty positions in a top row of the plurality of rows), and in accordance with not meeting the magnification level, the device displays the number of related content items (such that a location of the first content item can be maintained in the transition from the first layout to the second layout, thereby leaving empty positions in a top row of the plurality of rows). Forgoing displaying a number of related content items in the second layout enables the device to show only complete (e.g., filled-out) rows of content items to the user. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the related content items (e.g., photos A-T, 1208) are selected based on one or more similarities among the related content items (e.g., photos taken at a same/similar time and/or same/similar location).

In some embodiments, the related content items do not include an initial content item (the content items being in an ordered set, the content item that starts the ordered set being the initial content item) and a subsequent content item (the content item immediately following the initial content item in the ordered set) (e.g., even if they are sufficiently similar).

In some embodiments, method 1300 further includes one or more of the following items. Subsequent to displaying, on the display device (e.g., 1202), the first content item (e.g., 1208) in the second layout (e.g., 1212F, 1212G), the electronic device (e.g., 1200) detects a request (e.g., a user input, a scroll gesture, a swipe up/down gesture) to scroll the plurality of content items. The electronic device scrolls the plurality of content items at a scroll speed. In accordance with a determination that the scroll speed exceeds a threshold speed, the electronic device rearranges the plurality of content items into a third layout (e.g., a content item that was previously in an initial column is moved to a different column, a content item that was previously not displayed as part of the second layout is now displayed) without changing a display size of the content items of the plurality of content items (e.g., photos A-T, 1208). In accordance with a determination that the scroll speed does not exceed the threshold speed, the electronic device foregoes rearranging the plurality of content items into the third layout.

In some embodiments, subsequent to scrolling the plurality of content items (e.g., photos A-T, 1208), the device displays the plurality of content items in the second layout using a new arrangement of the content items (e.g., a content item that was previously in a column is now in a different column, a content item that was previously not displayed as part of the second layout is now displayed).

In some embodiments, in response to receiving the request to scroll the plurality of content items (e.g., photos A-T, 1208), the device scrolls the plurality of content items at a scroll speed. In accordance with a determination that the scroll speed exceeds a threshold speed, the device rearranges the plurality of content items into a third layout (e.g., a content item that was previously in a column is now in a different column, a content item that was previously not displayed as part of the second layout is now displayed) without changing a display size of the content items of the plurality of content items, and in accordance with a determination that the scroll speed does not exceed the threshold speed, foregoing rearranging the plurality of content items into the third layout.

In some embodiments, when the content items in the initial row of the layout are arranged such that the initial row includes empty space (e.g., 1224) or when the device is reducing/duplicating content items to have a full initial row, the device shifts the content items in the array when the user requests a scroll that is above the threshold speed. Thus, when the user is scrolling slowly, the user can continue to track the location of content items (the shift doesn't happen), but when the user is scrolling quickly (and not tracking the locations of content items), the device shifts the content items so that the initial (top) row is full (without requiring removal/duplication of content items).

In some embodiments, the second layout (e.g., 1212F, 1212G) includes a plurality of rows and a plurality of columns. In some embodiments, as part of displaying, via the display device (e.g., 1202), the plurality of content items (e.g., photos A-T, 1208) (e.g., photo, video, or representations thereof) in the second layout (e.g., 1212F, 1212G), the electronic device (e.g., 1200) displays a number of duplicate content items in the second layout. In some embodiments, the number (quantity of content items to duplicate) is selected by the electronic device such that a location of the first content item (e.g., 1208) can be maintained in the transition from the first layout to the second layout without requiring one or more empty positions (e.g., 1224) (no content item displayed) in a top row of the plurality of rows). In some embodiments, the device determines whether the current layout meets (e.g., is above, or is below) a magnification level. In accordance with meeting the magnification level, the device duplicates the number of content items (such that a location of the first content item can be maintained in the transition from the first layout to the second layout without requiring empty positions (e.g., 1224) in a top row of the plurality of rows), and in accordance with not meeting the magnification level, the device does not duplicate content items (such that a location of the first content item is maintained in the transition from the first layout to the second layout, thereby leaving empty positions in a top row of the plurality of rows).

In some embodiments, the second layout (e.g., 1212D) includes a plurality of rows and a plurality of columns. In some embodiments, transitioning from displaying the first content (e.g., 1208) item in the first layout (e.g., 1212A) to displaying the first content item in the second layout does not include displaying a combination of (e.g., crossfade of) content items at any location in a row of the first content item (e.g., 1208) (e.g., during the transition from the first layout to the second layout).

In some embodiments, a location of the user input (e.g., 1210) (e.g., a center of a pinch/de-pinch gesture) corresponds to a location of the first content item (e.g., 1208) in the first layout (e.g., 1212A). In some embodiments, as part of transitioning from displaying the first content item in the first layout to displaying the first content item in the second layout (e.g., 1212D), the electronic device (e.g., 1200) displays the first content item in the second layout such that a location of the first content item in the second layout at least partially (e.g., fully, completely) overlaps with the location of the first content item in the first layout. In some embodiments (e.g., when zooming in), when the first content item in the first layout uses a first display area, display of the first content item in the second layout uses the first display area and additional display area, thereby fully overlapping the first display area. In some embodiments (e.g., when zooming out), when the first content item in the first layout uses a first display area, display of the first content item in the second layout uses a portion of the first display area without using display area outside of the first display area, thereby fully overlapping the first display area.

In some embodiments, in accordance with a determination that the first content item (e.g., 1208) is in a first area of the display (e.g., on the right ⅓ of the display, in the right-most column) in the first layout, displaying the first content item in the first area of the display in the second layout; and in accordance with a determination that the first content item is in a second area, different from the first area, of the display (e.g., on the left ⅓ of the display, in the left-most column) in the first layout, displaying the first content item in the second area of the display in the second layout.

In some embodiments, the electronic device maintains visual continuity of the display location of the first content item by anchoring the first content item to the location at which it starts in the first layout. As a result, the user is more easily able to locate the first content item once the device has transitioned to display in the second layout.

In some embodiments, method 1300 further includes one or more of the following items. In some embodiments, while displaying the first content item (e.g., 1208) in the second layout (e.g., 1212G), the electronic device (e.g., 1200) detects a second user input (e.g., 1222) that corresponds to a request to reduce the size of the first content item. In some embodiments, the second user input is a second gesture that includes one or more contacts. In some embodiments, in response to detecting at least a first portion of the second gesture (e.g., 1222), the electronic device reduces sizes of the plurality of content items (e.g., photos A-T, 1208) (e.g., including the first content item) (e.g., zoom out to the maximum zoomed out level) based on a first portion of the second gesture, including concurrently displaying a seventh content item (e.g., photo along edge of display 602) at a first size and a eighth content item (e.g., photo along edge of display 602) at a second size (e.g., the same as the first size, different from the first size). In some embodiments, subsequent to reducing the sizes of the plurality of content items (e.g., zoom out to the maximum zoomed out level) based on a first portion of a magnitude of the second gesture, and in response to detecting at least a second portion of the second gesture (e.g., 1226, continuation of 1222) (e.g., without detecting lift-off of the gesture from the touch-sensitive surface), the electronic device increases a size (e.g., by increasing a dimension (e.g., a width, a height, or both)) of the seventh content item by a first amount. In some embodiments, the first amount is selected based on a first distance of the seventh content item to a location of the second gesture. In some embodiments, subsequent to reducing the sizes of the plurality of content items based on a first portion of a magnitude of the second gesture, and in response to detecting at least a second portion of the second gesture, the electronic device increases a size (e.g., by increasing the dimension (e.g., a width, a height, or both)) of the eighth content item by a second amount that is greater than the first amount. In some embodiments, the second amount is selected based on a second distance of the eighth content item to the location of the second gesture. In some embodiments, the second distance is greater than the first distance. In some embodiments, in response to detecting lift-off of the one or more contacts (e.g., from the touch-sensitive surface), the electronic device decreases the size of the seventh content item by the first amount to display the seventh content item at the first size, and decreases the size of the eighth content item by the second amount to display the eighth content item at the second size. Zooming out further than the maximum zoomed out view and then reverting to the maximum zoomed out view provides the user with feedback that the input has been received but that additional zooming out is not supported. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while in a selection mode (e.g., mode entered upon detecting selection of "SELECT" button in FIG. 12A), a tap gesture at a location corresponding to a respective content item selects the content item (e.g., via a tap gesture detected at the content item) without changing a size of the respective content item. In some embodiments, while not in the selection mode, a tap gesture at a location corresponding to a respective content item changes a size of (e.g., enlarges) the respective content item. In some embodiments, method 1300 further includes one or more of the following items. In some embodiments, while displaying the first content item (e.g., 1208) in the second layout (e.g., 1212D), the electronic device (e.g., 1200) detects a third user input (e.g., 1214) that corresponds to a request to reduce the size of the first content item. In some embodiments, in accordance with a determination that the electronic device is operating in the selection mode, the electronic device reduces the size of the plurality of content items to a third size. In some embodiments, in accordance with a determination that the electronic device is not operating in the selection mode, the electronic device reduces the size of the plurality of content items to a fourth size that is smaller than the third size.

Note that details of the processes described above with respect to method 1300 (e.g., FIG. 13) are also applicable in an analogous manner to the methods described below/above. For example, method 1100 optionally includes one or more of the characteristics of the various methods described above with reference to method 1300. For example, when performing method 1100, electronic device 600 uses crossfading techniques, as discussed above with respect to method 1300, in response to detecting a pinch gesture (e.g., 1006). For brevity, these details are not repeated below.

FIGS. 14A-14F illustrate exemplary devices and user interfaces for navigating a collection of media items, in accordance with some embodiments. The user interfaces in these figures are used to illustrate the processes described below, including the processes in FIG. 15.

Figure 14A:
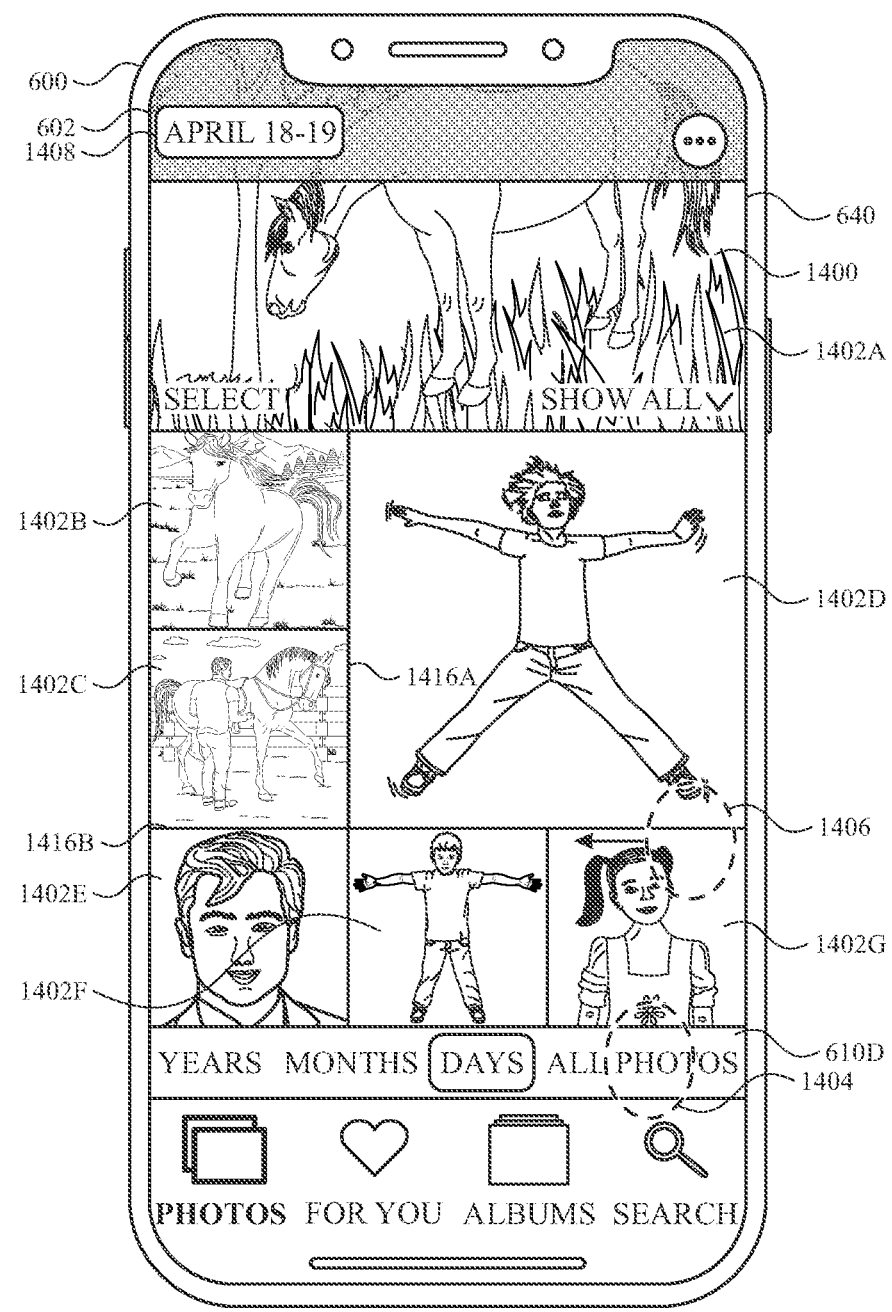
FIGS. 14A-14F illustrate exemplary user interfaces for navigating a collection of media items, in accordance with some embodiments.
Figure 15:
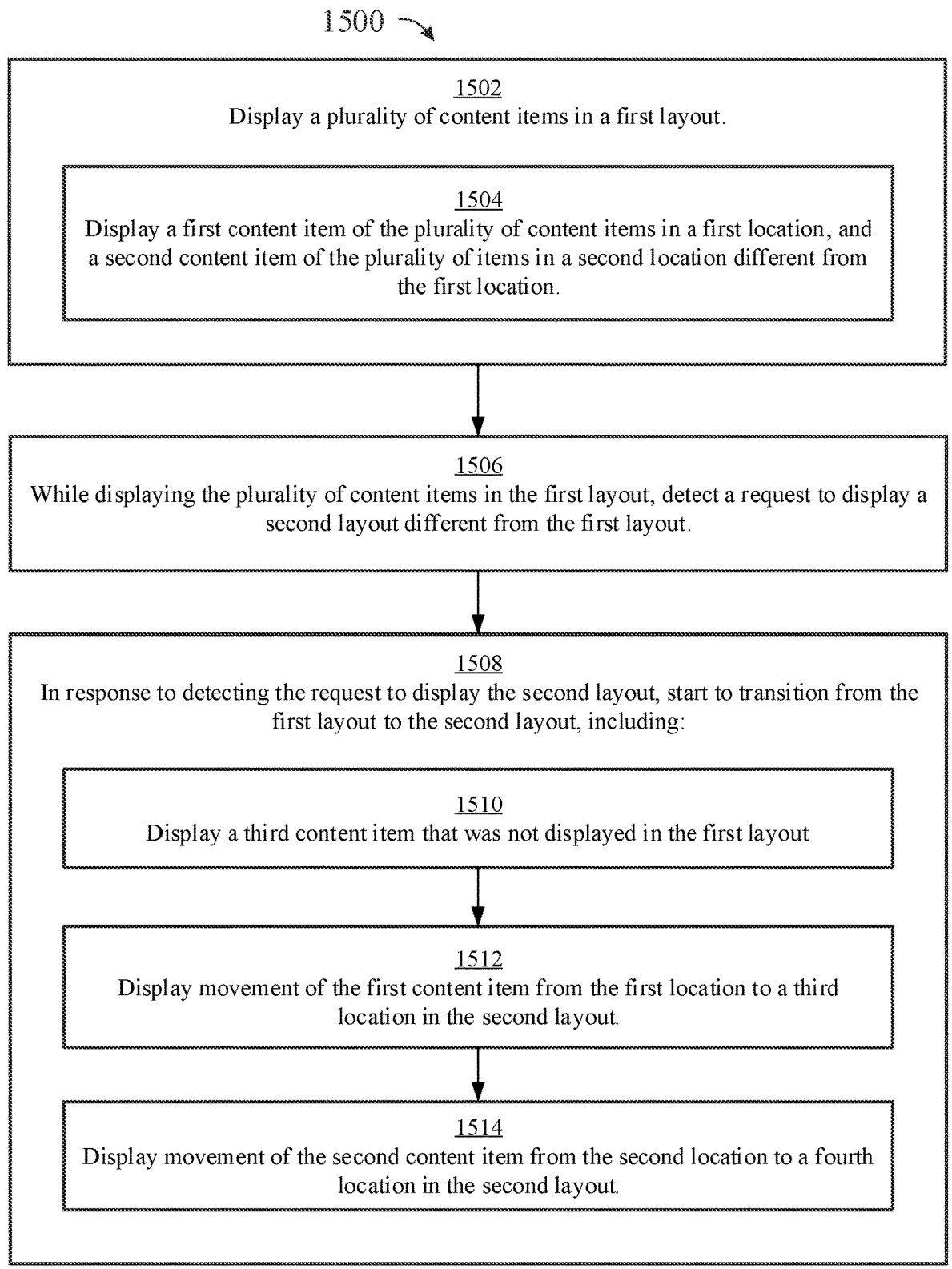
FIG. 15 is a flow diagram illustrating an exemplary process for navigating a collection of media items, in accordance with some embodiments.

FIG. 14A depicts electronic device 600, which is a smartphone with display 602. Display 602 includes a touch-sensitive surface on which electronic device 600 can detect user gestures (e.g., tap, swipe, drag). In some embodiments, electronic device 600 includes one or more features of electronic device 100, 300, or 500.

At FIG. 14A, electronic device 600 displays user interface 1400 for navigating a collection of media items (e.g., photos, videos). User interface 1400 includes photos 1402A-1402G, which are being displayed at respective initial locations on display 602. In some embodiments, the locations are selected based on the view in which the photos are being displayed (e.g., years, months, days, all photos). At FIG. 14A, the photos are being displayed in days view 640. In some embodiments, days view 640 includes a curated set of media items from a media library or representations thereof, where the curated set of media items correspond to a particular time period (e.g., April 18-19, 2018). Additionally, user interface 1400 includes title 1408 (e.g., corresponding to metadata 646A), which provides an indication of the time period to which the displayed photos (e.g., 1402A-1402G) correspond.

As shown in FIG. 14A, a user performs a tap gesture to switch from days view 640 to all photos view 810. As a result, electronic device 600 detects input 1404 at affordance 610D, which is associated with an all photos view.

Figure 14B:
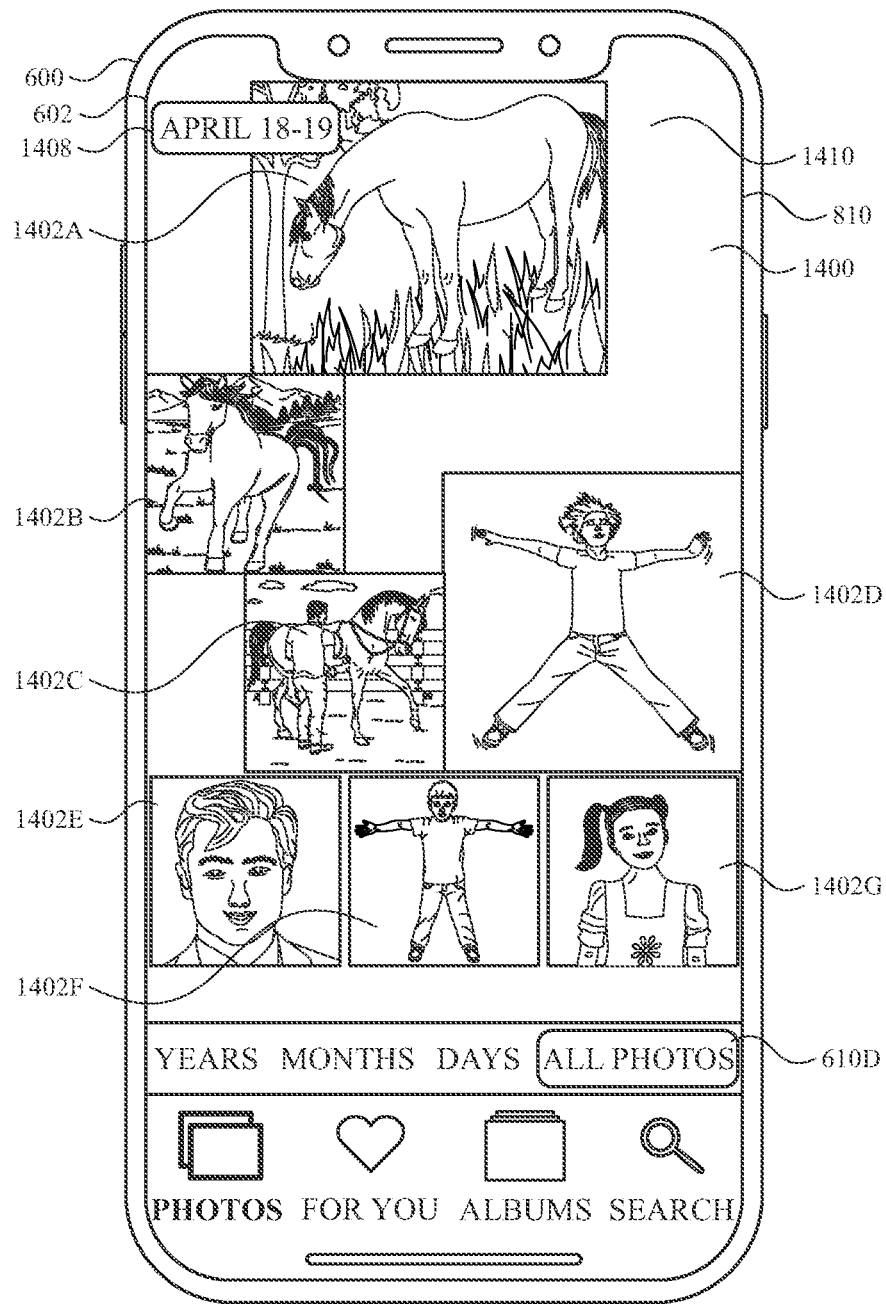

At FIG. 14B, in response to detecting input 1404, electronic device 600 initiates a transition from days view 640 (e.g., a first layout) to all photos view 810 (e.g., a second layout). As illustrated in FIGS. 14B-14F, electronic device 600 transitions from days views 640 to all photos view 810 in a manner that creates a visual connection between the two different views. Specifically, days view 640 includes photos 1402A-1402G, while all photos view 810 includes duplicate versions (e.g., 1412A-1412G) of photos 1402A-1402G. Accordingly, during the transition from days view 640 to all photos view 810, electronic device 600 moves photos 1402A-1402G from their respective initial locations to respective final locations, where the respective final locations are occupied by duplicate versions (e.g., 1412A-1412G) of photos 1402A-1402G. As a result, a visual connection between days view 640 and all photos view 810 is formed.

In some embodiments, electronic device 600 initiates a transition from days view 640 to all photos view 810 in response to detecting input 1406 with movement in the right-to-left direction. In some embodiments, all photos view 810 includes a non-curated set of media items (e.g., photos, videos) from a media library or representations thereof, as discussed above with respect to FIG. 8D.

Figure 14C:
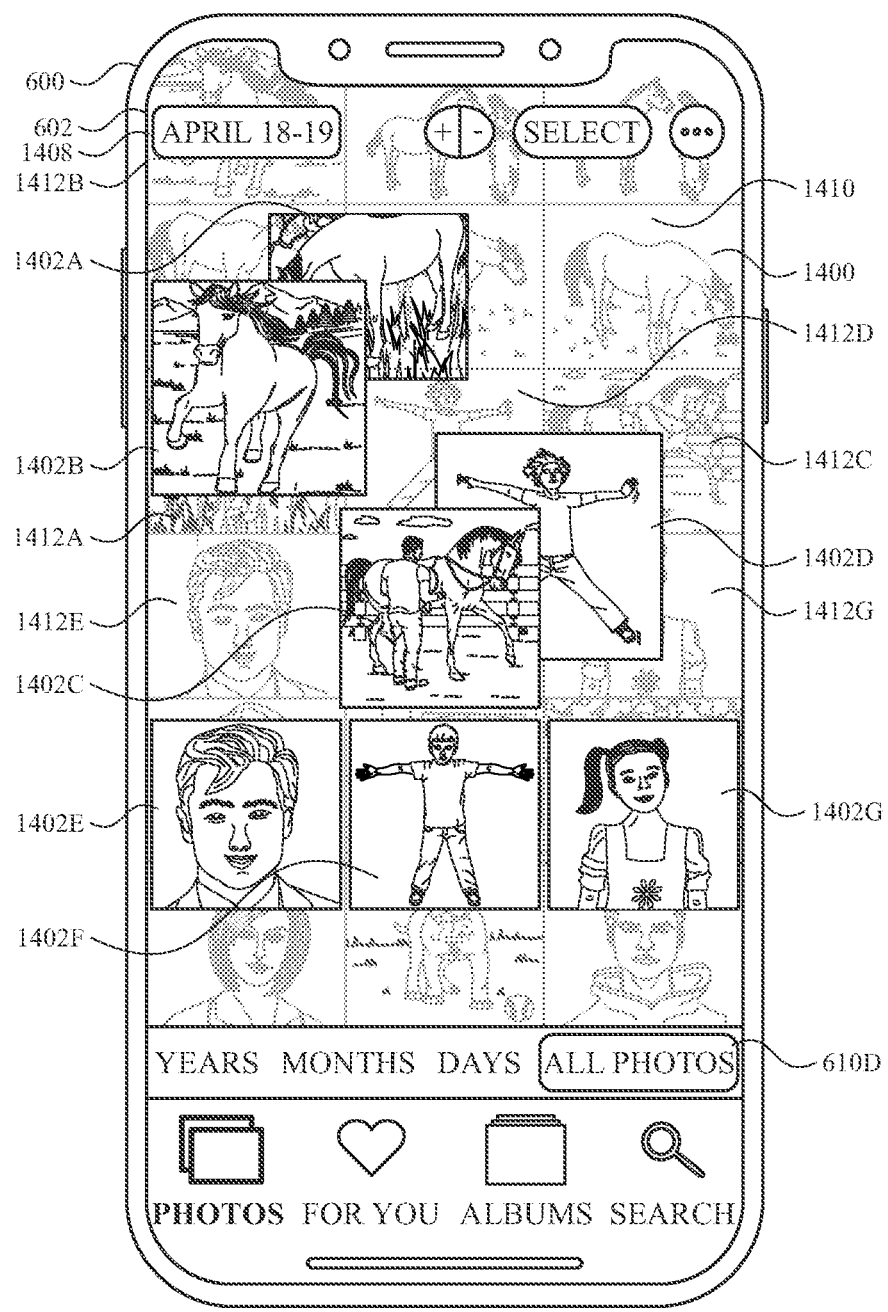
Figure 14D:
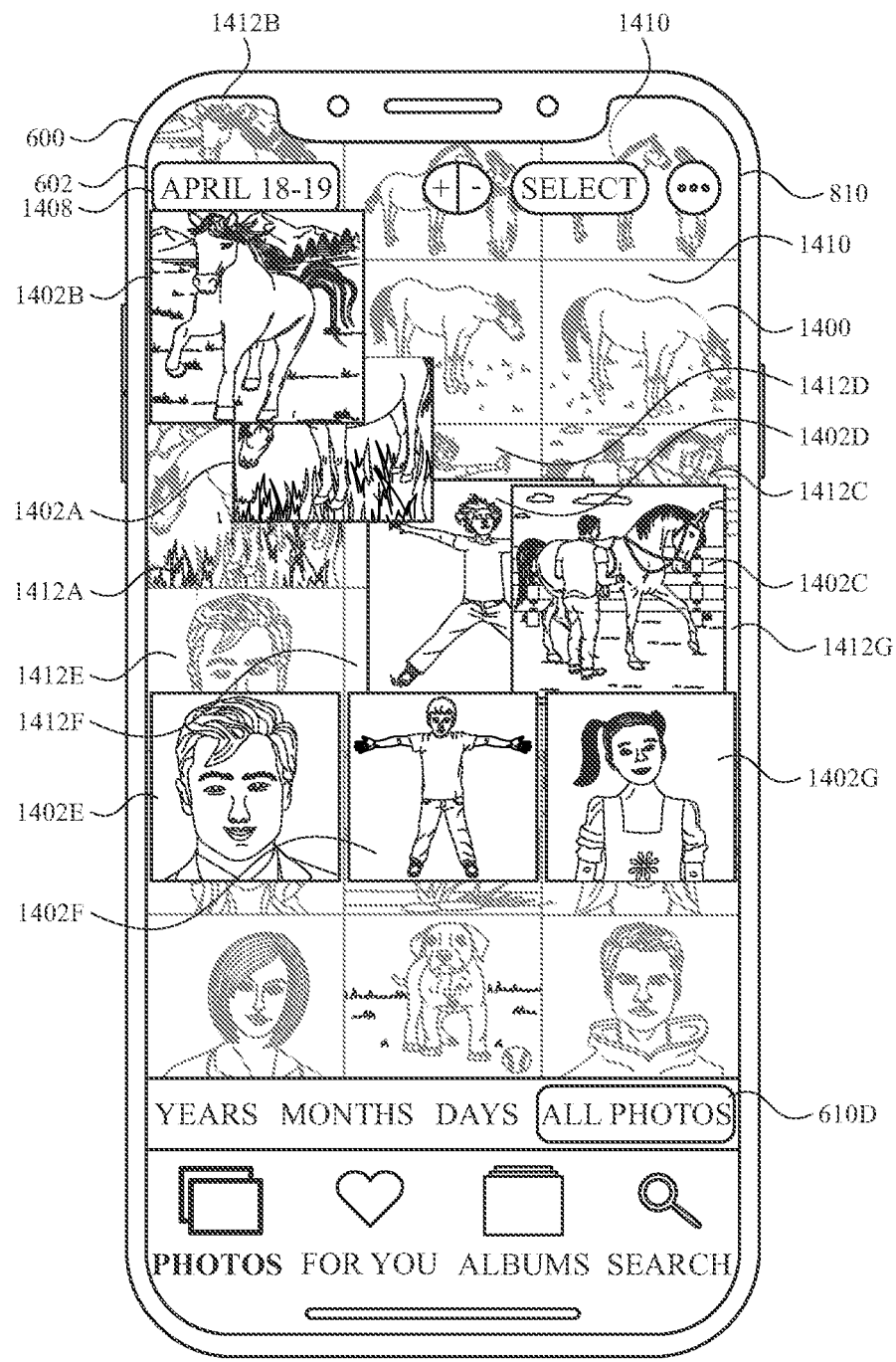
Figure 14E:
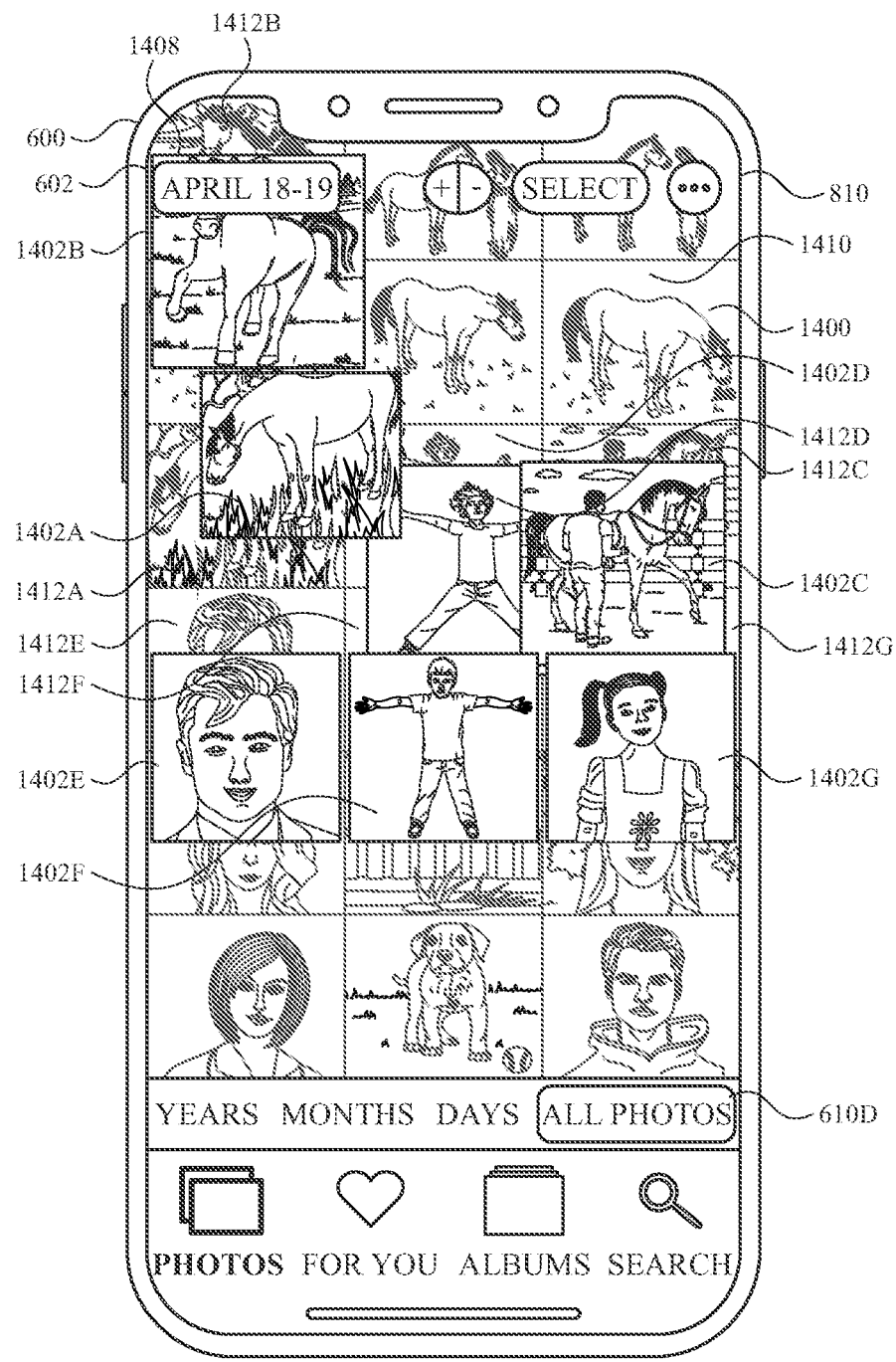
Figure 14F:
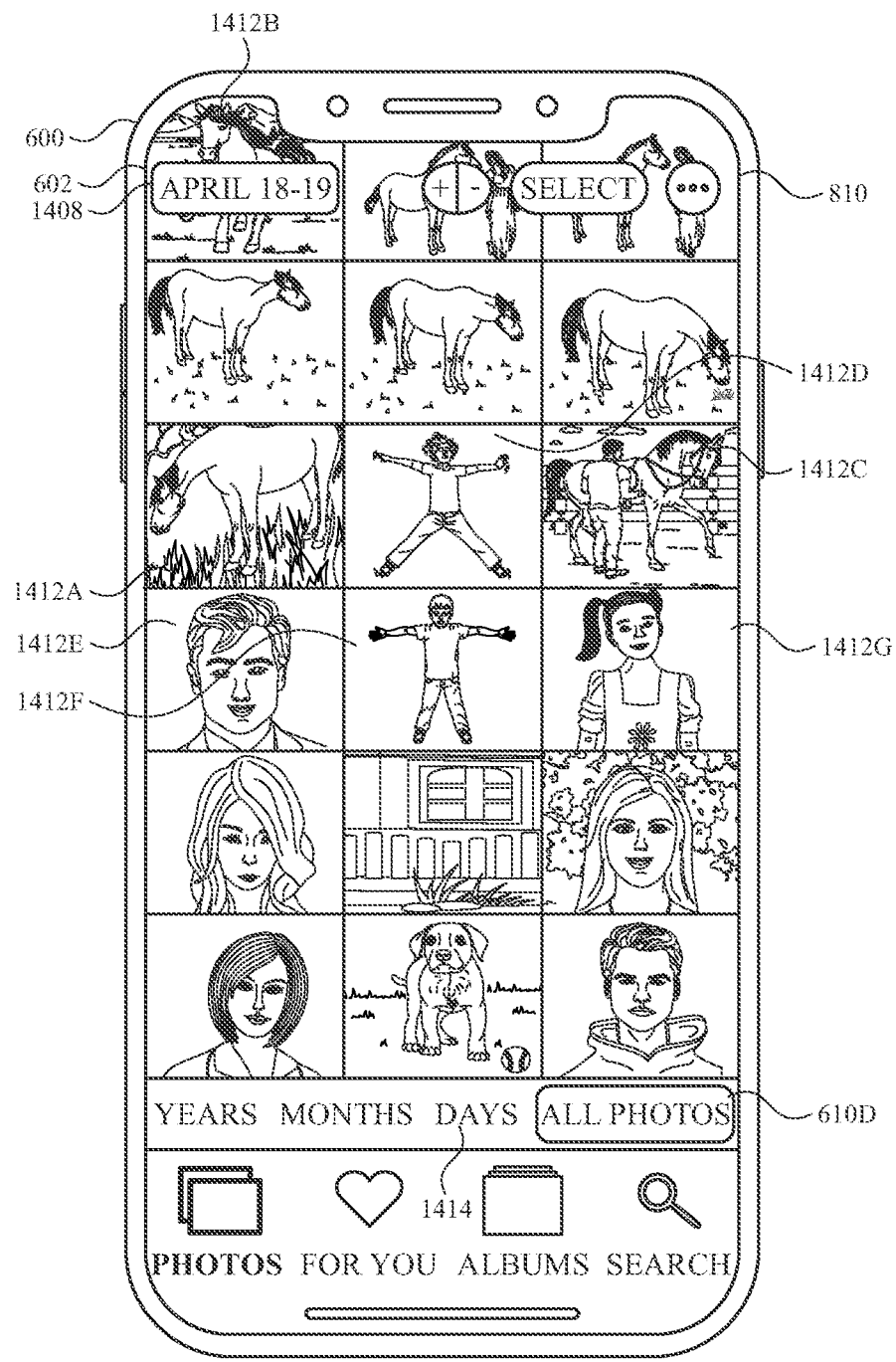

As depicted in FIGS. 14A-14F, during the transition from days view 640 to all photos view 810, electronic device 600 transforms photos 1402A-1402G from their respective initial states in FIG. 14A to their respective final states in FIG. 14F. Specifically, electronic device 600 moves photos 1402A-1402G from their respective initial locations in FIG. 14A to their respective final locations in FIG. 14F. As discussed above, the respective final locations are already occupied by duplicate versions (e.g., 1412A-1412G) of photos 1402A-1402G. For example, as shown in FIG. 14A, photo 1402A starts at an initial location at the top of display 602. During the transition from days view 640 to all photos view 810, electronic device 600 moves photo 1402A downward and to the left to the final location shown in FIG. 14F, where duplicate version 1412A already resides. It is noted that this movement of photo 1402A is displayed by electronic device 600. In contrast, electronic device 600 does not move photos of all photos view 810 (e.g., duplicate versions 1412A-1412G).

As shown in FIGS. 14A-14F, transforming photos 1402A-1402G also includes changing the respective displayed sizes of photos 1402A-1402G if resizing is required. In particular, electronic device 600 resizes one or more photos from their respective initial sizes in FIG. 14A to their respective final sizes in FIG. 14F. Resizing photos can include changing the level of magnification of the photo, cropping portions of the photo, changing the aspect ratio of the photo, or a combination thereof. For example, as shown in FIG. 14A, photo 1402A is displayed at an initial size with an aspect ratio (e.g., 16:9) corresponding to a landscape format. During the transition from days view 640 to all photos view 810, electronic device 600 resizes photo 1402A by cropping left and right portions of photo 1402A. As a result, the aspect ratio of photo 1402A changes to a final aspect ratio (e.g., 1:1) corresponding to a square format, which matches the aspect ratio of duplicate version 1412A.

Additionally, electronic device 600 changes the level of magnification of photo 1402A (e.g., zooms out on the photo), resulting in the final magnification level of duplicate version 1412A shown in FIG. 14F. As a result, electronic device 600 resizes photo 1402A to match the size of its duplicate version (e.g., 1412A). Transforming the photos (e.g., moving, resizing) in the manner described above provides a visual connection between days view 640 and all photos view 810.

Photos 1402B-1402G similarly undergo a transformation process during the transition from days view 640 to all photos view 810, as depicted in FIGS. 14A-14F.

Returning to the start of the transition at FIG. 14B, in response to detecting input 1404, electronic device 600 generates all photos view 810, which contains a plurality of photos including duplicate versions (e.g., 1412A-1412G) of photos 1402A-1402G. However, the user is unable to see all photos view 810 in FIG. 14B, as electronic device 600 overlays white layer 1410 that has full opacity on top of all photos view 810 such that all photos view 810 is completely covered. Thus, white layer 1410 is visible to the user while the underlying layer of all photos view 810 is not visible. Additionally, as depicted in FIG. 14B-14E, electronic device 600 displays the transformation (e.g., moving, resizing) of photos 1402A-1402G on top of white layer 1410.

At FIG. 14C, as the transition from days view 640 to all photos view 810 progresses, electronic device 600 reduces the opacity of white layer 1410 (e.g., increases transparency of white layer 1410). The reduced opacity of white layer 1410 reduces the obscuring of the underlying layer of all photos view 810, thereby allowing the photos of all photos view 810 to be visible, as depicted in FIG. 14C. At FIGS. 14D-14E, as the transition continues to progress, electronic device 600 further reduces the opacity of white layer 1410, thereby further reducing the obscuring of all photos view 810. As a result, the user can more easily see the photos of all photos view 810. Finally, at FIG. 14F, electronic device 600 reduces the opacity of white layer 1410 to zero, resulting in no obscuring of all photos view 810. Further, in some embodiments, at FIG. 14F, electronic device 600 ceases display of photos 1402A-1402G. It is noted that the techniques described above with respect to white layer 1410 improve the visual connection between days view 640 and all photos view 810.

Another connection between days view 640 and all photos view 810 is provided by the use of a consistent title. At days view 640 in FIG. 14A, title 1408 provides an indication of the particular time period to which one or more of the displayed photos (e.g., 1402A-1402G) correspond. Similarly, at FIG. 14F, all photos view 810 also includes title 1408. Thus, the photos in days view 640 and all photos view 810 correspond to the same time period. In some embodiments, electronic device 600 switches to a photo layout with a number of columns that exceeds a column threshold. In some embodiments, this type of photo layout includes a large number of photos. As a result, the title in these types of photo layouts corresponds to a longer time period (e.g., month, year). Thus, in these types of photo layouts, electronic device 600 would display a title different from title 1408, which corresponds to a time period of two days.

In some embodiments, during the transition from days view 640 to all photos view 810, boundary lines (e.g., 1416A-1416B) between photos continue to be displayed during the transition. In some embodiments, continuing to display the boundary lines during the transition improves the visual connection between days view 640 and all photos view 810.

In some embodiments, electronic device 600 initiates the transition from days view 640 to all photos view 810 in response to detecting an input with two contacts, where the distance between the two contacts is decreasing. In some embodiments, electronic device 600 initiates a transition from all photos view 810 to days view 640 in response to detecting an input with two contacts, where the distance between the two contacts is increasing.

In some embodiments, a user can return to days view 640 from all photos view 810 by performing a tap gesture at affordance 1414. In some embodiments, in response to detecting an input at affordance 1414, initiates a transition from all photos view 810 to days view 640. In some embodiments, the transition from all photos view 810 to days view 640 would occur in reverse order of FIGS. 14A-14F. In some embodiments, the reverse order of FIGS. 14A-14F includes white layer 1410 starting at full opacity at FIG. 14E, followed by opacity being reduced until opacity reaches zero at FIG. 14A.

FIG. 15 is a flow diagram illustrating a method for navigating a collection of media items using an electronic device in accordance with some embodiments. Method 1500 is performed at a device (e.g., 100, 300, 500, 600, 1200) with a display device. Some operations in method 1500 are, optionally, combined, the orders of some operations are, optionally, changed, and some operations are, optionally, omitted.

As described below, method 1500 provides an intuitive way for navigating a collection of media items. The method reduces the cognitive burden on a user for navigating a collection of media items, thereby creating a more efficient human-machine interface. For battery-operated computing devices, enabling a user to navigate a collection of media items faster and more efficiently conserves power and increases the time between battery charges.

The electronic device (e.g., 600) displays (1502), via the display device (e.g., 602), a plurality of content items (e.g., 1402A-1402G) (e.g., photo, video, or representations thereof) in a first layout (e.g., 640) (e.g., year, month, or days view/layout) (e.g., that includes a plurality of rows and a plurality of columns, that includes a single row or a single column).

As part of displaying the plurality of content items (e.g., 1402A-1402G) in the first layout (e.g., 640), the electronic device (e.g., 600) concurrently displays (1504) a first content item (e.g., 1402A) of the plurality of content items in a first location (e.g., at a first location/position/size), and a second content item (e.g., 1402B) of the plurality of content items in a second location (e.g., at a second location/position/size) different from the first location. In some embodiments, the first content item and the second content item are in a sequence (e.g., sequentially ordered).

Method 1500 further includes, while displaying, via the display device (e.g., 602), the plurality of content items (e.g., 1402A-1402G) in the first layout (e.g., 640), the electronic device (e.g., 600) detects (1506) a request to display a second layout different from the first layout (e.g., tap gesture (e.g., 1404) at a location corresponding to (e.g., at/on) a layout affordance (e.g., 610D) (e.g., all photos), voice input).

Method 1500 further includes, in response to detecting the request (e.g., 1404) to display the second layout, the electronic device (e.g., 600) starts (1508) to transition from the first layout (e.g., 640) to the second layout (e.g., 810). The second layout includes a plurality of rows and a plurality of columns.

As part of starting to transition from the first layout (e.g., 640) to the second layout (e.g., 810), the electronic device (e.g., 600) displays (1510) (e.g., initially displays), via the display device (e.g., 602), a third content item (e.g., a photo other than 1412A-1412G in FIG. 14F) that was not displayed in the first layout (e.g., at a particular size).

As part of starting to transition to the second layout, the electronic device (e.g., 600) displays (1512) (e.g., while concurrently displaying the third content item at a first fixed location), via the display device (e.g., 602), movement of the first content item (e.g., 1402A) from the first location to a third location in the second layout (e.g., 810). The third location is different from the first location and already contains a representation of the first content item (e.g., 1412A). In some embodiments, the first content item is selected for display in the second layout (e.g., by the electronic device) based on a determination (e.g., by the electronic device) that the second layout includes the first content item.

As part of starting to transition from the first layout (e.g., 640) to the second layout (e.g., 810), the electronic device (e.g., 600) displays (1514) (e.g., while concurrently displaying the third content item at a first fixed location), via the display device (e.g., 602), movement of the second content item (e.g., 1402B) from the second location to a fourth location in the second layout. The fourth location is different from the second location and already contains a representation of the second content item (e.g., 1412B). In some embodiments, the second content item is selected for display in the second layout (e.g., by the electronic device) based on a determination (e.g., by the electronic device) that the second layout includes the second content item. In some embodiments, the movement of the first content item and the second content item is displayed after the initial display of the third content item. In some embodiments, the sequential order of the first content item and the second content item is maintained (e.g., if a first content item comes before the second content item in the first layout, the first content item also comes before the second content item in the second layout). Displaying movement of a content item into a new location that already contains that content item provides the user with feedback about where the movement of the content item is heading. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first content item (e.g., 1402A) is displayed at a first size in the first layout (e.g., 640). In some embodiments, the second content item (e.g., 1402B) is displayed at a second size, different from the first size, in the first layout. In some embodiments, the first content item is displayed at a third size, different from the first size, in the second layout (e.g., 810 in FIG. 14F). In some embodiments, the second content item is displayed at a fourth size, different from the second size, in the second layout.

In some embodiments, the third size and the fourth size are the same. In some embodiments, the third content item is displayed at the third size (e.g., same as the fourth size) in the second layout.

In some embodiments, the aspect ratios of the content items changes when transitioning from the first layout (e.g., 640) to the second layout (e.g., 810). In some embodiments, the first content item is displayed at a first aspect ratio in the first layout and the second content item is displayed at a second aspect ratio, different from the first aspect ratio, in the first layout. In some embodiments, the first content item is displayed at a third aspect ratio, different from the first aspect ratio, in the second layout, and the second content item is displayed at a fourth aspect ratio, different from the second aspect ratio, in the second layout. In some embodiments, the third aspect ratio and the fourth aspect ratio are the same. In some embodiments, the third content item is displayed at the third aspect ratio (e.g., same as the fourth aspect ratio) in the second layout.

In some embodiments (e.g., when zooming in), when the first content item in the first layout (e.g., 640) uses a first display area, display of the first content item in the second layout uses the first display area and additional display area, thereby fully overlapping the first display area. In some embodiments (e.g., when zooming out), when the first content item in the first layout uses a first display area, display of the first content item in the second layout uses a portion of the first display area without using a second portion of the first display area and without using display area outside of the first display area, thereby fully overlapping the first display area.

In some embodiments, method 1500 further includes one or more of the following items. In some embodiments, while displaying, via the display device (e.g., 602), the plurality of content items (e.g., 1412A-1412G) in the second layout (e.g., 810), the electronic device (e.g., 600) detects a request to display the first layout (e.g., tap gesture at a location corresponding to (e.g., at/on) a layout affordance (e.g., 1414) (e.g., day view of photos), voice input). In some embodiments, in response to detecting the request (e.g., input at 1414) to display the first layout, the electronic device starts to transition from the second layout (e.g., 810 in FIG. 14F) to the first layout (e.g., 640 in FIG. 14A). In some embodiments, as part of starting to transition from the second layout to the first layout, the electronic device ceases to display the third content item (e.g., a photo other than 1412A-1412G in FIG. 14F). In some embodiments, as part of starting to transition from the second layout to the first layout, the electronic device displays (e.g., while no longer displaying the third content item), via the display device, movement of the first content item (e.g., 1412A) from the third location to the first location in the first layout. In some embodiments, the first location already contains a representation of the first content item (e.g., 1402A). In some embodiments, as part of starting to transition from the second layout to the first layout, the electronic device displays (e.g., while no longer displaying the third content item), via the display device, movement of the second content item (e.g., 1412B) from the fourth location to the second location in the first layout. In some embodiments, the second location already contains a representation of the second content item (e.g., 1402B). Displaying movement of a content item into a new location that already contains that content item provides the user with feedback about where the movement of the content item is heading. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, transitioning from the first layout (e.g., 640 in FIG. 14A) to the second layout (e.g., 810 in FIG. 14F) does not include movement of the third content item (e.g., a photo other than 1412A-1412G in FIG. 14F) that was not displayed in the first layout. In some embodiments, the second layout includes all the content items from the first layout and includes additional content items. In some embodiments, all content items from the first layout include movement during the transition to the second layout. In some embodiments, all the additional content items (that were not displayed in the first layout) do not include movement during the transition the second layout. Not moving content items that are newly displayed provides the user with feedback about which content items are newly displayed and were not available for viewing in the previous view. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of transitioning from the first layout (e.g., 640 in FIG. 14A) to the second layout (e.g., 810 in FIG. 14F), the electronic device (e.g., 600) displays (e.g., when starting the transition) a first visual layer (e.g., 1410) (e.g., a white-colored, a layer, a cover, a sheet) with an opacity level. In some embodiments, as part of transitioning from the first layout to the second layout, the electronic device reduces (e.g., gradually reducing) the opacity level of the first visual layer in conjunction with the movement of the first content item (e.g., 1402A) from the first location to the third location in the second layout (e.g., resulting in the opacity of the first visual layer becoming zero). In some embodiments, as part of displaying the third content item (e.g., a photo other than 1412A-1412G in FIG. 14F) that was not displayed in the first layout, the electronic device gradually displays the third content item as the opacity of the first visual layer is reduced. In some embodiments, reducing the opacity level reveals content items (e.g., the representation of the second content item that is not moving).

In some embodiments, as part of the transition from the first layout to the second layout, the electronic device displays (e.g., when starting the transition) a second visual layer (e.g., a white-colored, a layer, a cover, a sheet) with an opacity level, wherein the second visual layer overlaps (e.g., fully) the second content item that is displayed at the second location. In some embodiments, as part of the transition from the first layout to the second layout, the electronic device reduces (e.g., gradually reduces) the opacity level of the second visual layer in conjunction with the movement of the second content item from the second location to the fourth location in the second layout (e.g., resulting in the opacity of the second visual layer becoming zero). In some embodiments, the first visual layer and the second visual layer are part of the same visual layer and their levels of opacity match.

Changing the opacity of a layer in front of content items as other content items move into place provides the user with feedback about where the moving content items are going. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first visual layer (e.g., 1410) overlaps (e.g., fully) the representation of the first content item (e.g., 1412A) that is displayed at the third location. In some embodiments, first visual layer overlaps (e.g., fully) the third content item. In some embodiments, the second visual layer overlaps (e.g., fully) the second content item that is displayed at the second location.

In some embodiments, as part of displaying, via the display device (e.g., 602), the plurality of content items (e.g., 1402A-1402G) in the first layout (e.g., 640), the electronic device (e.g., 600) concurrently displays, on the display device, a first boundary (e.g., 1416A-1416B) (e.g., a first boundary line, as part of keylines) that separates a first column of the first layout from a second column of the first layout, wherein the second column is adjacent to the first column, and a second boundary (e.g., a second boundary line, as part of keylines) that separates the second column of the first layout from a third column of the first layout, wherein the third column is adjacent to the second column. In some embodiments, as part of the transition from the first layout to the second layout, the electronic device changes a distance (e.g., via an animation, increasing the distance when zooming in, decreasing the distance when zooming out) between the first boundary and the second boundary. In some embodiments, the distance between the boundary lines changes in conjunction with movement of the user input (e.g., pinch, de-pinch gesture) requesting to display the second layout. In some embodiments, the first and second boundary lines are parallel (and remain parallel throughout the transition). In some embodiments, the transition includes changing distances between a plurality of boundary lines (e.g., vertical and horizontal, keylines) that separate a plurality of columns and a plurality of rows. This indicates to the user that the first layout and the second layout are connected and that the first layout and the second layout share some content items.

In some embodiments, the request to display the second layout (e.g., 810) is a gesture (e.g., a multiple-finger gesture, a multiple-contact gesture) on a touch-sensitive surface of the electronic device (e.g., 600). In some embodiments, the gesture includes a plurality of contacts on the touch-sensitive surface. In some embodiments, the distance between the plurality of (e.g., two) contacts changes as the gesture progresses. In some embodiments, the request to display the second layout is a pinch or de-pinch gesture.

In some embodiments, the transition from the first layout (e.g., 640) to the second layout (e.g., 810) occurs in conjunction with the change in distance between the plurality of contacts (e.g., the transition progresses as the pinch/depinch gesture progresses). Transitioning the layout in conjunction with the movement of the contents provides the user with feedback that the input is causing the change from the first layout to the second layout. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the request to display the second layout is a swipe gesture (e.g., 1406) (e.g., a single-finger/contact swipe) on a touch-sensitive surface of the electronic device, wherein the swipe gesture originates at an edge of the touch-sensitive surface.

In some embodiments, the transition from the first layout (e.g., 640) to the second layout (e.g., 810) occurs in conjunction with the swipe gesture (e.g., the transition progresses as the swipe gesture progresses). In some embodiments, a swipe gesture results in the transition from the first layout to the second layout including collapsing the content items of the first layout into a container (e.g., in conjunction with the swipe gesture).

In some embodiments, the first layout (e.g., 640) includes display of (e.g., overlaid on the plurality of content items, displayed above the plurality of content items, displayed adjacent to a content item of the plurality of content items) a first label (e.g., 1408) (e.g., without displaying a second label, one or more indicators (e.g., date indicator, title indicator, location indicator) that include first information (e.g., month) and second information (e.g., year, location, title, day, hour)). In some embodiments, the second layout (e.g., 810) includes display of (e.g., overlaid on the plurality of content items, displayed above the plurality of content items, displayed adjacent to a content item of the plurality of content items) the first label (e.g., 1408). In some embodiments, method 1500 further includes one or more of the following items. While displaying, via the display device (e.g., 602), the plurality of content items (e.g., 1412A-1412G) in the second layout, the electronic device (e.g., 600) detects a second request to display a third layout (e.g., 810 in FIG. 10L) different from the first layout and the second layout (e.g., tap gesture at a location corresponding to (e.g., at/on) a layout affordance (e.g., all photos), voice input). In response to detecting the request to display the third layout, the electronic device transitions from the second layout to the third layout. In some embodiments, the third layout includes a plurality of rows and a plurality of columns. In some embodiments, the third layout includes display of more content items than the second layout (and more content items than the first layout). In some embodiments, the third layout includes display of (e.g., overlaid on the plurality of content items, displayed above the plurality of content items, displayed adjacent to a content item of the plurality of content items) a second label (e.g., 1003 in FIG. 10L) (e.g., without displaying the first label, one or more indicators (e.g., date indicator, title indicator, location indicator) that include first information (e.g., month) without including second information (e.g., year, location, title, day, hour), the first information and second information corresponding to at least some of the plurality of content items (and, optionally, displayed at a location selected based on the location of the corresponding content items)) different from the first label. In some embodiments, the content items in the third layout are all of the same aspect ratio (e.g., square) and of the same size.

In some embodiments, the second layout (e.g., 810 in FIG. 14F) (and/or the first layout, and/or a fourth layout that includes more content items than the third layout) includes a label (e.g., 1408) (e.g., a date label (month and/or year) that corresponds to a content item (e.g., 1412B) of displayed content items. In some embodiments, the label is displayed at a location. In some embodiments, the location of the label along a first axis (e.g., Y-axis, vertical display location) is based on the location of the corresponding content item (e.g., the label and the corresponding content item are displayed at the same vertical location, input that changes the vertical location of the corresponding content item also similarly changes the vertical location of the label). In some embodiments, the location of the label along a second axis (e.g., X-axis, horizontal display location) is not based on the location of the corresponding content item. In some embodiments, as the content items scroll on the display or are rearranged, the display location of content items change. When a content item has a corresponding label (e.g., marking the date, year, location of the content item), the label for that content item (which is also optionally a label for a group of content items of which the corresponding item is a member) moves with the content item in the vertical direction (as the content item moves up, the label moves up) but does not move with the content item in the horizontal direction (as the content item moves in the horizontal direction, the horizontal location of the label does not change).

Note that details of the processes described above with respect to method 1500 (e.g., FIG. 15) are also applicable in an analogous manner to the methods described above. For example, method 1500 optionally includes one or more of the characteristics of the various methods described above with reference to methods 700 and 900. For example, when performing method 1500, electronic device 600 implements days view 640 and/or all photos view 810 in the manner discussed above with respect to methods 700 and 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the presentation of media content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present targeted content that is of greater interest to the user. Accordingly, use of such personal information data enables users to calculated control of the presented content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of media content presentation services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and presented to users by inferring preferences based on non-personal information data or a bare minimum amount of personal information, such as the content being requested by the device associated with a user, other non-personal information available to the content presentation services, or publicly available information.

What is claimed is:

1. An electronic device, comprising:
  a display device;
  one or more input devices;
  one or more processors; and
  memory storing one or more programs configured to be executed by the one or more processors, the one or more programs including instructions for:
    displaying, via the display device, a first plurality of representations of media items in a first view of a collection of media items, wherein a plurality of media items in the collection of media items include content that can be played back over time;
    while displaying the first plurality of representations of media items in the first view, receiving, via the one or more input devices, a first input that corresponds to a request to navigate through a portion of the first view of the collection of media items that includes representations of two or more media items that include content that can be played back over time;

in response to receiving the first input, navigating through the first view of the collection of media items and while navigating through the first view of the collection of media items automatically playing content from two or more of the media items in the plurality of media items;

after navigating through the first view of the collection of media items, receiving, via the one or more input devices, a second input that corresponds to a request to switch to a second view of the collection of media items;

in response to receiving the second input, displaying a second plurality of representations of media items in the second view of the collection of media items;

while displaying the second plurality of representations of media items in the second view of the collection of media items, receiving, via the one or more input devices, a third input that corresponds to a request to navigate through a portion of the second view of the collection of media items that includes representations of two or more media items that include content that can be played back over time; and in response to receiving the third input, navigating through the second view of the collection of media items without automatically playing content from media items in the plurality of media items.

2. The electronic device of claim 1, wherein:
the plurality of media items in the collection includes at least one media item that includes content that can be played back over time that is not selected for automatic playback, and further wherein the at least one media item is different from the two or more media items, and
the one or more programs further include instructions for:
while navigating through the collection of media items, forgoing automatically playing content from the at least one media item of the plurality of media items that is not selected for automatic playback.

3. The electronic device of claim 2, wherein the two or more media items that are selected for automatic playback are displayed larger than the one or more media items not selected for automatic playback.

4. The electronic device of claim 1, wherein the two or more media items are selected for automatic playback based on the two or more media items having a higher priority than other media items that are not selected for automatic playback.

5. The electronic device of claim 1, wherein displaying representations of media items in the second view of the collection of media items comprises:
displaying, via the display device, the representations of media items in the second view arranged as a multi-row multi-column array having a first spacing;
receiving, via the one or more input devices; a fourth input; and
in response to receiving the fourth input:
in accordance with a determination that the fourth input corresponds to a request to zoom in, re-arranging the representations of media items in the second view to have a second spacing, including:
reducing one or more of: a number of displayed rows of representations of media items, and a number of displayed columns of representations of media items; and
increasing sizes of the representations of media items in the second view; and
in accordance with a determination that the fourth input corresponds to a request to zoom out, re-arranging the representations of media items in the second view to have a third spacing, including:
increasing one or more of: the number of displayed rows of representations of media items, and the number of displayed columns of representations of media items; and
reducing sizes of the representations of media items in the second view.

6. The electronic device of claim 5, the one or more programs further including instructions for:
subsequent to receiving the fourth input, receiving, via the one or more input devices, a fifth input; and
in response to receiving the fifth input:
in accordance with a determination that the fifth input corresponds to a request to zoom in while displaying the representations of media items in the second view having the second spacing, re-arranging the representations of media items in the second view to have a fourth spacing, including:
reducing one or more of: the number of displayed rows of representations of media items, and the number of displayed columns of representations of media items; and
increasing sizes of the representations of media items in the second view; and
in accordance with a determination that the fifth input corresponds to a request to zoom out while displaying the representations of media items in the second view having the third spacing, re-arranging the representations of media items in the second view to have a fifth spacing, including:
increasing one or more of: the number of displayed rows of representations of media items, and the number of displayed columns of representations of media items; and
reducing sizes of the representations of media items in the second view.

7. The electronic device of claim 5, wherein:
re-arranging the representations of media items in the second view to have the second spacing includes re-arranging the representations of media items in the second view into a single-item array of representations of media items, and
the one or more programs further include instructions for:
while displaying the single-item array of representations of media items:
receiving, via the one or more input devices, a sixth input at a location of a representation of a first media item from the collection of media items; and
in response to receiving the sixth input:
in accordance with a determination that the sixth input represents a swipe gesture in a first direction, navigating through the collection of media items to display a representation of a second media item from the collection of media items; and
in accordance with a determination that the sixth input represents a swipe gesture in a second direction different from the first direction, performing an action associated with the first media item.

8. The electronic device of claim 1, wherein navigating through the first view of the collection of media items comprises scrolling the collection of media items in the first view; and
wherein automatically playing content from two or more of the media items in the plurality of media items while navigating through the collection of media items comprises, while scrolling the collection of media items in the first view:
automatically playing content from a first media item of the two or more media items based at least in part on a scroll position of the first media item in the first view.

9. The electronic device of claim 8, the one or more programs further including instructions for:
while scrolling the collection of media items in the first view, and while automatically playing content from the first media item of the two or more media items:
automatically playing content from a second media item of the two or more media items based at least in part on a scroll position of the second media item in the first view; and
ceasing to automatically play content from the first media item of the two or more media items while continuing to display a representation of the first media item of the two or more media items.

10. The electronic device of claim 1, wherein media items that are displayed in the first view of the collection of media items are selected so as to exclude one or more media items that are displayed in the second view of the collection of media items.

11. The electronic device of claim 1,
wherein the first plurality of representations of media items in the first view includes representations that are at least two different sizes; and
wherein the second plurality of representations of media items in the second view include representations that are each uniform in size.

12. The electronic device of claim 1, the one or more programs further including instructions for:
while displaying either the first view or the second view:
receiving, via the one or more input devices, a seventh input that corresponds to selection of a representation of a media item; and
in response to receiving the seventh input, replacing display of, via the display device, the first view or the second view with display of a one-up view of the selected media item.

13. The electronic device of claim 12, the one or more programs further including instructions for:
while displaying the one-up view of the selected media item, receiving, via the one or more input devices, an eighth input; and
in response to receiving the eighth input, and while continuing to display at least a portion of the selected media item:
in accordance with a determination that the eighth input is a swipe gesture in a third direction, displaying, via the display device, one or more options for entering information to be associated with the selected media item.

14. The electronic device of claim 1, the one or more programs further including instructions for:
while displaying either the first view of the collection of media items or the second view of the collection of media items, displaying, via the display device, an indication of a boundary between a first set of media items of the collection of media items and a second set of media items of the collection of media items,
wherein the first set of media items is different from the second set of media items,
wherein the first set of media items are related to each other based on satisfying a first criteria, and
wherein the second set of media items are related to each other based on satisfying a second criteria different from the first criteria.

15. The electronic device of claim 14, wherein displaying the indication of the boundary between the first set of media items of the collection of media items and the second set of media items comprises concurrently displaying:
at least a portion of the second set of media items with a dimmed appearance while the second set of media items is not a currently viewed set of media items; and
at least a portion of the first set of media items without a dimmed appearance while the first set of media items is a currently viewed set of media items.

16. The electronic device of claim 14, wherein displaying the indication of the boundary between the first set of media items of the collection of media items and the second set of media items comprises displaying metadata.

17. The electronic device of claim 1, the one or more programs further including instructions for:
while displaying a third set of representations of media items from the collection of media items, receiving, via the one or more input devices, a ninth input,
wherein the third set of representations are each displayed having a uniform aspect ratio, and
wherein each media item corresponding to the third set of representations is associated with an actual aspect ratio; and
in response to receiving the ninth input, transitioning the representations of the third set of representations from the uniform aspect ratio to the actual aspect ratio of their corresponding media item, and wherein at least two representations of the second set of representations have different actual aspect ratios.

18. A non-transitory computer-readable storage medium storing one or more programs configured to be executed by one or more processors of an electronic device with a display device and one or more input devices, the one or more programs including instructions for:
displaying, via the display device, a first plurality of representations of media items in a first view of a collection of media items, wherein a plurality of media items in the collection of media items include content that can be played back over time;
while displaying the first plurality of representations of media items in the first view, receiving, via the one or more input devices, a first input that corresponds to a request to navigate through a portion of the first view of the collection of media items that includes representations of two or more media items that include content that can be played back over time;
in response to receiving the first input, navigating through the first view of the collection of media items and while navigating through the first view of the collection of media items automatically playing content from two or more of the media items in the plurality of media items;
after navigating through the first view of the collection of media items, receiving, via the one or more input devices, a second input that corresponds to a request to switch to a second view of the collection of media items;

in response to receiving the second input, displaying a second plurality of representations of media items in the second view of the collection of media items;

while displaying the second plurality of representations of media items in the second view of the collection of media items, receiving, via the one or more input devices, a third input that corresponds to a request to navigate through a portion of the second view of the collection of media items that includes representations of two or more media items that include content that can be played back over time; and in response to receiving the third input, navigating through the second view of the collection of media items without automatically playing content from media items in the plurality of media items.

19. The non-transitory computer-readable storage medium of claim 18, wherein:

the plurality of media items in the collection includes at least one media item that includes content that can be played back over time that is not selected for automatic playback, and further wherein the at least one media item is different from the two or more media items, and the one or more programs further include instructions for:
while navigating through the collection of media items, forgoing automatically, playing content from the at least one media item of the plurality of media items that is not selected for automatic playback.

20. The non-transitory computer-readable storage medium of claim 19, wherein the two or more media items that are selected for automatic playback are displayed larger than the one or more media items not selected for automatic playback.

21. The non-transitory computer-readable storage medium of claim 18, wherein the two or more media items are selected for automatic playback based on the two or more media items having a higher priority than other media items that are not selected for automatic playback.

22. The non-transitory computer-readable storage medium of claim 18, wherein displaying representations of media items in the second view of the collection of media items comprises:

displaying, via the display device, the representations of media items in the second view arranged as a multi-row multi-column array having a first spacing;

receiving, via the one or more input devices; a fourth input; and in response to receiving the fourth input:
in accordance with a determination that the fourth input corresponds to a request to zoom in, re-arranging the representations of media items in the second view to have a second spacing, including:
reducing one or more of: a number of displayed rows of representations of media items, and a number of displayed columns of representations of media items; and
increasing sizes of the representations of media items in the second view; and
in accordance with a determination that the fourth input corresponds to a request to zoom out, re-arranging the representations of media items in the second view to have a third spacing, including:
increasing one or more of: the number of displayed rows of representations of media items, and the number of displayed columns of representations of media items; and
reducing sizes of the representations of media items in the second view.

23. The non-transitory computer-readable storage medium of claim 22, the one or more programs further including instructions for:

subsequent to receiving the fourth input, receiving, via the one or more input devices, a fifth input; and in response to receiving the fifth input:
in accordance with a determination that the fifth input corresponds to a request to zoom in while displaying the representations of media items in the second view having the second spacing, re-arranging the representations of media items in the second view to have a fourth spacing, including:
reducing one or more of: the number of displayed rows of representations of media items, and the number of displayed columns of representations of media items; and
increasing sizes of the representations of media items in the second view; and
in accordance with a determination that the fifth input corresponds to a request to zoom out while displaying the representations of media items in the second view having the third spacing, re-arranging the representations of media items in the second view to have a fifth spacing, including:
increasing one or more of: the number of displayed rows of representations of media items, and the number of displayed columns of representations of media items; and
reducing sizes of the representations of media items in the second view.

24. The non-transitory computer-readable storage medium of claim 22, wherein:

re-arranging the representations of media items in the second view to have the second spacing includes re-arranging the representations of media items in the second view into a single-item array of representations of media items, and the one or more programs further include instructions for:
while displaying the single-item array of representations of media items:
receiving, via the one or more input devices, a sixth input at a location of a representation of a first media item from the collection of media items; and
in response to receiving the sixth input:
in accordance with a determination that the sixth input represents a swipe gesture in a first direction, navigating through the collection of media items to display a representation of a second media item from the collection of media items; and
in accordance with a determination that the sixth input represents a swipe gesture in a second direction different from the first direction, performing an action associated with the first media item.

25. The non-transitory computer-readable storage medium of claim 18, wherein navigating through the first view of the collection of media items comprises scrolling the collection of media items in the first view; and wherein automatically playing content from two or more of the media items in the plurality, of media items while navigating through the collection of media items comprises, while scrolling the collection of media items in the first view:
automatically playing content from a first media item of the two or more media items based at least in part on a scroll position of the first media item in the first view.

26. The non-transitory computer-readable storage medium of claim 25, the one or more programs further including instructions for:
while scrolling the collection of media items in the first view, and while automatically playing content from the first media item of the two or more media items:
automatically playing content from a second media item of the two or more media items based at least in part on a scroll position of the second media item in the first view; and
ceasing to automatically play content from the first media item of the two or more media items while continuing to display a representation of the first media item of the two or more media items.

27. The non-transitory computer-readable storage medium of claim 18, wherein media items that are displayed in the first view of the collection of media items are selected so as to exclude one or more media items that are displayed in the second view of the collection of media items.

28. The non-transitory computer-readable storage medium of claim 18:
wherein the first plurality of representations of media items in the first view includes representations that are at least two different sizes; and
wherein the second plurality of representations of media items in the second view include representations that are each uniform in size.

29. The non-transitory computer-readable storage medium of claim 18, the one or more programs further including instructions for:
while displaying either the first view or the second view:
receiving, via the one or more input devices, a seventh input that corresponds to selection of a representation of a media item; and
in response to receiving the seventh input, replacing display of, via the display device, the first view or the second view with display of a one-up view of the selected media item.

30. The non-transitory computer-readable storage medium of claim 29, the one or more programs further including instructions for:
while displaying the one-up view of the selected media item, receiving, via the one or more input devices, an eighth input; and
in response to receiving the eighth input, and while continuing to display at least a portion of the selected media item:
in accordance with a determination that the eighth input is a swipe gesture in a third direction, displaying, via the display device, one or more options for entering information to be associated with the selected media item.

31. The non-transitory computer-readable storage medium of claim 18, the one or more programs further including instructions for:
while displaying either the first view of the collection of media items or the second view of the collection of media items, displaying, via the display device, an indication of a boundary between a first set of media items of the collection of media items and a second set of media items of the collection of media items,
wherein the first set of media items is different from the second set of media items,
wherein the first set of media items are related to each other based on satisfying a first criteria, and
wherein the second set of media items are related to each other based on satisfying a second criteria different from the first criteria.

32. The non-transitory computer-readable storage medium of claim 31, wherein displaying the indication of the boundary between the first set of media items of the collection of media items and the second set of media items comprises concurrently displaying:
at least a portion of the second set of media items with a dimmed appearance while the second set of media items is not a currently viewed set of media items; and
at least a portion of the first set of media items without a dimmed appearance while the first set of media items is a currently viewed set of media items.

33. The non-transitory computer-readable storage medium of claim 31, wherein displaying the indication of the boundary between the first set of media items of the collection of media items and the second set of media items comprises displaying metadata.

34. The non-transitory computer-readable storage medium of claim 18, the one or more programs further including instructions for:
while displaying a third set of representations of media items from the collection of media items, receiving, via the one or more input devices, a ninth input,
wherein the third set of representations are each displayed having a uniform aspect ratio, and
wherein each media item corresponding to the third set of representations is associated with an actual aspect ratio; and
in response to receiving the ninth input, transitioning the representations of the third set of representations from the uniform aspect ratio to the actual aspect ratio of their corresponding media item, and wherein at least two representations of the second set of representations have different actual aspect ratios.

35. A computer-implemented method, comprising:
at an electronic device with a display device and one or more input devices:
displaying, via the display device, a first plurality of representations of media items in a first view of a collection of media items, wherein a plurality of media items in the collection of media items include content that can be played back over time;
while displaying the first plurality of representations of media items in the first view, receiving, via the one or more input devices, a first input that corresponds to a request to navigate through a portion of the first view of the collection of media items that includes representations of two or more media items that include content that can be played back over time;
in response to receiving the first input, navigating through the first view of the collection of media items and while navigating through the first view of the collection of media items automatically playing content from two or more of the media items in the plurality of media items;
after navigating through the first view of the collection of media items, receiving, via the one or more input devices, a second input that corresponds to a request to switch to a second view of the collection of media items;
in response to receiving the second input, displaying a second plurality of representations of media items in the second view of the collection of media items;
while displaying the second plurality of representations of media items in the second view of the collection of media items, receiving, via the one or more input devices, a third input that corresponds to a request to navigate through a portion of the second view of the collection of media items that includes representations of two or more media items that include content that can be played back over time; and in response to receiving the third input, navigating through the second view of the collection of media items without automatically playing content from media items in the plurality of media items.

36. The method of claim 35, wherein:
the plurality of media items in the collection includes at least one media item that includes content that can be played back over time that is not selected for automatic playback, and further wherein the at least one media item is different from the two or more media items, and
the method further comprises:
while navigating through the collection of media items, forgoing automatically, playing content from the at least one media item of the plurality of media items that is not selected for automatic playback.

37. The method of claim 36, wherein the two or more media items that are selected for automatic playback are displayed larger than the one or more media items not selected for automatic playback.

38. The method of claim 35, wherein the two or more media items are selected for automatic playback based on the two or more media items having a higher priority than other media items that are not selected for automatic playback.

39. The method of claim 35, wherein displaying representations of media items in the second view of the collection of media items comprises:
displaying, via the display device, the representations of media items in the second view arranged as a multi-row multi-column array having a first spacing;
receiving, via the one or more input devices; a fourth input; and
in response to receiving the fourth input:
in accordance with a determination that the fourth input corresponds to a request to zoom in, re-arranging the representations of media items in the second view to have a second spacing, including:
reducing one or more of: a number of displayed rows of representations of media items, and a number of displayed columns of representations of media items; and
increasing sizes of the representations of media items in the second view; and
in accordance with a determination that the fourth input corresponds to a request to zoom out, re-arranging the representations of media items in the second view to have a third spacing, including:
increasing one or more of: the number of displayed rows of representations of media items, and the number of displayed columns of representations of media items; and
reducing sizes of the representations of media items in the second view.

40. The method of claim 39, further comprising:
subsequent to receiving the fourth input, receiving, via the one or more input devices, a fifth input; and
in response to receiving the fifth input:
in accordance with a determination that the fifth input corresponds to a request to zoom in while displaying the representations of media items in the second view having the second spacing, re-arranging the representations of media items in the second view to have a fourth spacing, including:
reducing one or more of: the number of displayed rows of representations of media items, and the number of displayed columns of representations of media items; and
increasing sizes of the representations of media items in the second view; and
in accordance with a determination that the fifth input corresponds to a request to zoom out while displaying the representations of media items in the second view having the third spacing, re-arranging the representations of media items in the second view to have a fifth spacing, including:
increasing one or more of: the number of displayed rows of representations of media items, and the number of displayed columns of representations of media items; and
reducing sizes of the representations of media items in the second view.

41. The method of claim 39, wherein:
re-arranging the representations of media items in the second view to have the second spacing includes re-arranging the representations of media items in the second view into a single-item array of representations of media items, and
the method further comprises:
while displaying the single-item array of representations of media items:
receiving, via the one or more input devices, a sixth input at a location of a representation of a first media item from the collection of media items; and
in response to receiving the sixth input:
in accordance with a determination that the sixth input represents a swipe gesture in a first direction, navigating through the collection of media items to display a representation of a second media item from the collection of media items; and
in accordance with a determination that the sixth input represents a swipe gesture in a second direction different from the first direction, performing an action associated with the first media item.

42. The method of claim 35, wherein navigating through the first view of the collection of media items comprises scrolling the collection of media items in the first view; and
wherein automatically playing content from two or more of the media items in the plurality of media items while navigating through the collection of media items comprises, while scrolling the collection of media items in the first view:
automatically playing content from a first media item of the two or more media items based at least in part on a scroll position of the first media item in the first view.

43. The method of claim 42, further comprising:
while scrolling the collection of media items in the first view, and while automatically playing content from the first media item of the two or more media items:
automatically playing content from a second media item of the two or more media items based at least in part on a scroll position of the second media item in the first view; and
ceasing to automatically play content from the first media item of the two or more media items while continuing to display a representation of the first media item of the two or more media items.

44. The method of claim 35, wherein media items that are displayed in the first view of the collection of media items are selected so as to exclude one or more media items that are displayed in the second view of the collection of media items.

45. The method of claim 35,
wherein the first plurality of representations of media items in the first view includes representations that are at least two different sizes; and
wherein the second plurality of representations of media items in the second view include representations that are each uniform in size.

46. The method of claim 35, further comprising:
while displaying either the first view or the second view:
receiving, via the one or more input devices, a seventh input that corresponds to selection of a representation of a media item; and
in response to receiving the seventh input, replacing display of via the display device, the first view or the second view with display of a one-up view of the selected media item.

47. The method of claim 46, further comprising:
while displaying the one-up view of the selected media item, receiving, via the one or more input devices, an eighth input; and
in response to receiving the eighth input, and while continuing to display at least a portion of the selected media item:
in accordance with a determination that the eighth input is a swipe gesture in a third direction, displaying, via the display device, one or more options for entering information to be associated with the selected media item.

48. The method of claim 35, further comprising:
while displaying either the first view of the collection of media items or the second view of the collection of media items, displaying, via the display device, an indication of a boundary between a first set of media items of the collection of media items and a second set of media items of the collection of media items,
wherein the first set of media items is different from the second set of media items,
wherein the first set of media items are related to each other based on satisfying a first criteria, and
wherein the second set of media items are related to each other based on satisfying a second criteria different from the first criteria.

49. The method of claim 48, wherein displaying the indication of the boundary between the first set of media items of the collection of media items and the second set of media items comprises concurrently displaying:
at least a portion of the second set of media items with a dimmed appearance while the second set of media items is not a currently viewed set of media items; and
at least a portion of the first set of media items without a dimmed appearance while the first set of media items is a currently viewed set of media items.

50. The method of claim 48, wherein displaying the indication of the boundary between the first set of media items of the collection of media items and the second set of media items comprises displaying metadata.

51. The method of claim 35, further comprising:
while displaying a third set of representations of media items from the collection of media items, receiving, via the one or more input devices, a ninth input,
wherein the third set of representations are each displayed having a uniform aspect ratio, and
wherein each media item corresponding to the third set of representations is associated with an actual aspect ratio; and
in response to receiving the ninth input, transitioning the representations of the third set of representations from the uniform aspect ratio to the actual aspect ratio of their corresponding media item, and wherein at least two representations of the second set of representations have different actual aspect ratios.

* * * * *